US006965816B2

(12) United States Patent
Walker

(10) Patent No.: US 6,965,816 B2
(45) Date of Patent: Nov. 15, 2005

(54) PFN/TRAC SYSTEM FAA UPGRADES FOR ACCOUNTABLE REMOTE AND ROBOTICS CONTROL TO STOP THE UNAUTHORIZED USE OF AIRCRAFT AND TO IMPROVE EQUIPMENT MANAGEMENT AND PUBLIC SAFETY IN TRANSPORTATION

(75) Inventor: Richard C. Walker, Waldorf, MD (US)

(73) Assignee: Kline & Walker, LLC, Potomac, MD (US)

( * ) Notice: Subject to any disclaimer, the term of this patent is extended or adjusted under 35 U.S.C. 154(b) by 203 days.

(21) Appl. No.: 10/260,525

(22) Filed: Oct. 1, 2002

(65) Prior Publication Data

US 2003/0093187 A1 May 15, 2003

Related U.S. Application Data

(60) Provisional application No. 60/330,085, filed on Oct. 19, 2001, and provisional application No. 60/325,538, filed on Oct. 1, 2001.

(51) Int. Cl.$^7$ .......................... G06F 19/00; G06F 7/00
(52) U.S. Cl. .............................. 701/16; 701/2; 244/189
(58) Field of Search .......................... 701/3, 36, 2, 29; 180/170; 713/200

(56) References Cited

U.S. PATENT DOCUMENTS

| 2003/0055541 | A1 * | 3/2003 | Haley | 701/11 |
|---|---|---|---|---|
| 2003/0090382 | A1 * | 5/2003 | Shear | 340/574 |
| 2003/0128122 | A1 * | 7/2003 | Reynolds | 340/573.1 |
| 2004/0021581 | A1 * | 2/2004 | Weigl | 340/945 |

* cited by examiner

Primary Examiner—Thomas G. Black
Assistant Examiner—Ronnie Mancho
(74) Attorney, Agent, or Firm—Irah H. Donner, Esq.; Wilmer Cutler Pickering Hale and Dorr LLP

(57) ABSTRACT

This invention, a Protected Primary Focal Node PFN is a Trusted Remote Activity Controller TRAC and mobile communication router platform that provides accountable remote and robotics control to transportation vehicles by interfacing with the vehicles E/E systems. It connects each vehicle either on the earth's surface or near the earth's surface with application specific intranets for air, sea and land travel, via either host commercial servers or agency providers through wireless communication gateways and then further interfaces these vehicles in a larger machine messaging matrix via wireless and IP protocols to further coordinate movement assess and manage equipment use and impact on the world resources, societies infrastructure and the environment. This filing focuses directly on PFN/TRAC System use to augment and upgrade public safety and security in the Airline Industry and restrict any unauthorized use of an aircraft. Additionally, this application and related filings teaches the PFN/TRAC System™ use for all vehicle platforms to increase safety and security in a free society like the United State of America. The other related filings instruct in the technology's use for robust and accountable remote control for personal applications, stationary equipment and standalone functions, and coordinates them and interfaces them within the communication matrix. The TRAC controller also performs translation and repeating functions across a wide variety of communication protocols to complete a more mobile flexible matrix or web. This connected communication matrix of computers and humans provides an enhanced Human Machine Interfacing HMI scenario both locally and systemically in real-time for improve equipment management and world stability.

46 Claims, 48 Drawing Sheets

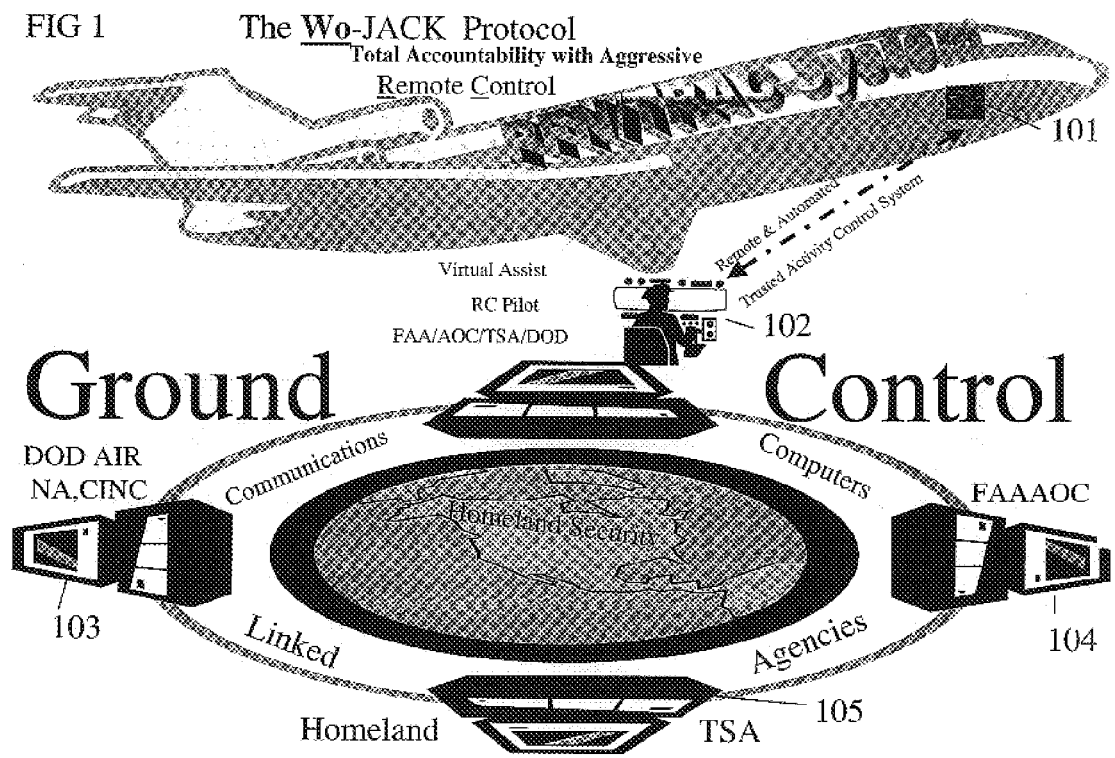

FIG 2

First Generation Benefits
1 A   PFN/TRAC unit

<u>C</u>ommercial <u>O</u>ff <u>T</u>he <u>S</u>helf Products (COTS) = Rapid Deployment

- Existing automated controls with- ground links established
- Progressive Functionality = Every Step Increases Security
- Greater real-time flexible responses for troubled aircraft
- Easier to Protect Machine Controls  Vs. Cock pit or Cabin.
- Increases Cockpit and Cabin Protection, Security & Management
- Coordinates Government Services for Homeland Security Via Advanced Ground and Air--- <u>H</u>uman <u>M</u>achine <u>I</u>nterfacing A basic ASIC design with progression & interfaces to be determined

Second Generation PFN

- SOC Consolidation and Greater System Protection
- More Affordable and Available in Smaller Aircraft
- More Pilot Assist Programed Flights and Landings Eliminate JFK Jr. Limited Skill Scenario for any Pilot.
- Redundant Accountable Event Storage Locally & Remotely
- More Control Over Carryon Electronics and Materials
- Better Occupant Identification and Emergency Management

FIG 4

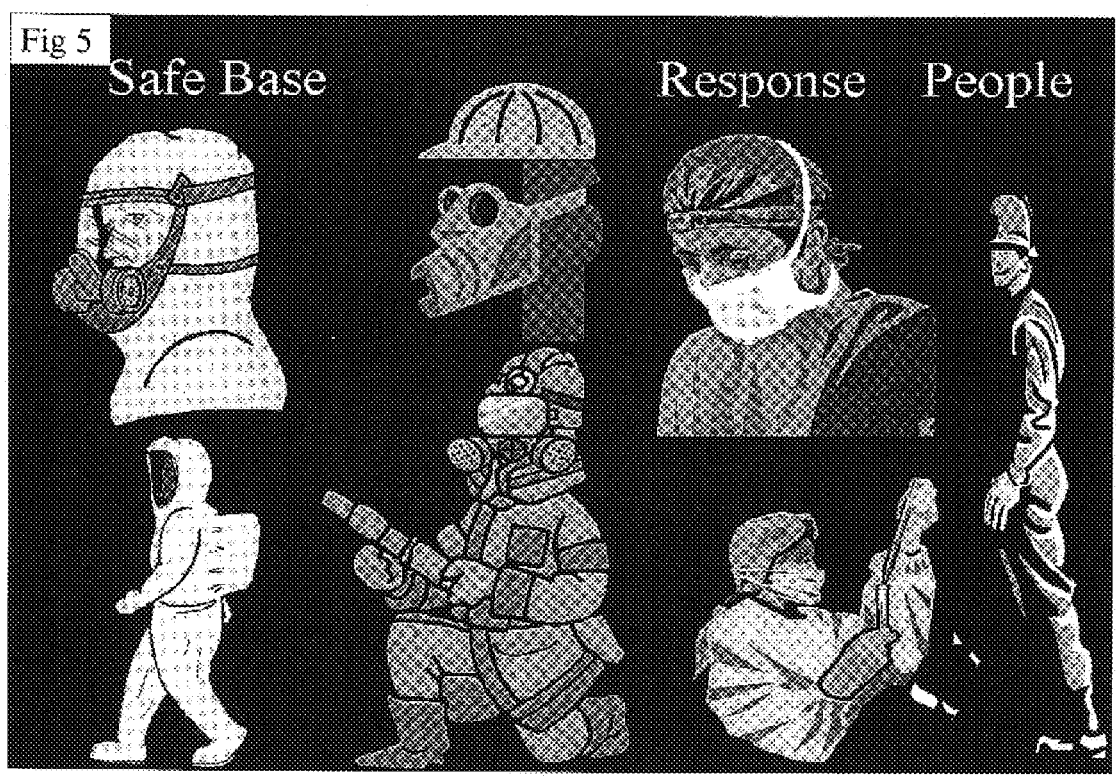

Fig 11  1a Sky Marshal TRACker Experimental Unit 1c and or Sky Marshal TRACker Unit SOC technology with the ASIC, display and DSRC broad band wireless ASICs Reduced To A SOC FACT Security PDA connections for Flight Crew PFN Portable Network that relays and repeats FIG 15  Sky TRACker's Circuit Architecture For Parallel Data Routing and Processing 1a,1b,1cs ~

Wireless interfaces and structural elements--to be determined as described

PFN/TRAC

Progressive Air Security

For

The United States Of America

TRAC/FACT System for Securing Movement
Trusted Remote Activity Controller

FACT/TSA Airport/Port/Train Stations Boaders/Installations Intranet Matrix

Expands and contracts on an as-needed basis (exemplary)

Commercial Wireless Technologies For Public Safety Users

Fig 19

AOC/ATM- FACT

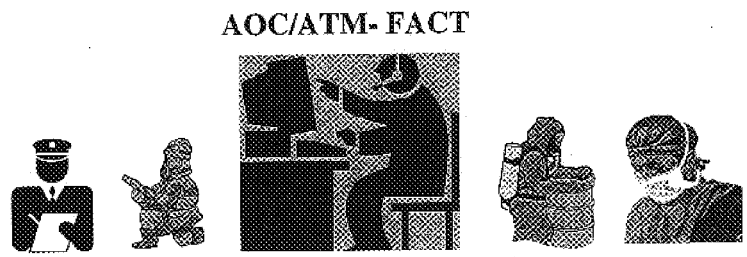

Real-time surface public safety wireless & IP interfacing for FAA/ FACT Security-- 2003

Data-only / large region ---------------------------------------------------Wide Area Data Services Voice and data / large region -----------------------------------------------Cellular, PCS and 3G Data / local-----------------------------------------------------------------------PANs and LANs High-speed collaborative / At-a scene to wide-area------------------LMDS and MMDS Widespread emergency and natural disaster-----------------------------Satellite Communications Commercial dispatch services----------------------------------------------Enhanced Specialized Mobile Radio Evolving spectrum needs----------------------------------------------------Future Public Safety Radio Universal PFN/TRAC Multi Band
Scan Route and Translate Transceiver Interface Array Fig 21 This is a Personal and Equipment PFN Digitpeating Wireless Translation & NENA Routing Emergency Matrix
TRAC links disparate wireless devices in a local FAA Security intranet and more Fig 24  1SV 1E and 1P PFN Architecture for Data
Translation and Processing Functions
Large Scale Integration The basic ASIC - progression and interfacing to be determined per application FIG 25 — Application specific wall structures for PFNs 1E PFN attached equipment controller/ routers
Fig 26
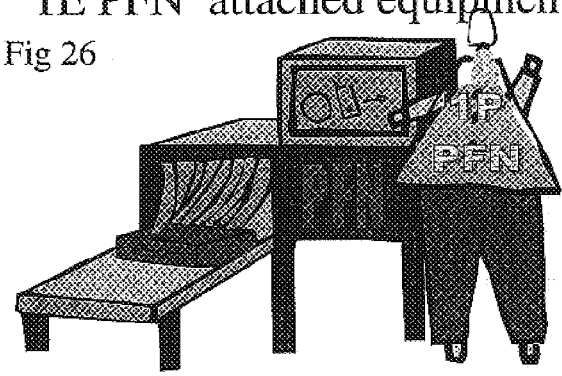
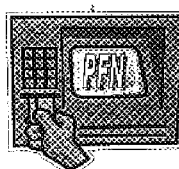
Secure Electronic Personal ID systems And Devices Interfaced With 1E, 1SV & 1P PFN Belts
VIDEO
SCANING
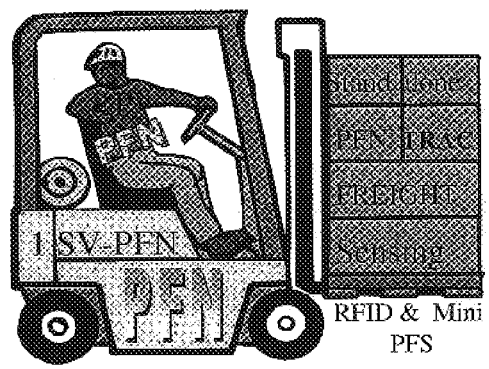
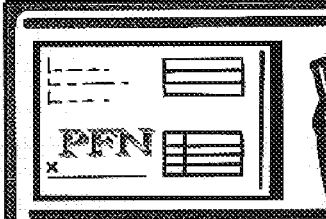
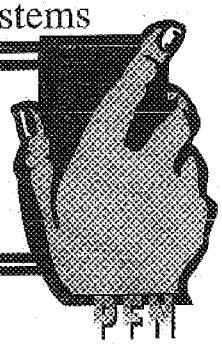
RFID & Mini PFS
Identification Systems PFNS Trusted Remote Activity Controllers PFN/TRAC Network of Machines

Fig 28

The Commercial Commitment

- More Cooperation & Universal Interfacing of Products
- More Sharing of Data and Knowledge for Public Safety
- Better Coordination of Cross Environment Technologies
- More Enhanced Security Checks & Protocols
- Better Protected Hardware and Software
- More Accountable Human and Machine Interactions
- Safer Fuels and Propulsion Systems
- Faster communications between surface and air operations
- More Robust Remote & Automated Flight Controls
- More Robust Remote Passenger Management Options

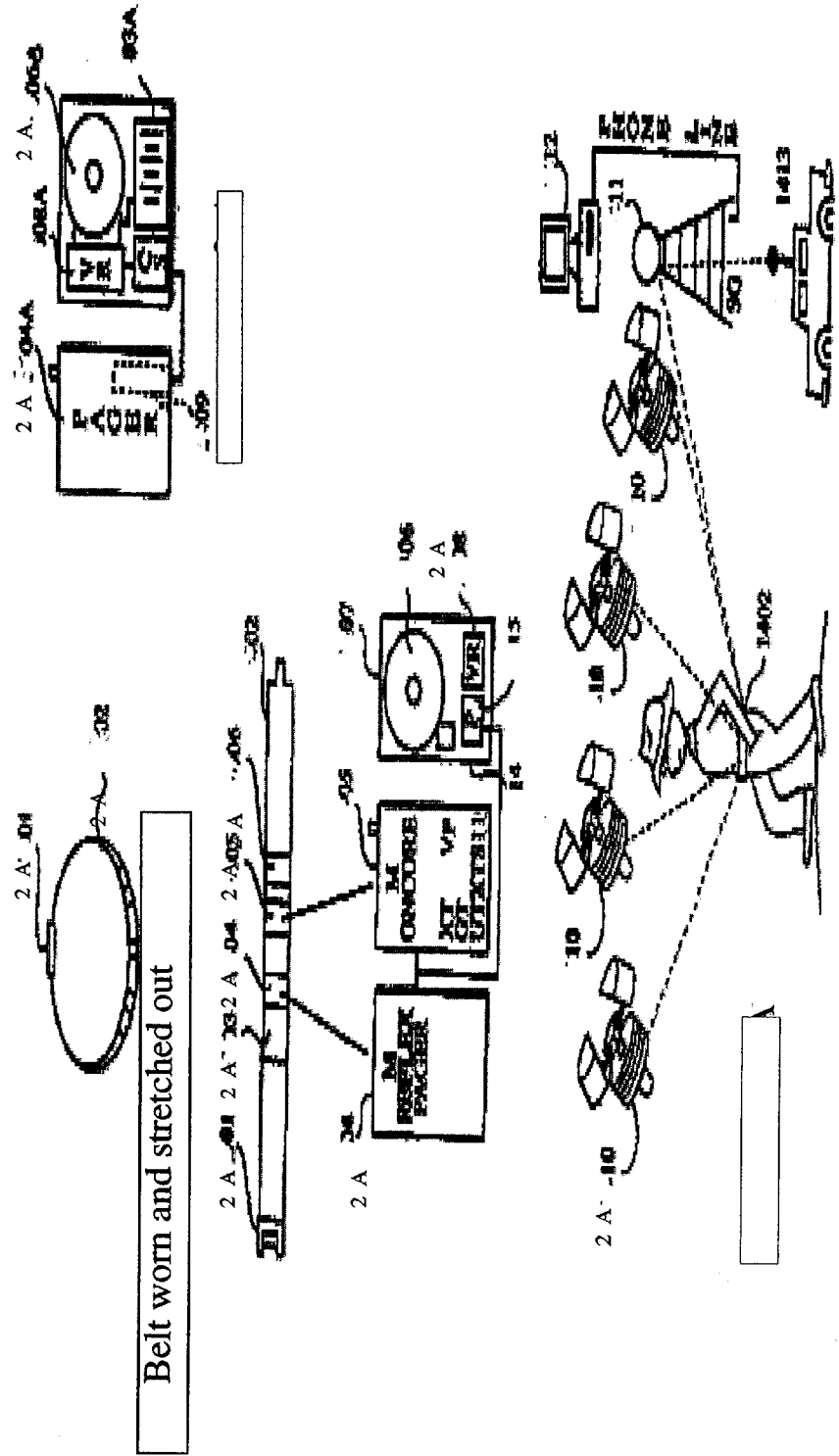
Fig 29 — Earlier version of a PFN tracking belt with a pager
Belt worn and stretched out FIG 30   PAGER TRACKING FOR PERSONAL PFN'S
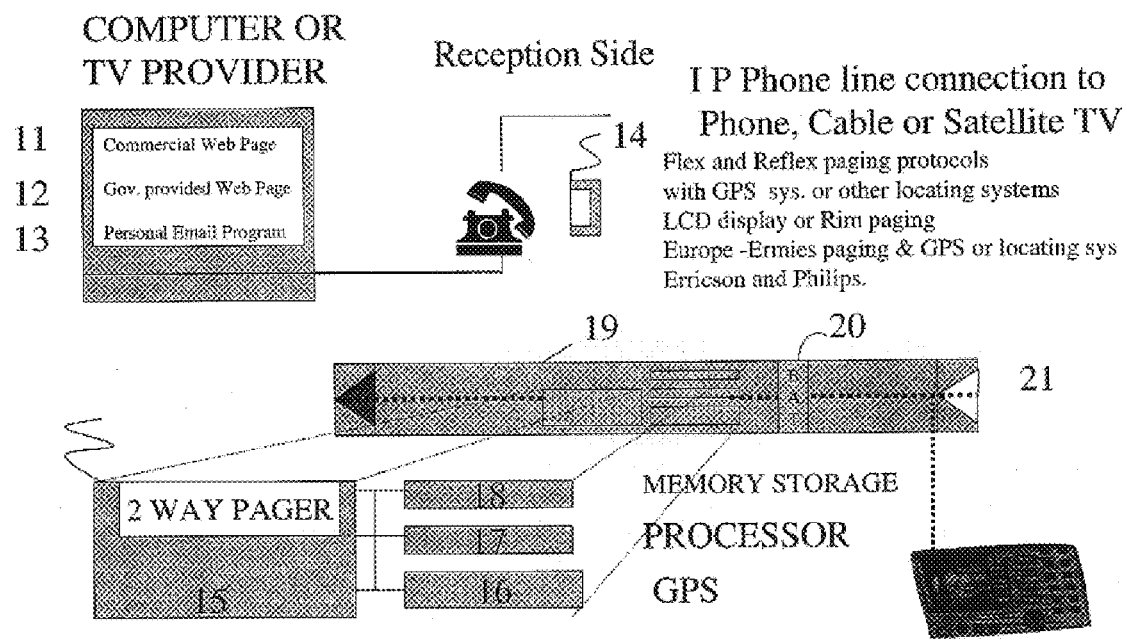

Fig 31       **CELLLULAR PHONE TRACKING
             FOR PERSONAL PFN**
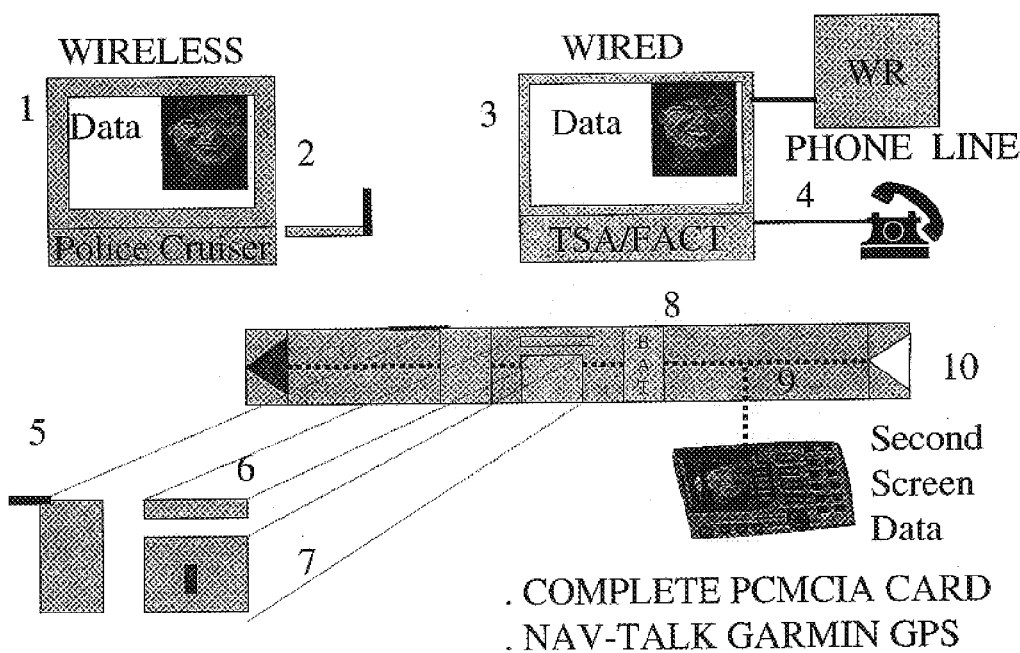

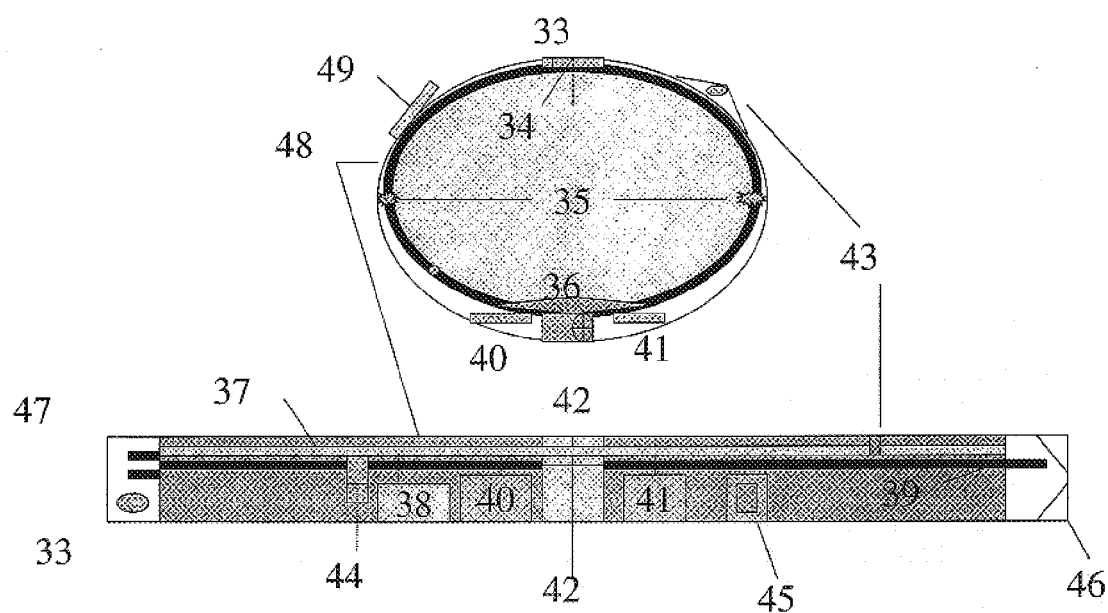
FIG. 33 BELT, CLASP, COLLAR OR BRACELET SECURITY SYSTEM

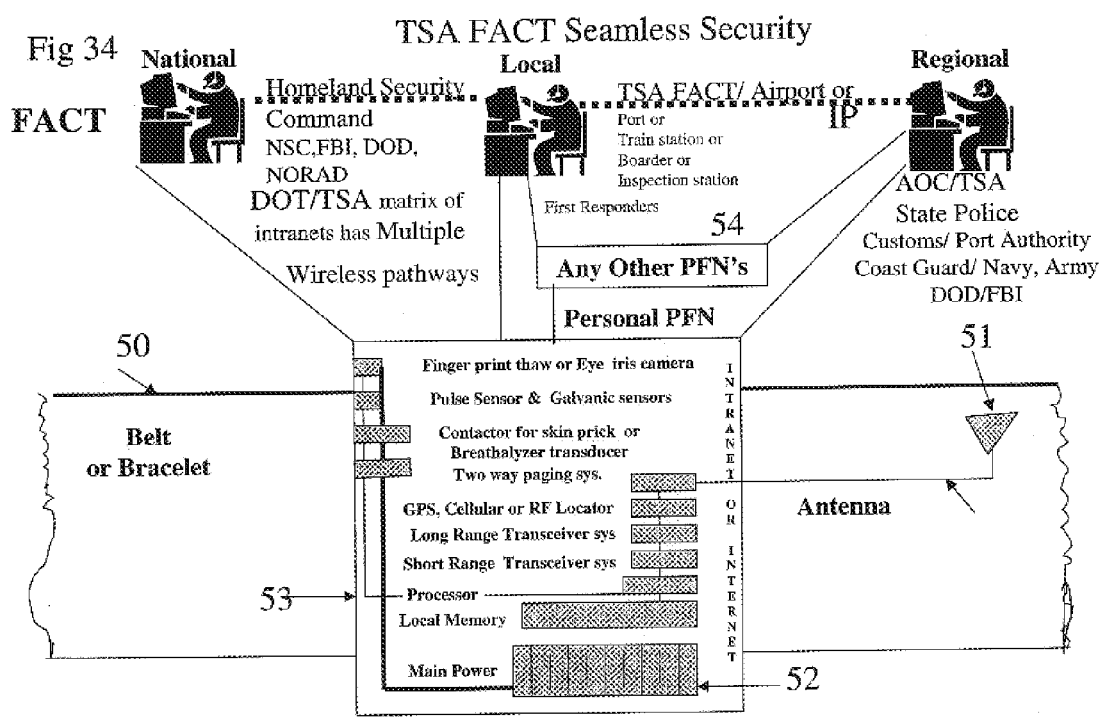

FIG 35 Mini 1PI PFNS Tracking ID technologies that are surgically implanted Evolve as SOCS and are miniaturized
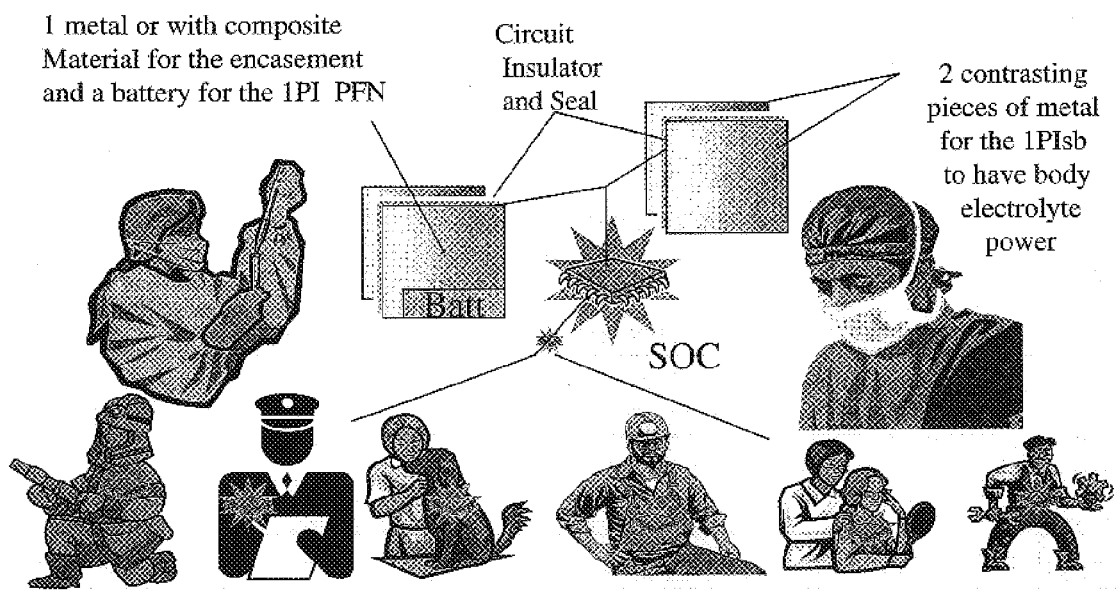

Fig 36

GOVERNMENT

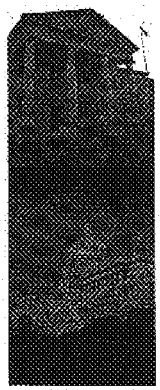

- Develop the Nations Software Codes For FACT
    - Security Contractors & Military (Omaha)
    - Set Up FACT Registries
- Legislate Laws, Rules, Regulations & Codes
- Fund & Back PFN/TRAC Interface Development
    - Create a Collaborative Inter Agency Effort
    - Call for a Unified Commercial Effort (THE ECONOMY)
- Instill Domestic Tranquility By:
    - Increasing Public Safety (Security)
    - Insuring Individual Rights Freedom and Respect
    - Lead in Proper Citizenry FIG 42 SOFTWARE FLOW CHART FOR FACT IN THE PFN / SOFTWARE FLOW CHART FOR FACT IN MAIN REGISTRY

Fig 45

Total PFN/TRAC Transportation Monitoring and Tracking

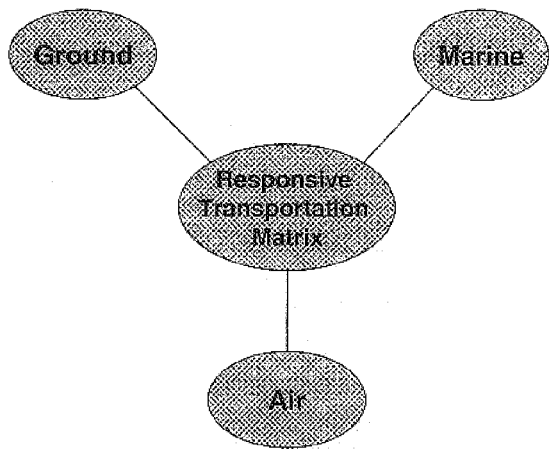

- Tracks real-time location of all assets throughout shipment, in and across all transportation modes;
- Monitors real-time status of each shipment, including seamless data transfer during change of mode;
- Provides continuous accountability in a security or transport matrix;
- Identifies and communicates specific pre-programmed sensing or reporting of shipment status; and
- Provides pre-programmed response to a potential threat during transportation.

Integrated System

The missing asset is sensed by other PFN units in the field. These units report the discovery to a PFN Primary Mover or Relay System, which in-turn, reports the asset's location to COMMAND & CONTROL which confirms and/or initiates deactivation and/or recovery.

Slide 6c(2): Infiltration Recovery

PFN/TRAC SYSTEM FAA UPGRADES FOR ACCOUNTABLE REMOTE AND ROBOTICS CONTROL TO STOP THE UNAUTHORIZED USE OF AIRCRAFT AND TO IMPROVE EQUIPMENT MANAGEMENT AND PUBLIC SAFETY IN TRANSPORTATION

RELATED APPLICATIONS

This application claims priority from U.S. Provisional Patent Application No. 60/325,538 filed Oct. 1, 2001 and U.S. Provisional Patent Application No. 60/330,085, filed Oct. 19, 2001.

This application is related to U.S. Patent Application No. 60/330,088, filed Oct. 19, 2000; 60/200,872, filed May 1, 2000; 60/176,818, filed Jan. 19, 2000; 60/139,759, filed Jun. 15, 1999; 60/140,029, filed Jun. 18, 1998; Ser. No. 08/975,140, filed Nov. 20, 1997; PCT Application No. PCT/US 97/21516, filed Nov. 24, 1997 and 60/032,217, filed on Dec. 2, 1996, all of which are hereby incorporated by reference.

BACKGROUND OF THE INVENTION

1. Field of the Invention

The nature and scope of this patent is to be the air travel portion of a national transportation and security matrix that will span the globe. This filing is an invention that is specific to aviation air travel and air transport. It relies on prior filings to incorporate the specified technology to complete a Federal Access Control Technology (FACT). FACT is a security matrix in and around the airport and gate to gate in the skies. The other related patents are designed to other vehicle platforms for complete national transportation management and security system. Because enter modal transportation occurs in each industry with technology overlaps this application addresses the interfaces and overlaps, but specifically to how it relates to air travel and transport. In commercializing the PFN/TRAC System and FACT security program it has proven commercially necessary to develop separate corporate structures to match up with the specific industries and government agencies and to create the complete movement management and security system termed the PFN/TRAC system with FACT Security. FACT stands for Federal Access and Control Technology. All the related patent filings are specially designed and written to separate commercial development to respectfully operate in a democratic free society and meet constitutional guidelines for their commercialization. The separate inventive portions (patent filings) are constructed specifically not to be a monopoly, but instead an accountable workable interface to combine present day dispersed and disparate technologies and systems via a coordinated network of wireless communications, machine controls, data handling and human machine interfacing.

This intellectual property and all inventions determined patentable, either granted or protected or inherent due to prior related filings must defer to that related technology holder(s) for additional licensing if other than aviation and air travel related (e.g., 1E, 1P, tracker and 1SV PFN/TRAC units, or system and FACT program, etc.) used for terrestrial vehicles and equipment 5 miles outside of any airport and/or for other operations and functions than aviation related or for a FACT purpose. However, included is any standard set for reasonable wireless contact to protect the public at the airport via FACT control center operations that will monitor and manage transport coming and going from the terminal and/or air travel and transport operations.

This is to be clearly understood by all to rely on and develop form inherited PFN/TRAC technology filed earlier and therefore the innovations default to the industry specific patents and their holders for any licensing, sale or implementation of the technology outside the air travel air transport industry. With that understood, this application is an extension to benefit inheritance from the related patents. This is a necessary statement for the system to be as extensive as it has to be and to be constitutionally appropriate to be commercialized in the United States effectively. All must understand clearly the operational and commercial boundaries of each intellectual property filing of the PFN/TRAC technology: the public, government agencies, the SEC, the court system, legislators and the investor in each of the specific corporate entities developing the technology.

It is important that the system does not develop as a commercial monopoly for communication and data messaging and mining or have any one dominating influence, but instead provide accountable interoperability with regard to the various industries that will be interfacing to create the entire system. This is done to protect the public's interest in the technology. Its use and quality of use, as a greater public utility technology. It is being structured to commercially insure free enterprise in its continual development process from the contributing technologies interfaced. This is addressed throughout the filing as "La technique" or the implementation teachings of the specification to make it applicable to industry.

With this application specific use of the invention understood by the reader, this filing and the other related filings will be licensed and/or sold specific to industry application or purpose in a connected commercial structure, that will encourage cooperative networking for efficient development and use of the PFN/TRAC system and FACT Security program. This is accomplished via serial numbered joint venture agreements representative of the related patent and protected technology area defined in the joint venture agreement and then written into a tracking program, maintained by the specific company and Kline & Walker, LLC the current patent holder. This tracking will become part of the inventions accountable business practice and maintained system wide with respect to all corporate entities generated to commercialize the invention.

Special files held in a nationally secure location(s) (to be determined) will be maintained by FACT Security, LLC. Commercial arrangements via (joint ventures) will be made with FACT, LLC. For this administrative function and for all other related PFN/TRAC companies for any FACT technology that is military or high security sensitive and involves secret status for public safety and/or national security.

2. Related Technology

The prior related patents have covered accountable automated and remote control of all vehicle platforms, equipment and machines, including human, animal tracking and telemetry and stand alone sensing and management functions as part of a great machine messaging matrix. This local accountable Primary Focal Node interface was invented for more freedom, public safety and better management of the earth's resources, environment and machines, and to help fulfill social/individual needs for a new economic tool to value use and impacts.

Due to the recent terrorist events both in New York and Washington, D.C., it has become imperative to step up the development of protected remote control and robotics in aircraft and commercial air travel systems. The PFN/TRAC System is an ideal technical choice for this scenario as it was created to stop and control the unauthorized use or unsafe use of vehicles and equipment via accountable remote control. Additionally, the technology incorporates existing technology as it exists in a present distributed architecture and coordinates and manages the essential function to stop and control an unwanted event and improve public safety. This requires hardware, software and wet-ware (people)— the procedures and protocols). The PFN TRAC system is a technology well grounded in a Science, Technology and Societal approach or STS approach to be effective and commercially acceptable for aircraft and air travel.

This invention from the first stop and control box system to restrict unauthorized use of a vehicle has addressed responsible and accountable machine intelligence as a very important equipment control option and unique quality to perform remote or shared control of any vehicle or equipment in a free society through responsibly recording events.

Historically, avionics has had flight recorders, processors, flight computers wireless communications, navigational systems, autopilots and protective containers for electronic packaging. Even in aircraft hobbies and in the military there have been remote control or robotic drones. However, shared controls or total robotics control of an aircraft with humans on board has always struck a watershed of unacceptability for a host of good and valid social economic reasons. And not just in the air, but on the ground as well. This is where the PFN/TRAC System fits into humanities present technical management needs and can be a progressive security enhancement for machine management. It can harness existing technology and apply constitutional procedures in real-times as preprogrammed protocols via local machine robotics and remote human/equipment control to prevent the hijacking, thwart the hijacking, manage all behavior in the plane, control and lower the planes destructive crash potential, or safely land the plane via the PFN/TRAC System including the PFN/TRAC protocols. This option is obtainable in a variety of modalities and progressions and this patent application teaches this unique technology in a variety of modalities.

This specialized quality of socially structured technology that coordinates disparate and distributed technologies in an acceptable and usable architecture starting from existing COTS products and consolidating an acceptable structure and set of operational protocols into one management system is uniquely the PFNTRAC system. It in no way competes with existing technology it merely enhance those technologies interfaced via a larger more acceptable machine messaging matrix of mindful machinery with accountable artificial intelligence.

The nine earlier prior related patent filings addressed the use of the PFN Trusted Remote Activity Controller in flight and surface applications to augment the aging FAA system, as a communication control unit. PFN/TRAC in aviation has always been thought of as a parallel data transfer technology to all the major transportation systems to get a foot hold in combining the disparate systems into one DOT management System. Therefore for aviation the car-plane invention was considered a futurist application for PFN/TRAC GPS and timing to coordinate air highways and surface traffic movement in an integrated traffic management level than in airports today. However the technology has been prepared for general aviation and to improve the choking point in today's airport management and security crisis. Additionally, it is perfectly set up to remain isolated in early generations, but improve movement and provide seamless security both on the ground and straight through the gate and up into the air space to enhance and meet the current security needs of the Air Traffic management system and back down to the tarmac through the gate in the destination airport and through that terminal as well to the passengers vehicle and baggage leaves the system.

The inventor and founders remained committed to the following:

Due in no small part to the sad events of 9/11, Kline & Walker Remote Management System, the assignee of the PFN/TRAC System wishes to work in any collaborative effort with all commercial and governmental interests to safe the skies and build back the trust in the flying public. This spirit of cooperation has always been basic to the reason for the invention and the development of this technology to a trusted and accepted management system first and foremost by increasing public safety, individual freedom and national and global security. This invention addresses environmental, social and commercial uses of all equipment and resources. The invention is designed to account for all machines, vehicles and equipment and their socio-economic and environmental impact worldwide.

"It is widely believed with the proper awareness—that this technology could provide, and the real-time communication this invention could help to provide—that the global inhabitants might find a way to make a life together". HopefullyJ rcw/bk.

BRIEF DESCRIPTION OF THE DRAWINGS

FIG. 1 This diagram of the PFN/TRAC System™ shows one objective. The goal to control the unauthorized use of an aircraft. It represents the technology and the human activities necessary to effectively respond to an airplane hijacking.

FIG. 2 is a Power Point slide highlighting the important characteristics and benefits of the PFN/TRAC invention; as a timeless interface technology that incorporates new technology into an architecture that provides accountable aggressive automated and remote control via existing technologies.

FIG. 4 discusses the product development differences between first and second-generation PFN/TRAC systems.

FIG. 5 The initial 1A PFN flight and landing software library will be for 5 selected safe bases to include emergency response procedures and protocols where specialists are available to remotely control any incoming aircraft and handle any FACT flight emergency condition.

FIG. 19 This figure shows the basic wireless communications being considered for the first responders.

FIG. 26 The different PFNS are commercially flexible for the various technologies and companies to interface, access and control any or all of the airport equipment e.g. ground service people, different airlines, private security contractors, local police and the TSA etc.

FIG. 28 discusses the need and how the PFN/TRAC system can help form a cooperative environment in working with all manufacturers and industries.

FIG. 29 shows a man walking on earth and his position derived from GPS Satellites.

FIG. 30 illustrates the use of pager technology, specifically 2 way paging interface in the invention.

FIG. 31 shows cellular use in the invention.

FIG. 33 shows the 1 P PFN belt system.

FIG. 34 shows another 1P PFN Belt configuration.

FIG. 35 shows the injectable 1 PI Chip PFN for implantation into a body.

FIG. 36 discusses the government's role in the technology's development.

FIG. 45 Portable networking application to keep a running inventory of a shipments contents and placement.

SUMMARY OF THE INVENTION

Figure 3:
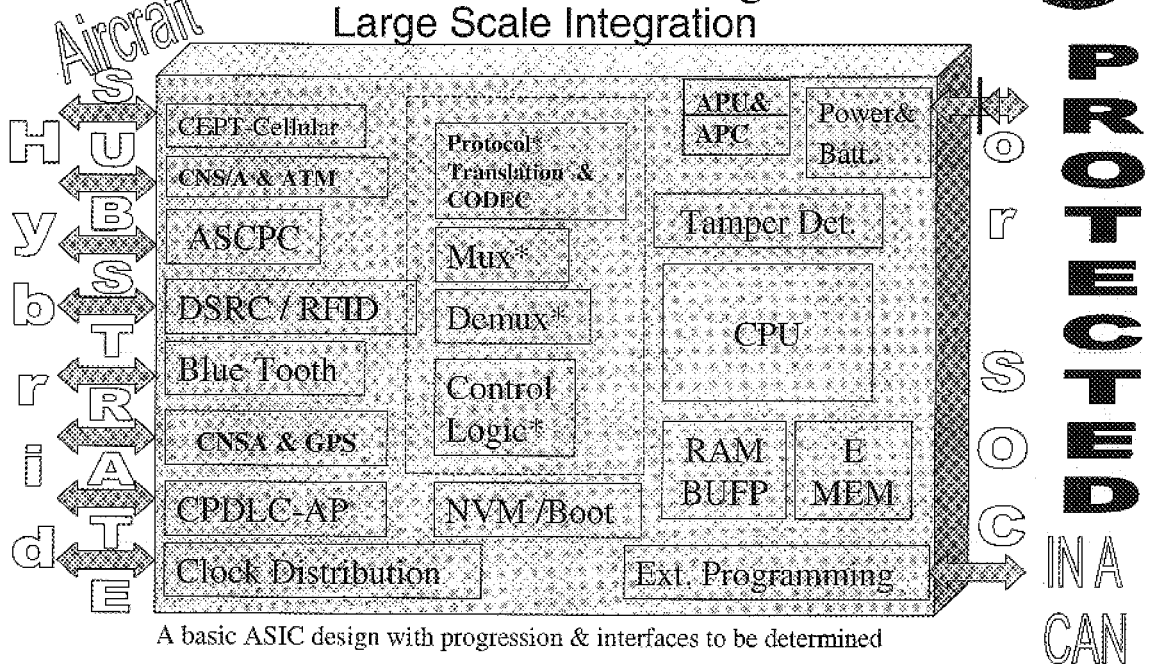
FIG. 3 is an application specific integrated circuit for an avionics PFN/TRAC System interface.

PFN/TRAC technology provides the capacity to organize, record, report, relay and control data and equipment from a local protected control/router to create a large machine-messaging matrix. Sharing or replacing local and standard Human Machine Interfacing HMI with accountable automated human assist controls, robotics and/or remote control accomplishes this. Additionally, the networking of various wireless technologies can be interfaced via a unique routing and translation process powered by stable current supplies from the machines, vehicles and equipment they are attached too.

This filing and use of PFN/TRAC controllers/routers deals with transportation and specifically avionics and air travel. It employs other similar PFN/TRAC ASICS and technology from separate applications, but specifically to complete an air travel and transport management system with the FACT Security program. This management and security system manages and monitors all equipment, materials and personnel through the airport and gate to gate in the skies.

This advanced human machine interface provides for accountable remote and automated control of all machinery interfaced and controls traffic flow and movement on and near the earth's surface. The PFN/TRAC units and system also records and reports all use and impacts and can proactively stop the unauthorized use or unsafe use of vehicles, aircraft and equipment. Further auto evaluations performed by the PFN controller/router and networks interfaced can determine tampering and improper interfacing in real-time.

Diverse interfacing and processing capability includes all types of sensing, video and audio monitoring and displays, keyboards, number pads, drives, identification technologies, card swipes, RFID memory storage, telemetry technologies, various wireless technologies and their protocols, the electronic payment industry, vehicle aircraft, equipment and machine interfaces and stand alone interfacing, processing and routing.

Terminology of the Invention

The following are basic terms and definitions used:

The PFN is a Protected Primary Focal Node (a protected accountable interface connected with a controller and communication router). This combination is a PFN/TRAC unit TRAC stands for Trusted Remote Activity Controller and termed so because it performs accountable robotics and remote control. FACT stands for Federal Access Control Technology. RC means Remote Control, WoJack means War ops and Jack is taken from hijacking.

TRUSTED for this invention means, accountable, and acceptable by all the public (the citizenry, industry and government standards). It also means to all reading this specification interfaced equipment must be reliable. All interfaces and interfaced equipment must pass reliability testing and be accountable for their specific use and service in any PFN/TRAC system. The PFN/TRAC System and all components must be trusted and pass industry and governmental standards for as a condition of accepted use and performance in the PFN/TRAC System™.

How the Technology Applies to Aircraft

Of particular value right now, TRAC technology can be embedded into aircraft (at the design stage or after-market) and perform accountable functions for the purpose of gaining control and stopping the unauthorized or unsafe use of an aircraft. Known as the PFN/TRAC System™, the architecture utilizes existing Commercial Off the Shelf COTS aircraft technology to create some of the first robotics flight and remote controlled landings with an absentee pilot for these emergency scenarios. However, in a hijacking the lack of flying skill is not the only concern. The aircraft might well be commandeered and deliberately used as a human guided missile for its destructive potential like on 9/11 in the terrorist attack on the World Trade Center and the Pentagon. In this scenario it is necessary to restrict the local flying controls immediately upon detection of an unauthorized pilot and flight path, unless they can be authorized and approved under some extenuating circumstances.

Basic Challenges to Accomplish the Invention in the Various Airframes

Fly by wire control conversion to exclude a local pilot on board the aircraft can be achieved far faster than those still using physical links. Total hydraulic systems and hydraulic assist systems can be converted to exclude local controls easier than physical link systems, but still more difficult than fly by wire systems. Systems and modalities for physical lockouts on human controls and the automation of those controls is taught in prior related filings so that anyone skilled in the art (engineers) can shop up the necessary devices to construct and protect an RC capable or robotics flight aircraft.

The next major hurdle is system redundancy and control of the dispersed isolated systems. Aircraft, because of the catastrophic results of a flight control failure have duplicate systems to insure flight controls and the operations of essential systems during flight. These systems have to be controlled enough to insure that the aircraft cannot be used in an unsafe and unauthorized manner. This increases the challenges to complete and construct the invention for aviation. It also enhances the system options for the PFN controller/router to evaluate. Evaluate and choose faster than a human could to achieve good or adequate performance and in many cases affect more options down to the component level, which would be unobtainable by humans during flight.

As unique as avionics is from other electronics and computer processing, the invention uses a PC architecture and application stack for the translation of messaging to interface flight systems and controls and protects this process in structures termed PFNs. PFNs house the trusted remote activity controllers or TRAC controllers and routers which make up a portable network. A matrix of secure, protected, redundant, automated controls and system management on the aircraft. Automated management for flight assist, robotics flight, and remote controlled flight. The local PFN/TRAC routers also interface wireless communications and transfer that data into Internet Protocols specific to the applications they are intended for and wireless protocols needed to transmit them. Data and commands are transmitted locally between the aircraft PFNs via dedicated short range communications to harmonize management of flight controls, and also transmitted to the earths surface by longer range wireless (e.g. RF) interfaced in the PFNs. Local 1A aircraft PFNs are likewise hardwired and dispersed to any appropriate avionics bus for flight system activity control, redundancy and integrity checks. There are also separate applications specific to PFN combined actuators for hard to secure flight controls or for legacy aircraft or special applications.

The General Robotics and Remote Control Procedures and Proprietary Safe Base Process The initial goal after eliminating local control is to stabilize the plane's flight path. This second objective is accomplished via robotics (chosen for better real-time responsiveness for long distance control scenarios) to fly the plane to a Safe Base via special preprogrammed and isolated flight paths. This control protocol PFN/TRAC System is secured and secluded onboard with preprogrammed software (5 preprogrammed flight plans available to the 1A PFN/TRAC processor or OEM automated flight systems if they can be secured during flight. The TRAC processor is interfaced with the essential E/E system bus to operate the planes flight control surfaces (with RF back up) to guide it to the best specific emergency response Safe Base (SB). All available location systems and communication systems are interfaced with the 1A PFN/TRAC processor. Additional controls interfaced with PFN/TRAC are to be the cabin and cockpit air pressure controller to restrict any air exhausted from the aircraft by either routing the air through carbon dioxide scrubbers/converters, as well as adding fresh air ($O2$). The removed and compressed atmosphere is canned. This un-recyclable air or waste air is then presented to a sensor array to detect biohazards and toxins. Once transducers have converted any molecular substance to an electrical signature, the signal is analyzed for recognition by the PFN/TRAC/FACT security system software library. It is recorded and reported to the surface by any secure on board 1A PFN/TRAC unit progressively programmed to complete this function for the surface Safe Base system to prescribe the appropriate safe base response to the incoming troubled FACT flight. Informed decisions to determine whether to terminate a FACT flight, bag it, and sterilize it or how to unseal it on the ground) are essential. Also, connected to the ventilation system the TRAC processor controls a valve with debilitating gas (sleep gas or chloroform) that can be activated from the ground or robotically. These are the worst-case scenarios and are termed the Wo Jack scenario or FACT protocol. Optimally the aircraft will be assisted in a positive manner and landed safely with the passengers and crew spared any injury or some worse fate. But this emergency scenario is inherently dangerous and this discussion is necessary.

During the final approach to the designated safe base landing zone the robotics flight and glide path control does a hand off to a Remote Control RC pilot in a surfaced based converted flight simulator receiving secure and redundant essential data streams via a the PFN/TRAC protected communication system to maintain the greatest real-time responsiveness of the aircraft. (heightened by a guardian/profit software program—an algorithm developed using the speed and time of data transmissions and skew the data for projected real-time response using onboard sensing, forward seeking radar and Doppler and weather radar at the base to enhance the RC station and on board robotics). Ideally, the result will be an intelligent aircraft with an accountable autopilot and Remote Control RC pilot.

Additionally, another in flight Remote control pilot would be flying second in a pursuit aircraft and NORRAD dispatched. Special training for RC pilots would have to be done of course. However in this scenario the pursuit/escort/assist aircraft would be in contact with the troubled robotics flight with in minutes of the FACT event take over. This pursuit/assist flight would be able to determine control of the aircraft and critical data while in flight. This is one immediate advantage for the nations security and the flying public. There is a standing executive order to the military to defend the nation's airspace against the hostile use of a commercial airliner. The invention provides some options to the shoot down scenario.

Intent and Purpose of this Filing

This application is reliant on the former applications cited, and therefore focuses explicitly on the first generation products to meet immediate needs for the nation to have improved efficiency and security in the nations 429 airports. One embodiment of the invention is a seamless security system termed FACT for Federal Access Control Technology a security program of the PFN/TRAC system for transportation and Homeland Security. All PFN/TRAC units are mobile communication router platforms that provide accountable remote and robotics control to transportation vehicles and other operational and security equipment via the interface with the vehicles or equipment's E/E systems to obtain a stable power source and additionally to control the attached piece of equipment.

Each vehicle and/or machine either on the earth's surface or near the earths surface is connected to its application specific intranets for air, sea, and land travel, via either host commercial servers or agency providers through wireless communication gateways. These vehicles and equipment are further interfaced with a larger machine messaging matrix via wireless and IP protocols to further coordinate movement assess and manage equipment and vehicles and their use and impact on the world resources, societies infrastructure and the environment. However this filing focuses directly to augment and upgrade public safety and security in the Airline Industry and restrict and/or document any unauthorized use or unsafe use of any aircraft. It also teaches acceptable methods to remotely manage baggage handling and security equipment on the surface.

Progressive Development

In the aircraft the first generation 1A aircraft controllers will be shadowed with the development of the 1a and 1bTRACker units to prototype much of the 1A ASIC detailed in FIG. 3. The Carryon TRACker series is to be a reporter interface only system with isolated devices from actual flight control systems. TRACker is set up to support limited testing of new avionics technology in an Isolated format so that the proper analysis taking generally eight years can be systematically reduced with real flight testing with the units working separately, while a security link is maintained with Aeronautical Operations centers and used as a device for air marshals to keep TSA security on the surface informed on flight activities.

Additionally, this application and related filings teaches the PFN/TRAC System™ use for all vehicle platforms to increase safety and security in a free society like the United State of America while retrieving and securing private data and statistical data in appropriate procedures/protocols to insure the protection of individual rights. The other related filings instruct in the technology's use for robust and accountable remote control for personal applications, stationary equipment and standalone functions, and coordinates them and interfaces them within the communication matrix. TRAC controller/routers perform translation and repeating functions across a wide variety of communication protocols to complete a mobile flexible matrix or web. This connected communication matrix of computers and humans provides an enhanced Humanity Machine Interfacing HMI scenario both locally and systemically in real-time for improve equipment management and world stability.

This application is introduce a number of application specific integrated communication and control circuits to include a special memory storage device (The Memory Ball a revolutionary black box technology that physical encasement can also be used to house a complete PFN/TRAC unit if desired) with a hybrid progressive innovation of two of the four basic PFN/TRAC circuit designs presented to create a seamless security link from the flight deck and airframe cabin through and to include the nations surface responders and air ports.

History of the Technology

This technology is well documented for it aggressive remote and automated response to the unlawful and unsafe use of vehicles and equipment. But it is important to remember that these security aspects are based first on a good operational management system and the invention is and always will be a management system first. The inventor feels strongly if the world populous can manage a life together n this hydrosphere sharing the resources they need in a satisfactory manner for all the security issue would be mute. So good security must start with good management of resources, space and movement. This requires knowledge, a means to organize that knowledge, and a means to find agreement on the use of the knowledge organized and the means to affect that use. This is the nature, scope and purpose of the PFN/TRAC System. FACT security is only to be the enforcement arm of the people. To protect and serve the public will, it's safety and our national security.

Not just individuals claiming to represent a mandate or to speak for the public or have the public voice. This invention provides the means to accountably poll the public on issues and should be used to give the populous more trust in their system of government and give their representatives their directives—that will be the real public voice.

The following excerpt stresses this point to keep a healthy social perspective. It is from the earlier related filing Ser. No. 08/975,140, filed Nov. 20, 1997, and PCT Application No. PCT/US 97/21516, filed on Nov. 24, 1997.

The reader is encouraged to read the other filings to get an overview of how the technologies and innovations are integrated. Further descriptions of the related teachings are available and incorporated herein by reference.

The invention uniquely interfaces a network of separate devices and/or interfaced IC circuits together, to create a "Primary Focal Node" (PFN) (in some form on every piece of equipment in the world). This is an interactive control center (ideally secured and protected) and connected with many peripheral devices and sensors interfaced and that can be remotely controlled and monitored via this (PFN). The (PFN) is able to, record and play back various data of different mediums, report this data back, or communicate it with off board "Gateways" into computer networks (like servers do on the WWW) and/or receive signals from these gateways/servers such as commands to restrict the unauthorized use of equipment. Or affect normal use of that vehicle/equipment in relationship to its cost and/or legitimate operation in society and the environment. Thereby, regulating the vehicle/equipment, to a compliance level with any legal parameters and/or commercial contractual agreements in real time. The invention uniquely provides the control device for society to fairly and accurately monitor and control the impact of equipment use on the world's environment and a nation's infrastructure.

This is accomplished via hardware, hardware embedded software (firmware), software programming, peripherals device and sensors on board, with wireless communication and locating devices. Which in turn connect with computer network systems to do monitoring and accounting and accountability business in a realistic and fair manner socially and economically, all aspect of a transaction are re-viewable.

The invention is a composite of a number unique interface innovations to include other commercial products to develop a complete accounting and management system for machines, vehicles and equipment use, some are described in this application and others are in related filings as other innovations.

A great deal of explanation and specification is necessary to explain how the world's societies can utilize the total invention as a management tool with all the application specific innovations in an optimal manner. This discussion has been based on humanities state of existence; technically, commercially and socially and how the invention can best be thought of as a complete management and economic tool for societies to fairly make and assess the crucial questions and make the correct decisions to enjoy a healthy existence together. Especially, with a doubling world populous in the next forty years and no increase in space.

It is important to keep in mind that this invention is a versatile, composite set of innovative interfaces for existing products, devices, and components to be net worked and span the globe. These unique embodiments of the invention satisfy the qualities to make it a timeless technology. Societies will still develop their own specific ways to manage their lives but also be able to coordinate their choices with the rest of the world on environmental and economic issues via nation and industry specific technologies that would no longer be disparate. And in this process develop responsible management and security via accurate data and accountable remote control. From basic accountable machine messaging to full robotics and remote control, many unique interfaced innovative products have been created and developed and are also described and commercially detailed for development in this application and the other two filings The primary goal has been to provide innovative technical and commercial options for humanity to cost effectively govern its technologies through a responsible, accountable and informative management system, both the individual and the public.

"We the people", have to and can, accept this responsibility for their freedom and use of our free enterprise system; and insure that our economic values are in line with our democratic values as well as, our environmental and social responsibilities. Bearing theses responsibilities and respecting everyone's right to freedom, and the pursuit of happiness is basic to United States citizenry; and also the main purpose of the invention as well as the parameters of it's nature, and scope. This technology was invented to provide information and the means for humanity to make a healthy and happy life together not to rule over or govern another.

BEST MODE FOR CARRYING OUT THE INVENTION

Human Machine Interfacing HMI is what the PFN/TRAC system is all about. The technology is an invention of management and security for societies to better operate and improve their quality of life on this planet. As a management tool one function is to acquire meaningful data and deliver it to mass data handling and storage centers. The network of PFN/TRAC units also stand ready to receive programming from these centers and act on it locally via direct connect machine controls. Considered essential to the technology's success is the public's acceptance as a TRUSTED system. For this reason it was envisioned and invented as an accountable technology and system so that all voices in society can find justice and good reason to make a peaceful, healthy and prosperous life together.

In teaching this invention, the inventor has had a personal struggle with the intrusion of this technology and other IT technology into the personal rights of privacy. However, this right has always had a mathematical survival component for human life to sustain itself on earth. Obvious e.g. our present world population has doubled in the last 50 years and is projected to double in the next 40 years. Data will be essential to good management of resources and even for survival—our massing endangers activity planning and other individual freedoms).

Sheer numbers of people and their activities in the same amount of place are going to raise the world's temperature and reduce our landmasses crowding the earth even more. The use of the dirty machinery and greenhouse gasses pale as the contributor to poor atmosphere, compared to the quantity of thermal heat from even the cleanest running future equipment and carbon dioxide our masses will generate.

Our personal biological data alone will become a barometer to humanity's quality of life. Personal biological data will become important data for all of humanity to know and plan from. Privacy will be difficult and via this invention replaced with amenity and individual respect via levels of secure accountable access to memory storage, with the strictest of professional procedures, protocols and penalties for any improprieties, so as the need arises to handle specific personal data in statistical applications the system will be trusted by and accountable to public. Already to day after 911 we really do not know how to move forward with seamless security for our nation and protect these rights in an acceptable manner.

The most important portion in the MODE to carry out the invention is the technology is TRUSTED.

More important than any of the circuit design is that this technology be TRUSTED for the unique and different way it has been designed to preserve our free society and govern technology to respect that. This understanding is not just for the skilled in the arts, but also for all who know and use this invention or any portion of it. All must be consulted in the writing of standards, laws, rules regulations and code. Especially, programmers and code writers, they should know their constitution and law, as they are the last before installation and implementation of any running programs. Obviously, programming will be changeable and the court system will be reviewing and doing that from time to time. But before implementation research and public deliberation to define procedures, protocols and programming should be in place. It is everybody's responsibility as citizens to review the use of the technology. The technology was designed to be an interactive gateway for the public voice to be heard so this technology stays current with the society it serves.

The FAA and avionics has always been an intricate part of the PFN/TRAC technology transportation and mobile management section and has been planned for in the development of this machine messaging matrix for humanity to better manage it's machines with the earths environment. Additionally, the PFN/TRAC System was created to provide a stable artificial intelligence for the abnormalities experienced from our different individual learning curves, behaviors or individual terms of existence through out the world. The system is designed to enfranchise all and help, provision for all with fair and just management by all, while maintaining public safety for all. No small task indeed, so it requires all of us.

For those of us that fear the real dangers in robotics and machine intelligence, and for planners and programmers, I am listing a quote I used in my earlier writings to the DOT on collision avoidance systems and enhance Human Machine Interfacing HMI to manage driver distraction do to many carryon electronic devices (e.g., cellular phones).

This quote is taken from the Handbook of Robotics, 56 edition and should be integrated in any programming construct or an operating system when writing code for any mindful machinery in the future. It is a good conceptual basis for artificial intelligence to write constitutional code to, an optimum logic tree for shared Human/Machine control scenarios and for total robotics.

"The Three Laws of Robotics (for any Artificial Intelligence)

1. A Robot may not injure a human being, or, through inaction, allow a human being to come to harm.
2. A Robot must obey the orders given it by human beings except where such orders would conflict with the First Law.
3. A robot must protect it's own existence so long as such protection does not conflict with the First or Second Laws."

Obviously a peacetime model, war, hostilities and homeland security will have programming applicable to that threat and those applications. (A sad human reality) But the reason for the following PFN/TRAC innovations for today's air travel.

DETAILED FIGURE DESCRIPTIONS

FIG. 1 is a diagram of the PFN/TRAC System™ shows one objective. The goal to control the unauthorized use of an aircraft. It represents the technology and the human activities necessary to effectively respond to in flight emergencies, including an airplane hi-jacking. To reach this goal pilot assist systems must advance in robotics and remote control to fly and land an aircraft without a skilled pilot on board. This application for invention provides a series progressions to accomplish this via proper testing, While, providing immediate management, safety and security enhancements to the air travel industry today.

The figures and specifications coupled with the related filings of PFN/TRAC technology provide guidance and feasible modes for those skilled in the arts of: avionics, electronics, mechanical engineering, computer engineering, communications, system integration and component engineering. This application focuses on aviation transport and to meet the specific challenges to obtain this goal. It is important to keep in mind that feasible modalities for final and specific designs to construct the remote control of the invention will vary with respect to the diverse aircraft that exist. All airframes and modalities discussed are generally used for examples. They are not meant to limit the nature and scope of the invention or the capability of any component engineer tasking to design and construct safe and functional avionics, aircraft parts and systems.

It has become essential to national security to achieve real-time accountable flight control to restrict unauthorized use of an aircraft. For this to happen, it has to be part of a seamless security system that is interfaced with ground security and part of a total air traffic management ATM system coordinated with the Transportation Security Agency TSA. The PFN/TRAC System is such a management system and it provides Federal Access and Control Technology or FACT security to monitor and manage machines, materials and people through the nations 429 commercial airports and 2000 flights a day. The invention monitors and manages flow through the terminal and gate-to-gate in the skies.

Figure 44:
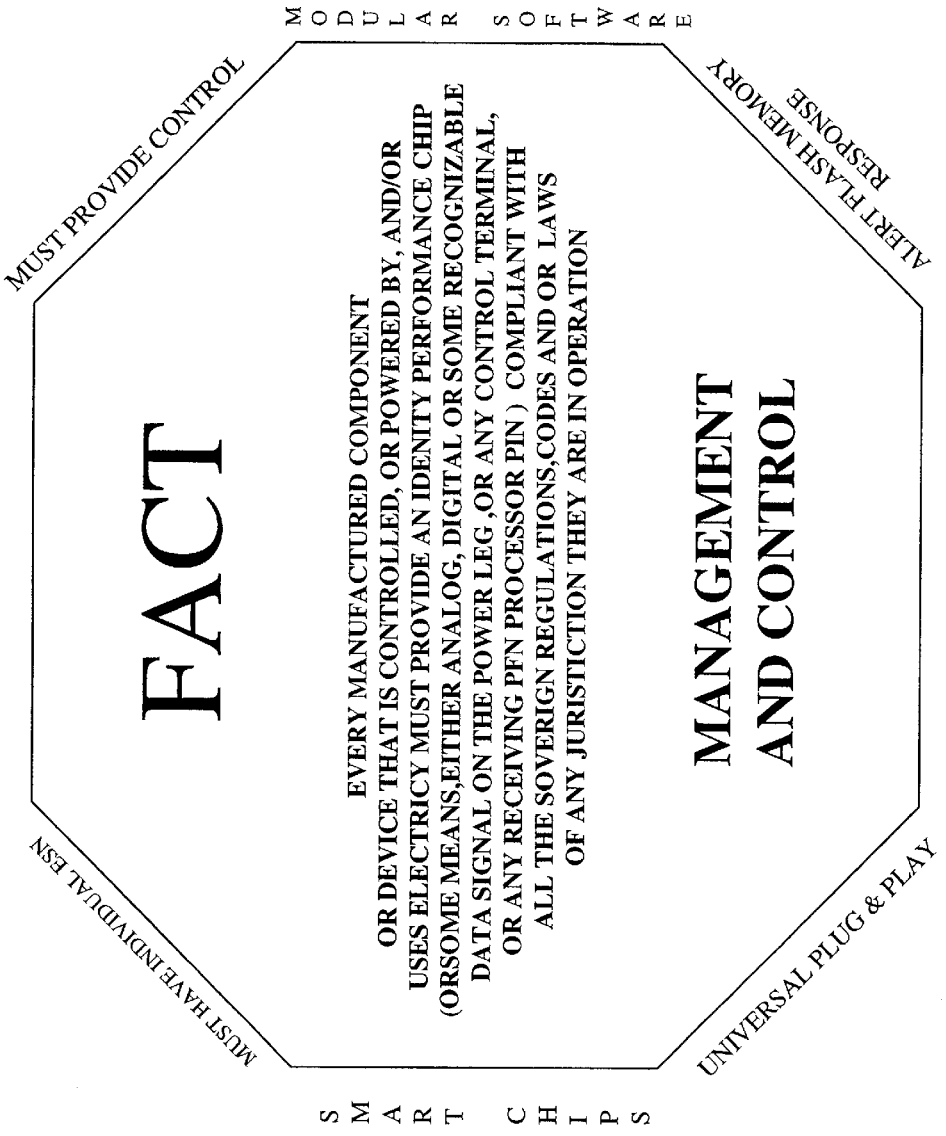
FIG. 44 FACT CHIP and soft ware functions in the system.

Number 101 is a 1 A protected PFN/TRAC unit. The Application specific circuit is further detailed in FIG. 3. Number 102 is a land based remote control station. These ground control units will originate from or be modeled after existing flight training equipment and/or adaptable simulators. These remote control (RC) stations will be linked via broad band wireless to actual flight controls and systems like existing auto pilots and flight computers that intern are interfaced through the protected PFN/TRAC unit on board the aircraft. The PFNs are protected and seclude or camouflaged if need be as well as impregnable during flight. They must be application specific in physical appearance and structure and teaching for their construction can be found through out all the related PFN/TRAC filings with reference details in this application for convenience. FIG. 44 shows an enclosure with a multiple wall structure for rough service and harsh environment protection. This structure will change per application meeting and becoming standard as part of the nature and scope of the invention.

The lower half of the figure is the ground support network linked by wireless telephony, satellites, landlines and Internet protocols.

103 is the DOD NORAD or North American (NA) military air CINC command center or center (S) and their data bases in Colorado and across the nations at the various air bases and special Safe Bases (SB). Their responsibility is to scramble any pursuit or escort aircraft, and in the case of the invention any Remote Controller assist aircraft in the event that an aircraft has been hijacked and needs a pilot while still in flight. First generation 1A PFN/TRAC will link and control hardware and software to robotically fly the plane to designated safe zones and landing bases of high security, there will be the capability to eliminate local flight controls, there will be the capability to land the plane at designated safe bases via remote control flying, there will be the ability for multiple communication with the aircraft and continual tracking, there will be the capability to dump the fuel remotely and robotically. There will be a means to incapacitate passengers and crew, there will be real-time audio and video to ground and escort assist aircraft with RC, there will be isolation capability for cabin air, there will be a capability to terminate the flight if the need arises.

Dual use of Commercial Avionics Data Links for the U.S. Air Force—Gihard

This air link is being quoted to show that the civil Aviation ATM GPS system can be used by aircraft to accurately dock their aircraft for refueling aloft. With this in mind this data link can be used through a 1A PFN/TRAC units or TRACker interface to coordinate security activities and better coordinate movement between commercial air craft and close air support to a troubled airliner.

Military Civil Air Link

The Air Force JEFX99 Initiative 99-018 demonstrated the use of civilian avionics data links to support air operational command and control communications.

Terms

Air Mobile Command AMC, Air Force Research Labs (AFRL), (CNS) systems to improve air traffic management (ATM). This new CNS/ATM concept relies heavily on specific avionics data links qualified to transmit air traffic control messages. This would require that the military equip their aircraft with dual beyond-line-of-sight (BLOS) data links, and in the long term, line-of-site (LOS) data links. In times of crisis means that military aircraft must operate in aeronautical mobile satellite services (AMSS). Denial of the best oceanic tracks, including optimal altitudes, and certain mission critical airspace may lead to serious degradation in DOD mission accomplishment.

In 1996, the U.S. Air Force's Electronic Systems Center (ESC) carried out a study for Headquarters Air Mobility Command (HQ AMC) which assessed the requirements, primarily for large transports, for operation in the new communication environment [1,2,3]. HQ AMC specified the need for the communications capabilities for airlift/tanker aircraft, and in 1997 the Air Force created a global air traffic operations/mobility command and control (GATO/MC2) ICAO has recently completed the Standards and Recommended Practices (SARPs) for an HF data link (HFDL) which will allow it to be evaluated by civil aviation authorities as an ATS data link. The Minimum Aviation Systems Performance Standard (MASPS) and Minimum Operational Performance Standard (MOPS) for HFDL are also under development by the avionics industry.

The military, along with several airlines, are encouraging this use of HFDL as a backup BLOS data link due to the large installation cost of the Inmarsat system and since many military aircraft are already equipped with HF radio systems for voice operation. Communications: Controller-Pilot Data Link Communication (CPDLC)—obviously there is much more to connecting two in fight aircraft for coordinated robotics flight and remote control but this coordinated use of commercial ATM systems is an ideal modality to interface the two. Away to introduce this for the PFN/TRAC 1A PFN aircraft units is the immediate application in the passive PFN version the TRACker as a parallel reporting system only and have these communication links integrated into TRACker to explore possibility and test non flight connect actuators first while air born with sensors to evaluate real-time performance with out flying the plane Commercial military contractors ESC, and a variety of commercial vendors including ARINC, Honeywell, Bremer, and AlliedSignal. Section.

There are a number of Federal, DOD, and USAF documents that require military aircraft to comply in peacetime with civil aviation requirements in civil-controlled airspace. In order to comply, the military is beginning to equip with CNS/ATM data links. Manufacturers are addressing the use of civil data link systems on military aircraft by developing solutions that port the civilian HFDL hardware and software onto circuit cards for installation into military HF radios. The addition of VDL Mode 2 and VDL Mode 3 protocols to military radios is being handled in a similar manner for VHF radios. Interfaces to a commercial off-the-shelf CMU are also being developed for military radios and for the military-specific flight management systems. In remote control flying, the addition of these mandated CNS/ATM capabilities to the USAF fleet via the ESC/GATO MC2 SPO activity enables an USAF AOC capability applied to command and control issues. One such issue to day is the Remote control of an air lined This link can be used with TSA Homeland Security and air command NORAD in close Remote Control of a troubled airliner via the PFN/TRAC units and FACT security system for public safety and national security for the air travel industry.

Since 911 an obvious necessity to coordinate air space activities between commercial air liners and military aircraft has now become a need to integrate flight controls for a number of good and sound reasons to include the capability to stop the unauthorized use of an aircraft. The PFN/TRAC unit can be the commercial direction and implementation to link both civil and military avionics for cohesive and coordinated real time responsiveness and local remote control of a troubled airliner. Initially implementation would occur by first sharing this data link via the technologies carryon TRACker interface platform for air to air and air to ground security links in an isolated format and to develop further it's integration into commercial airframes avionics for automated flight functions like robust robotics flight and close in RC.

Flight computers in some aircraft will hold the five flight plans that would first activate by a FACT event flag for compromised control of an aircraft and provide the best real time responsiveness with the flight controls, prior to escort RC assist aircraft's arrival. FACT flight plan software would recognize course deviation and quarry the flight deck staff to authorize and confirm the needed alteration and new course. If the change was unjustified or if communications to a legitimate pilot could not be established with confirmations in real-time that this same individual identified as authorized was indeed the one operating the aircraft; the aircraft PFN unit and surface TSA FACT command/NORAD would have a FACT flagged event in progress and an immediate Homeland Security code red/severe condition with an eminent threat status to public safety and national security. The local 1A PFN aircraft unit on board the troubled aircraft would robotically take control of the flight and begin it's unscheduled automated flight to a safe base with escort assist aircraft scrambled via NORAD/NA AIR CINC across the nation. Many protocols will have to be programmed for FACT management and the WoJack programming to an RC landing at a safe base is just one scenario. Flight contamination or illness might be another reason for robotics flight to remote control coordinated management from an escort assist aircraft.

The 1A PFN TRAC unit will have it's own protected back up power or utilize any that meets the technology's protected standard. In fact, all systems in place that can perform or be brought up to PFN/TRAC standard for protected operation and security access will be incorporated in the first generation to perform accountable automated and robotics flight. The ASIC in FIG. 3 and any TRACker will be progressively put in place and address avionics as described in the alphabetical avionics terms and definition section and implemented per standards and aircraft being converted for robotics and remote control flight.

The title words Wo Jack means War Operations for hi Jacked aircraft and it is the PFN/TRAC/FACT procedures detailed in this application. Procedures to become protocols for human response and software programming in the event that a commercial or private aircraft has been commandeered or deemed to be operating in an unauthorized manner. The basic scenarios and procedures are discussed throughout this specification to set the stage for a standard with the use of the PFN/TRAC System and interface units for these aggressive remote control scenarios. All the dispersed and disparate communications and mass data handling systems are coordinated to perform accountable real-time machine and equipment control. Specific to aviation and air travel for the most part, but coordinated with all the other PFN/TRAC innovations in other industries to manage movement, improve public safety and secure the nations porous boarders.

Computer station 104 represents the 200 FAA AOC commercial Air Operations Centers spread across the United States. Some are navigational hubs east of the Mississippi and some are in free flight areas west of the Mississippi where GPS allows straighter flight paths. They are all responsive via the various ATM providers (Air Traffic Management commercial wireless communication companies) like ARINC and Boeing via their low earth orbit LEO Satellites, VHF and new broadband data links for continental flying and overseas.

The bottom mass data computer network 105 in this drawing represents the TSA for Transportation security Agency's computer network. Thes TSA/FACT monitoring and management terminals will be matched to the FAA AOC stations across the nation and interfaced with NORAD or CINC military AIR command and assist as part of the Federal Access and control Technology's air wing of the PFN/TRAC system for transportation management and security.

Figure 7:
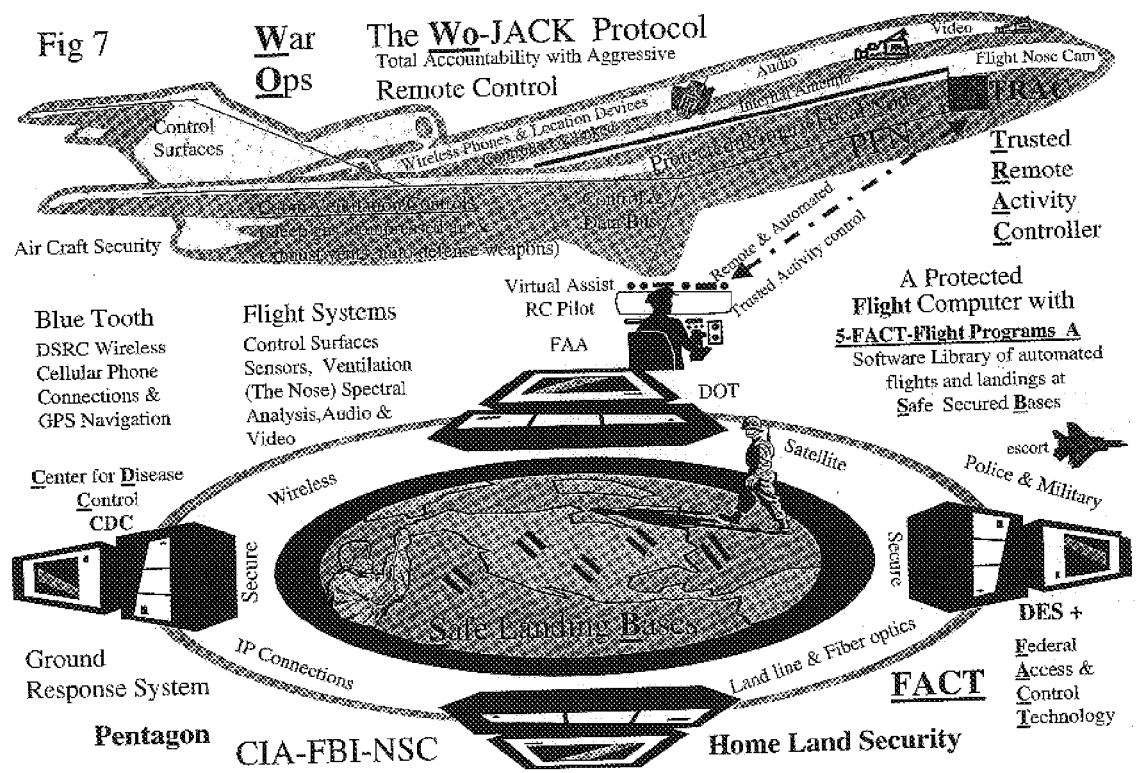
FIG. 7 illustrates the 2 basic technology sections; the plane and the ground control system to perform PFN/TRAC robotics and the Remote Control via RC pilot in the center of the figure.

Additionally, any number of mass data systems can and will have all sorts of controlled access to the FACT (Federal Access and Control Technology) network and data will be mined from all types of PFNS through out the PFN/TRAC System. This will be further detailed throughout this application. In FIG. 7 there will be greater detail given to the robotics and remote control of commercial aircraft to special safe bases to land and handle the special conditions of a troubled flight.

Any changes to aircraft or flight systems requires a great deal of time in testing before it is allowed in regular flight scenarios. With this understanding the invention has been designed to accomplish robotics and remote control flying in a progressive manner and teaches a progression from commercial off the shelf or COTS products thru specific ASICs (application specific integrated circuits) to SOC technology with the necessary integration and consolidation of entire systems to chip technology through out this filing and the related applications. For this reason it is important for the reader, examiner or reviewer to comprehend the use of existing technologies and parts and appreciate how they are innovatively interface and uniquely combined for functionality with present and legacy technologies to develop real product and test platforms for future consolidated versions with forward engineering for generations of enhanced protected and trusted PFNs to perform accountable machine control and secure communication routing for lifetimes.

FIG. 2 is a Power Point slide highlighting the important characteristics and benefits of the PFN/TRAC invention; as a timeless interface technology that incorporates new technology into an architecture that provides accountable aggressive automated and remote control via existing technologies;

This early bullet point figure states the advantages of the 1A PFN/TRAC controller/router as a physically protected impregnated integrated part of airframe and aircrafts electrical bus system. However, as stated in figure one the time period for any such physical connections to avionics electrical buses normally take eight years.

The PFN TRAC System was designed to function immediately as an isolated parallel system and in sensitive situations unconnected and passive. This application was first conceived for terrestrial PFN applications, specifically for light and heavy rail transport. One immediate benefit to this approach is that a real-time, real life test platform is created to evaluate prototype technologies in the field. Additionally, inexpensive wireless redundant to monitor and progressively manage and control operations as a backup is a decided advantage when using legacy technologies and/or max-ed out, or over taxed systems. Plus testing can be an ongoing process, from beta testing to pre-production testing and through to include in service evaluation of components and system analysis.

Progression is built by working examples. First by interfacing Commercial Off The Shelf Products (COTS) in a functional prototype like the 1a TRACker unit depicted in FIG. 11 with it's general purpose described in FIG. 10. This carry on brief case unit routes all aviation communications and data through other acceptable wireless technologies to deliver operational and security data and video to the ground in real time to parallel to ATM air traffic management data provider to the Air Operations Center (AOC). It accomplishes this without being connected to the aircraft.

Figure 12:
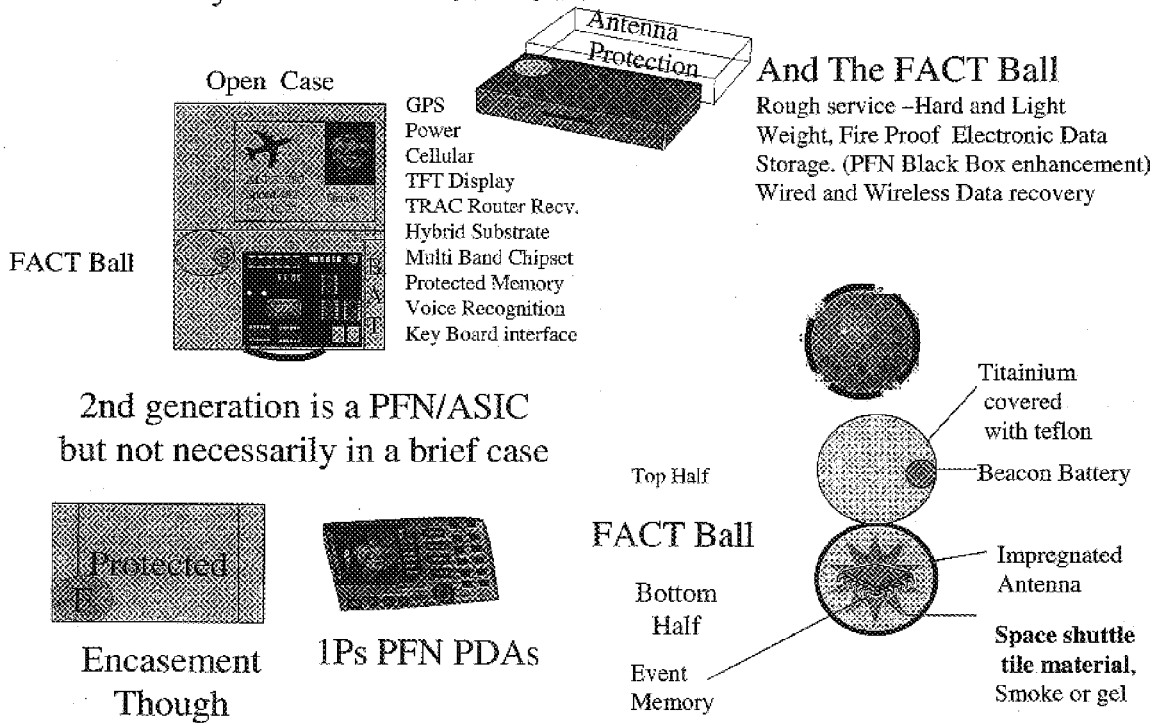
FIG. 12 Drawings of two products 1a TRACker and FACT Ball.
Figure 13:
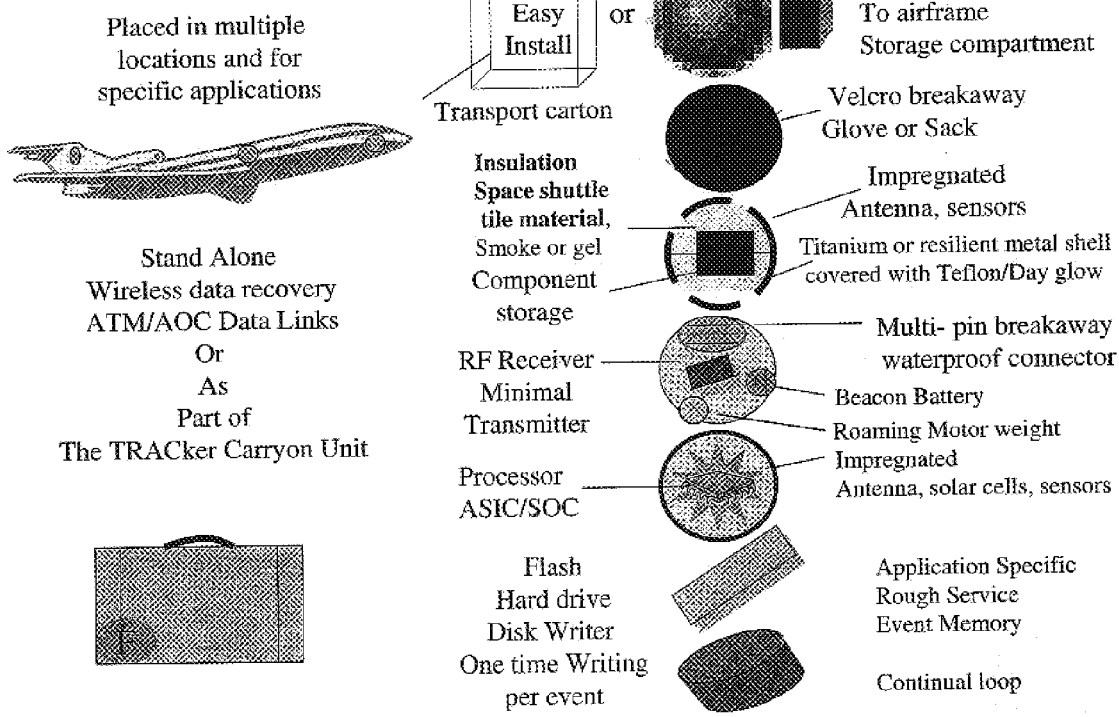
FIG. 13 More description on the FACT Ball.
Figure 15:
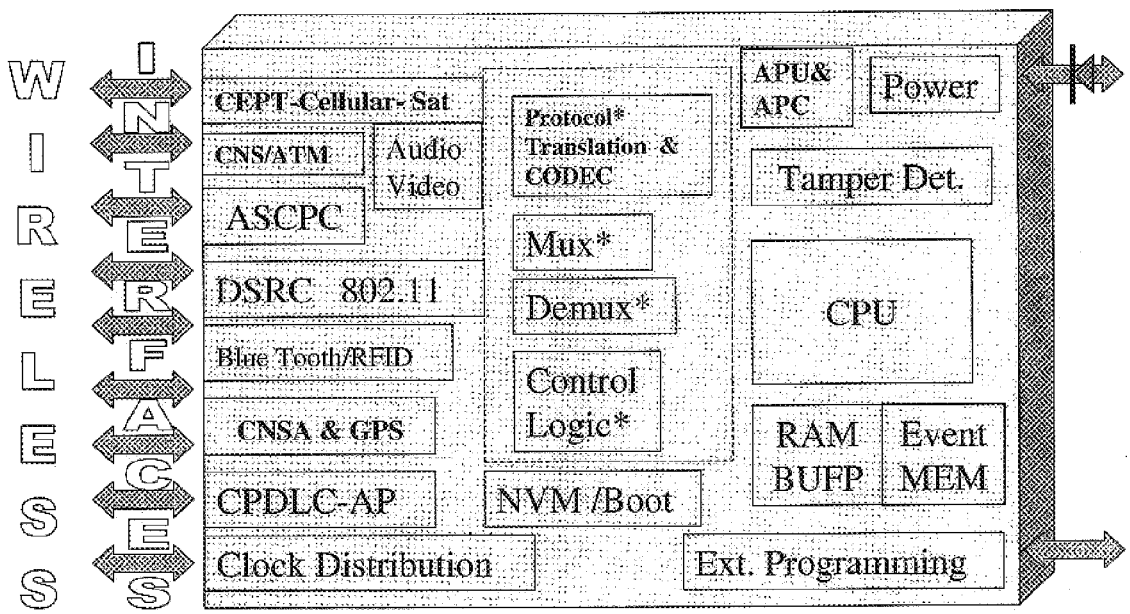
FIG. 15 The TRACker circuit.

FIGS. 12 through 13 describe the consolidation and integration of the circuit design into an ASIC that is shown in FIG. 15 and earlier in FIG. 3 as the 1A aircraft ASIC for a Trusted Remote Activity Controller (TRAC) and/or router. The final circuit design and components are determined via these Brief case carry on TRACker unit evolutions which start by employing a Laptop in the processor to run the necessary programming to complete the interfacing. Ideally set up to handle windows programming which is acceptable to many of the (COTS) sensor arrays and transducer software. Likewise a PDA can perform this function in the same capacity and be used as the Air Marshal TRACker unit's processor to interface wireless and video interfacing.

The 1a TRACker does not perform remote control via direct connection to the aircrafts avionics. However it is capable of receiving all critical flight data via hybrid wireless chipsets interfaced to the laptop/PDA (first generation TRACker unit) which is also interfaced with the public GTE airfone system or another acceptable wireless technology to relay critical flight data to the Transportation Security Agency (TSA) along with additional security telemetry such as EDS Explosion Detection sensors and cabin video and audio data that is also, recovered by approved Dedicated Short Range Communication (DSRC) another wireless interface to the TRACker unit.

This innovative prototype (The 1a TRACker Brief case unit) is further detailed in this specification for those skilled in the arts. Additionally, it is a wonderful example of the progressive aspect of this invention. The PFN/TRAC technology was envisioned with the capacity to self evolve from the generated data. The unit and the system enhance it self by mining recovered, recorded, and reported data at three levels in an ongoing process to refine and re-invent the PFN/TRAC architecture.

FIG. 3 Function Description for Programming

This application specific integrated circuit (ASIC) is to interface avionics with the PFN/TRAC System of wireless routing and computer networking on the surface. The circuit design is for complete robotics and remote control of an aircraft. This circuit is not just a simple record and report isolated monitoring function like another product the "1a Tracker" a related embodiment of the invention, which is discussed later in FIGS. 13,14, and 15. It is intended to interface into specific avionics flight control systems and data handling circuits and systems and be the functional control component during a Federal Access and Control Technology or "FACT" event.

1A PFN aircraft controllers will manage back up systems as well as primary flight systems on board. The benefits of system redundancy will be incorporated for the safest of robotics and remote control flights. In many simple and legacy aircraft the 1A PFN/TRAC controller/router may the only other system capable of performing redundant activities. The essential flight systems will be interfaced via a higher-level interface program running in the 1A Aircraft PFNs. Multiple 1A PFN/TRAC units may well be part of any specific aircraft's avionics and they will have intercommunications by wireless and hard-wired connections. These multiple PFNs will be harmonized to insure un interrupted and coordinated control of the aircraft for those authorized to manage the flight aloft and on the surface.

The architecture provides for translation programming between disparate communication protocols for universal emergency messaging. Additionally provided for, is the necessary programming for essential E/E avionics bus systems to be interfaced to harvest data and manage flight via any on board flight computers, collision avoidance systems and autopilots. Or, by direct connection with activity control components (any appropriate flight control surface actuator) via 1A PFN units or actuator specific stand alone PFNs. The robotics and remote control performed is to be a large scale PFN/TRAC unit integration with aircraft systems. It will be a progressive one with initial interfacing of current COTS dispersed systems and components into a protected processor and protected actuator architecture. Future consolidation miniaturization and reduction in weight will be accomplished through Systems On a Chip or SOC technology. Of course, all versions will have to meet current standards, rules, regulations and codes as a necessary part of FAA testing and to be in compliance with the nature and scope of invention (the PFN/TRAC System™) as detailed in related filings.

In concept this ASIC gives direction to those skilled in the arts to plan the various control scenarios involving hardware, software and firmware. This figure lists the basics to construct the aircraft controls to fly five pre-programmed flights and Safe base landings. Enough to operate the aircraft with the necessary real-time flexibility to flight conditions available equipment, with no flight personnel and to land at one of five specified safe bases. Obviously, this scenario will not be absolutely safe but better than no pilot or the wrong one. Later; Flight and glide paths in programmed library data bases will exist for more airports, but FACT troubled flights will still land at special bases designed to protect the public and national security, and these scenarios will never be absolutely safe).

The preprogrammed flight and landing programs can be stored on board or up loaded to an aircraft in need for automated assistance in returning to the surface. Possibly this could of aided an in experience pilot like JFK Jr. if a PFN controlled all the automated flight controls in his aircraft and he was in communication with a ground data base AOC center that could have down loaded specific programming to land at Martha's vineyard. Or had he had the opportunity and ability to download these programs before lift off.

Due to the many onboard systems and computers in present commercial avionics the PFN/TRAC System will initially and continually monitor current and future systems for failure by wireless interfacing and performing integrity checks for abnormalities and tampering. This progressive unit will be able to control any essential peripherals during a failure event via local programming and robotics while it receives remote up loads from the surface in real-time. Future generations will provide more system protection and consolidation as well as redundancy of dispersed PFN/TRAC units that communicate and operate in harmony. The first PFN generation of aggressive robotics and remote control will be thoroughly tested to insure no false activation of the system and components. This is to be the primary objective for any PFN/TRAC interface component before being offered commercially—no false activations. Then, it will be offered to the authorities and the public in general with the understanding; that it will not falsely activate. However, outcomes for authorized activations during hostile aircraft takeovers or to counter for local catastrophic flight control loss in real-time are at best just another option to a flight in trouble with no guarantees for a safe landing.

Basic for Public Understanding Concerning all FACT Activations:

When federal access and control of a piece of equipment occurs, that piece of equipment is being operated in an unauthorized or unsafe manner and any intervention is at best designed to limit the time any particular negative activity can transpire. Secondarily, exists the possibly to augment the outcome positively via genuine human effort and the proper technical options available. It is important to remember this is only a chance to improve the safety of a particular public at risk or the public in mass. There are no sure safety measures for unexpected dangerous operation of equipment, especially if it is a result of intended misuse like a terrorist event.

Sample Circuit Description

This figure is not to be considered specific or restrictive of any PFN ASIC architecture. The technical teachings of this patent for the PFN/TRAC System are discussed in an alphabetical avionics acronym list later in this application and three subsequent aviation filings. The terminology section helps organize the individual areas to progressively develop the technology via separate components and specific applications for the various aircraft. The accountable robotics and remote controls of the invention is the bases for the operating systems purpose, both in the FACT ground system and in 1A PFN aircraft avionics for flight management systems. The various events that will fag a FACT activation are discussed with the response and activity controls as they apply to the named through out the application and in this section The boxes on the left side of the green block are used to give examples of the communication and data interfaces essential to TRAC processing and should be controlled via the PFNs in a FACT event. Top Box CEPT-Cellular is the commercial cellular frequencies approved for use in flight applications like GTE's Airfone system used in the United States aircraft for passengers to place calls from the aircraft. This system works off of LEO satellites and does not interfere across the commercial surface cellular system of towers flooding ground telecommunication systems from a dispersed signal from above. Systems will be used to send parallel data streams to TSA and security links with real-time flight operation's data, in the other 1aTRACker product and could be used by this 1A PFN ASIC to send security telemetry recovered by the 4th block labeled DSRC for dedicated short Range communications, which may driving onboard close circuit video/audio and/or other sensor array security applications. The 5th box blue tooth that is a commercial Off The Shelf DSRC system for wireless carryon devices. This chipset with appropriate protocols will be interfaced as a hybrid substrate as stated to the left of these basic communication inputs on the FIG. 3 block.

A PFN/TRAC unit will be capable of controlling and using all standard carry on wireless devices and recognizing other non interfaced transmissions via It's scan function and frequency counting algorithm, that will constantly monitor an appropriate number of the 40 antennas that are on board a traditional commercial aircraft to adequately survey for an rogue or unauthorized transmissions.

The second block on the left CNS/A & ATM The Communications, Navigation, and Surveillance/Airborne system is linked by wireless hybrid transceiver/protocol chipsets. This configuration is displayed in other similar figures. The above 1A PFN/TRAC circuit recovers any data generated by the aircraft. All systems carrying voice transmissions analog or digital will have voice recognition software applied to transpose any verbal communication into digital format for transmission by other wireless protocols (e.g. airfone) interfaced and/or as text to be recognized and read at the appropriate application level in any TSA, AOC, ATM monitoring terminal, either locally or from remote locations. The ATM portion of this block would be also another Hybrid Chipset for the Air Traffic Management provider like ARINC or Boeing with all the necessary receiver, protocols, codec and translation programming to receive this data locally in the 1A PFN/TRAC unit(s) and relay this data via any number of acceptable or needed wireless technologies on board the air craft or via another digital configuration and modulation within the broad band width of the ATM service provider for the specific aircraft.

The TRAC controller/Router would determine the best means to transmit any needed data and how to under any circumstances. Redundant back ups on traditional frequencies and the not so usual frequencies is all available to the 1A PFN TRAC controller/router and the FACT/TSA/CINC North American Air command. These agencies will generally be located with the AOC. But when not the agencies will be able to network with AOC and commercial ATM programs in real-time. ASCPC Air Supply and Cabin Pressure Controllers is an exemplary accessory System Under Control or SUC to 1A PFN/TRAC unit and FACT programs. or at lease certain functions will be. The air supply to the cockpit and passenger cabin is to be monitored for contaminants e.g. Bio, chemical (EDS) and physical property sensor arrays smoke detection, Audio/Video/Thermal/radiation sensor arrays and various transducers, which send specific signals to the 1A PFN ASIC. These individual devices are operated and processed by the proper divers and programs installed in the 1A PFN and translated by conversion interface algorithms to format the signal for transmission to the surface and TSA terminals via the appropriate onboard wireless. Some such sensing capability exist on sophisticated aircraft already and these data streams would be interfaced with the PFN/TRAC units on board to harvested their data and enter it in to the 1A PFN/TRAC units monitoring program and on to the TSA system and other agencies via internet protocols and/or connected via direct wireless gateways. The FACT (IP) security matrix combines national and global transportation, law enforcement and security Intranets. These security agencies are responsible for continual layers of automated and human data mining and analysis.

The 4th and 5th blocks on the left are all the short-range interface protocols DSRC or stand alone PFNs with dedicated short range communications, RFID radio frequency ID products like (EZ pass) and Blue tooth another short range RF technology for wireless telephones to interface with some automotive telematics.

These are existing technologies interfaced via the PFN platform in the ASIC and would have the appropriate hybrid chip sets interfacing these technologies to track, identify and sense materials, equipment and people approaching and entering the aircraft and the aircraft's cabin and compartments. Via, these connections the 1A PFN or series of 1A PFS on board the aircraft and working in harmony will identify carryon wireless devices through ESN recognition and look for equipment alerts from FACT Security and TSA down loads to the local 1A aircraft PFN as well as manage the use or restrict any such use of the recognized cellular phone or other wireless carryon device as determined best for flight safety security by the legitimate flight crew or the 1A PFN/TRAC unit. This connectivity via Blue tooth or 802.11 DSRC to standard commercial cellular phones will be used as an emergency communication asset to the surface.

RFID

Mentioned above the RFID Tag technology is a short-range identification system that also can be interfaced into the PFN/TRAC interface platform's to repeat or digipeat as a report function to FACT and TSA terminals and deliver data to distant remote mass data repositories. The PFN would supply plug in connection for RFID transceiver chipsets to drive their special antenna or magnetic transceiver portion of the RFID architecture. Then the EZ pass tag could pass through the antenna array and be identified. Antenna hardware could be concealed in the air fame passageways and compartments. The gathered data would be passed on via PFN interfaced—long distance wireless technologies—either wireless telephony or other RF depending on the application. Additionally, the mined data from the tag's flash memory would be redundantly stored locally by the Primary Focal Node's Trusted Remote Activity Controller/Router's extended memory for accountability and accounting purposes with a flagged event. Or to compared to any boarding list of known materials that was checked in and tagged with RFID technology for transported to a particular aircraft that matched a specific passenger travel plans and movement for example. Or the recognition of suspect packages being tracked by law enforcement and was matched in the PFN processor from downloaded data from FACT/TSA or other agencies in the national security matrix tracking material movements. This technology can be used to identify and track mobile inventory for security and for commercial applications and billing applications, etc and communicated in real-time via the PFN machine-messaging network.

However, to step it up a notch the use of the stand alone PFN a version of the 1P personal PFN will provide sensing data of the material being moved and the state it is in and transmit this data to the 1A PFN and other equipment and vehicle PFN units like the 1E equipment and 1SV surface vehicle controller router which rebroadcast this data to FACT TSA centers. These units and their ASICs are detailed in other drawings with the defining difference being they have limited in power and distance and ability to handle high current applications, otherwise they can give the same telemetry as the equipment PFNs and more telemetry than the RFID technology (basically jus an ID tracking technology.

Scanning is another interfaced technology in all the PFNs. Scanning like Bar codes and the PFN/TRAC's own Bag sign where the 1A PFN ASIC via the proper chipsets and drivers (hybrid substrate) will recover images from personal bags, in this case of the PFN/TRAC bag sign product the passengers own signature which is placed on the bag by the passenger via invisible signatures made with special markers detected only by ultraviolet light and a hooded video scanning device. The images are converted to a distinct digital signal and are checked via a comparison handwriting algorithm in the PFN to confirm Bag and passenger match and location via video Iris or other personal ID recognition technology in real-time throughout the air travel/transport experience, through the airport and gate to gate through the skies RFID tag technology is an example of a technology that would be enhanced by a PFN interface. PFN/TRAC System increases RFID technology track and deliver more real time data to many IP systems for monitoring and management of material movement both for commercial purposes and security reasons. This technology is an excellent Commercial Off The Shelf Technology example of COTS interfacing being enhanced via the wireless PFN interface connection. The PFN/TRAC unit and System becomes a flexible security sensing matrix with these types of technologies interfaced and is likewise enhanced in it's capacity. Additionally, much more relevant data can be added to the RFID tag data during PFN processing such as PFN GPS or fixed address and time and passed on to command centers and first responders dial ups to NENA numbers or wireless gateways to IP protocols DES/DET/TSA and homeland defense and security—if applicable as well.

PFN Diverse Use Wireless Communications Use Like Blue Tooth (DSRCs)

As part of this invention's nature and scope these DSRC Systems Under Command/or SUC technologies would write interface code into their protocols to immediately transfer PFN/FACT directives and data via any cellular service they were resident with in the same wireless device. These phone providers would be part of a priority emergency action messages EAMs network that delivered this packet data to the surface IP/TSA gateways and dialups for FACT's homeland security matrix. The troubled aircraft would provide a continual down load of identifiable data packets and information to surface receivers or satellite in route for further data resources in real-time to critical assist agencies and for later analysis. Special arrangements with these providers to support secure gateways into this IP security matrix of FACT/TSA security and other agencies would have to be arranged and constructed. These providers would use their existing peta mass data handling and storage systems with special FACT/TSA security storage programming and storage, or they would be outfitted with special PFN/TRAC/FACT Memory repositories to capture all local down loaded data as part of a FACT equipment register system described in later figures and earlier related filings A Byproduct Advantage to Local Interfacing-System Connected While the invention uses existing technologies and better coordinates their use in cross environmental applications it also manages the host equipment more efficiently by coordinating movement of vehicles on or near the earths surface with the data processed. The technology does not infringe on existing art, it is enhancing it by interfacing it into the PFN/TRAC architecture where it enjoys a wider market base of applications. It is important for the reader or reviewer to keep in mind that the above wireless technologies are examples and this group of interfaces will change per aircraft and later in the terrestrial ASIC designs by application. The invention was not design to compete with existing technologies or infringe on prior art. It has always been conceived as an interface platform to coordinate these dispersed and disparate technologies and commercially work with these technologies to better manage equipment and route data for an improved the quality of life for humanity.

CNSA & GPS along with CRZ cruise tracking technologies are other inputs interfaced with the PFN via any necessary protocol chipsets. Exact flight path data will be gathered from onboard smart determination technologies and ground surveillance and communication systems and compared to preprogrammed flight plans. All in flight changes will be verified by surface and aircraft data telemetry and unauthorized flight will be FACT flagged and immediately result in a Safe Base flight plan via FACT event protocols. Constant communications with the aircraft and the order for escort and assist aircraft for any troubled FACT flight will be a part of this immediate response and directed by DOD homeland air defense CINC AIR COMMAND/NORAD.

CPDLC-AP The cockpit data link and autopilot box in the figure are the direct and primary data inputs and flight controls feed back. During a FACT event they will be SUC to the 1A PFN or group of 1A PFNs or Trusted Remote Activity controller/communication routers (this is a TRAC ASIC above the terrestrial PFN/TRAC ASICs are in subsequent figures), along with any sub specific application PFN ASICs which operate any necessary dispersed actuators to control flight control surfaces over any of these systems if they can not be secured from human control while the aircraft is in flight.

Avionics Translations

It is important to remember that the system under control has to translate avionics bus activity controls in digital format to the PFN operating program so along with all the hybrid chip sets there will be one to synthesize protocols like the 429 maintenance interface does for 737 to convert from the avionics digital signal messaging to a PC platform and windows applications for maintenance. This is not specifically shown here in this ASIC because of the space in this figure. But this is the type of translation programming that will occur in the CPU with the codecs stored and conversion programming stored in memory.

Other figures and the other related patent applications describe direct from the PFN separate actuators as well that are part of the technology's protected operations. The skilled in the art have to construct functionally appropriate designs to meet any code and specifications known in the industry for the specific airframes. Acceptance of the PFN/TRAC system architecture in general must be a process by the appropriate industry and government experts to test accept and standardize these constructions.

Many analog systems and physically controlled aircraft to day will see its first automated fight controls via PFN/TRAC unit avionics and actuator components. Actuator controls are covered in earlier related filings.

Basically, the 1A PFN and PFN/TRAC network of units if so needed in any particular airframe will operate to form a seamless connectivity of flight controls from first existing systems like the flight computer, collision avoidance systems, forward seeking radar, weather radar and any autopilot controls. These systems will be interfaced and use to fly the plane un interrupted and appropriately with current robotics However, in the event that the plane is not responding as it should the assist remote control pilot in an escort plane and/or the ground RC pilot in the simulator station or the 1A PFN TRAC Unit onboard will be deferred to-to control the aircraft via PFN robotics and via the network of specific PFN ASIC flight control actuator circuits. (Either wireless and encrypted or wired and with encrypted commands from protected PFN robotics or remote command).

Clock distribution. Is coordinated in each PFN by LEO satellites or the GPS interfaced or other wireless communications with redundant systems and local clock updates to keep all moving and stationary objects placed in synchronized time and space for movement management on and near the earths surface. This will be tied into collision avoidance programming and be used by the FACT program TSA and homeland defense/DOD to control robotics flights and coordinate and control movement in the air and on the ground. This clocking will be the bases for programmers to write algorithms to account for signal trans mission times and conditions to obtain the optimum performance for near real-time control of any aircraft under remote control. It will also provide 1A PFN/TRAC unit benchmarks for preprogrammed and timed responses performed by robotics in conjunction with ground controls. It is to be system wide synchronized timing and is augmented by geographic position coordinates and updated by consistent redundant sources. This process is part of the FACT construct program running in the 1A PFN to determine if a flight is positioned on time in the exact place and the correct altitude at a particular second in space and time. It is the electronic equipment placement police for an aircraft in the sky with a connected system partner on the ground all the way. The ATM and AOC as well as the TSA are linked nationwide and would include the areas of free flight west of the Mississippi.

Protocol Translation & CODEC

APU & APC APU Auxiliary Power Unit will be specially protected for the first generation of PFNs and also for PFN additional APUs or emergency power packs, which inherently reside in special protected compartments for the 1A PFN/TRAC unit and any FACT interface components to fly the aircraft (as detailed in earlier related patents). The APC the auto Pilot computer is listed in this block for the initial 1A PFNs to incorporate as much as possible the auto flight systems with secured power supplies and increase their protection to make them impregnable. Separate maintained power sources are inherent to PFN/TRAC system to insure the trusted remote activity controllers operation and essential for the activity components as well. These emergency power sources are of the highest quality lithium batteries and are maintained at full power by the aircraft generators and the airframe's electrical bus. The charging current is regulated and surge protected as well as one directional and can not be shorted externally to discharge or damage the emergency battery or negatively affect it's normal life (detailed in related filings). The standard self-contained PFN emergency battery self monitors and reports to the 1A PFN the battery condition. All PFN units and flight critical components are self-powered in an emergency. All actuator PFN circuits, control circuits like the 1A PFN ASIC or trusted remote activity controller and any of the connectable are protected physically, and employ secured data links, wired and wireless with redundancy, and have individual service current available locally to complete their specific tasks form authorized signals. Additionally, To integrate as part of the PFN/TRAC system performing FACT security programming, all other APUs on board must be configured to report their condition via regular integrity checks conducted by the 1A PFN unit. These regular system checks and PFN system data then downloads will to authorized service and maintenance centers for the APUs and PFN emergency power packs. All aircraft components essential to flight and PFN/TRAC/FACT operations will have these service integrity checks run on their performance, and these downloads will also go to manufactures. There is a FACT system auditor/inventory program locally run on the aircraft via the PFNs and a system wide redundant backup program done nationally/globally for everything that flies in commercial and general aviation via the FACT Registry discussed in FIGS. 37, 38, 39, 40. This portion of the FACT registry is operated by the FAA, TSA, Preliminary FACT FAA Tracking Registry Program Basically, the FACT registry tracks the use of electrically interfaced components and any equipment desired inventoried on the aircraft PFN file (e.g. tires type lot number) as a quality assurance program, and quick security and safety comparison check. A running program in each 1 A PFN aircraft checks all known components to be on board with no alerts downloaded from FACT AOC/TSA registry during pilot ACARS, during any service of components and periodically. New item recognition is flagged data and routed to the specific center for analysis.

For example, a suspect piece of baggage is evaluated through the airport terminal FACT flow data base and appropriately responded to, while an aircraft circuit or new transmission is processed through the FACT FAA central registry and compared to known inventory and assigned RF equipment) In this respect It can be used to counter terrorism, antitheft and monitor the sale and resale or reuse of aircraft and components, much as the FACT registry is used for terrestrial PFN/TRAC units for automotive marine and rail vehicles and products. Additionally required are specially qualified service personnel and controlled progressive program with security clearance for all work perform, as authorized service will have to be in place for service on any PFN/TRAC units and their responsive components operating in any FACT portion of the system. Ultimately, all PFNs will be operating in conjunction with the FACT system for national security in a transportation matrix.

The APU/APC are Separate Interfaces

APC is the Autopilot Computer and it must be protected with an uninterrupted power supply to be part of any PFN/TRAC/FACT system so it can carry out the preprogrammed FACT flights. Whatever augmentation is needed to complete this protective task to qualify the APC for PFN/TRAC technology must be made to perform to make it an accountable robust robotics flight and remote control component or a Trusted Remote Activity Control portion of any PFN/TRAC/FACT system. Progressive use of existing components and technology are encouraged for rapid development of secured robotics and remote controlled flight, but it has to be securable and protect able to qualify or it must be SUC to 1A PFNs on board. If employed the APC will be used to handle the 5 safe base fights initially and continually, but there will be self powered back up actuator controllers via dispersed PFNs operating in a harmonious matrix to provide ultimate control to the authorized authority, even if that authority is artificial intelligence (AI on board robotics in a 1A PFN) periodically.

Regardless, of 1A PFN overrides, the autopilot must be impregnable to unauthorized personnel during flight (standard to be determined and application specific).

Personnel identification is accomplished via the communication systems and data transfer systems interfaced with the 1A PFN controller. They would include smart card swipes, finger print and Iris scanning, voice recognition, thermal sensing, blood pressure readers and even EKGs via hand sensors and finger thaws on the yoke and instrument panel swipes as well as full biometrics transmitted via DSRC systems or 1P personal PFNS with body sensing harness belts, bracelets, watch type bands, or sensing clothing worn by the pilot and flight crew and interfaced. Individual biometrics can be used to identify a capable pilot in real-time via automated algorithms with pre-logged personal data in both the local monitoring program in the 1A aircraft and also in the AOC/TSA centers on the surface for real-time comparison and response.

This Robotics flight guardian program will maintain the approved flight plan via monitoring aircraft systems and progress with respect to authorized activity and conditions and continually check the pilots condition and flight crew if desired. This approval process can clear any legitimate pilot and provide proper access to the controls of the aircraft in emergencies by having all qualified personnel in the FACT registry. Local 1A PFNs will be updated with this list. However, an alert flag will be sent to FAA FACT/TSA/NORAD/AOC where final tracking and override is maintained. In absence of such an alternative the already flagged FACT flight will be programmed to the appropriate SB safe base via robotics and flight assist RC needed via the 1A PFN TRAC unit on board.

Most other portions of this ASIC are self explanatory to those skilled in the art of avionics, electrical engineering and computer processing. However, there will be sections in this specification and related filings that further define out functions performed by the specific components of this sample circuit. Additionally, there are similar circuit designs that further the reader's concept of this PFN Trusted Remote Activity Controller/Router unit and it's application as a primary Focal Node (PFN local connection point) to perform universal accountable interfacing with stable wireless connectivity and equipment control.

Obviously airframes, and terrestrial vehicles have different electronics and disparate properties that can hinder any effort to coordinate them. This is one main reason for the Primary Focal Node (PFN controller/router) being placed as a receiving PC processing platform in vehicles and machines where they have access to stable power sources; they then can perform wireless translation, and relaying or routing functions for the various forms of wireless communications, as well as, store pertinent data locally and remotely for commercial billing and accountability for commands delivered and resulting in remote control of the machines they are attached too. This creates a matrix of machine messaging and management that is coordinated and useable in real-time and can also be socially and commercially acceptable. Data is locally harvested/stored and/or sent on via the appropriate wireless and IP applications with encryption to the appropriate systems terminals and application programming for decryption and use.

General Function Summary of the 1A PFN/TRAC/FACT ASIC Unit

It is important to remember that the essential controls and communications will be determined by the security agencies, the FCC and FAA and industry standards efforts. The remote control communications will be ded or dedicated digital channels for individual activity controls for flight surfaces. Probably on special military (possibly DES communication channels) that will be used form aircraft to aircraft and for close to (SB) landing applications. (Safe bases (SB). Otherwise robotics flight will be employed to maintain the highest level of real-time responsiveness for aircraft performance in relation to the real-time flying environment. This is proprietary to the FACT programming and this sequence of activities is part of what defines a FACT event. Unless a local assist aircraft is accompanying a troubled flight, the PFN/TRAC unit will fly with robotics when activated to one of the 5 preprogrammed FACT flight paths that are stored in the PFN software library (or memory storage) to the pre arranged Safe Bases (SB) determined by location of the aircraft via (GPS and/or other smart location determining technologies on board) and/or the nature of the emergency that has been flagged as a FACT event flight (for Federal Access and Control Intervention).

To insure absolute maximum redundancy in communication from the plane to the surface, blue tooth, or 802 wireless or any applicable DSRC interfaced will provide contact from any and all of their air travel carryon devices that interface with other long range communications so that any wireless device can be used by the 1A PFNTRAC processor (s) and the FACT system. PFN/TRAC must have the capacity to activate any such devices and call NENA/FACT numbers in route for first responders and for direct downloads to the FAA homeland security's hot operations center (e.g. Herdon Va. With TSA/AOC) or flight Command Controller air operation center(s) (NORAD, TSA, AOC AIR CINC) and download all data that is recovered on board by the 1a PFN/TRAC unit. More than one 1A PFN/TRAC unit can be interfaced in the aircraft and to an aircrafts various electrical bus systems with each having a separate FACT ESN or electronic address and communication protocol to coordinate any flexible master slave relation ship and to insure continual service via protected secure controls of the plane via the various non accessible and secluded units. All automated flight control systems will have a slave relation ship to the 1A PFN/TRAC process on board the aircraft. These systems will be subsystems or Systems Under Control or SUC. to the PFN/TRAC units and any network. Many automated controls (auto pilots, flight computers flight and voice recorders sub system controllers exist in a distributed architecture in present and legacy aircraft. These systems are reliable trusted and well engineered and there is no real need to eliminate or replace them. The first goal and basic modality of the invention is to progressively create the PFN/TRAC System with an organized accountable interface platform via a progressive architecture to increase security and pilot back up for human controls in commercial aircraft to improve public safety and national security. This can be accomplished in a number of ways with all the various aircraft.

The Properties and Qualities of the 1A PFN Unit

First generation PFN/TRAC units will link and control hardware and software to robotically fly the plane to designated safe zones and landing bases with special security and support services to handle most all imaginable emergencies aloft and on the surface.

There will be the capability to eliminate local flight controls.

There will be the capability to land the plane at designated safe bases via remote control flying.

There will be the ability for multiple communications with the aircraft and continual tracking. There will be the capability to dump the fuel remotely and robotically.

There will be a means to incapacitate passengers and crew.

There will be real-time audio and video to ground and escort aircraft.

There will be isolation capability for cabin air.

There will be the capability to treat the breathable air in the aircraft.

Because realistically the invention's development and deployment will be varied and progressive earlier generations retrofits and legacy aircraft will not have all the functions desirable. Those not obtainable through hardware and software integration and interfacing will be obtained through well-trained and security-cleared personnel until such systems are available or as standard operations for specific aircraft. For this reason FIG. 3 is going to change over time and for specific aircraft.

There will be a capability to terminate the flight if the need arises. This technology is designed to be timeless, because it will evolve and become more consolidated integrated and protected. The ASIC translator and processor will be interfaced with IC hybrid substrate chipsets for the varied communication protocols. The chosen systems as standards will inevitably be converted to system on a chip or SOC technology and housed in cans or specialized containments that have electronic security packaging and tamper detection. Most importantly present manufacturers have direction to move forward in cross-environmental applications via the PFN/TRAC system and better coordinate their product's use with others. Additionally, their markets are expanded and their negative cross-environmental impact can be managed. Allowing them to freely produce their special products to an organized structure in place that is compatible to their industry, business, and government regulatory concerns, which will also improve public safety and national security.

The Aggressive response question for the public and government-this is always done for the Trusted Remote Activity controller/router to be trusted and accepted technology standard. It is a basic and unique element of the PFN/TRAC technology. In all the patent applications the invention address the social and constitutional issues and impacts it will makes as an advanced Human Machine Interface Technology. The following is a major issue for the People of United States to understand and accept as well as any peoples globally that will use the invention in the following manner.

Issue

In a hostile take over of an aircraft a disabling aerosols could be released into the ventilation system of an aircraft if this is determined advantage. The 1 A PFN controller could be programmed to control a responsive solenoid valve (wired or wireless on compressed gas containers and release this gas to sedate all occupants; if robotics flight and remote controlled landing proved the most ideal scenario for a portion or all of the public's safety. The data recovered and the course of action taken along with the geographic location and condition of the aircraft and occupants could be the determining factors in writing the software for the robotics flights and/or remote controlled landings as well as the human responses, and procedures taken both aloft or on the surface. Personal 1P PFNs could monitor the known medically compromised passengers and regular crew for any near fatal results for this aggressive remote control action as well as, cabin and cockpit video systems Adjustments could be made robotically or remotely by medical staff in the TSA centers or on the surface. As outlandish as it sounds even to this inventor these might be necessary options to insure the greater public safety and national security against terrorist events like the 9.11.01 terrorist act.

In keeping with the nature and scope of the invention, the employment of this function and similar ones involving the PFN/TRAC system and these FACT security system possibilities need to be known and the publics voice heard. And, not just government agencies and the public and legislative branches of government, but all the public. These are decisions that can have dire consequences and first deliberated on by the public and then developed into acceptable standards, standard actions, regulations, procedures and/or protocols with respect to this aspect of the invention or any other public issue of the invention. Programming must reflect how a democratic society has decided to employ the invention for public good, safety and national security.

The inventor suggests objective reviewers like the Kettering Institute and their National Issues forum and Civil Liberties to objectively frames the issues and quarry the public and report to the public wishes to government. The hardest of issues might well be served with a public polling during stand elections. With the public pulse on these issues incorporated before standard groups meet and/or legislative committees take up planning and make regulations, laws, procedures and protocols; the software code writers and programmers can construct these sensitive programs of the invention in an acceptable and trusted manner. One that has the trust of the public and can serve as invented.

Industrial Applicability, Commercial Progress and Component Review

1A PFN series) Aircraft Controllers is the first of a number of related aviation PFN/TRAC products with FACT Security that make up this management and security invention for air travel and transport.

Commercial efforts are underway seeking government support and assistance to include funding, aircraft, and technical transfers in an effort to partner up with major aircraft manufacturers and avionics companies to develop the 1A PFN/TRAC unit a protected equipment control technology. Informal discussion with Boeing's ATM people pointed to a long process to physically interface the 1 A ASIC with commercial aircraft. This aggressive of a control system on board an aircraft has its proponent and opponents. But Boeing and others did not dismiss the possibility, nor the need for more technical options to poor human flight control when it is taking place. Most would rather stay focused on pilot assist systems for as long as this has the least reactionary approach.

More initial interest has been shown for the fist progressive stage the of the PFN/TRAC technology. The "1a TRACker" which is a carryon brief case air marshal connection to ground security and TSA is not interfaced directly to the aircraft's electrical system. It begins by recording and reporting via an isolated wireless communication system. This 1a TRACker laptop design and the 1b "Tracker) which has the same circuit design as 1A PFN/TRAC units in FIG. 3 is also listed and defined later in this application as FIG. 15 and considered a progressive step for the PFN/TRAC System and FACT security system into the Aviation Industry. The 1a carryon TRACker evolutions discussed later will be the first product to market. The TRACker ASIC (FIG. 15) is similar to this proposed integrated 1A aircraft TRAC circuit. The 1a carryon TRACker brief case series will be responsible for final and specific 1A PFN ASIC in FIG. 3 for the robotics flight and the remote control interface configurations via appropriate testing in real-life passive use. This is to be as a tool to design PFN/TRAC interface avionics for retrofitting and legacy aircraft and new design as well. It is a perfect example of the progressive aspects of the invention to uniquely employ existing technology and refine any design for future PFN/TRAC unit's ASICS and related accessories.

Regardless of this associated first commercialization the 1A PFN/TRAC aircraft unit will be prototyped at the earliest opportunity as the market is so diverse in airframes no work rendered in this area will go unused or be fruitless. So in summary the invention in every aspect has industrial applicability.

The (FACT) security program of in the PFN/TRAC System of controllers remotely controls specifically to counter the unauthorized or unsafe use of all equipment. Boeing and others, TRW have shown strong interest and a willingness to help the inventor and the companies commercializing this invention to include "TRAC Aviation Inc." get into the right programs and with the correct manufacturers to develop the terrestrial sections of the invention as well for the nations air transport system and airports. They also have strong interest and are willing to help develop the portable PFN tracking and telemetry network provided by the relay function of the PFN for short-range communications to longer-range communication links to maintain a mobile inventory for materials and baggage in transit. Other applications will be discussed latter.

FIG. 4 projects product development differences between first and second-generation PFN/TRAC systems. Whether there is a distinct product development difference between first and second-generation 1A PFN/TRAC units depends on application cost and aircraft variations. This figure discusses some of the attributes and goals that will progressively be accomplished for all aircraft, however the time frames are flexible to say the least. The distinction between different 1A PFN units in the different airframes will be quite drastic, ultimately; the system will be miniaturized into protected SOC technology.

Redundancy, trusted technology is another goal and these more perfect versions will be much cheaper as market volume increases and standards are defined and refined. Mass acceptance will evolve a more universal technology for the management of shared controls with people and equipment. This will reduce cost for the technology by economy of scale. Making more sophisticated controls available for less sophisticated and light aircraft.

Another planed development for the technology is to be forward and backward engineered. Generally speaking second generation systems will go from the early PFN systems that combine COTS dispersed systems and will move to more centralized protected PFN architecture where complete PFN/TRAC protected technology will be the base operating system and duplication and distributed components will be on for redundancy and reliability. However, standards and component designs will always be determined by the experts, the skilled artisans, and engineers within industry and government.

FIG. 5 is the initial 1A PFN flight and landing software library will be for 5 selected safe bases to include emergency response procedure, protocols and personnel. Specialists will be available to remotely control any incoming aircraft and handle any FACT flight emergency. Second generation software flight and landing libraries will be developed for all 429 commercial airports and more and more different types of aircraft to help skill deficient pilots at their controls fly safely and return to the surface in a safe and controlled manner. Additionally, the nation's 8000 private and general aviation airports will also have approach and landing programs developed as an ongoing process. There will exist the capacity in this second generation to wirelessly upload to a 1A PFN flight controller in real time software flight programs. The PFN/TRAC unit operated with the appropriate wireless chipsets and the system part of the FAA/AOC with commercial ATM programs can assist and robotically land the troubled flight. Where the pilots skills dose not match the flying challenge but the equipment exists on board to assist the pilot or do the job.

First generation flight and landing at the 5 safe bases will employ COTS software for commercial or military airliners with their existing automated flight, glide path assist and advanced landing systems. Additionally these Safe Bases will be equipped with the latest systems like Denver's automated decent and landing systems. Data links from these systems will be incorporated, along with existing automated flight simulator programming to mimic real-time flight conditions via conversion software algorithms that provide the RC pilot on the ground at the safe base realist simulation of the inbound FACT flight. This converted simulator responsive to real flight conditions at the 5 Safe Bases will be the initial RC pilot stations and part of the first generation FACT Flight protocols performed by the 1A aircraft PFNs. The 1A PFNs will permit the hand off for the RC pilot to take control from the autopilot for final landing. Second generation may be completely automated with robotics and have the capability to land itself. Regardless the RC stations will be refined and specially trained RC pilots will be staffed at these airbases as part of a regular air wing of the North American military AIR CINC Command/or NORAD. There also is to be airborne Remote Control for the incoming FACT flight. The airborne RC pilot sits in a specially outfitted fighter for RC operations. He is in direct contact with the troubled FACT flight that is responsive to his commands via the 1A PFN aircraft controller on board the troubled airliner. It is suggested that the airborne RC pilot be seated in the front seat Or have un impeded visibility) with a high visibility TFT display below his wind screen (sun shielded) with all data from the FACT flight instrument panel displayed. Additionally yoke/stick and rudder pedals. Ideally a fly by wire system that can be switched from the FACT aircraft to the pursuit aircraft in an emergency. Meanwhile, the other pilot in this pursuit/assist aircraft is flying the pursuit jet as his main job. Both pilots have the means to terminate the flight and protocols for any such decision need to be determined and put into place.

The decision to hand off the controls to the land based RC pilot is one that will also have to be determined by testing and specific circumstance and then made into procedures and protocols, that are both reflexive and thoughtful where they should be.

This branch of the nation's air defense will train for all sorts of aircraft and there will be special RC pilots that will be assigned to bases as squadrons. Some of which are RC air born pilots and others that are ground based RC pilots. Skill is the determining factor and cross aircraft training is a necessity. With the same vigilance as NORAD staffed and defended the Due line during the cold war—so should it maintain available support aircraft flight staff and first responder specialist at these five safe bases (and en route stations) to handle any airborne emergency, aircraft and circumstance. The Remote control Pilots and the 5 Safe Bases are part of this invention's proprietary FACT flight procedures to be made into national air defense policy and protocols. They are part of the PFN/TRAC system with FACT security for Air travel and transport management and security.

There will be more details as to the technical responses at the 5 safe bases in the figures to follow.

Figure 6:
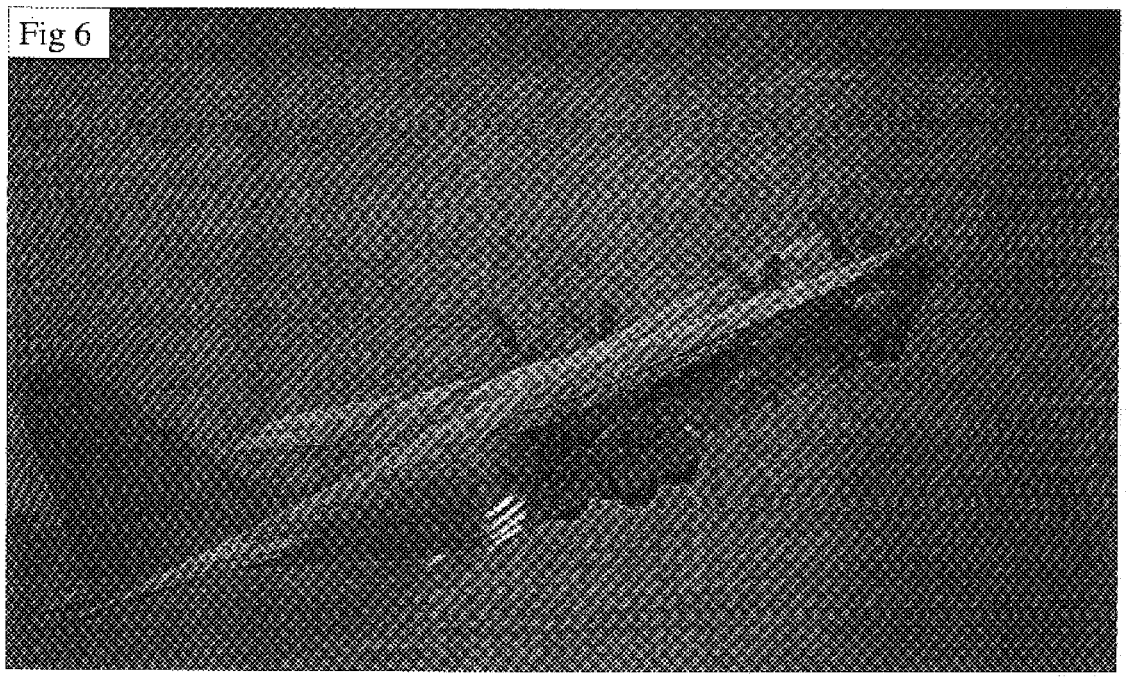
FIG. 6 An airborne emergency response team/swat team with medical/bio/chemical/explosive and fire, team members are to catch up with the airliner and follow the flight to the air base ready to parachute from their troop carrying aircraft if the aircraft has an earlier termination than the safe base.

FIG. 6 There also may need to be more than five safe bases to cover the nation. They should be placed so no flight in process is no more than 500 miles for a Safe Base landing or not more than an hour in the air after a FACT event has occurred on a flight—if possible). Even though when a FACT event occurs the aircraft via 1 APFN robotics climes or descends to a special unoccupied altitude and airway on a special controlled flight path with no on board control a possible hour flight is still incredibly long. For this reason along with the pursuit assist aircraft launched to the troubled flight an airborne emergency response team/swat team with medical/bio/chemical/explosive and fire team members are dispatched immediately when the FACT event occurs. This figure shows such a C type troop carrier military aircraft. It has assist rockets for a quick air born assent. Additionally all specialty gear would be stored on board the aircraft ready specifically for any number of responses and enough aircraft, personnel and equipment would be on stand by for immediate departure to meet any specific need. Possible the new osprey will have the bugs worked out of it and would provide the best service for these applications. The objective of these assist services are to catch up with the airliner and follow the flight to the safe base and be ready to parachute from their troop carrying aircraft if the aircraft has an earlier termination before the safe base. Additionally via the PFN/TRAC/FACT/TSA/NORAD system, first responders on the surface would be notified via the system and could coordinate efforts with the specialist parachuting into the scene including transporting any dispersed team members to the crash site.

The Safe Base Runway Tunnels

FIG. 7 illustrates the 2 basic technology sections; the Plane and the ground control system to perform PFN/TRAC robotics and the Remote Control via RC pilot in the center of the figure.

FIG. 7 Overview:

General

Like in FIG. 1, there are 2 basic sections to this drawing the Plane and the ground control system interfaced via the PFN/TRAC robotics unit which performs the FACT functions on board and with the Remote Control RC pilot in the center of this figure. In the lower front of the aircraft is a green lock box, the 1A PFN/TRAC unit. It is a protected interface node that cannot be compromised during flight and has the primary control over vital aircraft controls. (Any essential flight and landing component, programming and communications). This 1APFN controller and/or any redundant PFN/TRAC control/routers on board are the only command and control units in connection and responsive any ground control system during a FACT event. This includes ultimate control over all voice systems. PFN units can and will be duplicated and placed wherever appropriate throughout the aircraft. They will be secluded as well as protected and interface as necessary with the aircraft's electrical bus in any fashion determined suitable to command, control all essential flight systems and security functions on board; and to back up any of those component or systems to meet standards or as determined appropriate by component and system engineers. Additionally, connected to the 1A PFN/TRAC unit or harmonized network of PFNs is any and all of the various antennas on board any aircraft. PFNs scan a necessary amount of system to receive and count frequencies to determine any and all transmission on board an aircraft. Additionally, they control all wireless communications to include hand held carryon devices such as cellular phones, personal navigational devices, other personal PFNs, mobile office units, personal computers, PDAs or palm pilots. The immediate purpose for this is to be able to terminate the use of these devices during critical flight operations at the will of authorized flight deck personnel via the PFNs, and especially, during a FACT event robotically. Additionally, the authorized pilot and trained crewmembers to include sky marshals can utilize these systems as emergency wireless links to the surface during where they respond to wireless IP gateways and data storage receptacles in an emergency.

The dominant 1A aircraft PFN operating at a any given point will be deferred to as the master controller in a control matrix that coordinates all other PFNs on board the aircraft either physically or permanently integrated and/or any carried on PFN versions for a specific purpose and flight. This process will start during pilot ACARS before take off and be part of a running integrity program in all PFNs. All other PFNs and aircraft systems will be systems under control by the master 1A PFN controller. It becomes the communication router and activity controller and can use any all communication links to down load data to the surface, including special direct and indirect communication pathways that report to appropriate NENA numbers per geographic location for any specific first responders and the FAA/AOC/TSA/DOD/NORAD and any appropriate ATM commercial wireless gateway provider.

With the detection of compromised flight controls (a FACT event e.g. unauthorized aircraft activity) the 1A PFN sends an immediate Emergency Action Message EAM to AOC Air Command center in Herdon Va., NORAD/all North America military AIRCINC air defense centers and safe bases that the aircraft is departing from it's present course and has a new heading to the closest or most appropriate safe base via a preprogrammed FACT flight. At this point the pursuit and assist aircraft and personnel are scrambled and the appropriate level of Homeland security is increased to the appropriate level (Color code and how it applies to everyone for this event to be determined). Specifically, not just to all safe bases but throughout the FACT connected system servicing all of the nations transportation means and their security agencies. Operational and specific information will be processed through the system to provide the most relevant data for particular an emergency and heightened security level. General alerts from the FACT/TSA homeland command center regarding transportation security and safety will be issued in real-time or near real-time to allow for the appropriate formatting for optimum public safety responses. Other informative transportation management data will be passed to public media and websites via the inventions proprietary and protected technology, detailed in earlier related filings.

Specific

Figure 10:
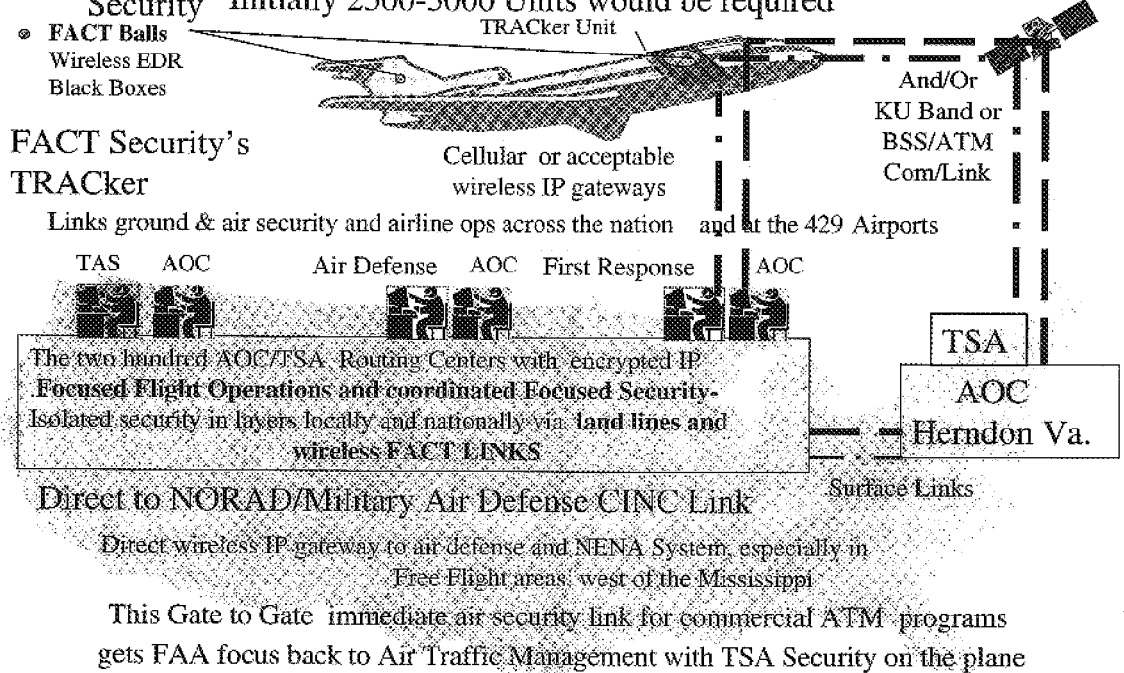

The FACT/TSA network needs to be put into parallel with the AOC centers nationwide as shown if FIG. 10 and NORAD and North American air command CINC and configured in progressive steps to achieve FACT control of all commercial and private aircraft. Additionally these FACT robotics flights have to be developed with military planners, aircraft manufacturers and security contractors to include isolated DES chipset in the 1A PFN controller to assure complete military supremacy of the FACT flight. The military are charged with homeland defense and they alone must have the sole capacity control and terminate a FACT event. All other agencies and authorities stand second to military control and the President's Executive Orders. Other essential agencies like CIA, FBI, NSA, NSC pentagon, CDC, TSA, FAA, and NTSB will be incorporated into the Homeland Security Matrix and connected via wireless and IP connections as indicated in this figure. Special government and security contractors have to develop for the procedures and protocols and code written for these specific agencies to have accountable access to this PFN/TRAC/FACT system and control matrix. All access must require agency specific and individual encoding with identification verification at each and every PFN or access terminal either wireless or hardwired to be recognized and gain access. All access will be audio, video and data monitored and recorded locally as well as, time and GPS or location stamped then sent and stored in regional and national FACT Security mass data repositories. (The special encrypted encoding to be developed and written with specific agency authorization must comply with any control procedures and specific protocols determined by DARPA and DOD software research and development operations like in Omaha and/or the appropriate military and security contractors)(TS to be considered in this process are proprietary to the PFN/TRAC System invention and specifically the FACT Security program to manage the nations airways and transportation assets safety and security).

Things to Do

Flight and landing program libraries for the Safe Bases SBs for the different airliners need to be written—Virtual RC pilots need to be trained for ground and the air pursuit aircraft. Five ground RC simulator stations with RC communication links need to be constructed at the five Safe Bases across the nation. The Five safe bases, the air routes/ airspace have to be determined, facilities and aircraft have to be determined, arranged, secured, out fitted/supplied, and manned with trained personnel for the first to respond to a troubled fact flight.

Understanding the Extent and Impact of the Innovation

For they are to be complete air space security all commercial, general and private aircraft have to have a 1A PFN/TRAC controller in place with the aircraft responsive to the FACT Security program. This requires; all aircraft manufacturers, airlines, government agencies hardware software avionics companies to work in a collaborative manner and a progressive one to standardize this effort and to meet the specific needs to construct the 1A PFN/TRAC architecture correct for everything that flies. As part of this progressive process and until it is accomplished on each and every aircraft, human security and support operational staff will have to be trained specific and employed to fulfill any deficiencies to enforce the FACT option to fly and land at the desired NORAD/TSA/FACT conversion safe bases. The bases will precede all the aircraft converted to 1A PFN controllers, including the hybrid systems utilizing existing COTS avionics. Initially Air Marshals, pilot and crew will be assisted by the educated citizen/passengers.

However, not all security will be manual and technically deficient. Part of the PFN/TRAC progressive architecture is to provide the appropriate steps to grow from, no remote and automated controls or passive remote control only to accountable aggressive robotics, shared HMI control and full remote control. From the invention, this is accomplished in a series of PFN/TRAC System products. These products first interface via one-way wireless reception of standard aircraft data transmissions to the surface. Additionally they interface non-flight related security telemetry Audio/Video/ GPS and assorted sensor functions, remote control monitoring and testing for future PFN remote control and robotics flight components and systems. These initial product ASICS are similar to the final PFN trusted remote activity controller/routers for each application (e.g. 1A aircraft PFN). At least as they are projected in the current patent writings and teachings.

Understanding the Progressive Embodiment of the Invention

The reader is ask to remember that all final designs are and must be flexible in this process to complete the nature and scope of the invention due to the enormity of this management and security system, which includes all the nation's aircraft, vehicles, machines and equipment not to mention all the personal and stand alone PFN applications as well.

This same progressive development is used for all PFNs in every application. The process starts by interfacing COTS electronics and computer products to determine the basic components and programs for any specific application. Then the TRAC ASIC controller is assigned by computing requirements. This to may be of COTS origin like PC 104 architecture Then further development and testing as router via an interfaced plug and play hybrid chipset platform of the desired transceivers, activity controls, sensors communication protocols software and firmware to construct a final PFN/TRAC unit as desired architecture is identified standardized and made more universal these ideal components and software and systems will be constructed and burned into a chip as SOC technology-miniaturized integrated and protected in a can or appropriate encasement to meet the PFN/TRAC System Standard as determined by industry and government experts.

All the way through this process commercial product like the 1 a TRACker (a brief case Laptop configuration) will be generated tested, accepted and used as a trusted controller/ router to perform accountable remote control, robotics and communication routing via protected and secure wireless and Internet protocols.

Getting FACT in the Air with TRACker for Seamless Security in Air Travel

Isolated form the air operation avionics the 1a carry on brief case TRACker unit can forego the long test period to be placed on an aircraft and provide critical flight data early to all related security personnel and systems. TRACker's noninvasive recovery of critical flight operations data and security monitoring technology processed with GPS location and time data helps immensely to plan and coordinate a security response that is relevant to the threat. 1a TRACker organizes translate, records locally, reports and relays data to the surface. This data is mined locally by the crew and air marshal on board with out having to converse with the flight deck or crew, Displayed on a personal DSRC PDA or special 1 P PFN display unit)

Two Products for PFN/TRAC Unit Development in Aircraft

TRACker is to coordinate security efforts gate to gate in the skies with surface security/TSA and NORAD early on to develop the FACT monitoring system with present available security measures and grow the PFN/TRAC architecture. Another such versatile PFN/TRAC proprietary research and development product is the "FACT BALL" which basically gathers data and provides post analytical evaluating data in a protected storage vessel (an enhanced black box that can be set up to monitor anything without a lot of hard wiring— It also can perform as a driver interface platform to test equipment, monitor, recorder driver other devices (data gathering devices and actuators). However, this unique enclosure structure can be used to house a complete 1 S PFN/TRAC unit (a Standalone version of the 1P Personal PFN—these two types of PFNs are distinguished by requiring self contained power sources to operate them). Both the TRACker and the FACT Ball are precursors to the 1A PFN and they are further detailed in FIGS. 10,11,12,13,14, and 15.

Further discussion of FIG. 7 teachings disclose the planned development of the 1A PFN/TRAC router unit The drawing above shows the aircraft with a more a detailed description than FIG. 1 a line on the bottom of the aircraft culminating in the exemplary 1A PFN lock box, but running to all the flight control surfaces is the aircraft control and data bus system. These are redundant and dispersed bus networks in many cases and as a result would all require interfacing (SUC) to the PFN control system on board. Additionally, another wider line running through the center of the aircraft and culminating in the 1A PFN is an antenna to communicate with dedicated short range communication systems or DSRC technologies like Blue tooth, RFID, 802.2 and many of the 5 GHZ wave links being approved for short range broad band applications by the FCC (e.g. 5.7 GHZ short range communication approved for DOT applications and interactive highway applications) However, this antenna is conceptual and any and all of the forty separate antenna on a normal passenger aircraft may well be interfaced with the conceptual 1A PFN unit (singular as in this figure for clarity—but also in number of 1A PFNs for any specific aircraft to complete a PFN FACT matrix and perform any and all of the communication control applications detailed in this specification).

All wireless devices carried onboard the aircraft and integrated in the aircraft are to be controllable via the 1A PFN on board controller/router on board the aircraft. Close circuit video as well as audio and all sorts of security sensor arrays are to be processed via the 1A PFN and relayed to surface security and air operations with time, GPS and Unit and aircraft identification. GPS receivers are generally part of any PFN architecture and this technology as well as other intelligent positioning technologies will be interfaced and used to confirm aircraft positions and flight path as one determining factor to detect unauthorized flight and will result in a programming flag triggering a FACT event and FACT robotics flight response in the 1A aircraft PFN.

The middle of the figure names the interfaced systems that will be detailed more extensively through out this specification and figures. However, from the middle of the drawing over to the right is the FACT Safe Base Remote Control Station receiving telemetry from the troubled FACT event aircraft, the five preprogrammed FACT robotics flights and the escort assist aircraft, that are all activated simultaneously in a FACT event. The exact activation and scrambling of aircraft is to be determined for most proficient use of equipment and personnel for each emergency and these procedures are to be made into protocols taught and programmed into the system where relevant. The ultimate objective is the highest public safety and national security and the least collateral damage for any and all decisions.

Commercial Operation Applicability Risk Management and Insurance for FACT Events These are tough decisions at best and if proper procedures are followed responsibly; there should be no personal liabilities, even if a better methodology is determined post any event) (any and all persons genuinely performing in these FACT event procedures should be interified and deserve all the respect the nation can give them. Whether life or limb is at risk they will be emotionally affected more than most in a lifetime by even single event. The system and its manufactures likewise should be indemnified if their development and construction has been properly performed. Insurance and risk management plans should be developed and incorporated by government and the private insurance companies. The PFN/TRAC/FACT system of accountable reporting should provide all commercial bidders fair but guarded access to essential data in their effort to bid for these granted policies. However, they must have secret clearance facilities, personnel and policies in place to protect any sensitive information during their evaluations even if they are not privy to the most sensitive FACT program information.

FIG. 7 The lower half of the figure is the matrix of security computer systems and mass DATA handling and storage. That is made up from the PFN/TRAC system of PFN controller/routers and existing mass data systems. Together, this will make up FACT security program and a real-time real-life matrix for homeland defense and security. It will involve the TSA, NSA, secret service, CIA, CDC, FBI, DOD, and local first responder, just to mention a few.

Figure 22:
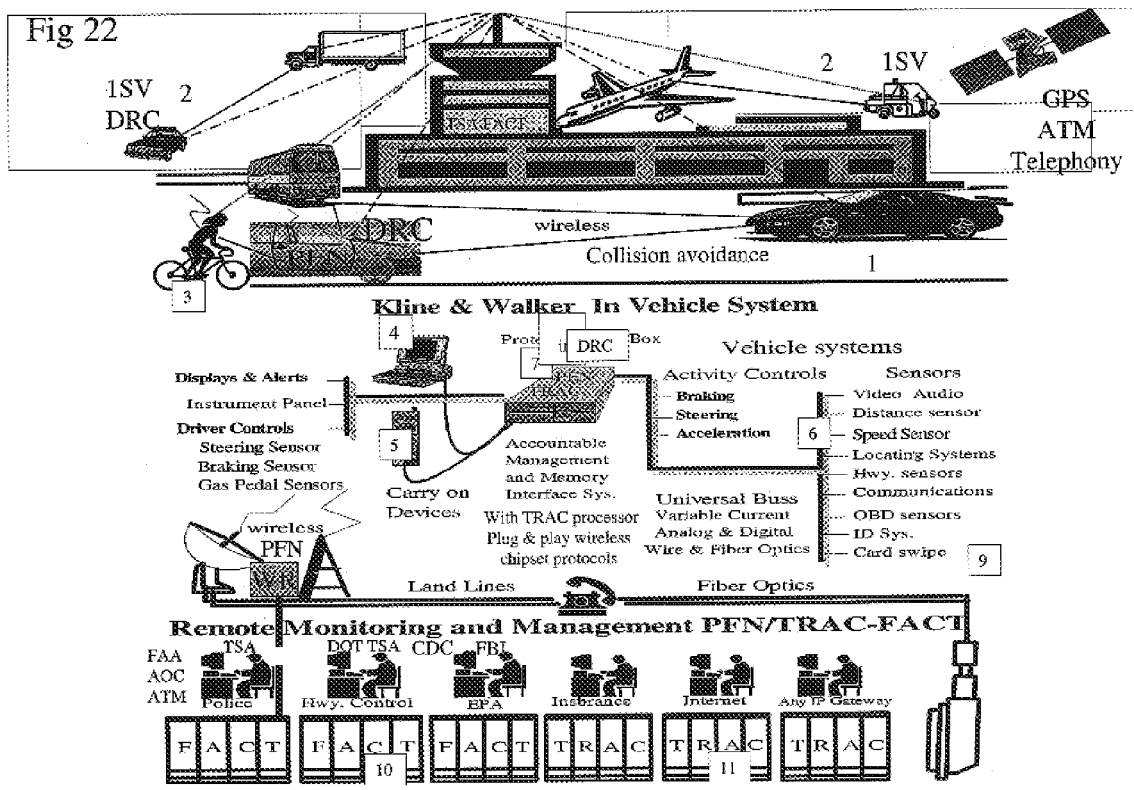
FIG. 22 shows two basic free wheeling terrestrial platforms.

More of the PFN network and FACT security system is illustrated in a transportation matrix overview in FIG. 22 for the entire DOT network. It can and will involve all or only government agencies and/or commercial industry via specific connections in real-time; and/or the public with limited access and/or total access to specific areas, and/or, no access to specific areas; to be determined and processing determined for real-time and/or near real-time reporting. But one endemic fact is that any and all access is to be totally identifiable, traceable and accountable, to include the nature of the access and use and content including quantity of data affected. (All protocols even top secret must be determined and deal with this absolute accountability process for access and use of the PFN/TRAC System and FACT Security Program (no exceptions and redundantly protected). This is what makes it a TRUSTED architecture to gain the Public's Acceptance; and it is a crucial embodiment of the invention's nature and scope.

In the bottom center of the figure surrounded by the PFN/TRA/FACT IP matrix is the globe showing five safe bases across the continental United States a CDC with a nurse and soldier in the center. This represents the five specific air bases converted to Safe bases, (these protected campuses should be 20–30,000 acres of protected space at least with the highest state of the art technical and personal security and defense possible. Additionally, all types of emergency responders should be staffed and ready to respond for any FACT flight event. Much thought as to the placement and construction of these safe bases have been done and will be held as trade secrets (TS) at this point for National security reasons. It is important to keep in mind that enough of the FACT flight program has been explained for those skilled in the arts both in government and the private sector to construct a secret program like FACT and also to claim this practice and any derived procedures and protocols proprietary to the PFN/TRAC system and this FACT security invention regarding air travel and transport for public safety and national security.

Acronyms Repeated that Relate to FIG. 7 and FIG. 1 for Convenience

The following are basic terms and definitions used for this invention: The PFN is a Protected Primary Focal Node (an accountable controller/routing wireless interfaced unit. The PFN contains TRAC a Trusted Remote Activity Controller to perform accountable & reliable robotics and remote control. FACT stands for Federal Access and Control Technology. RC=Remote Control, WoJack=Wo War ops and Jack is taken from hi jacking.

TRUSTED for this invention means; reliable, accountable, and acceptable to all the public. (The citizens, government, and commerce all the public).

Points of Implementation

Of particular value right now, TRAC technology can be embedded into aircraft (at the design stage the 1A aircraft PFN architecture should be developed immediately so it can perform accountable functions for the purpose of gaining control and stopping the unauthorized or unsafe use of our newest aircraft. 1A PFN development for retrofitting should be initiated immediately as well for present and legacy avionics and aircraft. The 1a TRACker with the laptop or PDA processing in a brief case carryon unit should be developed immediately and this inventor has discussed this option with Boeing already. Ideally beta testing can be done in one of their test aircraft or FAA's test aircraft.

The 1A PFN Aircraft Control Challenge

In a hijacking the lack of flying skill is not the only concern. The aircraft might well be commandeered and deliberately used and guided for it's destructive potential (e.g. a human guided missile like the WTC and pentagon events). In this scenario it is necessary to restrict the local flying controls immediately.

Major Types of Controls

In the above scenario, conversion of fly by wire controls to exclude a local control on board the aircraft can be achieved far faster than those aircraft still using physical links. Total hydraulic systems and hydraulic assist systems can be converted to exclude local controls easer than physical link systems, but still more difficult than fly by wire systems. Physical lockouts on human controls and remote control automations are workshop tasks for those skilled in the art; and there is no minimization of the size and enormity of this task being inferred. However, engineers/technicians can construct a secure RC operated or robotics aircraft from existing aircraft and aircraft avionics via the specification and their knowledge base. Aircraft automation and computer controls are quite advanced today. One big jump is psychological to TRUST an automated system with the well-respected job of pilot.

However, it might prove easier to protect, make operate consistently and secure a small electrical control package in comparison to all insuring performance variables with humans and protecting the cockpit and flight controls. (Let it be well understood—there is no suggestion of a pilot-less aircraft and the inventor would not fly on one) This is an issue of pilot assist and options.

The 1A PFN TRAC aircraft package will be backed by a massive mindful machine-messaging matrix of coordinated human and artificial intelligence to help the pilot deal with any of today's emergencies. Pilots will be carrying guns to protect their position behind the yoke. These highly skilled aircraft operators are not stagecoach teamsters rocking across dusty trails at 15 to twenty miles an hour tops for a few short minutes trying to lean back and shoot at hostiles trying to hold up the coach. Pilots are flying sophisticated machines traveling at 400 knots 30,000 feet above the earth's surface.

These scenarios while quite possible today would still take eight years to get them on board functional in a commercial air craft with the current government and industry approval rate. However, their development today is essential and necessary. The TRACker has been created as a first step in this process as it does not interfere with the flight controls or interface with the aircraft. It is essential however to complete the remote control scenario for the complete invention and protocols to be understood and the objectives and goals to be appreciated The initial goal after eliminating local control is to stabilize the planes flight path. This second objective is accomplished via local robotics for better real-time responsiveness in flying the plane a distance to a predetermined Safe Base. The TRAC processor will have five preprogrammed flight plans. TRAC is interfaced with the essential E/E bus to operate the planes flight control surfaces. Additional controls interfaced with PFN/TRAC are to be the cabin air pressure controller. TRAC can restrict any air exhausted from the cabin by either routing the air through carbon dioxide scrubbers/converters. TRAC will also add fresh air (O2-?). Removed cabin air will be compressed and canned. This un-recyclable air or waste air is then presented to a sensor array to detect biohazards and toxins. Once transducers have converted any molecular substance into an electrical signature, the signal is transmitted to TRAC. TRAC running recognition software will analyze it locally. If not identified by the local software library it is recorded and reported to the surface by any secure on board TRAC interfaced communication if the deed frequencies are compromised. The data is to be used locally for emergency in flight options and on the surface for the Safe Base system to prescribe the appropriate safe base response for the incoming troubled aircraft. Informed decisions will be made to terminate flight, bag it when it is down, sterilize it, or how to unseal it on the ground and deal with it). Also, connected to the aircrafts ventilation system will be a TRAC controlled valve with debilitating gas (sleep gas or chloroform, etc.?) that can be activated from the ground or robotically for what is termed a Woo Jack scenario or FACT protocol.

During the final approach to the designated safe base landing zone the robotics flight and glide path control gets a hand off to a Remote Control RC pilot in a surfaced based converted flight simulator receiving secure and redundant essential data streams via a protected multiple digital control channels for the greatest real-time responsiveness of aircraft. Additional control is added by a software algorithm (fuzzy logic) for a heightened and more accurate glide path; a TRAC guarding angle function. The result is an intelligent airplane with an accountable autopilot and RC pilot performing an uneventful landing with sleeping occupants. Worse case scenarios being the bad guys have their own air supply. However, their hostages will be dead weight and un-reactive to their commands terror tactics, which in some circumstances could lower collateral damage due to passenger's erratic movement when the plane is boarded by swat teams. TRAC can always change the atmosphere and revive the passengers if this proves more beneficial to a security protocol.

Abhorrent RC and Robotics Options

The 1A PFN/TRAC unit will have the ability to dump any fuel from a remote location or via preprogrammed robotics and/or accountable remote control. There may be good reason to dump the fuel or release a treating agent into the fuel supply that reduces the flammable characteristics of the fuel supply. Obviously, the 1A PFN could perform many undesirable functions including the ultimate destruction of the aircraft via remote control if this was determined the best public safety alternative. A proper decision tree has to be determined for these difficult RC choices like the Wo Jack scenarios before emergency FACT software protocols can be programmed, code written and in stalled in a function 1A PFN controller/router unit. PFN/TRAC was created to improve human life and public safety in transportation.

Software Challenges

Obviously, the programming cannot and will not ever be the same throughout the PFN/TRAC system handling this FACT Security program. However the PFNs will operate on a PC platform as much as possible with windows applications for most all human interfacing components (Displays, etc.). Individual PFNs will be tested and certified when placed into service, as accessories and new programs are added and from time to time to insure they comply to a minimum processing speed and have their safeguards in place to prevent over taxing the unit's capacity to be responsive and reliable in running programs and driving essential activity controls for safe robotics and remote control. Integrity checks and continual anti virus programs will be done and down loaded from the FACT Mass data centers service and maintenance divisions as well. The unit will be isolated for service from the system and the owner notified. With each unit recording its activities locally these isolated units can be accessed and contacted by isolated wireless remotely and quarried in real-time by the FACT cyber police computer to immediately detect tampering or hacking event and any virus recognized and introduced to the unit. The physical unit will be picked up and replaced along with the access ID perpetrator or at least the ID imposter scheme will be discovered.

Governing Law on Tampering

As detailed in earlier related filings the protected PFN/TRAC unit should have especially stringent laws and severe punishment applied to anyone caught deliberately tampering with a PFN unit. This is an accountable shared control technology with humans to perform machine activities as a whole system and deliberate and malicious destruction or damage to a PFN causes great risk to the public in general.

It is a great assist technology for humanity and humanity deserves this kind of protection from anyone seeking to do this kind of harm to the populous via tampering with PFNs.

Software Cont.

All other languages and protocols will have translation algorithms developed and either have burnt in firmware in plug and play chipsets to complete interfacing or have installable software and drivers for the desired accessory or device connected to include the various wireless protocols. Most all the major wireless manufacturers offer the experimenter products to construct programming for prototype projects and this will be the modality used in many cases to coordinate a translation processing done by the specific PFNs between the present wireless protocols and machine messaging. Some has already been done and some is done in PC format and wireless protocols, (automotive can bus systems j1939.j1850 and the latest automotive bus—the 429–737 air bus maintenance program for avionics, etc but There will be the need for real collaboration to achieve the universal translation throughout the PFN/TRAC system for the FACT program to really function well.

Figure 8:
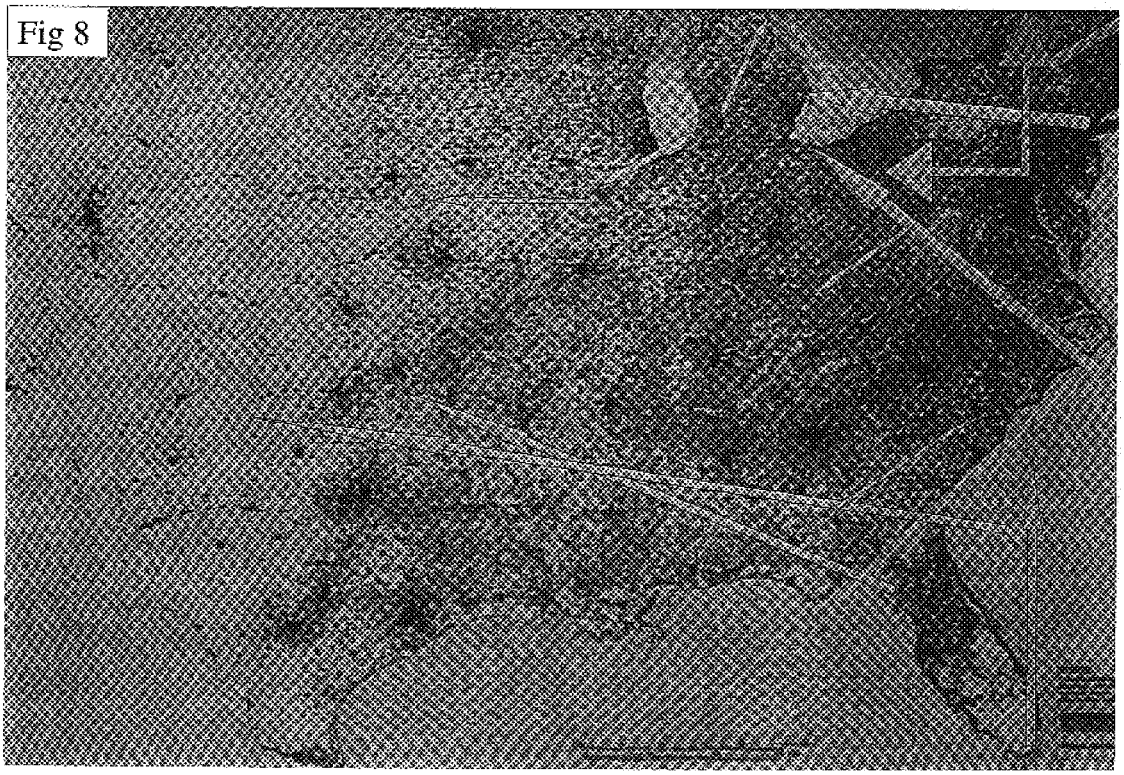
FIG. 8 This map shows the eastern half of the United States Ambient population.

FIG. 8 This map shows the eastern half of the United States ambient population. It is easy to see how densely populated the country is east of the Mississippi. The arrows show some possible FACT flight lanes across the US where the least amount of the citizens would be affected. There are no good choices for bad outcomes, but limiting the extent of a bad outcome begins is all of our responsibility starting with these visions and inventing and continuing with good planning, construction, training, implementation, performance, evaluating the results, refining the products and process and reinventing if need be.

This is one inventor, who is proud to be a US citizen first and foremost and realizes this invention requires all of us at our best for each other to come into being. We can and we will achieve this technology together. We will also use it wisely, fairly and justly for all; in that great tradition of freedom and democracy that the United States stands for.

Operational Flight Policy

The eastern area is still navigated by flying to hubs and as stated earlier west of the Mississippi is flown by GPS. With the ATM providers becoming more proficient in aircraft positioning and data transfer via 2 GHZ broad band data pipes) tracking and telemetry for a 1A PFN controller router will be more and more doable. Flights will be easer to track and movement easier to manage with less fuel needed via direct free flight flying, rather than hub flying. This will help to quickly ascertain a corrupted flight and control it to safe FACT flight lanes. The ones shown in this map are only concepts. Population concentrations are only but one consideration to planning safe base flight paths. There are prevailing winds and real-time weather and environmental conditions to consider for specific emergencies (e.g. airborne bio and chemical toxins, etc) However west of the Mississippi has much more space to accommodate the size of a SB landing facility a fact that cannot be overlooked. Another point is when military installations are considered, they off times boarder National forest already government land and this should be considered in choosing a desirable base for the availability of other government owned land that can be combined to provide the appropriate space and area needed.

There is more that could be detailed in this figure as to SB location options, structure and certain design characteristics but these details are being retained as (TS) for the appropriate authorities and the appropriate time as they may prove useful to the nation. This innovative FACT Security program for the PFN/TRAC machine management technology in air travel and transportation should be completely understandable to the skilled artisans who will have to complete their respective secret and top secret tasks and to substantiate this specification and teachings of the innovation.

Figure 9:
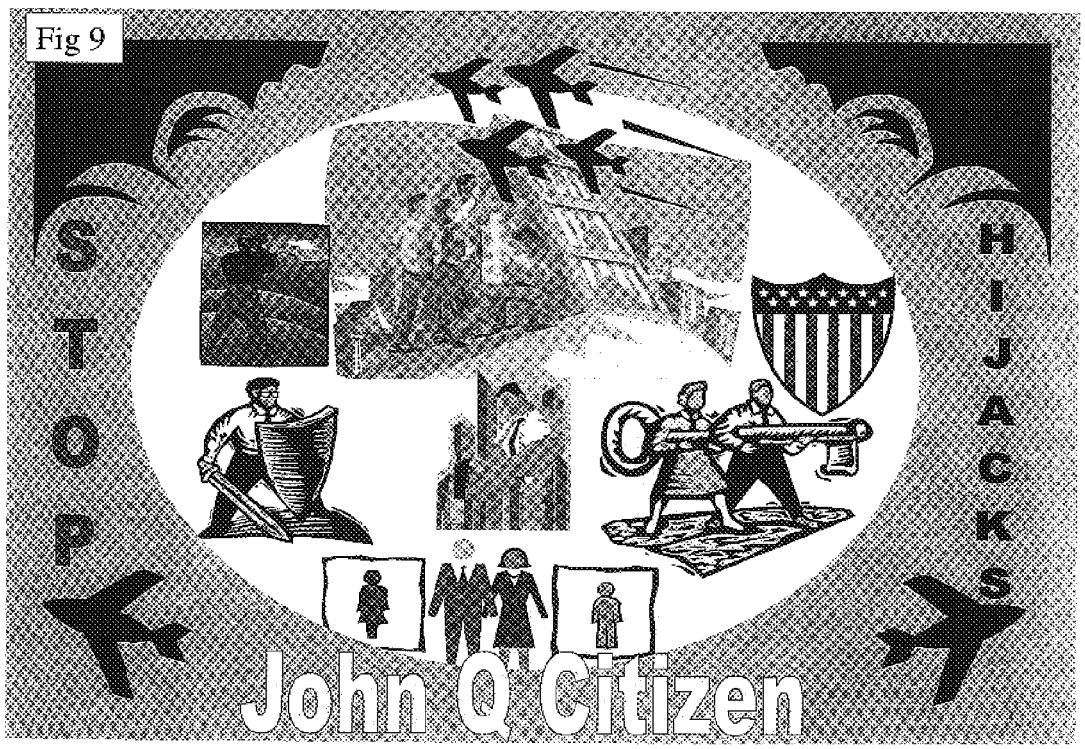
FIG. 9 expresses the need for public awareness to the threat the nation faces from terrorism FIG. 10 displays the first aircraft router/test PFN/TRAC interface platform "The TRACker".

FIG. 9 FIG. 9 is a slide done for a promotional Power Point presentation introducing the PFN/TRAC system with FACT Security to the different government agencies after 911. It was made part of this filing because the technology is all about public involvement not just for security but for the management of machines, vehicles and their movement, use and impact and how this all effects society and the environment. The most important part of good management is a safer more secure and better quality of life for all. That comes from knowing how to properly operate technology and operate around technology and the responsibility for vigilant citizenry to insure we all respect the proper use of our technology. This slide points to the citizen's responsibility to each other to protect our freedoms by working together.

It also is a call to the individual to rally and put the pre PFN/TRAC/FACT procedures and protocols to fill the gaps in protected flights until the first generation of the 1A PFN FACT unit is in place. Much of the early security will require vigilant observation and a willingness to get involved and stop terrorist in any manner necessary as systems are being developed. One such citizen step might involve the aggressive physical thwarting of a hijacking and assault on the cockpit. (And already has taken place).

Information bulletins should instruct the passengers how to take an aggressive option with fellow passengers and trained personnel on board. They should be educated before flying and warned of the risks of action and inaction in hijackings. Additionally, citizens should be educated to observe radical groups and report any such questionable behavior to the proper authorities. In flight they should be ready to be enlisted by the any air marshal or trained flight crewmember and work in conjunction with the data and service the 1a TRACker unit can provide to gain control and maintain a stable passenger cabin and secured cockpit to land the troubled aircraft at an appropriate FACT (SB).

Update

It is just one year from 911 and much of the public and personal security measures are being implemented, however the flying public has not returned to the skies and those that have are traveling are being plagued by very slow terminal process to clear airport security and enter the aircraft. Sensing and explosives detection technology is being developed slowly and government TSA personnel are also being trained very slow. Only ⅓ of TSA is staffed as of the writing of this formal filing and baggage handling and security sensing is uncoordinated at best in the terminal and not capable of tracking the luggage with the passenger to the aircraft and through the next airport. All 429 airports are not working with the same equipment, so they cannot interface data through any one system for good operational flow and security.

Answer

The PFN TRAC System with FACT security can link these disparate systems and personnel can be trained in a uniform manner for one architecture that can universalize data management for disparate technology to organize the movement of machines, materials and people. This can be done for local terminals and for a national security system. Additionally the public and be informed and educated to how the system works and is working in real time as well as what is expected from the every step through their travel experience. Then they to can help the air travel system operate smoothly and safely. This will relieve a lot of public frustration, build their trust and improve the financial state of the commercial air travel/air transport carriers and aircraft manufacturer.

FIG. 10 The No. 10 FIG. displays the first aircraft router/test PFN/TRAC interface platform "The TRACker". The TRACKer Units are in the form of a carry on mobile office or brief case and operate completely independent of the aircraft to provide flight telemetry and more. The Laptop also has GPS, audio and video devices and wireless modems interfaced with the appropriate drivers and programming protocols installed. The Laptop is running a routing program to process data recovered from the various aircraft data inputs/security telemetry, which intern is combined and processed into data packets and protocol chosen to transmit this data by wireless to the closest dedicated surface gateway serving the TSA computer network. This is the 1a Tracker receiver router proto-typer development/service package. It is to be a functional unit as a prototype tester to perform basic security telemetry, and a functional parallel security link with in a year in 2500–3000 commercial aircraft as shown in FIG. 10. This unit will determine what flight data is critical from each aircraft and transmit it to the surface security as well as, provide a direct link from the surface security-to-security flight staff or air marshal. The flight deck can also be provided this data or it can be with held (procedure and protocols to be determined per optimum FACT event policy).

The second in this series of TRACker units is the 1b TRACker. As exact data streams are determined the interface, receiver chips and protocol chips will be supported on a PC 104 plug and play accessory interface board. Additionally PC 104 mini computer architecture will be employed to maintain the PC processor platform and windows programming for HMI applications. This software programming is becoming more and more prevalent in operating COTS sensors, actuators and devices with COTS customized PC programming available for most every application. Additionally, manufacturers are choosing this to convert their OEM programming for maintenance analyzers and windows for human machine interfacing (to drive displays). This is the ideal universal platform to convert to as early in the data mining process and therefore chosen for the local PFN processors. Finally, it is best suited for systems compatibility to enter the matrix of computer networks and Internet protocols worldwide. (As a general rule to improve reliability for the PC platforms and MS window products—this architecture will be tested for minimums of extra computing capacity to maintain proficient speeds with the highest of frequencies. Isolated programming for functions will be redundant, confirmable with memory surplus and corruption and tamper detection programming to insure reliability and accountability. Additionally, rough service and EMF protection will be built in to maintain reliability and accountability in each PFN and through out the PFN/TRAC system and FACT security matrix. The 1b TRACker units will be based and interfaced according to the ASIC design in FIG. 15. There will be 1C TRACkers as solid state proprietary constructions with IC and surface mount architecture prior to this ASIC as a SOC constructions and these developments will be used evolve the PFN/TRAC technology in all facets of avionics progressively. This step method of development is to accommodate forward and backward engineered for interfacing and flexible for the diverse design in the aircraft industry. During this process into smaller encasements like a PDA these 1CTRACker units will be placed in structures like the FACT ball discussed in the next few figures for test scenarios of interfaced products. These smaller more personal applications or hand carried devices will also be easier for the air marshals to carry and conceal with them on the aircraft and have complete wireless information form the aircraft and ground operation with no passengers being wise to their activities. These units are 1P PFN units and well documented in earlier related filings and applications. In this application one is seen in a ground application in FIG. 37 (lower right) being held by a TSA officer at the airport checking baggage identity information and sensed data recovered through the FACT Security program operating in the PFN/TRAC sensing system in the terminal.

By definition "The 1a TRACker" for aviation is a commercial off the shelf Laptop PC platform secured in a carrying case with several wireless interfaces to route data through the laptop to surface security. This FACT product is planned to be first in commercial flight to accomplish three goals. To create an isolated communications link to surface operations for mission critical data and security specific data to create a seamless security link with airport flow operations, surface law enforcement with gate to gate security in the skies to continue to monitor people, equipment and material, movement. The second objective is to introduce a redundant communication technology that can accountably perform control functions from a protected secure architecture to assist authorized flight of an aircraft. Thirdly perform testing and monitoring needed appropriately to introduce future designs of accountable robotics and remote control technology in aviation. Every product is a method to the next progression of machine assist and automated flight and a way to test and gain acceptance for the PFN/TRAC systems as a tried and true trusted technology. One to be standardized in time and for a time and for specific aircraft and applications in a progressive development process to enhance human machine interfacing.

In this application a noninvasive relay function is performed by having the same multiple band wireless receiving capacity as the Aircraft and Aeronautical Operations Centers AOC on the surface via an inter changeable hybrid substrate chip set for the specific aircraft (respective of the various ATM global communication systems commercially available today (BSS, ARINC, EURCOM etc). The aircrafts signals are received and processed locally via the PFN programmable processor, that is additionally interfaced with a second wireless technology acceptable for cross environment use in aviation. (Possibly commercial Cellular, and/or Satellite phone, or other RF technology VHF, GPS, etc.). The signal is then re transmitted to wireless gateways en route located on the surface that connect with the FAA FACT security intranet and terminals via wires data packets and IP protocols. These signals and data are reconstituted to provide geographic position on calibrated maps of the aircraft and the location of person or materials or substances in the aircraft during flight as well as, serve as redundant aeronautical operational data link to provide flight telemetry. One immediate benefit of TRACker is that it provides a marriage of security data and tactical mission data for the flight without interfering with normal approved flight communications, data links and operations for safer more secure focused flying. The system design is to support audio and video with the appropriate, bandwidth, physical properties, drivers and programming as well as support various detection transducers and sensor arrays.

TRACker's Operational Characteristics for Considerations

- Controlled by identifiable authorized Flight Crew members to include TSA air marshals will operate from a protected but accessible area by authorized personnel
- Consists of approved wireless interfaces for use in air aviation (COTS).
- The Unit is not physically interfaced to aircraft's electrical system.
- Self Powered and Emergency backup power.
- Event Data Recorder in an integrated via Memory Ball innovation (enhanced black box technology).
- Controlled by authorized airborne and surface security (Flight crew).
- It has a Plug in chip set interfacing technologies capacity (for analog digital protocols via (Hybrid substrates and COTS products).
- Has an individual ESN and ID capacity that recognizes Aircraft call sign and ESN and reports back both to FACT surface security.
- Performs FACT auto integrity checks of interfaced electronics and reports status to FACT registry to include new interfacing with component ID.
- All component changes sent back to TSA-FACT AOC FAA NTSB FBI via Herndon Va. Mass data Center for handling and storage.
- It compares Unit configuration to data stored in the unit inventory memory.
- Local or regional data handling, storage and buffers are possible for local first responders in real-time use).

As illustrated in FIG. 10, the ATM/AOC operations across the nation are matched up with TSA/NORAD and first responders. TSA and NORAD can monitor what is going on in the aircraft via separate communications to develop public safety and national security scenarios for a troubled flight while AOC, pilots and air traffic controllers focus on the flight of the aircraft.

This isolated data source can help authorities filter what the public needs to hear about a troubled flight and what should remain FACT event proprietary information at any given time, while flight operations stays focused on the flight performance and all other aircraft. The PFN/TRAC system from the earliest related filings has supported a proprietary data reporting and information service to public media and web pages for an integrated intelligent transportation management system. This can be real-time or near real-time data displayed to aid in public movement, safety and national security. System costs will be defrayed by accompanying advertisement for this service with a priority alert and processing for viewing special alerts or Public-Emergency Action Messages PEAM. Additionally, via commercially supported public media messages, the wireless technologies like GTE Airfone providing an encrypted download service can have their operational cost defrayed thereby providing lower cost or even complementary cellular phone use to passengers reducing the temptation or need to use personal wireless products, which are prohibited in flight and disruptive surface communication.

The hybrid chip set modality in the TRACker receiver portion is the same as the aircrafts standard radio frequency avionics to the surface. TRACker receives the transmissions locally processes data and voice to the appropriate message format and re broadcasts them for security purposes along with other isolated security data, to include GPS sensing other sensor arrays e.g. explosion detection sensors, audio and video, etc. The transmissions are clocked with mission critical Aeronautical Operations and Air Traffic data transmissions for as close as possible synchronization on the ground for real-time decision making for a compromised flight. On the surface trajectory and purpose can be quickly surmised to reduce collateral damage on the surface and best support safety and security activities a loft. The data received is filtered to the public for Websites to include airlines, and general public sites. First hand high-level data (could be delayed during an event for security and discriminately provided airline executives, manufacturers, and secondary component suppliers and government agencies. These emergency applications can make security links to surface NENA Numbers like the 911 system (but special numbers) via the TRACker dial up program and GPS factoring for local first responder notification tracking and telemetry.

The chip sets in the local TRACker unit may or may not have the protocols and codecs to decipher and present the data in the local unit (to be determined by application). This is possible but needs to be determined by airline procedures and protocols and if it is a tester unit or performing security functions. They may just merely receive packet data and rebroadcast it via the wireless interfaced to gateways and landlines, cable, microwave or satellite with Internet protocols to any monitoring computer center. (Application e.g. surface service stations) The how and when data is processed and reconstituted is to be determined by the those responsible for framing the issues and those responsible for signing security procedures and protocols into law for a flexible color code to rate the nations security state. The TRACker can be programmed to do this if this is deemed desirable and it can be flexible in this capacity by operating with in desired realms via security clearance.

There are a number of different ATM data communication systems and the security link has to be universal to provide consumers a free choice of products and providers. On the ground wireless gateways form all the diverse ATM communication systems and can transmit their individual flight data to the appropriate AOC tracking station as they cross the nation and nationally via IP protocols as depicted in FIG. 10. In time and with testing ATM communication links will be used to carry needed security data as well, but they are not approved to do this function outside AOC flight operations, (the air operation centers network). There are also proprietary commercial hurdles including some airline policies involved. The FACT/TSA/NORAD/FIRST RESPODERS and FACT AIRPORT SECURITY System need to be an isolated security matrix unto itself and away from Flight operations in the cockpit and from Air Traffic Management and operational centers on the surface. They all need to be close and coordinated, but both jobs require specific and dedicated skills and focus in a FACT event (hijacking etc.) The separate communication links can serve as another redundancy for both operations as well. The 1a TRACker is a way for on board air security to stay linked with the ground security matrix and not be a bother to standard air operations. Proper human interface procedures first between security and flight staff and then technical joining of these systems and personnel can come via appropriate testing protocol development and programming.

Critical Questions that Justify PFN/TRAC Management System and FACT Security

Air Travel proficiency—where is it after 911?

What is missing in commercial air travel today?

Answer

"Organized and efficient security" and "A plan to achieve it."

Critical Awareness

The question is not what security is needed—everyone knows or has an idea—that is for sure.

The real question is: How do we use all these ideas proficiently together?

Answer

The progressive PFN/TRAC System with FACT Security

The Qualities, Properties and Mode of Progression

It fills the voids and does not interrupt well designed in place management in the process.

It's implementation parallels technical architecture in place.

It augments and enhances what is there and working.

In Air Travel and Transport

It will match each technical step in air traffic management with a separate security component It will monitor not hinder present operations first It then processes data for analysis It improves equipment integration Equipment controls Material recognition Material movement Human coordination Identification Activities All the time TRACker helps maintain a productive efficient secure air traffic management across the nation.

This same process is continuous for airport management and flow where PFN/TRAC terrestrial products with FACT security programming and functions are married to the same database and computer network that the 1a TRACker is. Both air and terrestrial movement data is coordinated to manage secure movement on and near the earth's surface.

This filing will detail technical modalities, point out and describe the options and discuss the impact issues. For this reason there cannot be final design as exact function must be determined by the public and formal review, however, the technology has to be an agreed upon standard in aviation as part of the nature and scope of the invention. The technology is forgiving in that it can be reprogrammed rapidly. But solely by authorized personnel to change procedures or preprogram protocols if the proper authority the public determines this to be proper and necessary. This should include the capacity to deactivate any component, unit or portion of the system determined unacceptable. Continuously, explained is the component and specific instruction for those skilled in the art to understand and construct the PFN structures and PFN/TRAC System™ to support the FACT Security. A separate program, but parallel with FAA AOC Aeronautical Operations Centers and the different Air Traffic Management ATM systems. Interfaced with the rest of the surface transportation system in a Department Of Transportation DOT Matrix is national and local law enforcement for Homeland Security. This DOT Network is detailed in earlier related filings and displays the interagency connections (IP) that are made accountable, but does not compromise individual agency sovereignty/security and in fact adds to their existing fire wall protection secure interagency connectivity.

The PFN/TRAC System has always been a complete wireless machine-messaging network for movement management and security invented to set standards and be constructed by and with standards. As the nation implements the technology, FACT is well detailed in prior related patent applications and will be further described in this application to meet the nation's needs to implement this technology to improve equipment management and security. The result will be one integrated system with plenty of parallel, and redundant backups. Included are more secure communications with real action plans that are both informative and robust with remote control and robotics. They will give the new national threat color code system real protective power. Via, proactive homeland security operating in concert with the citizen and having all of the United States technical power governmental, public and private organized and ready for implementation for real-time security and defense.

The TRACker Unit is in a personal PFN configuration. It's looks like a brief case, or a mobile office. But operates completely independent of the aircrafts avionics and is responsive to the flight decks control (if desired). It provides aircraft flight telemetry and more. It performs a noninvasive relay function, having the same multiple band wireless receiver capacity as the aircraft and Aeronautical Operation Centers on the surface. Universal versatility is accomplished by constructing the unit to accommodate plug and play interchangeable hybrid substrate receiver chip sets for a specific aircraft's avionics to include their various ATM global communication systems. Some systems commercially offered today (BSS, ARINC, EURCOM etc.). Software in TRACker would recognize the aircraft's identifiers when the unit was placed in service and then locked with an authorized code. (ESN, Call signs and any Specific electronic address, etc recognized). The unit would self program, specific to the aircraft during pilot ACARS and repeat integrity checks each time even shadowing aircraft data streams in AOCs if desired. The signals are received, identified, clocked and processed locally and encrypted via the processor and programming in the TRACker unit. The unit is additionally interfaced with a second wireless technology acceptable for use in aviation. (possibly aviation's own commercial Cellular GTE's Airfone technology, and/or the abandon cellular frequencies or Satellite phone technologies like (Iridian), or other RF technology approved for in flight use today). The signal is then retransmitted to wireless gateways en route on the surface, either directly or by satellite (oceanic applications) that connect with FAA/Security/Eurocom ETC. (GPS determined) to be responsive in a FACT surface security intranet. Information could be in wireless data packets or streamed depending on the capacity of any approved isolated transmission technology, modems and the surface equipment receiving and processing it. The data signals are then reconstituted in terminals (application specific with decryption programming (to be determined) and provide geographic position on calibrated maps and other vital aircraft telemetry useful for public safety planning on the surface and for an incoming troubled flight. Additionally, data on persons, materials, and substances in the aircraft, sensed during the flight could be interfaced with TRACker via acceptable Dedicated Short Range Com Links, or directly connected to a TRACker unit.

E.g., a Boeing-777 is used as the airframe example to show some specific avionics that would be interfaced and monitored by reception only locally via the carryon brief case series of units.

ADF—Automatic Direction Finder

AFDS—Autopilot Flight Director System

CPL—HF Digital Antenna Coupler

DME—Distance Measuring Equipment

GLU—Multi Mode Receiver—Global Landing System

HFS—HF Data Radio

LRA—Low Range Radio Altimeter

MAT—Maintenance Access Terminal
SAT—Satellite Communication System
SI—Standby Indicators
TCAS—Traffic Alert and Collision Avoidance System
TPR—Mode S Transponder
VHF—Very High Frequency Transceiver
VOR—VHF Ommi-directional Range/Marker Beacon Receiver
WXR—Weather Radar System WXR-700X—Weather Radar System The PFN/TRAC technology begins with a benign approach to interface with aircraft avionics and other critical operations in transportation like the nations railroads. First generation PFNs in these applications supply parallel redundant data to improve public safety initially then progressively perform additional isolated functions with new robust activity controls in the field until the technology is well tested and TRUSTED under real-life circumstances. Then it may be either interfaced with existing systems or a hybrid design may evolve to accommodate the most optimum configuration via the Trusted remote activity Controller/router.

Aviation alone takes an average of eight years to test and implement new technology into aircraft. The inventor hopes to safely reduce this test period for new interfaces and to safely find the way for more remote control and robotics flight. Additionally, through these early carryon relay PFNs more public safety and national security data can be harvested via approved dedicated short range communications with the additional interfacing of transceiver chip sets in the PFN for approved wireless sensors and video systems on board aircraft. The Primary Focal Node Trusted Remote Activity Controller/router is an ideal architecture to progressively develop operator/pilot assist systems both locally and systemically for legacy and current technology and to forward engineer future artificial intelligence in avionics and all other fields.

Figure 11:
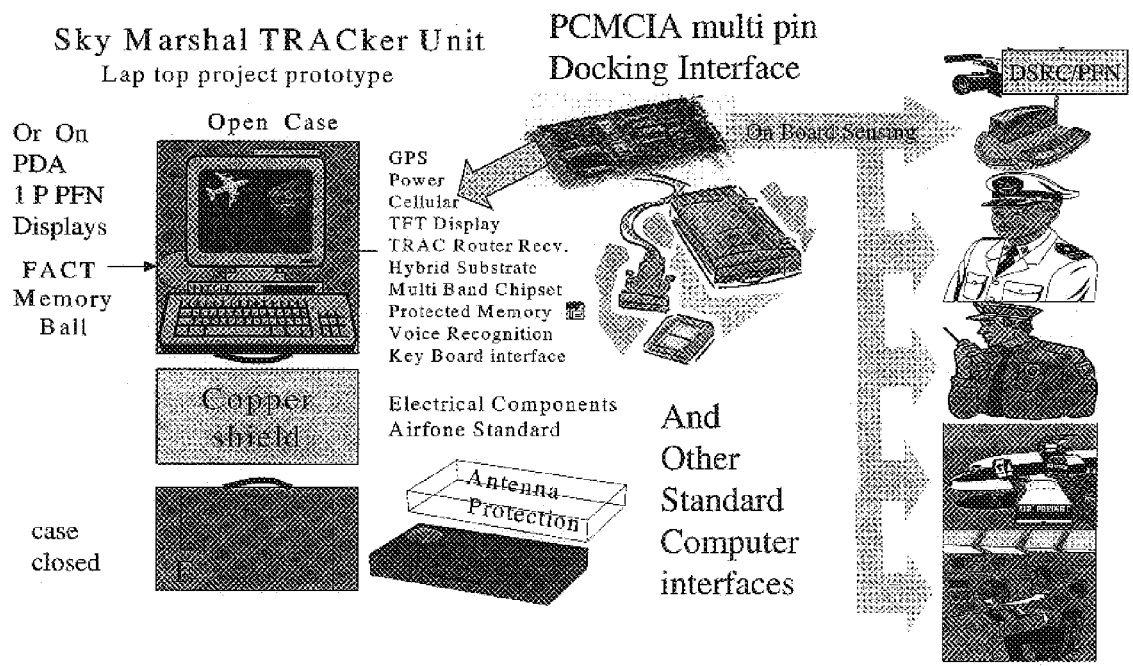
FIG. 11 The 1a TRACker will use a quality COTS laptop computer product.

FIG. 11 Functional and Experimental the 1a TRACker Prototype

The 1a TRACker will use a quality COTS laptop computer product with a custom multiple pin PCMCIA docking station (embedded modem that supports an avionics receiver ASICS, compact antenna and wireless protocol chipsets and modem connection to the laptop. These first to market units are commercial off the shelf Laptop PCs in a protected carrying case with several essential wireless technologies interfaced for communications routing of aircraft data to surface security and the reception of critical security data for display to the air marshal while in flight. Also, the Laptop has GPS, audio and video devices and other wireless modems interfaced with the appropriate drivers and software, either through the PCMCIA multi-pin docking station or any other data interface port connection available as shown in the center section of FIG. 11. (to capture data from inside the aircraft).

The Laptop is running a routing program that operates above and simultaneous with the other interfaced COTS device programming. These interfaced data streams are harvested and formatted for display via a COTS windows application software via a developed routing program. However to determine what needs to be routed and when, flexible testing has to occur. This implementation is accomplished by Macro preprogram instructions like "Hot Keys" to initiate multiple simultaneous programming in the TRACker computer. The data recovered from the various inputs, telemetry, and wireless is combined and processed into timed data packets by a windows program like WARPS (Windows Automated Radio Positioning System, and/or other appropriate protocols (NEMA) to transmit this data modulated and in data packets via wireless to the appropriate surface gateway providers serving the TSA FACT computer network.

Basic concept has the laptop running the routing program to processes data recovered from these inputs in timed data packets into the protocol chosen to transmit this data by wireless to the surface gateway provider serving the TSA computer network. The Laptop will probably utilize a 56 k modem interfaced with the GTE Airfone or the higher commercial data interface provided by GTE system architecture). Air line wireless transmissions carrying desired flight operational data for security application will be received locally by the appropriate receiver chips interfaced to the laptop via the special PCMCIA plug in receptacle board to receive these hybrid substrate receiver chipsets with their protocol firmware to process and prepare the data for local recovery for human review and to process it to the GTE airfone protocol for rebroadcast to the surface. If the software does not exist to display this data in a PC platform ideally windows application a translation or conversion algorithm will have to be written from the code keys to a windows program. How ever much of this exists at the service level at leas for avionics analysis.

Viewing FIG. 11 vertically all the laptop's com ports in the middle of the figure can be used for any wireless by additional modem and receiver chipset connection and interfacing to include existing ATM communication systems and therefore a universal PFN COTS interface that falls with in the nature and scope of the invention. This deign is for immediate application in the troubled aviation industry and to determine the exact interfaces and data streams desired for security purposes in the air. This is the purpose of the 1a Tracker receiver router prototype development package. It is planned to be a functional unit and be a benign prototype tester for basic needed functions. Designed to be put into service with in a year from the time the program is started with some specific physical packaging and commercial use to frame the FACT reporting system in parallel to AOC operations as shown in FIG. 10.

This unit is to determine what flight data is critical from each type of aircraft to transmit to surface security. How it is to be prepared and processed transmitted delivered and/or displayed. It is invented to be inexpensive and a rapid experimental platform with the ability to universally interface disparate communications and avionics messaging into the most widely used human interface software MS windows to review the data streams.

Other Interfaces Shown Right of Center in FIG. 11

The Laptop has GPS, audio and video devices and wireless modems interfaced via the appropriate drivers, protocols and programming.

Aircraft machine messaging interfaced via the PCMCIA modem router plug in docking board will recover aircraft data from the This unit is to determine what data is critical to transmit to the surface security and how it is to be prepared and delivered. It is invented to be inexpensive a rapid experimental platform with the ability to universally interface disparate communications and machine messaging data stream into the most widely used human interface software MS windows. It is designed to achieve this locally on board the aircraft via conversion software like 429 maintenance codes to windows conversion algorithm for analytical and diagnostic avionics system assessment and alerts on the 737, that can also be sent via wireless telephony and Internet protocols to the surface in real-time for handling and storage.

While initially offering safe product and a platform to evaluate new products with in less time than eight years period. Ultimately, 1A units will evolve to be a reliable back up to any or all mission critical functions.

1a Tracker should be configured to use any acceptable wireless communication to the surface. The feasibility model uses the GTE's AirFone system already approved for aviation applications. 1a TRACker construction includes copper shielding the unit, secured placement in an appropriate area of the plane, and approved signal transmissions directed downward away from aircraft instrumentation. Any approved wireless application, that can stream data may be interfaced and used to make the wireless gateway connections to the parallel FACT/TAS security network on the surface completing the security links shown in FIG. 10.

FIG. 12 The left side of drawing 12 continues a brief case configuration for the Carryon TRACker router unit. However, this version does not use a Laptop or PDA mini or microcomputer, but instead uses a PC 104 minicomputer architecture. There are many processor variations and computing power to application would be a major determining factor in the choice or processors used. The circuit in FIG. 15 would be the basic architecture to be achieved and rather than employing the 104 architecture the circuit could be constructed. Never the less the 1b programmable version would have language and software chosen that best suits the application from the 1a TRACker experimentation phase beginning in FIG. 11. This local Tracker routing unit can be constructed with software code written to provide any type of interfacing via software processing that translates between different avionics messaging, wireless communications and standard computer languages like Java script. Data transmitted by Internet protocol will also be encrypted as determined appropriate using PGP to DES level security applied by the local Tracker routing and directing messaging to the appropriate secure terminals or DETs for decryption and application level decoding. The units can be configured to interface with most any electrical device to report or record any data generated or even send command signals if desired to automated controls. (Not avionics controls unless especially approved).

Because all units router, controllers or both are interfaced with DSRC technologies like Blue tooth, all these components can communicate as a mobile portable network. The carryon routers or permanently placed units will route and relay data to the next generation of 1PS PFNs the personal or stand alone units or the DSRC 1c PDA/PFN product for short range HMI with some use as a local remote controller. Basically, these units are reactive in application specific networks via the short range communication connection (e.g. air travel air transport industry), however recognizable through the FACT Security matrix of PFN/TRAC routers nationally or globally as determined appropriate via ESN they can be authorized in real-time or deactivated and located. The hand held PDA configurations will have various models and capacities. Some will physically connect or rely on DSRC/ESN recognition to interface with belts like the IP personal PFN utility belts for airport and aircraft personnel shown in the later FIGS. 30–34 from earlier related patent filings. These will be more for display and keyboard message functions. The 1C PFN PDA that is an extension of this air marshal TRACker function in FIG. 14 could range from short range communications to interfacing with many wireless technologies as a SOC architecture fully responsive in the PFN/TRAC system as a 1Ppersonal PFN.

More on the 1b TRACker in the Brief Case or Other Encasement

The brief case can support keyboard, audio voice recognition, video dedicated short range and application specific wireless reception translation and/or re-transmitting functions, sensor array interfacing either by hard wire connectable or wireless. This diagram is by no means to be considered limiting as to the nature and scope of the invention and it's configuration. It is merely designed as a carryon system to be in immediate support to OEM flight systems and provide an isolated security link. The technology is progressive as desired and tested. The encasement might be changed for the type of environment and various containments are discussed in this application and the other related filings.

Still the Same Important Characteristics as the 1a TRACker

It is isolated from the aircraft's avionics completely and basically serves as a reception and relay station in parallel to the standard communications and data links provided by commercial companies like ARINC and Boeing and Eurocom via their ATM connections with AOC. TRACker is not interfaced with the aircraft physically, nor are the 1P PFNs PDAs or belt systems. It still performs as a benign receptive unit that receives translates and re transmits to the surface by approved secondary communications like the GTE Air phone (mentioned to prove feasibility of design not to limit the nature and scope of the TRACker wireless router innovation). Additionally, these TRACkers will have the capacity to test out future avionics and flight actuators in a disconnected state without compromising flight operations and lives (procedures and protocols to be determined for these scenarios). Most likely these testing TRACkers and (FACT Ball interface controllers used for the same purpose would not be the same units performing crucial air security links. But another TRACker that would interface with a component to be tested and operate it in a disconnected state from the aircraft and report back the performance in real-time to FAA Atlantic City, N.J. research center, service centers and/or manufacturers performing R&D on new the designs or analyzing failed part applications. The company departments and agencies would be connected as part of specific purpose computer network and delivered data directed by the local TRACker router via preprogrammed wireless to IP gateway commands to complete the connections.

The TRACKer Unit (in this) is a personal PFN in a mobile office configuration, that operates completely independent of the aircraft to provide flight telemetry and more. It performs a non-invasive relay function by having the same multiple band wireless receiving capacity as the Aircraft and Aeronautical operations Centers on the surface via an interchangeable hybrid substrate chip set for the specific aircraft (respective of the various ATM global communication systems commercially available today (BSS, ARINC, EURCOM etc.). The aircrafts signals are received and processed locally via a programmable processor, that is additionally interfaced with a second wireless technology acceptable for cross environment use in aviation (possibly commercial cellular and/or satellite phone, or other RF technology). The signal is then re-transmitted to wireless gateways en route located on the surface that connect with the FAA FACT security intranet and terminals via wires packet data and IP protocols. These signals and data are reconstituted to provide geographic position on calibrated maps of the aircraft and the location of person or materials or substances in the aircraft during flight as well as serve as redundant aeronautical operational data link to provide flight telemetry. One immediate benefit of TRACker is that it provides a mirage of security data and tactical mission data for the flight without interfering with normal approved flight communication, data links and operations for safer more secure focused flying.

FACT Memory Ball

On the right side of the drawing is another first generation accountable memory product for aviation. The "Memory Ball" or "FACT Memory ball" in this application is shown as the extended event memory preserved in a special protected spherical receptacle for aviation applications. The FACT Memory Ball's construction is as important an innovation in this application as any electronic component and is and extension of the protected vessel concept for accountable data and communications for remote management. The design is made to maintain survivable service and protect event data for the FACT system to operate in the harshest of environments and perform analytic functions to any equipment and human failures and/or any criminal investigations.

FACT Ball Properties

The properties are hard and light, to obtain a low inertial energy coefficient value when in motion (like being transported in an aircraft at 500 knots). Both to limit damage to other objects caused by an engineered release of the ball on impact and also to limit internal damage to the FACT ball's components, like the event memory and beacon transmitter stored in side. The ball must also be capable of withstanding high heat and radiation or EMFs generated in explosive terminations of flights. The outer shell must be constructed of dent resistant material but resilient enough to resist cracking due to impact with hard and sharp objects (possibly titanium for the shell). This outer shell is to be covered or coated in Teflon and the internal electrical components are to be stored in a carved or molded cradle to form, fit, support and cushion the electronic package inside. Suggested material to use for this application is the thermal tile developed for the NASA' space shuttles shaped to fit the concave contour of the FACT Memory Ball's interior. Additionally, the internal insulation may incorporate two hemispheres— pillow pockets of fire resistant jell that the space tile ball is surrounded by between the FACT ball's metal shell. These flexible insulating pillows also serve as shock absorbers on high impact. If though testing the jell proves to be too heavy $CO_2$ gas pillow pocket packets will surround the fire tile sphere between the outer shell.

Internally any number of 1PS PFN variations could be stored inside this high impact transportation encasement. The EDR Electronic Data Recorder or memory storage device, power source and mini beacon location transmitter is the original design purpose for the FACT memory ball as an enhancement to the Black box technology that exists today in aviation. The antennae is impregnated in a lamination form to be a sheet over one coat and under another of the Teflon coating, which also seals the ball against moisture. The Metal shell underneath the coating is the negative or chassis ground for the antenna and the device. For the FACT Ball, the Teflon serves five purposes.

First to help the ball slid out of harms way

Second to be the first heat resistant shield

Third to be a plastic base to impregnate the antenna into

Fourth to seal external seams, and access ports

Fifth to mix a day glow or a light energy absorbent and radiant component so that the FACT Memory Ball can absorb ambient light energy and release it at night to aid searches to recover the EDR ball.

Other heat insulator materials and flame retardant materials are also within the nature and scope of the invention and have been detailed in earlier filings and considered inherent to this application; such as SMOKE and Gypsom and even Dyper gel. However, this application is concerned with electrical conductivity and weight so these issues have to be addressed in any application specific choice of materials as well as, floatation, water proofing, special security seal and access, data is to be stored in any standardized format desired for application and the FACT Ball will store private and statistical data in the appropriate protocols as detailed in other related filings. The Data will be encrypted and/or compressed—transparent and in any format deemed appropriate for the application and any technology of memory storage all of which is considered with in the nature and scope of the invention and determined specific to application.

E.g., of PFN/TRAC system design for technology sharing to progressively construct invention.

This FACT Memory Ball innovation for the accountable PFN/TRAC controller/router is also ideal protection for other rough service applications involving the packaging of electronics outside the aviation and air travel industry. In this respect, these other applications, like for this technologies terrestrial transportation product and PFN commercialization would enjoy this product enhancement with no obligation to any corporate entity that owned all or part of this intellectual property filing, because this enhancement to the PFN encasement relies on earlier designs and related patents to establish the concept and need for this level of protection for the PFN type applications, Therefore this is an example of industry specific technology development that will be shared by the other corporate entities in their specialty areas creating the PFN/TRAC system to support FACT Security for the nation and the globe. For this reason, special joint venture arrangements to sell across industries will be structured for the companies owning and developing the PFN/TRAC System to work with one another to complete the system. This is indigenous and necessary to the PFN/TRAC system to insure the consistent progressive development of the technology for FACT security and considered an embodiment of the technology—the commercial La Technique of the invention.

Separation in corporate service is intended and to be specific to the industry to develop the PFN/TRAC system and FACT security in harmony with industry and the different government agencies. However commercialization, marketing and sales is to be universally open to all corporations owning PFN/TRAC System technology. Special protocols for sales coordination and integration of PFN/TRAC technology development and manufacture will be put in place with appropriate corporate structure.

It is important to remember that practical design and implementation for the best human machine interface structure per application will forever be changing and evolving with PFNs. But, the invention—the PFN/TRAC portable network system with FACT security program for aviation will be the same and that all these enhancements and variations will be integrated and are with in the nature and scope of this invention.

FIG. 13 The benefits to a more universal architecture for limited use applications.

Other applications for TRACker use may be in private and general aviation, where some aircraft and operations are technology starved restricting their use, and safe performance form time to time. In many cases, these are cost related issues involving expensive avionics products in limited markets. With the PFN/TRAC System architecture expanding over so many industries and being designed and constructed to perform accountable remote control and robotics for all types equipment to provide trusted and reliable service. These more universal product designs will enjoy expanded markets and reduce the cost with higher quality and more sophisticated equipment. This positive PFN/TRAC technology development will improve the nation's transportation management system with greater security and better public safety. And also result in improving areas of aviation where there is limited resource revenue to update technology.

This is another reason to recognize the importance of the commercial PFN/TRAC embodiment to provide economy of scale technology for more universal use and standards to meet the nation's need for a more coordinated management in networking a future destine to be named "The Smart Machine Age". This design method for progressive technology interface development is a sound economic course as well. One that will benefit the people, keep the industries strong, marry up well to government agencies, reduce the learning curve for all machine use, continue competitive product development and allow for rapid security access and control augmentations nationwide though out all the industries.

It also makes it easier to write, codes, rules, and regulations, to create standards procedures and protocols for handling personal and statistical data recovery storage. With uniform technical architecture to apply constitutional law for data recovered, Investigations can proceed with protected data that is acquired, stored and used justly prior to and via the discovery process and any legal action with accountability for all access and action to insure equal and fair and just access and use.

Application, Placement, Qualities and Properties of the Memory Ball FIG. 13

The memory ball as stated in FIG. 12 is built light in weight, with a resilient, Teflon-coated metal shell. It then can reside in a breakaway Velcro sock or sack that sticks to sponge laminated adhesive on one side of the sponge and glued Velcro hooks on the other side of the sponge. This holds the fact ball in place in the aircraft and is in the top right of FIG. 13. The carton to just left at the top right can hold the FACT ball as well for concealment as a normal package and be placed into a certain area for surveillance interfacing to the FACT data recovery system and additional sensing connected if desired. Of course it can be placed into the TRACker applications as an extended memory component or the memory component with special protection to provide accountability among other functions. It can also be placed in with any other PFN application and/or be used to provide protective service for other vital components.

Additionally, teflon is prepared with a light absorbent day glow radiant color and an embedded antenna to retrieve data by wireless and send a beacon signal for recovery of the vessel. The Ball can receive local data transmitted from the aircraft, through either direct connection to a tracker unit (as shown in FIG. 13 via watertight breakaway connectable—(final configurations to be determined and tested). Or the FACT Ball can be stored isolated and outfitted with a receiver/processor chipset (a SOC) and receive data via DSRC. However, the FACT ball structure can be made in various sizes to accommodate anything that is determined to require this type of protection. It can also provide a safe environment for a complete PFN/TRAC controller/router if desired. With that in mind it can have long and short-range communications integrated into its electronics structure allowing it to connect with equipment and systems via hardwire and wireless. Adapters connectors and conversion products will be made as inherent by products of the invention and any such technology should be considered proprietary and with in the nature and scope of the invention and related filings. (this would include short adapters, cable connections and wireless connections and interfaces to include existing COTS combinations, when used for service with the invention or innovation of the invention to serve the inventions full purpose (to provide accountable interfacing, communications/messaging and robotics and remote control) Application specific, and preprogrammed the memory ball monitors and records relevant flagged events in a permanent memory for safe storage. They can be constructed flexible in application and size as displayed and stated in FIG. 13. Additionally, data recovery—memory storage technology with regards to the PFN/TRAC technology is well covered throughout the related filings for every type of memory storage to meet any of the many various applications that PFN/TRAC controller/routers are applied to, including these FACT Memory Ball configurations. They are inexpensive to add surveillance applications and record investigative telemetry from new sensors interfaced, video or audio as isolated security pods in the FACT system, either for later data recovery or equipped to have real-time responsiveness in the FACT security matrix. Additionally they can be controlled by the Flight deck if desired.

For most applications by merely receiving data from aircraft wireless transmissions they are non invasive to critical flight operations. The ball's dedicated, short-range beacon and separate power source, makes it responsive to specific search/quarry signals, as well as the capacity to send timed signals (to conserve power), an effective distance for a typical search process.

Proactive FACT Ball Functions

And with new photocell technology of reduced size and increased power out put, the addition of photocells to regenerate beacon power when exposed to solar energy is feasible and inherent throughout all the PFN/TRAC technology applications as stated in related filings. These solar cells would be impregnated into the Teflon coat and may well be destroyed on impact or positioned away from the sun. In this event the emergency self-contained power source would be the default power source. Some positional weight displacement technology that auto-motivates the sphere via an attached micro-servo motor and existing current is an option to improve effectiveness of this regenerative power source (TS). This function will be employed to auto articulate the sphere for the strongest solar source reception and likewise be used to position the antenna for best signal reception via sensing current levels generated and signal strengths in any micro processor or mini computer inside any given FACT memory ball. Additionally, thermal sensors/converters in the Teflon-also impregnated maybe used to convert heat energy into electrical power and/or to sense harmful heat sources and activate the auto movement function of the FACT ball. This auto-motion function may be activated by the search team remotely to visually gain a fix on the FACT Memory ball when they are in the local vicinity. This facet of FACT balls may be used in only some applications and/or replace the jell packs space. Some other FACT Ball attributes are It; floats on liquids, fire proof, non chaffing with other objects, low inertia value, high impact resistance and impact deflective, visible at night and day, special integral seal to maintain spherical geometric integrity, tamper resistant and detective. Advantages and characteristics include; non-invasive to other equipment systems, application specific of very diverse and easy to install with limited skill into an aircraft. The seal is made for the FACT ball by having two hemispheres that are threaded. One is internal and one external that marry with a special seal ring for tamper detection.

TRAC Aviation Inc is talking to major aircraft Manufacturers about creating a line of Memory balls. TRAC Aviation will seek out aircraft and avionics manufacturers.

Figure 14:
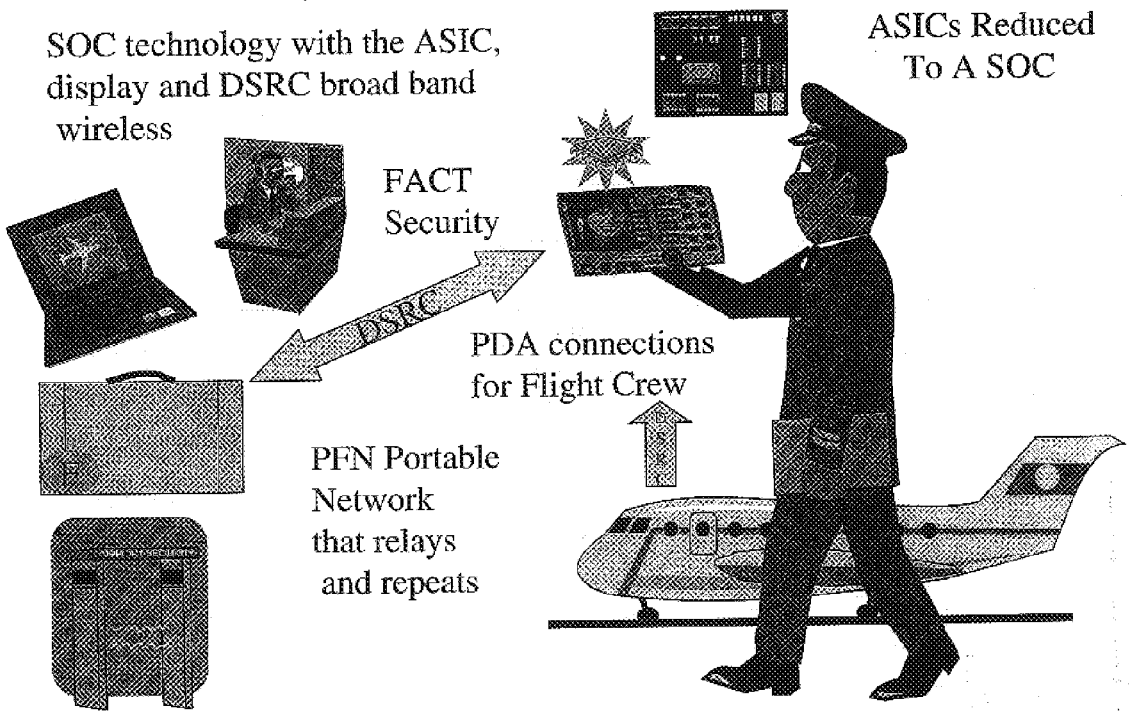
FIG. 14 More description on 1a TRACker.

FIG. 14 The 1b TRACker in FIG. 12 will evolve the exact data streams for each airframe and appropriate TRACker unit. With the exact data streams determined the interface, receiver and protocol chips will be supported on a PC 104 plug and play accessory board. Additionally PC 104 mini computer architecture will be employed and the PC platform and windows programming continued. Software programming is becoming more and more prevalent in operating COTS sensors, actuators and devices with PC COTS customized programming available and manufacturers choosing this to convert their OEM programming to for maintenance analysis and human machine interface applications. This is the Ideal universal platform to convert data to at the local level to enter it into the wireless security matrix with internet protocols worldwide. As a general rule to improve reliability in this architecture minimums of extra computing capacity will be determined and maintained per device with isolated programs of redundancy and enough reserve memory available to detect corruption and stalled locked up programs. Rough service and EMF protection will be established to maintain reliability and accountability per unit application and with in the PFN/TRAC system and FACT security matrix 1b TRACker units will be based and interfaced on the ASIC design in FIG. 15. However their will be 1C TRACkers as solid state proprietary constructions and surface mount versions as well as SOC constructions and these developments will evolve into smaller encasements like PDAs and the Mini FACT ball structures and even smaller inject able units.

FIG. 14 shows a PFN PDA of which a 1c would be a full miniaturized 1 P PFN/TRAC controller/router. This determination is made by having more than one wireless technology interfaced. For example long and short-range wireless. In FIG. 14 the pilot's PDA might well be a complete 1P PFN device using many of the interfaces detailed in FIG. 15. Regardless, the pilot or air marshal with their 1 PFN PDAs would be able to communicate with all aspects of FACT security at the airport in the aircraft and on the surface via all the equipment PFNs communicating with this 1P PFN PDA. All law enforcement would have this immediate connection capacity and recognition to the FACT system. Whether they are a customs agent, TSA, airline mechanic, a local policemen a register policemen from another country their unit ESN and individual identification confirmed would allow them to have contact with local FACT control and to interface with surrounding equipment. The 1P PFNs would be multi-access remote controllers as well of the surrounding equipment. Obviously these accesses and controls have procedures and protocols to be determined by the appropriate authorities.

Figure 21:
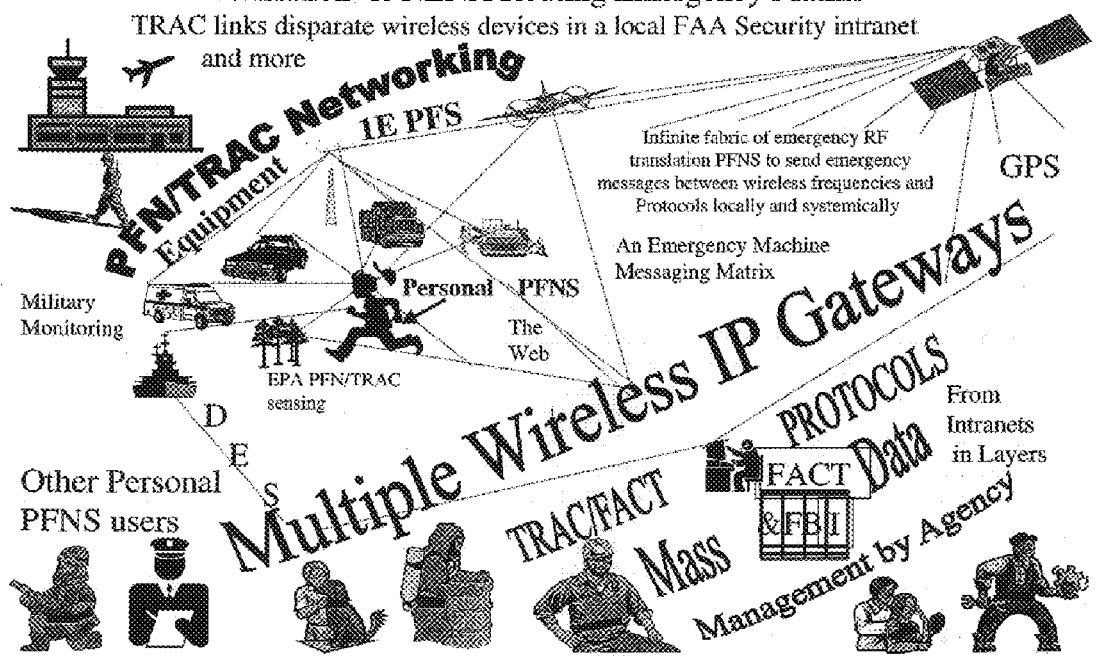
FIG. 21 illustrates a wireless tracking network locating a lost child.

Earlier versions and applications of 1 P PFNs and tracking units are discussed in FIG. 21. Here the PDA applications may be displays and HMI system interfacing functions and not complete PFNs like this 1c unit the pilot is using. As it is not clear what exact configuration will best serve individuals and their job performance. For example a simple LCD display plugged into a belt system like the four belts discussed later may be the best for craftsmen like mechanics or to connect to a watchband view screen. These application specific configurations will come in time.

If not, carry on TRACker units can provide plug, and play and program architecture to include software embedded hard ware or firmware that can be quickly configured when plugged in to receive the specific aircrafts broad casts (and Identify this aircraft as (HOME) by identifying RF coefficients such as proximity, strength of signal, the specific aircrafts call sign or ESN or component S/N signatures if existing, or any specific RF address of the aircraft and retransmit the data in appropriate packets after being processed by TRACker through a modem and data splitting program for the Airfone protocol. The surface IP gateways to this FACT security system will be running the application specific Airfone software to reconstitute the data into IP packets if necessary and the specific coedecs to reconstitute the data into a comprehendible format or usable form for automated use at the desired destinations.

ATM can be Linked to FAA TAS Security

The Tracker allows for telemetry to the manufacturer and supply liners to evaluate their product performance through the regular phone system and internet. The public can be provided filtered data as to time and place of aircraft and even educated and given interesting web presentations of flights in progress (videos if public data release can be done by agreement in real-time to protect the invasion of privacy). The TRACker wireless interface will be used first and for most for the FACT Security system evaluation of passenger professionally and with in constitutional guidelines. However, other TRACker units could be employed to gather public data for commercial applications and public enjoyment.

FIG. 15 The 1a TRACker units even though they are COTS lap tops and Mini hand held computers their interface design and testing will attempt to create this ASIC in FIG. 15 in function at least. 1b TRACker will also try to achieve this integration using commercial off the shelf PC 104 architecture and 1c TRACker will be the first proprietary manufacture of the ASIC specific to airframes using surface mount technology and protected in a can or appropriate encasement. The second 1c TRACker generation of the refined and miniaturized circuit will be a SOC or Systems on a Chip technology of the 1c TRACker and with the capacity to interface direct with avionics electrical bus systems on board and will be used in beta testing to determine the 1A PFN/TRAC aircraft unit in FIG. 3 for accountable remote and robotics control of an aircraft. These miniaturized versions could be designed to physically be placed into avionic bus cables and secluded. The intention is that this progressive evolution for avionics will accomplish more synergy with terrestrial equipment controls, wireless communications and computer networks.

With telematics and automation in terrestrial platforms equaling avionics sophistication, the same level of reliability and accountability will be required for automated machine operations and movement. This common ground will allow for a lot of parallel developments that can be coordinated through the PFN/TRAC System, also a praised and analyzed through the system to insure more synergy between the technologies and related industries via quicker commercial coordination for universal interfacing. Along with security movement management and coordination will be the driving forces. Position in space on or near the earth's surface—speed and direction are all becoming more universally determined and automatically navigated through the same intelligent positioning technology GPS. This technology could also provide the universal timing component to synchronize all the PFN and TRACker clocks to provide the portable network the means to locally and remotely determine collisions and coordinate counter measures automatically.

Review of Chipset and/or Wireless/Protocol Interfacing

The boxes on the left side of the green block are used to give examples of the communication and data interfaces essential to TRAC processing and should be controlled via the PFNs in a FACT event. Top Box CEPT-Cellular is the commercial cellular frequencies approved for use in flight applications like the Airfone system used in the United States. This system works off of LEO satellites and does not interfere across the surface cellular system of towers flooding ground systems from above. These systems will be used to send parallel data streams to TSA and security links on the flight operations, as well as any security telemetry recovered by the 4th block DSRC dedicated short Range communications. Or the 5th box blue tooth that is DSRC for wireless carryon devices. This chipset with appropriate protocols will be interfaced via a hybrid substrate as stated to the left of the basic inputs on the left of the block. A PFN/TRAC unit will be capable of controlling and using all standard carry on wireless devices and recognizing other non interfaced transmissions via It's scan function and frequency counting algorithm that constantly runs monitoring an appropriate number of the 40 antennas that are on board a traditional commercial aircraft. The second block on the left CNS/A & ATM The Communications, Navigation, and Surveillance/Airborne system is linked by wireless hybrid chipset displayed in other similar figures to the above 1A PFN/TRAC circuit to recover any data generated by this system. All systems that carry voice have voice recognition software applied to transpose any verbal communication into digital format for transmission by other wireless protocols (e.g. airfone) interfaced and/or as text to be recognized at read at the appropriate application level in any TSA monitoring terminal, either local or from remote locations. The ATM portion of this block would be also another Hybrid Chipset for the Air Traffic Management provider like ARINC or Boeing with all the necessary receiver, protocols, codec and translation programming to receive this data locally in the 1A PFN/TRAC unit(s) and relay this data via any number of acceptable or needed wireless technologies on board the air craft. The TRAC controller/Router would determine the best means to transmit the needed data and how under the circumstances. ASCPC Air Supply and Cabin Pressure Controllers will be a System Under Control or SUC to TRAC monitoring and FACT programs. or at lease certain functions will be. The air supply to the cockpit and passenger cabin is to be monitored for contaminants e.g. Bio, chemical (EDS) and physical property sensor arrays (Audio/Video/Thermal/radiation sensors) and various transducers, which send specific signals to the 1A PFN ASIC. They are operated and processed by proper divers and programs in the 1A PFN and translated by conversion algorithms to format the signal for transmission to the surface and TSA terminal via the appropriate onboard wireless. Some such sensing capability exist on sophisticated aircraft already and these data streams would be interfaced with the PFN/TRAC units on board to harvested their data and enter it in to the TSA system via internet protocols. Or the FACT (IP) security matrix combing national and global transportation Intranets and security agencies for continual layers of automated and human analysis.

The 4th and 5th blocks on the left—DSRC dedicated short-range communications, RFID radio frequency ID program (EZ pass) and Blue tooth a short range RF technology for wireless telephones to interface with some automotive telematics. These are existing technologies interfaced via the PFN platform in the ASIC and would have the appropriate hybrid chip sets interfacing these technologies to track, identify and sense materials, equipment and people approaching and entering the aircraft and the aircrafts compartments. Via, this connection the 1A PFN or series of 1A PFS on board would work in harmony to identify the carryon device (ESN recognition and look for alerts) as well as manage the use or restrict any such use of cellular phones and other wireless carryon equipment as determined best for flight safety. As part of this invention's nature and scope these SUC technologies and systems would write code into their protocols to immediately transfer all PFN/FACT directives via access through any cellular service that the phone provider is part of for emergency action messages to be delivered into the surface IP/TSA gateways. This gives a continual down feed of identifiable data packets and information of a troubled flight to surface receivers or satellite connected to data receivers/receptacles for further data resources in real-time and for later analysis. Special arrangements with these providers to support secure gateways into this IP security matrix of TSA and other agencies will have to be arranged and constructed.

CNSA & GPS along with CRZ cruise tracking technologies are other ASIC inputs interfaced with the necessary protocol chipsets to the 1A PFN. Exact flight path data will be gathered from onboard smart determination technologies and ground surveillance systems and compared to preprogrammed flight plans. All in flight changes will be verified by surface and aircraft data telemetry and unauthorized flight will be flagged and immediately result in a Safe Base flight plan via FACT event protocols. Constant communications with the aircraft and the order for escort and assist aircraft for the troubled FACT flight will be a part of this immediate response and directed by DOD homeland air defense CINC AIR COMMAND/NORAD.

CPDLC-AP The cockpit data link and auto pilot are the direct sensory inputs and flight controls that will be SUC to the 1A PFN or group of 1A PFNs or Trusted Remote Activity controller/communication router (this is a TRAC ASIC above—the terrestrial PFN/TRAC ASICs are in subsequent figures), along with any sub specific application PFN ASICs which operate any necessary dispersed actuators to control flight control surfaces over any these systems if they can not be secured from human control while the aircraft is in flight. The reader must remember that the system under control and Avionics Bus interfaces are inherent for activity controls (along with any hybrid chip sets to synthesize protocols like (the 429 maintenance interface for 737 to go from the avionics signal messaging to a PC platform and windows applications) and is not shown here in this ASIC because of the space in this figure. Other Figures and the other related patent applications describe the separate actuators as well and the need for protected operations. The skilled in the art have to construct them to function appropriately and to meet any code and specifications known or the appropriate industry and government experts standardize that in acceptance of the PFN/TRAC system architecture. Basically, the 1A PFN and PFN/TRAC network of units if so needed in any particular airframe will operate to form a seamless connectivity of flight controls form first existing systems like the flight computer, collision avoidance systems forward seeking radar, weather radar and any autopilot controls and use them to fly the plane un interrupted and appropriately with these current robotics. However, in the event that the plane is not responding as it should the assist remote control pilot in an escort plane and/or the ground RC pilot in the simulator station or the 1A PFN TRAC Unit onboard will be deferred to control PFN robotics via the network of specific ASIC actuator circuits, with either wireless and encrypted or wired and encrypted commands from protected PFN robotics or remote command.

Clock distribution. Is coordinated in each PFN by LEO satellites or the GPS interfaced or other wireless communications with redundancy locally (local clock as well that is system integrated as determined adequate and backed up wireless synchronization) to keep all moving and stationary elements synchronized in their movement on and near the earth's surface. This will be tied into collision avoidance programming and to be used by the FACT program TSA and homeland defense DOD to control robotics flights and coordinate and control movement in the air and on the ground. This clocking will be the bases for programmers to write algorithms to account for signal transmission times and conditions to obtain the optimum performance for near real-time control of an aircraft with under remote control command. It will also provides 1A PFN/TRAC unit bench marks for preprogrammed and timed responses performed by robotics in conjunction with ground controls It is a system wide synchronized timing and is augmented by geographic position. This process is part of the FACT construct program running in the 1A PFN to determine if a flight is positioned on time in the exact place and the correct altitude at a particular second in time. This is an electronic equipment policeman for an aircraft in the sky with a connected system partner on the ground all the way. The ATM and AOC as well as the TSA are linked nation wide and would include the areas of free flight west of the Mississippi.

Protocol Translation & CODEC

APU & APC APU Auxiliary Power Unit will be specially protected for the first generation of PFNs and also additional APUs or Emergency power packs will reside in special protected compartments for the 1A PFN/TRAC unit and any FACT interface components to fly the aircraft. The APC the auto Pilot computer is listed in this block for the initial 1A PFNs to incorporate as much as possible the auto flight systems with secured power supplies and increased protection. Separate maintained power sources are inherent to PFN/TRAC system trusted remote activity controllers and essential activity components. These emergency power sources are of the highest quality lithium and are maintained at full power by the aircrafts generators and electrical bus. The system self monitors batteries, their condition and reports their condition via regular integrity checks conducted by the 1A PFN unit and regular system checks and downloads this information to service and maintenance centers. Specially qualified security service personnel perform all service on PFNS. Additionally, all circuits are monitored for their current levels. The light shaded diode symbol on the power ports is to instruct designers that power surge and shorting protection are required for circuit protection, to guard against, tampering and efforts to disable or harm the unit.

APC is the Autopilot Computer and it must be protected with an uninterrupted power supply to be part of any PFN/TRAC/FACT system so it can carry out the preprogrammed FACT flights. Whatever augmentation is needed to complete this protective task in the prescribed manner with PFN/TRAC technology must be made and is required to perform accountable robotics flight and remote control. The APC will be used to handle the 5 safe base fights initially and continually, but there will be self powered back up actuator controllers or dispersed PFNs in a harmonious matrix to follow through with ultimate control. Regardless of 1A PFN overrides, the autopilot must be impregnable to unauthorized personnel during flight. Personnel identification is accomplished via the communication systems and data transfer systems interfaced with the 1A PFN controller and include smart cards, finger printing Iris scanning, voice recognition thermal sensing and blood pressure readers in hand sensors and finger thaws on the yoke and instrument panel as well as full biometrics transmitted via DSRC from IP personal PFNS and body sensing harness belts or clothing worn by the pilot and flight crew. A Robotics flight guardian program will maintain the approved flight plan during any real-time approval process needed to clear any legitimate pilot access to the controls of the aircraft. In absence of such an alternative the already flagged FACT flight will be programmed to the appropriate SB safe base via robotics and flight assist RC needed.

The other portions of this ASIC are self explanatory to those skilled in the art of avionics, electrical engineering and computer processing. However, there will be sections in this specification and related filings that further define out functions performed by this similar circuit design to further the readers concept of the PFNTAC unit being a universal accountable interface platform for wireless routing and equipment control. Obviously airframes, and terrestrial vehicles have different electronics and disparate properties that can hinder them being used in a coordinated fashion. This is one main reason for the Primary Focal Node (PFN controller router) being placed as a receiving PC processing platform in vehicles and machines where they also have stable power sources. They then can perform wireless translation, the relaying and routing of various communications, as well as, store data locally for accountability and commercial billing and deliver accountable commands to the machines they are attached too. This creates a matrix of machine messaging and management that is coordinated and useable in real-time. Data is locally harvested/stored and send on by the appropriate wireless and IP applications with encryption to the appropriate systems terminals and application programming for decryption and use.

General Function

It is important to remember that the security agencies, the FCC and FAA and industry standards efforts will determine the essential controls and communications. The remote control communications will be ded or dedicated digital channels for individual activity controls for flight surfaces on special military possibly DES communications that can take place form aircraft to aircraft and for close in landing applications at the Safe bases (SB). Otherwise robotics flight will be employed to maintain the highest level of real-time responsiveness for aircraft performance in relation to the real-time flying environment. This is proprietary to the FACT programming and sequence of activities in a FACT event. Unless a local assist aircraft is accompanying a troubled flight, the PFN/TRAC unit will fly with robotics when activated to one of the 5 preprogrammed FACT flight paths that are stored in the PFN software library (or memory storage) to the pre arranged Safe Bases (SB) determined by location (GPS and other smart location determining technologies on board) and/or the nature of the emergency that has flagged the flight—a FACT flight or Federal Access and Control Intervention.

To insure absolute maximum redundancy in communication from the plane to the surface, blue tooth, or 802 wireless or any applicable DSRC will provide contact to any and all carryon devices to interface all communication devices via the 1A PFNTRAC processor(s) and the system. PFN/TRAC with the capacity to activate any such devices can call NENA/FACT numbers in route for direct or download to the FAA homeland security's hot operations center (egg. Heron Va. With TSA/AOC) or flight Command Controller air operation center(s) with (TSA, AOC AIR CINC) and download all data that is recovered on board by the 1a PFN/TRAC unit. More than one 1A PFN/TRAC unit can be interfaced in the aircraft and to it's various electrical bus systems with each having a separate FACT ESN or electronic address and communication protocol to coordinate any flexible master slave relation ship to insure continual protected secure control of the plane via the various non accessible and secluded units. All automated flight control systems will have a slave relation ship to the TRAC process on board the aircraft. These systems will be subsystems or Systems Under Control or SUC. to the PFN/TRAC units and any network. And provide the needed immediate security links and management between movement on the earth and Flow through the sky.

All wireless like STDMA, CDMA and TDMA digital cellular, analog wireless telephony and radio and Blue tooth or 802.11, Dedicated Short Range Communication DSRC wireless technologies via chip set and antenna to identify all wireless carryon devices turn them off and record their ESN and use will be a progressive development of the wireless transceiver circuit. The scanner, translation between protocols, signal repeating and interface and connection structure is all part of this communication function on the left side of the FIG. 15 ASIC. Part of Tracker's experimental development is to manage personal wireless phones during flight as a beta test focal routing center on board the aircraft. The first object is to control unattended or poorly attended wireless devices during mission critical flight situations like take off and landings from the flight deck and as part of the air marshal and/or crew's function to detect, be aware of and eliminate any unauthorized, unwanted or any unsafe transmissions as physically feasible in flight and in real-time.

The TRACker unit will explore first and foremost the development of DSRC routing to specific cellular phone addresses via these DSRC frequencies that might better be contained to limited areas and other equipment effected (with low powered signals). This is to be accomplished to allow commercial wireless handsets to be utilized via the TRACker router interface via approved broadband wireless connections to the surface and satellites during flight. Of course with the cooperation and approval of the commercial and governmental interests e.g. cellular phone manufacturers witting their ID and tracking codes to be processed to Blue tooth DSRC or other DSRC platforms and government agencies like FCC and FAA approving the design and testing, as well as organizations like the Commercial Pilots Association and EIA/Avionics organizations specifically condoning and writing standards for the technology' use, procedures and protocols.

Many different RF possibilities are named as they are approved in aviation or they are in the process of approval. One such example is Boeing's recently received license for 2.GHZ satellite transmission. This technology, also could support a channel or side band that could serve as a security data link format for gate to gate air security for new aircraft and retrofit existing technologies e.g. Rockwell Collins Avionics data links with any new transceiver, protocol chipsets (antenna) appropriate or needed. Also other ATM communication providers like ARINC and Eurocom could have their communication protocols via hybrid chipsets plugged in and programmed into any 1a,b or c series TRACker unit on board to compete a master communication monitor function to progressively determine the 1A PFN/TRAC aircraft controller/router architecture to perform accountable, reliable remote control and robotics flight.

Scanning and Routing Function

The Federal Access and Control Technology FACT is to have the ability via PFN or TRACker routers to scan for all sorts of electromagnetic frequencies and EM wave propagations/transmissions or random oscillations in any specific application deemed appropriate to control the air wave environment for public safety and national security. The use of the NASSA deep space or radio signal search for intelligent life algorithm customized to filter out known transmissions and to look for only unauthorized or never detected before RF occurrences. This programming could be applied to the proprietary frequency scanning programs to be developed and written for these PFN/TRAC unit applications.

Background Facts and Technology to Construct the Wireless Interfacing:

Wireless Technology,

Eighteen major types of wireless technologies exist, containing a large number of subset technologies that range from ATM-protocol wireless based. This ATM is wireless traffic routing management not Avionics These ATM. Links to this system cost approximately $200,000 per data link. Additionally, local-area network WLAN sell for $500,000 per data link). Frequencies of the different technologies travel between several hundred feet (wireless LAN) and 25 miles (MMDS). PFNs and TRACker will be used to provide a less expensive, more comprehensive, secure and stable mobile platform to transfer data. The development of wireless interfacing via the PFN/TRAC portable WLAN network carrying a multitude of protocol interfacing programs will create a flexible universal communication matrix or wireless by Internet protocol. The system will always be diverse and need planning to insure enough of the properly programmed PFNs or more universal PFN units are present for adequate coverage of all types of wireless. This evolving process will always be one of forward and backward engineering, however, the flexible interfacing via plug, play and program architecture (proprietary to the PFN/TRAC system) will aid immensely in this process. (costly upkeep of the system will be reduced by more involved in maintenance. As standards emerge and technologies merge specific technology will be refined and miniaturized into SOC configurations, but always with a flexible plug, play and program interface capacity to grow and keep current the PFN/TRAC System and FACT security network. The FACT network via it's industry specific government registries must be programmed and capable to recognize all new interfacing and system augmentation and provide a review process and integrity check both at the local interface and with system wide checks and alerts to any anomalies for FACT program flagging (public safety and national security).

The wireless technologies progressively to develop TRACker units and will be the designs tools to construct any specific 1A PFN/TRA aircraft Controller Router.

Another early COTS product to track people and packages and materials is the RFID technology developed by Texas Instruments. A basic RFID system consists of three components:

An antenna or coil

A transceiver (with decoder)

A transponder (RF tag) electronically programmed with unique information

The antenna emits radio signals to activate the tag and read and write data to it. Antennas are the conduits between the tag and the transceiver, which controls the system's data acquisition and communication. Antennas are available in a variety of shapes and sizes; they can be built into a door-frame to receive tag data from persons or things passing through the door, or mounted on an interstate tollbooth to monitor traffic passing by on a freeway. The electromagnetic field produced by an antenna can be constantly present when multiple tags are expected continually. If constant interrogation is not required, the field can be activated by a sensor device.

Often the antenna is packaged with the transceiver and decoder to become a reader (a.k.a. interrogator), which can be configured either as a handheld or a fixed-mount device. The reader emits radio waves in ranges of anywhere from one inch to 100 feet or more, depending upon its power output and the radio frequency used (tested first for use with avionics on specific aircraft. When an RFID tag passes through the electromagnetic zone, it detects the reader's activation signal. The reader decodes the data encoded in the tag's integrated circuit (silicon chip) and the data is passed to the PFN or TRACker computer for processing.

RFID tags come in a wide variety of shapes and sizes. Animal tracking tags, inserted beneath the skin, can be as small as a pencil lead in diameter and one-half inch in length. Tags can be screw-shaped to identify trees or wooden items, or credit card shaped for use in access applications. The anti-theft hard plastic tags attached to merchandise in stores are RFID tags. In addition, heavy-duty 5- by 4- by 2-inch rectangular transponders used to track intermodal containers or heavy machinery, trucks, and railroad cars for maintenance and tracking applications are RFID tags.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type).

Passive RFID tags operate without a separate external power source and obtain operating power generated from the reader. Passive tags are consequently much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32 to 128 bits) that cannot be modified. Read-only tags most often operate as a license plate into a database, in the same way as linear barcodes reference a database containing modifiable product-specific information.

RFID systems are also distinguished by their frequency ranges. Low-frequency (30 KHz to 500 KHz) systems have short reading ranges and lower system costs. They are most commonly used in security access, asset tracking, and animal identification applications. High-frequency (850 MHz to 950 MHz and 2.4 GHz to 2.5 GHz) systems, offering long read ranges (greater than 90 feet) and high reading speeds, are used for such applications as railroad car tracking and automated toll collection. However, the higher performance of high-frequency RFID systems incurs higher system costs.

The significant advantage of all types of RFID systems is the noncontact, non-line-of-sight nature of the technology. Tags can be read through a variety of substances such as snow, fog, ice, paint, crusted grime, and other visually and environmentally challenging conditions, where barcodes or other optically read technologies would be useless. RFID tags can also be read in challenging circumstances at remarkable speeds, in most cases responding in less than 100 milliseconds. The read/write capability of an active RFID system is also a significant advantage in interactive applications such as work-in-process or maintenance tracking. Though it is a costlier technology (compared with barcode), RFID has become indispensable for a wide range of automated data collection and identification applications that would not be possible otherwise.

Developments in RFID technology continue to yield larger memory capacities, wider reading ranges, and faster processing. It is highly unlikely that the technology will ultimately replace barcode—even with the inevitable reduction in raw materials coupled with economies of scale, the integrated circuit in an RF tag will never be as cost-effective as a barcode label. However, RFID will continue to grow in its established niches where barcode or other optical technologies are not effective. If some standards commonality is achieved—whereby RFID equipment from different manufacturers can be used interchangeably—the market will very likely grow exponentially.

With the advent of more PFN/RFID interfacing either transmitter antenna protocols directly supported in the PFN or COTS reader interfaced with PFNs the history of sensing an item in transport can be reported in real-time to the FACT system and re burnt in the memory of and active Tag and stored locally in the PFN the tag is passing. Real-time reporting and accountable history will be useful for first responders stop a FACT event and to analytical investigations prior to and god for bid after an event has occurred (e.g. terrorist act) that threatens public safety or national security.

This technology barcode scanners the proprietary PFN/TRAC bag sign technology will help track and recover sensed data during transit. And the 1Ps stand-alone PFNs will be able to drive active sensing internal of a container or package to deliver FACT event data to other PFNs or communicate to a tag to insure multiple data recovery for a flagged event in transport. (e.g. Chemical or Bio toxins—to EPA CDC Customs local hazmat, police TSA homeland security FBI to be agency factored and nationally factored to increase or decrease security color code a long with resulting in the appropriate response by all contacted agencies).

Further communication systems interfaced first as COTS and then in more integrated architecture Another wireless data routing possibility for a separate data link is Honeywell's Email to air craft MediaSolv, MediaSolv partner and distributor Seattle Lab, and aircraft supplier Honeywell (NYSE: HON) have teamed together to provide passengers access to their messages, contacts, and calendars by plugging their laptops into phone jacks at their seats or just by turning on their wireless devices—including PDAs or WAP phones. Still to be approved but this broad band Data pipe to aircraft might serve well to deliver stream video and other data from the troubled aircraft down to the surface. In any event this service should be interfaced with and controlled by TRACker and any future 1A PFN aircraft controller/router to evaluate and control messaging during a FACT event.

911 proved one thing about cellular phones in air travel—it was a feasible way to communicate when all other flight communication systems were compromised by the hijackers via pilot elimination.

The question facing cellular phone use is how should it be controlled and used so as not to interfere with normal flight operations. Additionally, there will not be a total band on Cellular phone use world wide for long—so the question is how to insure the safe controlled use of this technology in the airborne environment.

As expected the PFN TRACker can be a solution for this problem. Allowing machines to police them selves and thus reduce workload and the possibility of interference with flight operations from wireless devices. First generation TRACker units would have the capacity to receive cellular transmissions (with a set of local wireless protocol data links chipset). Identify their ESN address and terminate their use locally if they were unauthorized, or experiencing mal functions, or in an un obtainable area in flight, or were detected to have interfered with any avionics systems via the wireless FACT Memory Balls and resident integrity program running in it's isolated format through out the airframe and communicating via approved DSRC to the authorized TRACker unit intercepting and controlling the wireless transmission.

One collateral value of the accountable receptive FACT Balls will be to help isolate, detect and document interference from all types of electrical oscillations. To put to rest what RF propagations negatively affect flight avionics in what specific aircraft. The FACT Ball receiver units configured to sense and receive broad-spectrum EMWs noise and record and time it as an event with GPS in space. The Fact Balls could be tuned and/or programmed to receive only new or unusual events as well for recording and reporting purposes. More accurate determinations can be made as to the actual effect these signals on flight operations and systems to help design future systems.

Another Data Link is the AirCell Phone Systems to FACT/TSA Ground Security Matrix "Data link" currently is the hot topic in aviation circles. Quite simply, the problem often cited these days is the limited availability of radio spectrum frequencies. Enter AirCell, with 50 megahertz of radio spectrum frequencies that were originally allocated for terrestrial communications, and are now also approved for AirCell equipped aircraft. With wide bandwidth and clear line-of-sight signals, AirCell is the fastest, most valuable method of delivering data to and from your aircraft. Imagine hooking up to the internet for the latest NexRad weather updates, or checking on the latest airport conditions and flight advisory services. Imagine updating your charts and maps in real time. With AirCell, you get much more than a high quality telephone . . . you get a total personal communications system for your aircraft."

The TRACker™ unit would employ this approved wireless transceiver technology and any packet data protocol to IP conversion codec both in the TRACker™ unit and in the receiving ground station gateway or connected terminal to the FACT/TAS or ATM security system via the appropriate dedicated gateway. (The reason for the many names and technologies mentioned is to show the flexibility of the system to interface with the various wireless technologies and avionics. And still since the 911 incident there is a lot of confusion on how to deal with security data needs and how to deal with flight operational situations with out negatively affecting each other).

As mentioned earlier another possible Cell link to try out the TRACker™: Airfone Unlike other cell phones, the casings of so-called air phones are sealed with copper to keep the frequencies from interfering with cockpit controls. In addition, the frequencies are directed to a receiver in the plane's belly and then down to specific ground radio base stations in North America, according to GTE Airfone, part of Verizon Communications.

Calls made 200 miles beyond the U.S. coastline run on a satellite system, where calls are sent to a satellite earth station rather than a radio base station", the company said. Also taken from the Airfone commercial publications. They also can handle data—There would be a protective copper sheath for the carryon Tracker unit to fit its use. The system (cost could be defrayed by ticket tax structured as is the 911 and NENA today. Additionally, data presented on web sights with advertisers can lower GTE Airfone cost for regular use—blue tooth local routing to identify customer ESNs and route calls to the Airfone in the seat closest to the wireless customer. With higher application for use in security and public web sites and through airlines and aviation manufacturers the cost will be reduced by economy of scale for these data link services as new business in new markets".

This technology is a chosen portion of the modality to build a prototype of the TRACker unit that will be tested in a Boeing Jet with the FAA and George Washington University if all parties agree on a joint effort. For this or any wireless telephony to be used to complete the wireless connection to IP connection via gateway to a TSA beta TRAC computer test center on the ground in Herdon, Va.; it must employ the appropriate codecs and run an appropriate digital data splitting program to create data packets from the airline recovered data to the communication protocols to stream the data through the interfaced wireless IP.

Data Capacity Concerns

First a simple system such as phase shift keying (PSK) for it's very robust and easy to implement qualities will be used to test the concept with limited flight data because this technology has low data rates. In PSK modulation, the shape of the wave is modified in neither amplitude nor frequency, but rather in phase. The phase can be thought of as a shift in time. In binary phase shift keying (BPSK), the phases for the sine wave start at either 0 or ¼. In BPSK modulation, only 1 bit is transmitted per cycle (called a symbol). In more complex modulation schemes, more than 1 bit is transmitted per symbol. The modulation scheme QPSK (quadrature phase shift keying) is similar to the BPSK. However, instead of only two separate phase states, QPSK uses four (0, ½ ¼, ¼, and ¾ ¼), carrying 2 bits per symbol. Like BPSK QPSK is used because of its robustness. However, because it modulates only 2 bits per symbol, it still is not very efficient for high-speed communications. Hence, higher bit rates require the use of significant bandwidth. Many modern fixed microwave communication systems are based on quadrature amplitude modulation (QAM). These systems have various levels of complexity. Although 64-QAM is very popular in both cable and wireless broadband products, 256-QAM is also being tested. The higher the density in QAM, the higher a signal-to-noise (s/n) ratio must be maintained to meet the required bit-error rates (BERs). These are the important physics of the cellular products that have to be considered for interfacing with the shorter-range product like blue tooth and 802.11. and the 5.7 GHZ Broadband frequencies for terrestrial interactive highway systems.

Any routing program between different wireless technologies will have to package data in factored packets so that when then reach their IP address they can be appropriately integrated and reconstituted no matter how they are routed. How the data is encoded also plays an important part in the equation. The data is usually scrambled, and a significant amount of forward error correction (FEC) data is also transmitted. Therefore, the system can recover those bits that are lost because of noise, multi-path, and interference. A significant improvement in BER is achieved using FEC for a given SNR at the receiver. These are with in the present wireless protocols of today's cellular systems. Developer kits for those skilled in the art will provide the needed data to write programming code to construct proper routing between DSRC Broad band and long range broad band wireless technologies interfaced in the PFN via the plug in hybrid substrate chipsets and any translation programs running in the Trusted remote activity controller/router for Emergency Action Messaging that is translated between disparate protocols. This is termed a (TEAM message and proprietary function of the PFN/TRAC system for FACT Security and first responders.

A wide enough broad band pipe will be needed for what ever data is considered essential to security services during a flight. This may not be an option for these first units with the frequencies available. But these units will determine all the exact specifications to get FAA and FCC approval for the appropriate bandwidths or they will open the door for these security data streams through existing data links to the surface in an isolate and protected architecture (e.g. PFN or TRACker unit).

TEAM Messaging is for Disparate Wireless Translation

One Translation program that will be in all PFNs and TRACker units is the Translation Emergency Action message or TEAM program for interfacing all the local wireless technologies with disparate protocols. This a universal emergency vocabulary of identifiable terms and action codes (to include the national color codes applied and including DES and military levels of threat corn if appropriate). These are sent as distinct identifiable signals to any PFN/TRAC unit that receives them. They are in turn rapidly converted to the same content message in a different wireless protocol and displayed or routed to the address requested or processed as a command function and performed as a remote control command. Also interfaced in the same PFN/TRAC controller/router is the necessary ID technologies to authorize restricted data to the correct individual to view and interact with the PFN unit and FACT security system. Some will be public alert and warnings and others could be a high security message for a specific person.

Developer kits exist with programmer key codes and hybrid chip sets may also exist for messaging into alphanumeric messages in displays via existing IP text protocols for most all the wireless technologies. The TEAM Message library is what has to be developed. These messages will not only be in text format but audible verbally as well (COTS text to speech algorithms exist but special ones well be used from the telecommunication industry and wireless payment industry and different languages by verbal request, either preprogrammed from past use, or FACT personal contact request and/or downloads in real-time from FACT mass data center (e.g. INS) if not enough local memory to hold all the entire language conversion library (these translation programs should be developed by the US government State Department, CIA and (echelon program). The programs should also run voice recognition and identification via digital oscilloscope algorithms to match prerecorded voices as well as psychological profiling software programs as are used by the FBI to detect stress and deception as well as panic and other emotions of excited human states. PFN and TRACker units with displays will also display a set of universal symbols pictures (video) and color codes will be written from algorithms developed for all types of emergency messages to cover for the level of alert with the best description of any emergency and/or suggested responses or specific directions for the individual or individuals interacting with the specific PFN. E.g. for a mass TEAM message—It would be possible to tie in the Doppler radar projections into the PFN/TRAC GPS system and activate a tornado alert not only on every PFN device but every known wireless device operating around the PFN and provide alphanumeric audio alerts, give directions and a count down to impact every ground zero position the storm was going to have.) The PFN/TRAC system and FACT security program is big brother and big mother and it has the accountability for all the activities performed. But it requires responsible citizenship. We the people can and must demand responsible and just use as authorized and proper use of the technology monitoring and management capacities.

There are many freedoms in our life and with each freedom comes specific responsibilities. We the people want all the freedoms so We the people have all the responsibilities for those freedoms (individually and not just as rights). The PFN/TRAC system is a wonderful tool and it can provide a wonderful quality of life for all of us, but we all have the responsibility to make sure it does. We and All have the Freedoms and Responsibilities. And the Responsibility to maintain the freedom and freely pass it on as the greatest gift to our fellow beings in what sometimes appears to be the most costly process of becoming a good soul. This is the best product We The People have to export and the one to provide us the greatest security.

Our Responsibility is Our Insurance Policy

Our challenge is to empower more individuals with freedom and responsibility and replace frustration, fear and the behavior of fanatical following. To replace the narcotic of ritualistic thought (blind following) with a genuine pursuit of happiness and a sense of well being (critical awareness). That allows for the healthy questions of existence to result in awareness and answers to share life with others openly and freely.

We the people have to start this with a genuine effort to understand the real fears and poor life conditions of the terrified and address their real and just fears as well as take just blame if we are responsible in some way. And help with a positive and helping hand, not token, but real nation building with them and with them as the architects and us the guidance and support. And with noninterference and no usury or profiteering)(e.g. Afghanistan can be a start) Iraq looks like the next effort to make change. Can we do it and not for the 10% sweet oil in the world either.

Not to look accurately at the issues makes us blind followers, and We the people are not fanatics in our pursuit of happiness. Our way of life and use of oil is no narcotic, We need it correct, but I is not an obsession, We are not dependent on it like a narcotic, we could give it up tomorrow correct. This is the hard decision when it comes down to perspective and way of life issues. The use of resources and provisioning of what the earth has to offer us is the real issue. These are the tough management decisions we are being judged by those who have less. Of course we can justify our need with our rationalization and when we have commandeered Iraq's national prospect to generate wealth for it self and we have put the other oil producing profiteers back in there place in the sand box; we will make a free life with Iraq—I would like to think so—How about you? Do you think We the People management will place another Mosquito monarch in Iraq so we can suck the oil dry?

Separate Modality—History on regular cellular phones in air travel; While presently commercial cellular phone use in the aircraft is prohibited in this country, it may not be always and especially in other parts of the world. For this reason they are considered interface capable communication links for the TRACker and the future aircraft interfaced 1A PFN/TRAC units These are the questionable reasons for the band on cellular phone use while flying.

FARS Quote: "while there is no definitive proof that cellular phones pose safety risks on airplanes—the devices should stay banned as a precautionary measure. The Federal Aviation Administration's Thomas McSweeny testified that restricting the use of these devices prevents an extremely remote chance of a disaster from taking place.

The FCC's Engineering and Technology Chief, Dale Hatfield, WOIFO, also testified. Hatfield says Commission rules also prohibit cellular transmissions aboard in-flight aircraft. That, he says, is because calls made from high altitudes keep phones on the ground from being able to use the same cellular telephone base station frequencies. Representative James McGovern urged the FAA to promote technology, which detects emissions from inside an aircraft cabin that could produce electromagnetic interference.

Only by Accident

FCC Law Do Not Apply to Sprint and ATT

"The ban does not extend to Sprint PCS and AT&T wireless phones because of an FCC "oversight," according to a former FCC engineer. Sprint PCS and AT&T wireless phones use a different frequency than other cell phones. The oversight might imply that a user of either phone could use them in flight, but most, if not all, airlines adhere to FAA guidelines and prohibit all mobile phones anyway. "No agency—not even the RTCA—has come up with definitive evidence of portable electronic devices interfering with a plane's instruments.

For this reason the memory ball the innovation was created to capture and record EMW and time and record them with the rest of the aircrafts avionics performance to better discern the cross environmental impact of these devices.

Other Views Globally on Cellular Use During Air Travel

Scandinavian Airlines System will test a wireless local area network called 802.11—or Wi-Fi—Additionally, this inventor wishes to explore with Motorola or Boeing if they have purchased the old iridian satellite phone technology of LEO satellites with the acquisition of the Hughes Satellite corporation—now the Boeing Satellite System BSS as another data link to be used for this application to supply a parallel security link for the AOC and Boeing ATM system A Possibly—the old lrridian Satellite phone system Low Earth Orbit satellites? Or BSS new 2 GHZ license and satellite system.

Obviously for their to be a seamless system on the ground and in the air space the system has to provide the architecture to interface all the competing technologies that are approved today with the flexibility to change in the future and to handle all the cross environmental controls need for carryon devices. With this simple fact their needs to be real-time policing and accountability for wireless use in aircraft in light of all the potential benefits and dangers from misuse and deliberate inappropriate use of these technologies. For that reason alone there is the need for an electronics policemen over wireless use in air-travel and the TRACker router and PFN/TRAC controller/router make perfect sense for national security and public safety in air travel and elsewhere.

In-Flight Network LLC is a joint venture entity formed by News Corporation (NYSE:NWSROK), a world leader in aviation electronics. Boeing and their avionics supply liners and others like ARINCs Communication Systems and Rockwell Collins (NYSE) just to mention a few, will all be approached to help develop and construct the PFN/TRAC units and TRACker units in any commercial arrangement that can work. The primary goal of TRAC Aviation Inc is to help the United States of America and her airline industry regain the public confidence and full use.

Additionally, cellular providers without question will want to enter the aircraft to serve their customers and having a platform that can handle and route these calls via one controller helps to eliminate the noise and reduce complaints both from interference on the surface and a loft and from lack of service or cost.

Another commercial off the shelf interface is a cellular router that has been designed for boats to funnel and route normal cell phones interfaced with tracker but miniaturized The Technology is >Britany Ferries-new Inter-wave communications system—BF "has contracted with Menlo Park, Calif.-based (Nasdaq: IWAV) to install a digital wireless base station on board the ship. The station will link into a VSAT (very small aperture terminal) satellite-based system from Geolink.

Private-branch telephone exchanges that are fed by satellites have been available on ships for several years, but Brittany Ferries said this is the first time a GSM base station has been installed on a cruise ship for passenger use.

Passengers use their regular mobile phones on and around the ship, just as if they were using a land-based network. The difference is that calls made outside the ship's cellular zone will be routed through a satellite install an Interwave "GSM Network in a Box" system Interwave's base station, the Wavexpress, is contained in a PC tower-sized unit that weighs about 50 pounds. The system uses four hardware modules: the CPU card, radio card, switching trunk card and the antennae connection card.

System Supports 16 Channels All of the modules use the same central processor unit and switching trunk modules, as well as the same core of library applications. Each Wavexpress can be configured to support up to 16 mobile phone channels.

The satellite capabilities and the GSM compact network system will enable the Val de Loire to provide its passengers with a service similar to international roaming on their phones, said Claude Barraud, president of Group Geolink, in a press release.

In September, Interwave joined BT A&M, an aeronautical and maritime telecommunications software producer, in a successful trial of a wireless communications system for P&O Cruises' flagship Aurora.

Other Cellular Applications Encroaching in to Airspace

Wireless on aircraft: use of mobile phones is forbidden by airlines because of concerns that it can interfere with an aircraft's radio and navigation systems.

BAE, which was created in November 1999 by as a result of a merger between British Aerospace and GEC Marconi Electronic Systems, intends to provide safe airborne wireless connections by equipping an aircraft with an antenna that is a scale model of the radio antenna used in terrestrial base stations Air-to-ground wireless service may not be limited much longer to pilots or passengers in private aircraft. BAE Systems is now moving toward deploying a technology that enables calls on commercial flights.

BAE and Scandinavian airline SAS announced in August they were developing an in-flight mobile phone service for aircraft named Cabin Call, which uses Interwave's wireless networking technology. The airline's systems are expected to be deployed in August.

These historical and present trends in wireless technologies are another reason for the TRACker to manage airwave traffic in the skies. They are also additional COTS interfacing that can enhance routing functions via the accountable protected TRACker unit. Industrial applicability to manage these technologies is demonstrated and TRACker technology offers characteristics and properties needed to standardize wireless routing, management for all applications in use around the globe. A flexible standard for different avionics and national laws via the PFN/TRAC System and FACT Security Program is programmable and scalable.

Figure 16:
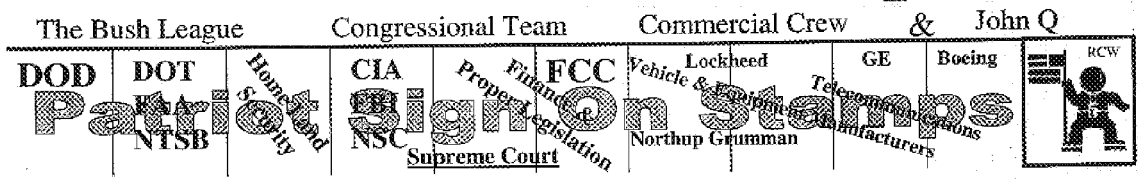
FIG. 16 A figure stating the need for cooperation from all the stakeholders.

FIG. 16 This figure was placed into the patent directly after 911 in keeping with the nature and scope of the invention to enlist and initiate joint cooperation from government, industry and the general public. Still today the Air travel/transport industry is hurting immensely in light of the terrorist acts of 911. The inventor and forming business associates of TRAC Aviation Inc. is carry forth the current thrust for the PFN/TRAC System and FACT Security program in aviation. This includes in roads with DOD and a major military contractor to develop this technology and to help insure safe secure movement in military transportation and commercial shipping. Additionally, TRAC Aviation Inc. has met with commercial aircraft manufacturers and government officials to move forward with all the innovative products of the PFN/TRAC System for safer more secure air travel. As FIG. 16, illustrates TRAC will maintain a commitment to those commercial, government and public interests to work hard and in a cooperative manner with all to safe the nation's skies and build back public trust in aviation transport. The intent of the invention is to provide the organizational platform for all the stakeholders and for all technologies to coordinate efforts for a free, safe and secure United States and World air travel system.

A Thought from a Life with Man and Machine:
Awareness

Whether innovating total industries or innovating a single company with automation and enhancing that automation with Artificial intelligence (AI) and Information Technologies (IT) via computer management; the difficulty has never been one of equipment or technical barriers. It invariably is human machine and human interfacing that makes or breaks an operating system. Success, performance and final out come of any design is a direct result of human acceptance and willingness to work with others the design and any improvements needed.

Before designing any technology, one has the responsibility to seriously walk in the shoes of all those affected by any innovation. And always plan for progressive adjustments, that are inclusive and proficient to be acceptable by all. With this said, the best invention or innovations are only possibilities and direction. It always takes the skills of leadership to empower all the stakeholders to join in a collaborative effort to make vision and innovation a reality and an improvement in life.

The PFN/TRAC invention and innovative FACT Security program provides feasibility and direction for good management on the earth. To complete this management system and make it functional, it will require everyone in FIG. 16. And to develop it's use with responsibility and respect, it will require everyone in the world.

Whether it will be a completed technical plan to operate a more secure and fulfilling life together depends on our own leadership and courage and ability to change. In a life together we are both leader and follower, which requires good timing and respect. Timing can be organized with good technical planning. Respect is hard learned and hard earned—this and change we are in charge of? AWARENESS rcw FIG. 17 The Trusted Remote Activity Controller provides all local vehicle or device control and event storage relative to PFN (Primary Focal Node) operation. It interfaces to an RF telemetry link, which may consist of a one or two way paging system. More sophisticated links could be used such as digital cellular or PCS (Personal Communication System) or application specific wireless. Typically, a Remote Management System (which may be as simple as a single page, or as complex as a controlling PC or Server) initiates a TRAC function, such as an automated guidance control, slow, stop and secure sequence involving terrestrial vehicles, equipment and aircraft. The signal or command is received securely (via encryption) and decoded by the TRAC. Optionally, a local display or audio speaker may provide local status of the TRAC function being executed, with appropriate progress tones, voice queues or displays to provide a local operator feedback relative to the progress of the function. In performing the function, all Activity controls are initiated by the TRAC and monitored by the TRAC from start to finish. This is accomplished through feedback sensors. The TRAC may interface with plug, play and program connectable technology and drive other sensors, other wireless communications audio and video. Sensors may be electrical, mechanical, fiber optic, infrared or other technologies. Since the function being performed requires a high level of accountability and trust that the sequence was in fact executed properly, every step of the process is monitored through appropriate feedback sensors and programming to attain the reliability and trust required. This positive feedback in the TRAC is the key feature which distinguishes the TRAC from other electronic or software controllers; making it a fully "trusted" system for the task being accomplished. Additionally, all events and status relative to the function are recorded locally in the Local Event Storage Memory. This is termed the System Function Data. The level of redundancy in storage of System Function Data and the level of additional feedback and checking required in order to verify the Activity or function was accomplished properly, is directly related to verification requirements. These requirements may be regulated and approved by local or federal law, law enforcement or insurance agencies, World Bank, EPA, ICC, SEC, FAA, FCC FBI, DOD, DOT, TSA, DOE or other regulatory agencies.

Figure 17:
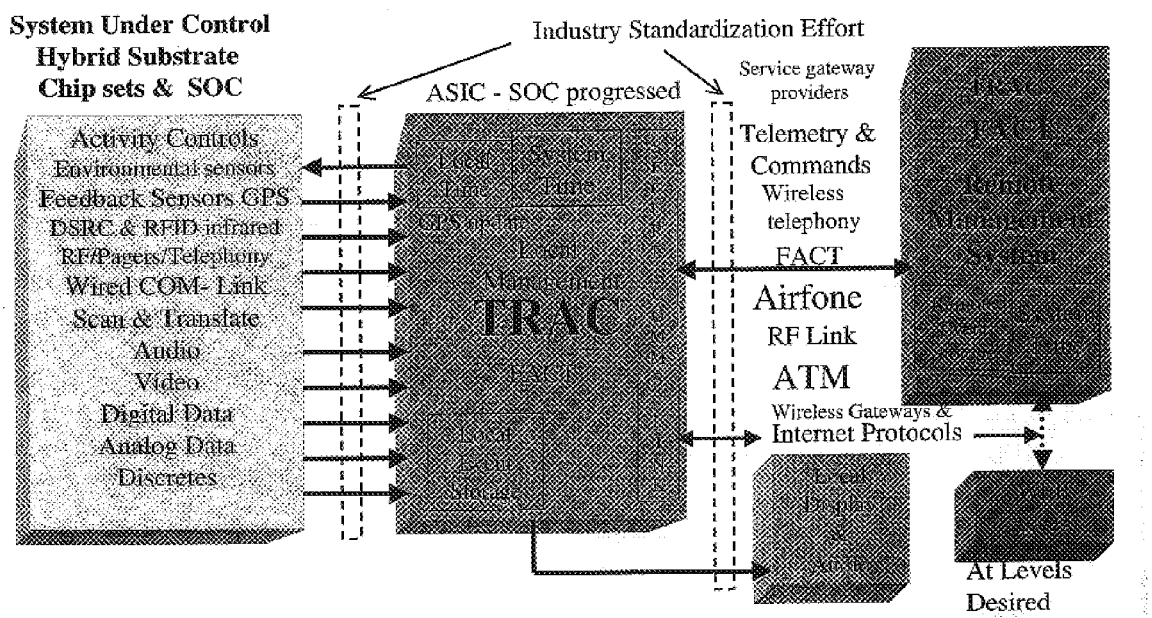
FIG. 17 The Trusted Remote Activity Controller.

This process in aircraft is greatly complicated with a more robust three environment and diverse air fames. The avionics details for the TRAC processing and progression of system under control SUC to perform robotics flight and remote control flying and landing is addressed through this application and two others avionics. FIG. 17 is to show the general architecture of TRAC/FACT reporting and responsiveness. The drawing explains the properties of accountable robotics, remote and shared machine controls via the TRAC design.

From earlier related filings it serves several functions for those skilled in the arts of electronics/wireless and computer networking. The figure shows a scalable technology from local and regional wireless remote control to national and global IP management as a network of interfaced FACT Intranets. Beginning, with sub set webs at each of the 429 airports that intern are connected via telecommunications, cable, satellite, microwave and fiber to FAA/AOC/TSA center (to be developed at air operations) in Herdon Va. A base for the FACT/TSA Aviation intranet is created The 200 AOC/TSA terminals are also linked to TSA/Herdon Center as shown in FIG. 10. And each terminal acts like a TRAC intranet in a greater portable network that is flexibly connected to each passing aircraft. Further, The TRAC is a mini hub for routing data and will send data packets via diverse communications determined by local routing algorithms (discussed through out the text). These software routing programs are running in the local TRAC processor stored in the protected PFN interface that receives stable power from every piece of equipment interfaced with a PFN unit and each unit maintains an emergency power supply for (completed operations).

These local PFN/TRAC processors and data storage receptacles are the means for a trusted accounting processes and the acceptable use of remote and shared equipment controls in society. Identifiable data packets (wireless/IP/encrypted) generated by the routing program in a TRAC unit are held in local in memory buffers and each buffer of every server in a FACT network for a time (to be determined by network engineers). Standard processing and packet tracking for completed messages (IP) will be employed with the exception of data storage of transparent messaging being securely stored at all levels until authorized FACT termination of data directives have been received to clear buffers. A secondary backup processing program at the appropriate application level use of recovered data will do a near real-time integrity check on data received via other dispersed communications system connected. This is to be engineered to be a very robust process for confirmation.

All real-time remote control wireless communications are dedicated and real-time sensitive by the synchronized clock time locally and systemically. There is a number of developed algorithms and software technologies being developed for this function and will be needed in TRAC RC processing programming to determine exact position in space and time with respect to other known objects and their movement in specific air space. Real-time dedicated communications with local robust robotics are to be priority and default operational backup or failsafe aspects of TRAC technology. To be used together with each other (exact relationship and programming to be determined specific to application, by those skilled in the art).

Processing Confirmation for Accountability

Interim progress of the sequence, activity or routing function may be optionally transmitted back to the remote management system through a 2-way phone, wireless, RF, or paging link. This may occur as the function is executing or may be programmed to occur after completion of the sequence, with accumulated data.

In the case of billing for service data routing will be stored locally in some cases and downloaded to wireless billing mass data centers in off hours depending on communications traffic. Or may be transmitted in real-time command string or headers accompanying the data packets, and directed for operational billing programs running in the commercial service providers infrastructures. Additionally these practices may change and will be determined by providers and their business requirement and protocols and any standards efforts rules regulations or law. In any event, local, redundant storage of both types of events is always contained within the PFN for subsequent or simultaneous retrieval of event information and proof for accountability purposes. The PFN enclosure and TRAC monitoring with tamper sensors guarantee the information has not been compromised and can be TRUSTED. These physical protections and electronic protections are detailed in related PFN/TRAC filings. Other types of information to include System Function Data (SFD file) may be stored in the TRAC Local Event Storage Memory for analytical or investigation recoveries.

Other Data may include digital or analog data not directly related to a function being monitored and executed by a host machine. But information gathered via authorized sensing technologies or accessories interfaced with the PFN/TRAC unit.

These may be fore the purposes of evaluating and determining of legal liability or be a useful tool for the collection of evidence or to recover impact data on the environment. The public and their legislators will determine what, how and when data can be recovered stored and used: The industry standards efforts and government agencies will develop, standards, code rules and regulations, the system analysts and integrators, the component engineers, the programmers and code writers will final design the hardware software and construct the architecture, the public will implement it and the courts, justice department and law enforcement (specific to application e.g. DOT/TSA) will professionally police operations to insure the will of the people is maintained in the implementation of the TRAC.

Examples of public monitoring include road conditions via surveillance audio and/or video, bio and chemical toxins, explosive detection and radiation etc and not just on the nations highways but in every aspect of life that there is movement (Transportation). All of which can be supported via interfaces with The TRAC unit and PFN protective structure. The use and application still has to be prescribed as stated in the above process. This critical point is a most important embodiment of the technology, This self-integrity capacity of the unit and system to detect tampering and access and determine the impacts of that action can serve to make the perpetrators accountable.

Additionally the invention and other technologies impacts on society and societies infrastructures as well as the world's environment and resources can equally be evaluated. Any injurious practices can be stopped or augmented in programming downloads in near real-time. To complete this task monitoring and management operation must be broad and professionally accomplished with the proper respect for privacy and personal injury. This cannot be over stated if this technology is to find use in a free society like the United states and should be applied and understood by all the stakeholder areas of interests. This is why it is threaded into the inventions specification fabric. Part of the technology of any invention is the technique to operate it and what to expect from that operation. Most invention specifications are far too irresponsible in this regard.

Data Handling and Storage

Special standards efforts involving those skilled in the legal arts and constitutional law to frame issues for public deliberation on personal and statistical data acquisition, handling and storage is an intricate portion of the invention's (La Technique). As mentioned earlier, to be trusted and accepted by society The TRAC has to be subject to review from it's inception and continually while in use. So will any process used to handle and store data. E.g. professional procedures need to be in place so that sensitive data for legal use recovered and disclosed E.g. discovery processes procedures that do not compromise and keeps pristine data until court convenes.

Other issues the different handling for statistical data and personal or private data handling.

Statistical data recovered without personal identifiers being used by the public for better public management. E.g. a 1P PFNTRAC unit a personally worn device doing biometrics reports on an individual's heart rate at the top of a long subway stair well via a DSRC as the individual passes a 1E PFN on an escalator out of service. The research program being run on cardiovascular research also asks for the persons age, sex, race, nationality any weight data their sex and any known medical conditions or medications data stored in the 1P PFN memory. However, no personal identifiers like name social security numbers health care or insurance data or address phone numbers or email can be accessed.

The data recovered is to be specific to statistical research to better plan a safe and healthier environment and warn citizens at risk of over taxing conditions from a movement task in their environment (like the stairs vs. an escalator for the cardiovascular compromised. The monitoring is done first to research real-life situations that might be hazardous to ones health and then warn them in discrete ways of the danger with general public notices and/or through a earpiece attached to the 1P PFN and delivered in an audio message to a particular person. A similar statistical data recovery for automobile use and highway system evaluation may be used with warnings of dangers in traffic movement. Then a 1E PFN driven sensor might pick up unusually high levels of gamma radiation and quarry all area PFNs and video attached systems with and without other radiation and explosive sensor arrays. Employing technologies like the Noise an order detection technology that can detect odors at the molecular level some 2000 times greater than a human's noise.

In this latter case the Local FACT event programming is initiated and personal PFNs are quarried to see who is in the area and what does the telemetry and video time synchronized images look like for the flagged radiation event being tracked. Telemetry like, what is the intensity of the radiation and what is the geographic position with audio video a list of PFN/ESN and remote control assets and human intervention assets like police special first responders all on one screen with individual screens being specifically monitored in TSA/FACT command center. Both of these scenarios are good reasons for acquiring data for public safety and national security, but how will it be used and how can we make sure the accountability of the TRAC serves the public good to protect our freedoms and does not invade them or harm us. This is the hard part to get right the human machine and human interfaces of the technology.

Inventor's Suggestion

Obviously, Civil Liberties should weigh in early and as an on going in process through the court system. But this alone does not keep time with the real-time nature of the invention and other IT technologies today Other groups should be sought out and funded to put a permanent public review process in place to feel the publics pulse and advise lawmakers to change the use of the invention as conditions warrant. Groups like The Charles F. Kettering Foundation or The National Issues Forums Institute—NIFIG. Org with their deliberative process on national issues. Another organization is Public Agenda, they to quarry the public to help determine public policy. Additionally, local efforts that seek to gain public opinion in shaping national and community oriented public policy need to be funded and put in place. Programs run by universities and community colleges like Maryland's Montgomery College's "Center for Community Leadership Development and Public Policy with their NIF deliberative Format and other human resource services.

All portions of the public should weigh in together as much as possible on policy implemented. The invention it self can function to quarry the public on issues and even set up issue framing data from logged comments and performs initial survey programs via unit and system programming and people participating in the process. E.g. One issue could be what are acceptable levels of police video monitoring to provide national security?. The Reason for this question— Possibly to determine the correct procedures and protocols for PFN/TRAC/Fact programming to match the national color codes and how to inform the public of these diminished rights of privacy and how they should be applied.

Implementation

TRAC implementation may be accomplished in many ways, depending on space or funding constraints and level of integration required for the system to control and to route. A PC-based system may be in the form of a desktop system, laptop, palmtop (PDA), personal communication unit (PCU) or (PC 104) or embedded system with a dedicated DOS or Windows based TRAC program, consisting of machine language, Basic, C, C++, Visual Basic, Visual C or C++, or other high level language which accomplishes the TRAC function through software control. Interfaces to the System Under Control (SUC) may be accomplished through appropriate I/O cards, either analog or digital, plug and play chipsets with protocols in firmware or PC compatible Modems or Cellular phone interfaces (or chipset) provide the interface to the Remote Management System (RMS) and for routing options. SUC and RMS interfaces may be in the form of ISA, PCI, PCMCIA, VME, Compact PCI, Future Buss, or other commercial interfaces compatible with the PC-based system used. More compact and custom implementations of the TRAC may consist of dedicated state machine controller implementations in which TRAC functions are executed through embedded firmware These implementations may incorporate multi-chip (or Hybrid) solutions using EPROM or EEPROM interfaced to Arithmetic Logic Units (ALU), I/O ports and discrete memory elements. They may also be microprocessor or microcomputer based. A large variety of board level products are commercially available for such an implementation. Single chip or high-density implementations might consist of Field Programmable Gate Array (FPGA) or Application Specific Integrated Circuit (ASIC) based devices and Systems On a Chip or SOC technology. Additionally, wireless router functions and signal relaying (digipeating) might be accomplished with the different wireless protocols in hybrid chipsets and firmware on Plug and play (PC 104) interface board or I/O cards and would be developed from developer kits provided from the 18 most frequently used wireless telephony protocols. The same process (developer kits) would be used by the skilled in the art to develop a universal routing software program termed (TEAM translation software) to provide flexible Translation of Emergency Action Messages (or TEAM messages) for FACT Security communications within the PFN/TRAC controller/router architecture.

Universal Communicator Program

This master routing/translation software package is to processes same content message data between disparate wireless protocols via a universal library of specific emergency messages and repeat them through out the PFN system as routed. These same universal messages are to be translated into all known human languages. This same program is to have a voice recognition algorithm to identify languages spoken and a universal audio and video set of pictures to accompany these TEAM messages.

All TRAC implementations may incorporate all sequencer, firmware, I/O and storage functions on a single device and would provide the highest level of integration and smallest size. Display, Video and Audio (Auxiliary Data) for the TRAC can be in many forms and types. These may range from analog systems, in which tape or other magnetic media store the analog signal, to digital systems in which data is stored on hard disks, EEPROM or RAM. Data format may be modulated through FM or AM, compressed, packetized or otherwise encoded for reduced bandwidth or for transmission over the Internet (packet audio and video).

The vast amount of possibilities and form for the TRAC are deliberately designed into the PFN interface and will be a continuing effort to be as inclusive as possible of all technologies to provide versatility and universality for the public and the free market system.

Hardware Implementation are to be Progressive and Flexible

Trusted Remote Activity Controller is First

COTS Based PC—Programmable Controller (PC 104)—Custom Logic Sequencer mP (Micro processor) FPGA (Field Programmable Gate Array) Custom Gate Array (ASICs) Systems On a Chip (SOC)

TRAC Features

Industry Accepted and Trusted System, Uses "Industry Standard" Interfaces, Provides Accountability Requirements, Aggressive Remote Control Functions, It is Programmable & Modular, Scaleable, provides Level of Redundancy, Event Storage, Algorithm Type is Dependent on Application Accountability Requirements, Resides in PFN (PFN Provides Physical Security) Remote Management Command Authentication, Local System Control and Event Storage, Software/Algorithms Bank/Stock Exchange Transaction Products & Algorithms RPV (Remotely Piloted Vehicle) Technology, Security, Commercial: 128/64 bit Encryption (Web Transactions), Military: DES (Data Encryption Standard) and all the FACT Program functions programmed in the different software protocols to operate on local hardware and PFN/TRAC system architecture Interfaces Automotive industry standardization efforts, IEEE standardization efforts, avionics standardizations efforts, rail standardization efforts, marine standardization efforts, electronics standardizations efforts, computer standardizations efforts, H-Rel connectors, actuators, sensors, signal levels Wireless Telephony and Data Interfaces Digital Cellular, PCS, 56K Modem, RF & Pager Technology, all the approved aviation wireless technologies, all marine, interactive highways all DSRC, all emergency frequencies AIP, Airline Control Protocol, Data link layer polled protocol that runs in full-duplex mode over synchronous serial (V.24) lines and uses the binary-coded decimal (BCD) character set., Airline Product Set ALPS circuit, And a communication path across a TCP connection between a host reservation system and an ASCU. When MATIP encapsulation is used on an ALPS circuit, it is equivalent to a MATIP session., ALPS Tunneling Protocol airline protocol, Generic term that refers to the airline reservation system data and the protocols, such as P1024B (ALC), P1024C (UTS), and MATIP, that transport the data between the mainframe and the ASCUs., Airline X.25.

Dynamic Host Configuration Protocol (DHCP), [RFC-2131], a framework for passing configuration information to hosts on a TCP/IP network Time of Day Protocol [RFC-868], to obtain the time of day Data or network Edge or access router DSP medium RF medium (coax, modulator/demodulator, antenna)

RF management software

Wireless Standards Effort

PFN/TRAC units will provide a less expensive, more comprehensive, secure and stable mobile platform for the development of wireless routing and interfacing with equipment, via the portable WLAN network created. The system is to start Internet data packet routing at the earliest point data is generated and apply this technology universally across the wireless spectrum. The system will always remain diverse and need planning to insure enough of the properly programmed PFNs or more universal PFN units are present for adequate coverage of all types of wireless. The process will always be an evolving one of forward and backward engineering. However, the flexible interfacing via Plug, play and program architecture at local routing interfaces (proprietary to the PFN/TRAC system) will aid immensely in this process. With more dispersed maintenance to include the individual public to lower industry cost. The PFN/TRAC System was invented to be the machine messaging system for the United States to automate all equipment controls. As standards emerge and technologies merge the specific technology will be refined and miniaturized into SOC configurations.

There is always to be a flexible plug, play and program interface capacity to grow and keep current with new technology and accommodate legacy technologies in the PFN/TRAC System and FACT security network. The FACT network via it's industry specific registries must be programmed and agency staffed and capable to recognize all new interfacing and system augmentation and provide a review process and integrity check; both at the local interface PFN/TRAC unit and system wide to check for alerts or anomalies. Either because of FACT programming or to write code to flag events as FACT alerts and upload any critical data to all effected PFN./TRAC units for the most real-time preprogrammed responsiveness.

At least 18 different types of wireless are in commercial use today. Therefore, as PFN/TRAC technology becomes more mainstream, many of the applications will migrate to specific architectures and product interfaces The different types of wireless are quite unique to each other on numerous levels, and require specific types of expertise to deploy, use, and maintain them in deployment.

Like every access medium or technology, wireless has its pros and cons. The pros include these:

It's much less expensive to deploy than hardwiring.

It's much quicker to deploy—.

Wireless can go in inaccessible terrain.

It involves an inherent high degree of security, and additional security layers can be added.

Wireless provides broadband mobility,

PFN/TRAC wireless link will be a fully featured router, which means that it must provide VPN, enterprise toll bypass, and MDU/MTU access services where these are not present by commercial providers interfaced in the local unit to include with cross protocol routing. The fundamental elements remain relatively constant between the wireless providers allowing PFN/TRAC router access to translate between the protocols retrievable at Layer 2 of the wireless protocol stack. The majority of wireless vendors access the wireless stack at layer 2 some at Layer 3 as well like Cisco Systems routing. Depending on application any specific PFN/TRAC unit would have programming at least for one may be both accesses layers to the stack. And somewhere in any specific intranet e.g. FACT/TSA airport terminal a PFN/TRAC unit in the relay matrix would have both access to digi-peat messaging.

A Data Handling Modality for Wireless PFN Machine Messaging

The protocol stack implemented could be based on the DOCSIS standards developed by the Cable Labs consortium. The principal function of the wireless portions of the TRAC unit is to transmit Internet Protocol (IP) packets transparently between TRAC controller/routers and the FACT security control matrix via direct dial ups or through local intranets. Ideally, certain management functions could also ride on IP to include spectrum management functions (for identification, addressing, accounting) and software downloading. Both ends of any wireless link are to be IP hosts on the network matrix, and they fully support standard IP and Logical Link Control (LLC) protocols, as defined by the EEE 802 LAN/MAN Standards Committee standards wherever appropriate (for wireless telephony). The commercial servers generally support the IP and Address Resolution Protocol (ARP) protocols over DIX and SNAP link layer framing.

The primary function of the wireless system is to forward packets. As such, data forwarding through the commercial servers is done with transparent bridging or network layer forwarding such as routing and IP switching. Data forwarding through the PFN/TRAC system could be accomplished with link layer transparent bridging based on IP. Forwarding could be similar to [ISO/IEC10038] as per any applicable DOCSIS specifications. Both ends should then support any spanning-tree protocols to include capability to filter 802.1 d bridge PDUs (BPDUs) with out loops in specific intranets and support for Internet Group Management Protocol (IGMP) multicasting. FACT and special encryption applications would be above the network layer, This transparent IP capability will be bearer for higher-layer services. Additional translation programming between protocols should run at these higher levels. Use of these services will be transparent at the unit level unless the unit is running these higher applications by authorization and identification (e.g. DES or special TSA set as PFN/TRAC DET terminals), In addition to the transport of user data, several network management and operation capabilities are supported at both ends of any intended messaging.

The Primary Focal Node access wireless architecture as a router allows it to serve as a hub or mini relay station serving other nodes (PFN/TRAC units in a WLAN or portable network. In the above described application It is a point-to-multipoint architecture in the sense that the entire bandwidth on the upstream and downstream is shared among all the responsive PFN/TRAC units. The protocol stack implemented to make all this work is based on the DOCSIS standards developed by the Cable Labs consortium. This one proposed modality of routing via the PFN/TRAC controller/router to construct the flexible web.

PFN/TRAC Unit Characteristics in FACT TSA Air Travel Network

They have local event memory storage in protected containments; report to mass data management and storage centers at the airport; they can have wireless and wired connections; and multiple communication technologies and protocols; and have automated radio frequency scanning and translation between different wireless protocols. In addition, PFN's have back up power supplies; they provide the means to add electrical functions to legacy equipment; interface separate equipment and existing security systems into one management system; and respond locally and to repeat messages and signals to and from each other as well as to the remote portions of the system; they provide their physical location (GPS or recoded fixed address) with the data they report; and can drive audio and video equipment and other data recovery devices; they can operate automated robust actuators and equipment controls; they perform real-time remote control with accountability; they perform their own integrity checks and of assets interfaced and inventory with them; they can perform self maintenance checks and diagnostics; and affect repairs automatically and remotely; they can detect tampering; can operate encrypted programming PGP and DES; as well as operate independently preprogrammed and robotics functions; they can operate electronic payment industry programs and ID programs; and drive Card swipes; Explosive Detection Equipment, and all sorts of transducers, sensor arrays; PFN/TRAC router functions—Network data flow to the remote management system and provide local robust broad spectrum data and communications routing Elements of a Total Management and Security Network Solution for Transportation Premises networks (PFN Portable Network) e.g. Airports, Ports, Rail Terminals, Installations, Borders Access networks E.g. Primary Intranet FACT/FAA/TSA Terminal Command Center and National Air Travel Core networks DOT/FACT/TSA National Mass Data handling and storage matrix of intranets for air, land, sea, boarder customs, and national security agencies homeland security Network management PFN/TRAC System and FACT program Billing/OSS PFN/TRAC system, electronic payment industry, etc A fully comprehensive wireless solution must also include the issues of deployment, maintenance, legacy, migration, and value propositions. The scope of what comprises a fully comprehensive solution is addressed in this filing and the related filings.

Figure 18:
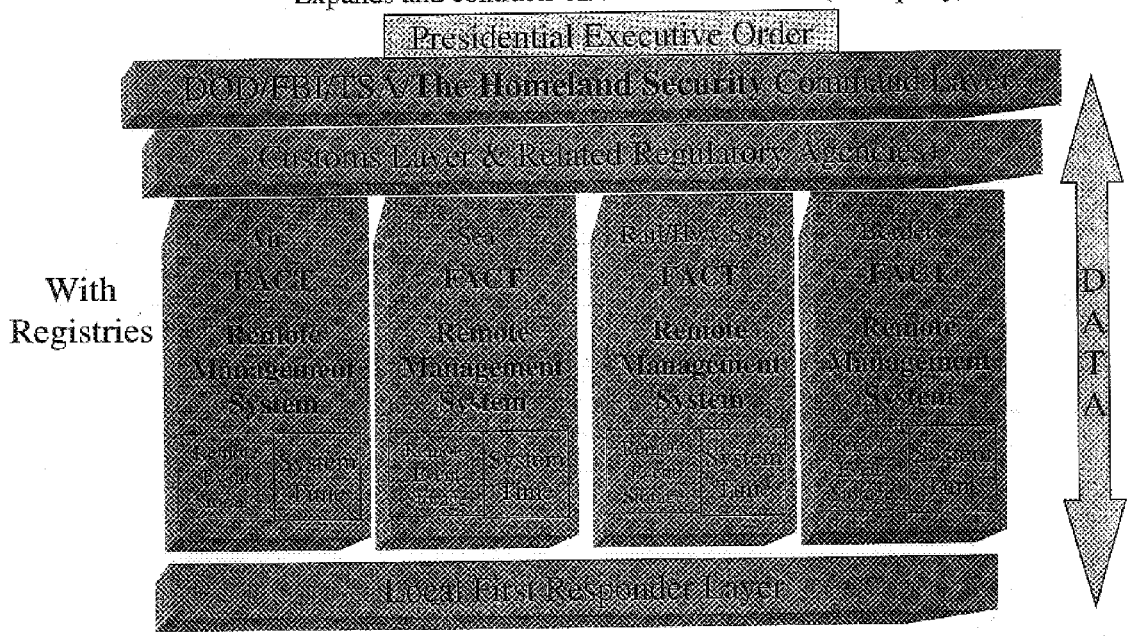
FIG. 18 The FACT Security Program in layers.

FIG. 18 In FIG. 18 the FACT Security Program is to have layers of redundant reporting from multiple pathways that are time and geographic synchronized as well as, identifiable in nature, origin and communication path through out a homeland defense/security matrix. The very top bock is only exemplary of the security agencies network via IP at this level. The list is long to include NSC,NSA, Secret Service, CIA and the special security responsible components of the three branches of Government Executive, Legislative and Judicial. (possibly a new judicial function into the procedures and protocols for an interactive accountable use of the FACT security program). At This highest-level procedures, will need to be determined and agreed upon to maintain the balance of powers and protect the public's interest.

Accountability

Personal and agency identifiers with traceable data telemetry for system access, use and commands will be reported and recorded through out the entire system to include this the highest national security FACT Command level. The access to this data will be denied and transparent—system wide when classified Secret, Top secret and/or to include any of the appropriate terms used for classified data. Application viewing and access to data can be controlled via personal ID clearance and Data Encrypted PFN/TRAC interface Terminal protocol (to be determined and approved by each security agency for agency specific data as a data handling software directive and added to the data packets).

Seam

This message program is to provide guarded mobile and flexible access to the highest level of security from almost anywhere. This program messages will be termed SEAM messages for Security Emergency Action message. They of course will be transparent in the system and use compatible wireless transfer and translations to maintain accurate and complete content delivery when messages are passed through different wireless protocols. No transcribing through the universal TEAM language libraries, here.

However, there will always be real-time total access to the universal communication program if security command agencies require this to complete operations.

Generally, the plan is for a central homeland security command, but this could be modular and/or transferable to different locations as well as the master control staff changed E.g. Enchelon, NORAD combined with TSA AOC and Emergency response Center or dispersed. Procedures and protocols need to be determined and these protocols need to remain top secret as well as be altered with all the necessary encryption algorithms for coded commands from time to time and done with integrity checks before activation of any changes. (integrity check protocols will need to be determined as well).

TRAC/FACT is all about accountability to be trusted and respected by the public. National Security has to act responsible to that ideology and way of life, both, professionally and respectfully as a member of that public. With that said the individuals performing these tasks deserve the highest respect and appreciation in their efforts to protect the public/the nation.

Freedom of Information or FOIA is a special attention issue for the release of any data that could be used to place judgment on the individuals serving the nation and the public at all levels of the FACT program. Improprieties (e.g. negligence, deliberate intrusion of privacy with out cause or for personal reason will be intolerable and criminal, but risk management studies must be conducted to determine the liability/insurance issues and indemnity policy for personal performance for these inherent tough decisions. Additionally rational limits for damages have to be determined and standardized for real-life accidents and unforeseen equipment failures.

The second block termed "Customs" layer is an example of all the individual government agencies law enforcement and security departments interface Layer. The flow is interactive and multidirectional throughout all the layers and all the directions through all that is interface. However, there are responsibilities, procedures and protocols to be determined for this interaction.

The four big blocks below the second layer are the basis of the TSA matrix to monitor movement and mange that movement. These intranets for the FACT Security matrix are only indicative of all the intranets public and private that will someday be interfaced. Transportation applications have been chosen because the management of movement is basic to security to push back our borders and internally continue to enforce our border policies. This is a flexible and doable architecture for Homeland Security. The concept being good efficient traffic management in all transportation platforms and their choke points frees up movement (helps the economy and provides the infrastructure to support seamless security throughout the nation.

All agencies/department intranets responsive in the FACT security matrix will support a FACT registry operation applicable to the to their appropriate regulatory duties. The four intranets shown in FIG. 18 are displayed here for illustration purpose not to be considered a final inclusive design. DOT alone with FAA, NTSB AOC, etc would be just some of the agencies for the AIR FACT intranet displayed in FIG. 18. All these separate agencies or responding sub set intranets would have message capacity to the other agencies in the other blocks. Additionally, these areas are also chosen for their basic commercial and industrial design to be the basis of support for the hardware interface platforms (PFN/TRAC router unit) at the component level.

The local first responder bar or bottom block is part of this local WLAN or portable network that is receiving automated FACT event alerts do to Preprogramming in the individual PFNs. They are also receiving data from FACT TSA Security command. Specific scenarios and responses have to be projected an determined in an on going process to develop the most optimum and consistent results and use of the PFN/TRAC system and FACT Security program.

FIG. 19 This figure shows the basic wireless communications being considered for the first responders to have access via local 1E, 1SV, 1Ps and the TRACker units through responsive connections with their 1p 1Ps personal communication interface belts or other personal PFN configurations; supported by the PFNTRAC/router architecture. The wireless interfaced will be available for FACT Security functions. Incoming data to a FACT event area will be supported by every working PFN/TRAC unit and have that data and information delivered on interfaced displays, and audio systems for the best possible human to machine interface and control. Additionally to these wireless services would be various DSRC communication and would include in some cases infrared and laser communications for local LOS or line of sight machine access and control functions. These applications are detailed in earlier terrestrial PFN/TRAC applications for local law enforcement tools as part of the Federal Access and Control Technology.

Example Application

1E PFN equipment controllers coupled with building security systems, can make above wireless links responsive with public address systems as well as mass phone and computer messaging system to wam civilians of impending danger. All initiated from an early warning triggered by a flagged flight trajectory processed in an ATM/AOC system from a TRACker unit) Other security markers would be used as well in a FACT program (pilot/passenger panic signal and video surveillance surface monitored) to determine a flight threat and coordinate surface response from FACT/TSA command system processing of GPS/geographic preprogrammed high probability target profiling that updates homeland security colors in all HMI Display units and communication mediums for general response and specific area responses. Then local tactical command gives minute by minute optimal instructions to manage emergency evacuation procedures to the weakest link—the properly trained citizen.(just kidding)—humanity responds remarkably well under pressure—when properly trained to use a technology—this training is quintessential) A total response could include operating People Transport devices (elevators and access ways) as well as fire prevention, smoke and ventilation controls remotely and optimally to save lives. Additionally, People would be specifically trained to perform virtual fire fighting from special command support centers locally (safe position) and from remote locations. Support and assistance through building robotics and building occupants that were educated in Civil Defense procedures and protocols could help immeasurably.

Personal PFN units with their GPS coordinates calibrated on command center map displays as mobile assets, coupled with public safety radio and commercial TV coverage delivered directly to the first responder and all area wide PFNs will also aid immensely to coordinate the rescue effort. Hopefully, coordinated communications in all remote command centers with all the individuals responding locally can limit the loss of life experienced by NY firefighters responding to the WTC-No.1 Tower.

With coordinated well informed communications and the lessons of 911 learned, we can help protect the brave men and women that perform so special of a public safety service for our homeland safety and security. (Action plans that corTelate with HS color codes in response to data received and processed can alert everyone to work together and well planned procedures and protocols with every citizen working with the first responders and coordinated equipment will give more of us and hopefully all of us the edge we need in any FACT event.

Figure 20:
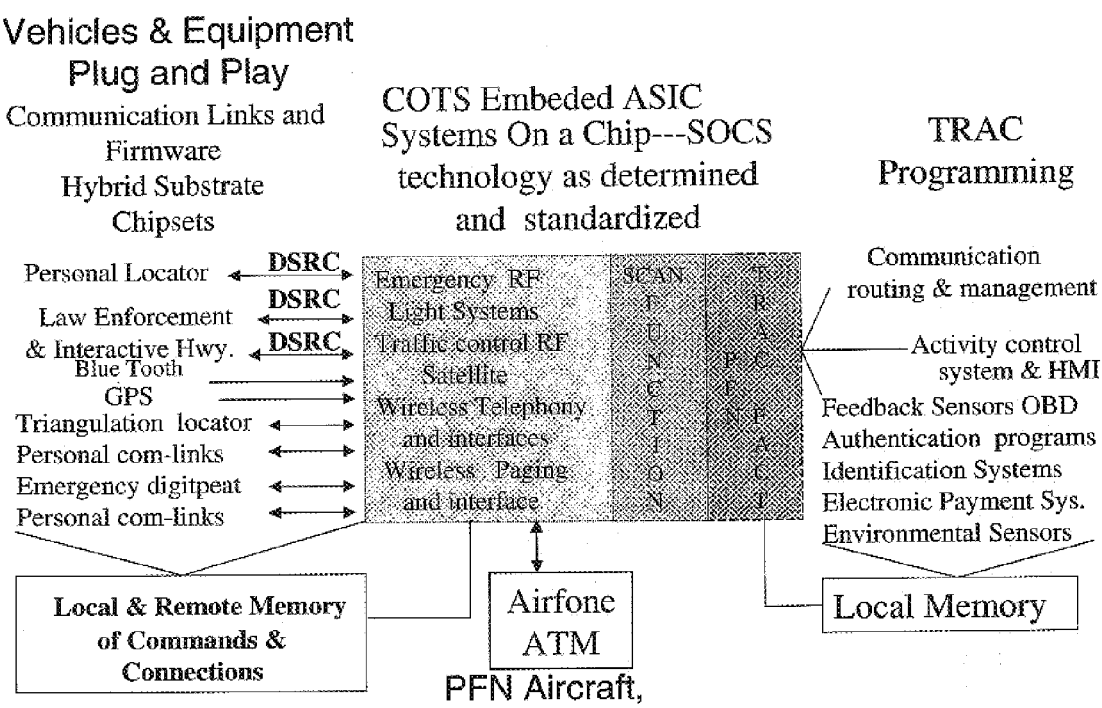
FIG. 20 illustrates a multiple receiving scan process.

FIG. 20 The drawing 20 illustrates a multiple receiving scan process. As stated in earlier figures a multiple of wireless protocols are interfaced to the TRAC processor in a number of ways depending on the nature of the hardware and development of the technology. Basically this scan process is the first stage of the PFN receiving wireless communications. The PFN/TRAC unit is configured with the appropriate antenna to accommodate all the wireless interfaced and in some cases a broad-spectrum antenna for counting frequencies. A scan program either running in the transceiver circuit section (e.g. chipsets or TRAC processor section interfaced or integrated recognizes messages in a frequency band of one of the wireless interfaced in the PFN/TRAC unit. If the signal has a particular address not relevant to the unit ESN or ID it scans past to the next activity.

One function of the scan process is for the unit to do environmental EMF and EMW surveying for security control and management of remote control functions and to do environmental research on areas to maximize and/organize transmissions and reception and to address health and safety issues regarding electromagnetic fields, presence intensity and any PFN correlated sensed facts as to their effects. This data is to be maintained in a buffer and memory storage or the TRAC PFN processor or extended memory receptacle.

Another function of the scan process involves a TEAM messages which could be received on one or more wireless technologies actively interfaced and with simultaneous signal reception one is stored in a buffer for near-real-time review while the best signal is processed immediately.

Universal Communicator Program

This master routing/translation software package running in the TRAC processor but augmented by with TEAM programming in the wireless software interfaced in any particular PFN/TRAC unit processes same content message data between disparate wireless protocols via a universal library of specific emergency messages and then routes or repeat them to another wireless interfaced to complete the translation process in and through out the PFN system. These same universal messages are to be translated into all known human languages as well and available to the appropriate persons along with public TEAM messages. This same program is to have a voice recognition algorithm to identify languages spoken and a universal audio and video set of pictures to accompany these TEAM messages.

And be Delivered by These Interfaced Accessories

A third function is the portable network. Part of the FACT function is to inventory interfaced components and to maintain a working inventory of associated materials. In this case the PFNs are mini repeating stations to those agency intranets in FIG. 19 support FACT registries for every electronic component that can be interfaced with a car, plane, boat, train, machine or piece of equipment. This is true for 1Ps standalone PFNs as well. This is the basis for the traceable portable network a machine messaging matrix or web that is flexible and mobile. For example a number of materials could be transported across the country and their preprogrammed imed communications would quarry each other to see if they were in the same area and recognize when the wer not and report it back direct to the FACT control center for that intranet. This data would be re transmitted to all the intranets by IP and all intranets would up load this data to their PFN assets so when a scanning PFN identified the lost signal it would report the interrogating PFN GPS if the signal did not provide tracking e.g. an RFID interface not another short range PFN.

Forth is locating program for non-GPS units. The scan process would have an algorithm that recognized time reception of the same signal and strength and be able to apply it's known position history (fixed address or GPS coordinate) with other PFNs in the WLAN and determine position of the non GPS asset.(automate triangulation algorithm running in the scanner program and driven by the wireless receptions and frequencies counted.

Fifth Scanning Routing Function with FCC FACT for System Integrity and Proper Use of the Airwaves The Federal access and control technology—specifically FACT/FCC will need to approve this PFN/TRAC scan function and employ it. All PFNs or TRACker routers could be configured to scan for all sorts of electromagnetic frequencies and EM wave propagations/transmissions or random oscillations as a precursor and maintenance procedure to safely perform wireless access and control of communications and machinery to protect the public's safety and national security. With terrorist looking for ways to harm the united state we have to safe and protect our remote controls and airwaves. The PFN/TRAC system is all about protection and detection and this scanner function is but one electronic policemen on the job looking for unwanted and unauthorized transmissions.

By design this is to be part of the FCCFACT regulatory process and their registry program for the communication commission to review data generated by their FACT program when making licensing decisions or enforcing it's regulations. PFNs could deliver clear evidence of over saturated areas with high noise and help the FCC delineate how best to license the airwaves and protect and mange this public asset.

Additional Scanning Program

The Technology plans to explore the use of the deep space radio telescope signal search program to discover intelligent life in space. The average public was asked to help provide processing power (PC Based software) to run the software algorithms. For the PFN/TRAC system this would be reduce or customized with known transmissions filtered out in some cases and only looking for unauthorized or never detected occurrences (or special FACT event anomalies).

FIG. 21 FIG. 21 This Figure illustrates a wireless tracking network locating a lost child. The same process would be used at an airport to track human movement and interface directly with the machines vehicles, equipment and aircraft in the PFN/TRAC management matrix and seamless security network. All types of 1P PFNs or 1ps Standalone (totally self powered units) communicate with the 1 E equipment, 1SV surface vehicle PFNs 1a tracker units and 1A PFN/TRAC units. The personal PFNs can be belts like the ones used later to detail types of wireless communications and they can be placed on or in people, equipment, machines, materials, baggage, to for a portable network to track a desired mass of assets traveling or being transported together or a way to follow each and every piece of material anywhere. These self powered 1 P PFNs are generally limited is size, amount of wireless options and their responsive distance, therefore the repeating and relaying of messaging is a major function of the system.

Small low powered transceivers transponders and technologies like RFID tag, are able to function through the repeating function of the PFN/TRAC units in each vehicle and equipment platform where there is stable current to energize functions and re-energize emergency batteries to insure a consistent reliable and redundant network function through mass mini repeating stations or routing nodes. Not only for tracking and telemetry of movement but to perform bidirectional accountable remote control via the machines that hosts these PFN units.

When the personal PFN/TRAC units attached to individuals communicates with equipment, machines, vehicles and other PFNs capable of repeating emergency messages through translation or repeat communication protocols and relay messages via more powerful equipment PFNs with long range communications and stable energy sources their limited range is given far greater reach to deliver data. The flexible mobile web allows for endless tracking and accountable robust remote activity control if deemed necessary.

For an example, personal units can be designed for criminal applications (and indeed some similar devices could operate to increase their distance through FACT network and PFN/TRAC repeat technology. Other applications include; child tracking, medical telemetry with automated medication and/or for the criminal or criminally insane being transported by air transportation. Even debilitating responses in an emergency can be sent if considered a viable solution (These are at best near real-time though—it would be ideal to have real-time monitoring at least) These units could interface through aircraft, cars, trains, a bull dozer, a printing press or any machine using PFN/TRAC Unit and FACT programming allowing for the tracking through out a national matrix of responsive PFNs. Possibly used with illegal immigrants that may have questionable intentions in their visit and/or the conditionally released to provide more freedom of movement with an improved level of public safety. (Uses to be determined legally and practically)

These devices can be configured to provide Biometrics from the individual wearing them and with scanners and sensors interfaced to these units (and other PFNs) these units could recover the same kind of data from others if the need be (e.g. applications like nurses, doctors, EMTs, stewards, pilots, police and even the mechanic or service personnel for ID purposes via the Biometric data transfer. 1P personal units would have value for flight crews to determine healthy authorized flight staff or the medically ill when transported by air, or for tracking children traveling alone, pets and/or those with diminished mental capacities. The specific intranet systems could always be in contact via the matrix of equipment and 1P PFN/TRAC units.

Additionally these personal units if only DSRC will translate and relay to Cellular in on board TRACker units and/or 1A PFN/TRAC controller/routers to link personal body telemetry (Heart and respiration) via fabric sensors supported by belt, bracelet and/or band mounts or implanted in a personnel to feed critical data to surface security and/or medical experts providing real-time connectivity with the most up dated information to act upon. These systems will support ID sensing systems so that Flight crew and airport authorities and legitimate work personnel can process any individuals ID information or data. Either digital Iris scan/face scan or magnetic swipe or canvas for data via smart card or finger print or DNA technologies. The units provide for sensor arrays to be powered and to process their data back to the TRACker Unit or any other PFN/TRAC unit 1E 1A or another 1P PFN in the machine messaging matrix either aloft or terrestrially through the terminal matrix and elsewhere via long distance dialups for special NENA data gateways via cellular interfaces for all specific intranets. This creates multiple modalities of connectivity for redundancy.

Description of Triangulation and Miniaturized Personal PFNS

The equipment units fixed positions are known or determined from interfaced GPS receivers that apply location data and the units electronic identifiers ESN or other industry standard for tracking in the unit via the appropriate FACT intranet and registry. The identifiers accompany any retransmission as well as a strength of signal received coefficient for processing and display via the application specific programming in a capture window (of txt, video, audio, graphics, and with any warning alerts on a calibrated campus map and/or terminal floor plan displays in the FACT TSA terminal center. With a number of 1 E, 1 SV and TRACker PFNS providing (strength of signal coefficients) from their known locations to be factored by a triangulation algorithm running in the FACT Security program, seamless inexpensive tracking of the less powerful & simplistic transmitters can be accomplished. The software would adjust through the real time multiple receptions to the varying strength of the power source in the weaker short range personal PFNS and the location is determined by strength and timing of the signal vectoring to known PFN locations with a reception history from these specific coordinates.

The actual received signal might be a combination of a primary signal and several same signal echoes recovered by a PFN. Because the distance traveled by the original signal is shorter than the bounced signal, the time differential causes two signals to be received. Fixed addressed PFNs or with hot GPS readings would archive and compare a number of signals received from these minimal current 1 P PFNs or COTS RFID unit (twin antennas interfaced in the portable network matrix of PFNs). These signals are overlapped and combined into a single one. In real life, the time between the first received signal and the last echoed signal is called the delay spread, which could be as high as 4 $\mu$sec (not RFID). The echoed signal is delayed in time and reduced in power. Both are caused by the additional distance that the bounced signal traveled over the primary signal. The greater the distance, the longer the delay and the lower the power of the echoed signal. You might think that the longer the delay, the better off the reception would be. However, if the delay is too long, the reception of an echoed symbol S1 and the primary symbol S2 can also interact. Because there may be no direct path for the incident signal in non-line-of-sight (LOS) environments, the primary signal may be small in comparison to other secondary signals. In analog systems such as television, this multi path situation can actually be seen by the human eye. Sometimes there is a ghost image on your television, and no matter how much you adjust the set, the image does not go away. In these analog systems, this is an annoyance. In digital systems, it usually corrupts the data stream and causes loss of data or lower performance. Correction algorithms (fuzzy logic etc) must be put in place to compensate for the multi-path, resulting in a lower available data rate. With this algorithm written in to the translation and routing program running in receiving PFNs the mini data packet recovered from these minimal personal PFN units or inject able PFN SOC units can be accurate and used to locate the exact position of the 1 P PFN transmission in comparison to the receiving equipment PFN (bigger PFNs with GPS) This multi-path signal propagation has it's signal strengths evaluated by the program running in each equipment PFFN receiving the signals. Each equipment PFN sends its processed position evaluation to FACT central in the airport terminal in this case for the FACT system computer to final process all received signals from the equipment PFNs.

This tracking modality is piggy backed on the data translation and error correcting software program and can be evolutionary in the important effort to miniaturize singular purpose PFNs with no GPS to minimally powered tracking and telemetry units. This will enhance tracking immeasurably in the PFN/TRAC portable network, resulting in simple application specific SOC telemetry or transponders that can be concealed in or on a mobile object or garment or even implanted via injection or with minor surgery into an individual and report biometrics with location from all the PFNs receiving and tracking monitoring and recovering and reporting telemetry and location to the FACT Security system or managing movement of material and people via the PFA/TRAC System. On application for these 1 P PFNs is for mission critical flight personnel—to insure a healthy authorized pilots are interfacing with the aircraft controls monitored by ground and air security via the Isolated TRACker unit on board picking up the 1P units signal another 02.2 grant application).

FIG. 22 This diagram shows two basic variations to terrestrial PFNs. The 1SV PFN/TRAC controller/router shown here for the air travel industry and the DRC PFN/TRAC unit for the automotive industry development. The 1SV PFN and DRC unit in the illustration is universally discussed for future versions of both and to better explain the progression and entire set of innovations applied in this figure. As sections are discussed the progressive development to this protected robust robotics and remote controller/router for all land vehicles will unfold. For regular automotive applications the PFN has been termed the DRC meaning Driver Resource Center. DRC PFNs in cars and trucks have a little different commercial progression than the industrial 1SV PFNs (like for an airport intranet or local matrix). They also may have different wireless technologies interfaced.

The first discussion will be about the regular automotive, DRC PFNs first generation DRC 1. And specifically how the regular car is going to be first interfaced into the federal access and control technology TSA FACT command center at the airport.

Before the 911 incident telematics in vehicles was beginning to be developed through programs like GMs Onstar, Chrysler Daimler's TeleAid and Ford's "Wingcast" program with sprint wireless for private cars. Additionally, for a number of years GPS truck tracking has been developing as private intranets interfacing cellular telephony and GPS in some cased and other wireless location reporting technologies like Lojack. And some of these networks (Intranets) are run by major freight companies and delivery companies like Highway Masters, UPS, FEDEX, etc. The first generation DRC PFN would interface these existing systems (PFN their wireless units) and interface their wireless protocols to immediately provide the network fabric and platform for the TSA FACT command centers; at the airports, terminals, ports, along boarders, tollbooths weigh stations and inspection stations. This would be a direct access connection through these vehicles wireless technologies when these vehicles were in a certain range of let say an airport facility. Additionally there would be certain FACT software that would be downloaded to these units. (Pre-programmed or real-time updates) In time hardware sensing in these vehicles would be increased (EDS, etc) and the diverse types of equipment and dispersed system architecture would evolve into a more universal protected DRC. A primary focal node with a TRAC processor to support all the interfacing necessary with flexibility to be commercially viable and applicable at all times. During this progressive process the vehicle controls will become more automated with collision avoidance and driver assist systems and require accountable machine messaging and remote commands to be acceptable to society. All the PFN/TRAC system companies will push to set standards in vehicle controls and advance HMI to reduce driver workload with the DRC or protected PFN/TRAC local architecture.

The 1SV PFN for industry will interface legacy vehicle electronics in much of the material handling, mobile baggage transport for the airport facility equipment and be the most sophisticated electronics on these vehicles. The other major difference is the types of wireless technologies interfaced. However, early on in the development of the DRC PFN and the 1P PFN they will have plug and play multi-pin docking to accept different wireless by installing chipset with the appropriate protocols in an accommodating transceiver board (universal with an automated scan function). The ASIC in all the application figures sustains the architecture desired for routing SEAM, TEAM and EAM messaging in all local PFNTRAC routers.

The progressive integration of all the automotive telematics intranets begin with an IP systems connection to the larger Rail and highway TRAC/FACT/TSA registry which intern delivers data to the highest security command layer (center(s) in FIG. 18. DOD and DOT will be the lead agencies in development and implementation of this critical national infrastructure. And they need to be funded well and staffed with some real doers.

DOD/DARPA and the national security and law enforcement agencies will be responsible for developing the hardware standards and software procedures and protocols and the writing of the operating FACT program to identify agency/user access and for the FACT registries.

DOT will be responsible for structuring the transportation FACT registries via all their departments and sub agencies like National Highway Traffic and Safety Administration NHTSA and the FMC Federal Motor Carriers just to mention a few. It is important to mention that DOT monitors transportation and writes regulations specific to vehicle platforms. This is how the agencies and divisions are structured. These vehicle frames have different electrical/electronics E/E system and bus architecture. They require different monitoring and reporting as well as law and regulation enforcement, so the different intranets that track theirs assets geographically already will have their sensing and telemetry increased for TSA and homeland security immediately. These intranets would also have IP connections to the specific agencies monitoring portions of their commercial activities e.g. EPA/Colorado watching for Blue smoke from diesel trucks could receive data from the DRC PFN via interfaced vehicle sensors in the exhaust stack and this data would then intern be routed to ICC the state police/EPA/hazmat officials locally where the truck was operating. This and passive reporting through the registries will be ongoing and near real-time unless a FACT event flag occurs. Then the system can respond another way in emergencies—via direct dial in or dial out with FACT/TSA command centers. PFN/DRC units responsiveness is different during a FACT event where explosives are sensed on a vehicle on an interstate that is not suppose to be carrying them.

FACT implementation and commercial development will request the wireless intranets to be discussed to station one of their control hubs at each of the 429 airports across the nation and link them to TSA/FACT command center servers. Or arrange for their technology to be interfaced and integrated into the FACT/wireless gateway router at airports. PFN/TRAC TSA FACT wireless router (WR) is illustrated in the bottom left corner of drawing 22. TSA/FACT with the (WR) is to be a giant protected Primary Foal Node mass data handling, routing and storage center for critical FACT data at the airport. A physically protected facility (Capacity and protocols interfaced to be determined) This air terminal TSA FACT hub/router transceiver unit (WR) would be vaulted and protected with a versatile docking structure to interface the above intranets wireless and the above telematics wireless protocols. As a base or center to link these present systems directly to FACT security at the terminal to provide immediate local responsiveness via the local PFN units.

The top third of the page is the TSA/FACT airport terminal command center communicating with all mobile objects via the various PFN/TRAC wireless interface router functions. All the PFNs on all the above transportation platforms are receiving GPS data from the above array of geo-synchronized orbit satellites illustrated by the satellite in the upper right corner. Additionally each PFN/TRAC circuit clock is updated and synchronized via software (firmware) in the TRAC ASIC directing the use of this data received form the GPS/NEMA data packets (or another stable wireless time providing technology) to locally plot movement harmony for any portion of the mobile matrix of 1SV and DRC PFNs.

The Figure

No. 1 the car in the right is communicating with the little car to the left via DSRC and specific vehicle identifiers (ESN PFN DRC, etc). However, all the vehicles and people having PFNs are passing through a sea of communications all the time. It is the recognition and use capacity to retrieve this critical information and precipitate it's use into appropriate movement that is unique and creates the PFN/TRAC traffic management system and base construct program for a TSA FACT robust security matrix.

In the figure the two cars, the bus left of the terminal and the women riding the bicycle are all part of an instantaneous interactive portable network that performs a mixture of robotics and remote control (RC). Positioning software is running in each PFN unit monitoring and demarking certain distances from other objects relative to all objects velocity (speed and direction or signals from a stationary object via—a fixed 1E PFN beacon or beacon signal program running in an unattended parked vehicles DRC PFN or 1SV PFN).

All of the above vehicles are in communication with each other and the TSA FACT local command center at the airport. This allows the left car's DRC to be aware of the cyclist No.3 and the driver is warned of the bikers location (via IP PFN or RFID tag etc). Secondly the car would not be able to turn towards the curb to park as a result of this remote telemetry and robotics. If any of the drivers were not paying attention and there was going to collision their car would automatically adjust in micro seconds and warn the driver by audio message or stop the car if the algorithm in the movement program was satisfied via rear sensors (radar) there was no vehicle detected closing distance from the rear. The satisfied safe condition algorithm is that at all times no two known objects can be projected by velocity to occupy the same geo-space and time coordinates. If this state is factored—parameters in the software are to warn the operator and eliminate the condition without colliding with any other known asset identified in the local environment.

Additionally, as an advanced HMI assist system, an operational evaluation program is always running in the DRC to sense over steering, slow braking, slow acceleration slow reflexes, etc. and archive a personal driving history of the identified authorized driver's necessary skill to operate the vehicle proficiently. Using this assessment program the DRC automated collision avoidance programming is to override operator control and effect the collision avoidance option. There are more and more collision avoidance technologies being developed and these are to be systems under control SUC to the DRC PFN. Additionally driver performance can be transferred by smart cards or data transfer devices so that each PFN recognizes upon energizing a host vehicle for authorized use (like a personal key). The new vehicle would be given performance parameters for the known driver and the driver assist programs would be there to assist all the way up to full robotics driving in real time for those situations that required it. Providing more freedom for the physical and mentally challenged.

Initially, PFN/TRAC programming for this function can be initiated from the GPS commercial off the shelf products that can follow a vehicles movement now and provide vocal instructions to a driver for the next change in direction. Or the software algorithm can be written from any number of intelligent positioning technologies and their software programs. These technologies have developer kits and PC software kits to write code from to develop assist verbal warning and base RPV programming and algorithms as desired for these applications. The goal is total vehicle robotics via first incorporating driver assist systems and not to stop human driving but to continue freedom of safe movement for more people—people age—However, "we all know we are perfect drivers". The level of driver assist and robotics will be real-time variable—just for those times we just might not be perfect. Another reason is cellular phones and driver distraction. Other existing commercial off the shelf technologies need a safe cross environmental interface to manage their use and the vehicle while in transit-the DRC PFN is a total management system for this purpose and the progression to full vehicle robotics through assist driving technologies will increase public safety and national security via insuring authorized healthy and real-time capable operators and operation of vehicles equipment, machines and aircraft.

Other collision avoidance data on the newer cars (e.g. proximity detectors, forward radar, and infrared night vision would have their data streams processed to interface into the movement management software, which will be the base program for automated guidance of a vehicle via direct connection to crucial actuators or via vehicle bus system interfacing as detailed in the center section of this figure and throughout all the PFN/TRAC System filings since 1996.

If the PFN or DRC has a specific preprogrammed travel plan the portable network will better be able to plot and direct movement both at the local PFN level and systemically from this exemplary TSA/FACT Command center at the nation's 429 airports. DSRC frequencies have been granted to the DOT by the FCC—(5.7 GHZ). Presently, standards efforts for the use of this broadband frequency or other suitable bandwidth (FCC approved and dedicated) have to get underway immediately with FAA/AOC/TSA and the automotive electronic and avionics wireless device manufacturers for cross-environmental application standards, procedures and protocols. Their focus is to develop an agreed upon messaging and directives protocol for optimum movement on and near the earth's surface. A three dimensional road map and operator manual/operations program for terrestrial vehicle platforms on the roads and in and out of air ports (intermodal communications and recognition protocols to be tied into aircraft traversing the tarmac with service vehicles—both vehicle 1SV PFN possibly DRC loal police cruiser and aircraft TRACker unit need to have the proper wireless chipsets to be cross tied into their collision avoidance systems and TSA FACT's seamless security for contact or near contact with any aircraft).

Automated movement algorithms must process the movement data universally, but specific to individual vehicle, time, place and surroundings in PFN/RPV programming to remote piloted vehicles with robotics. (RPV is the major embodiment of the local TRAC processor, preprogrammed robotics for reliability and responsiveness is another portion so software has to be written for this condition as well. Robotics algorithms will determine the safest commands to respond, to, to include; local human, RC commands or auto-determined movement alternatives. (procedures and protocols to be determined for these preprogram situations).

The satellite above also symbolizes that low earth orbit or LEO satellites used in the PFN/TRAC system for wireless communications and include Air Traffic Management ATM and wireless telephony as other possible near earth communications interfaced in local PFNs and to link the intranets.

The vehicle platforms and airframe above the airport's TSA FACT command center are mostly all ISV PFN specific to the airport intranet with all the appropriate wireless interfaced through the PFN for TEAM messaging. Many of these units could be capable of SEAM messaging (to be determined).

Used as an example of cross environmental telemetry, the airport police cruiser in the upper left is a good example of a vehicle applications that could and should carry a full complement of wireless protocols to both function outside the airport in any TSA/FACT Interactive Highway application of the PFN/TRAC system and also with the TSA/FACT/FAA/AOC Intranet as part of seamless security. This has a dual function as well as a dual purpose. First seamless reporting is accomplished to follow a FACT event and second to have accountable remote management and control capability with intranet demarcation and cross-environmental integration. Example of purpose, a local police pursuit that has entered the airport facility should have immediate FACT programming responsiveness in each PFN with command center integration so a real time authorized officer recognized via his 1P PFN-ESN, etc. confirming his or her personal ID then can use his/her command interfaced pad or voice to activate automated gates, baggage handling equipment and vehicles and/or stop their unauthorized use providing seamless security. (Procedures and protocols to be determined) This accountable machine-messaging network creates a security matrix of redundant human and automated monitoring with real-time accountable remote control to manage safe secure and efficient movement at airports and can build public confidence in air travel.

Initial Commercial Cooperation Needed

FACT control will have a real-time placement on calibrated mapping displays of all moving assets on the airport campus (monitoring procedures and response protocols to be determined). This will be a unique security advantage and main reason for requesting commercial cooperation in constructing a multiple access local wireless routing hub of all known wireless protocols at each airport. And for combining it with the PFN/TRAC automated frequency counting scan program to identify unwanted and unauthorized transmissions in the airport vicinity. This is how TSA can be really responsive via a FACT sensory and command control center at each of the 429 national commercial airport terminals. A security system that is based on good efficient management of vehicle movement. One, that can identify exact location time and space and directly issue remote commands for reliable accountable interdiction by using interfaced automated equipment, that is locally coordinated with human security at the air port.

In the center of the drawing a sample of the Systems Under Control SUC in the vehicle are illustrated to perform wireless routing, Robotics RC and RPV for the vehicle. As stated earlier this can be accomplished via direct connection to the DRC or via interfacing with the CAN Bus. These various modalities are well documented in earlier filings and therefore basically listed in this figure. To instruct those in the arts what accessories must be connected or constructed to effect RC and robotics activity as a result of the programming functions detailed for each application and to include the progressive teachings to complete the integration for the local PFN and the PFN/TRAC system.

In the figure left and center on the E/E CAN Bus are the vehicle displays and alerts. They would be PFN constructed or if OEM in place, they would be used to deliver messages, TEAM, SEAM and/or emergency action messages for the general public—public service messages termed EAM messages).

Data provided to the instrument panel critical to vehicle operations would also be basic I/O interfaced via the vehicle CPU or retrieved from the bus redundantly. Driver controls would be PFN automated and/or interfaced with newer drive by wire technologies or connected by traditional can bus interfacing. Ultimately every E/E connection critical to vehicle operation and/or designated or regulated by government as a TSA FACT Security concern must be priority routed and protected consistent with PFN/TRAC System technology. If these specifications are deemed necessary an result in any standards or regulation or are improved on by any government agency or standards effort they are still considered to be within the nature, scope and purpose of the invention if to provide reliable accountable remote control and FACT security for TSA and the Department of Homeland Security.

Public Safety in Driving

Items 4 and 5 in the center show wireless carryon devices into a car. These devices are a great asset to the traveler but they also cause driver distraction. In earlier filings the interfacing of these carryon units is well discussed technically and also for their cross environmental impact and causing driver distraction. For this reason they have been interfaced through the DRC PFN to have there use and vehicle operation optimized while maintaining the safest vehicle movement. The DRC can be a real-time assistant or auto/Co-pilot to the operator, either distracted, over taxed, tired, ill, intoxicated, or bored with driving and desiring to do something else while traveling. The actuators would be attached to the activity controls listed left of number 6. Number 7 is the DRC PFN and contains the plug and play wireless interfaces to sere as a router in a specific intranet as well as retrieve dedicated short-range communications.

A specific universal DSRC frequency and protocol should be determined for a universal chipset connectivity through all PFNs and across all wireless devices to create the portable flexible integration network of messaging described. It must be broadband and all PFNs have to receive it. It must be standardized or each PFN must carry all the various DSRC transceiver/protocols with specific device identifiers (ESN) and special routing instructions for the receiving PFN.

To the center right shows all the vehicle sensing audio and video to include any infrared, laser, heat imaging data, distance sensors, sound, locating systems, Lojack, GPS, Lorenz etc. lane highway detector, DSRC beacons edge sensors optical lane sensors that are; light, reflective, magnetic, optical to video signal recovery with software algorithm to follow, lines, oil discolorization or vehicle discharge during regular use on the highway. The communications are 5.7, DOT DSRC, or they could be any DSRC determined necessary and having a large enough data pipe.

The earlier mentioned FACT ball or 1Ps stand alone data orbs that supply critical highway environmental data and conditions either preprogrammed or real-time sensed to the PFN DRC, and/or COTS RFID technology used in a reverse application-Specifically the TAGS passive and active would be imbedded into the road and placed along the road system as data suppositories and deliver critical data instructions from firmware on the driving environment to the receiver antenna portion or reader of the RFID technology connected to the vehicles DRC PFN.

This application of RFID technology or other such applications or technologies used and interfaced to create a portable sensing network and a data atmosphere for RC and robot Other DSRC are Blue Tooth and 802.11 DSRC to deliver data, etc).

This sea of detectable data is delivered to all the PRIMARY FOCAL NODES PFNs for processing by TRAC, the TRUSTED REMOTE ACTIVITY CONTROLLER/ communication router. A PFN or PFN DRC is a machine brain—A. I. artificial intelligence for mindful machinery to perform trusted RC and robotics.

As these protected and secure PFNS pass through an atmosphere or ether of environmental information they can sense and process the environment, and equipment movement much like a person does when walking or driving. In time these mindful machines linked locally in a machine messaging matrix (PFN/TRAC System) will operate vehicles more accurately and move people and materials more safely with better coordination.

OBD Sensors I,II,III, J1850, J1939, ISO all the automotive CAN bus networks to include the latest DSRC ether nets, single wire digital transmissions, fiber optics vehicle or equipment E/E systems are all to be systems interfaced and under control by the local PFN or DRC PFN. This is necessary to perform TRUSTED RC, RPV and robotics, socially, commercially and governmentally with large-scale integration and accountability.

Through out the PFN filings all type of ID technologies can be interfaced with the TRAC processors, iris scans, face scans (video), finger scan, voice recognition ID programs, Smart card or chip technologies, biometrics from 1P personal PFNs via DSRC, or the earlier RFID tags worn or implanted as with the PFN SOC ID and biometrics implants, or non invasive DNA acquisition transducers processing sample cells recovered and converted into a digital signal or (DAC or ADC as necessary in the sensor or the PFN), and the identification technology list could go on and on with new ID technologies developed and interfaced with the PFN/TRAC units and system for the FACT Security.

Number 9 card swipes in cars and on 1SV PFNs or DRCs. Obviously as stated earlier this can be used to recover identity information. But it is also part of creating a new economic tool for the nation and world to develop management and controls over the dispersed and hard to track energy use by equipment using alternative power sources. The PFN provides a stable data recovery mechanism for appropriate taxing for the impact of this equipment on the environment and societies infrastructures to include smooth interfacing with our oil based economy now. It also allows for flexible transition between the different energy sources to maintain a stable economy and hopefully to help some with world politics (a human responsibility we all share) by providing a good socio-economic mechanism for stable cross investment with all the energy sources.

With this in mind the PFNS will run electronic payment industry software protocols and be physically protected and electronically secure to be better trusted for these activities. The PFN can also have the capacity to read credit cards/ smart cards as stated in the figure.

At the airport rental cars and real time purchase of accessories and services for those vehicles are made easy to effect via the PFN (cellular phone service wireless IP connection for laptop computers, sending video back to home computers, receiving real time directions, best routes, activate robotics driving, etc). Card swipes in cabs receiving fairs rather than cash are a safer economic tool than the dollar bill. It makes the accounting and management of assets and use of those assets respect to revenue returns easier to track for the cab companies (or for all fleets). Also cabs, limos, airport shuttles, light rail subways, buses, delivery companies and any services entering the airport facility have to have all their wireless intranets supported locally to the FAA/FACT command center Transceiver router. TSA FACT command control is immediately contacted by all arriving and departing vehicles with wireless as well as, all wireless devices carried by persons via DSRC to stationary perimeter PFNS (either stand alone or with solar or other power sources to include any of the application specific PFNS.

At the bottom left is the airport TSA/FACT airport command center and directly above it the wireless router WR that has the correct antennae tower and satellite reception capacity to feed the TSA FACT router with all known wireless protocols interfaced. This tower receives data from every know wireless transmitting and the router processes data to the address recognized in the data packets via special routing protocols (COTS) or by signal recognition or identifier modulated in an analog propagation. The router is a serviceable link or wireless gateway to land, lines and fiber optics to also provide rapid message delivery to all the desired FACT/TSA related operations and national command center and NORAD Homeland security (as appropriate—e.g. TEAM and SEAM messages). Also shown connected via the PFN/TRAC System are other intranets via IP connections land line and satellite. These other intranets may be provided data in real or near real-time as TRAC system reporting e.g. (accounting operations will be processed second to SEAM and TEAM messaging at the routing level. Some broad band and broad spectrum routing is done today and protocols are becoming more universal and standard for wireless and cable transmissions, They still are not interrelated will enough to form one flexible roaming web for all the wireless, this is what is a unique function of the PFN/TRAC system. Many are still to proprietary and application specific.

CISCO systems/Motorola and Simens are some of the existing corporations that will be contacted to collaborate and construct the PFN/TRAC TSA/FACT Command center wireless router through COTS interfacing and TRAC architecture with their products and others COTS routing products. All wireless must be known to operate legally at the airport and the automated frequency scanning program running in local PFNS create a sensing fabric to eliminate authorized transmissions and triangulate on unauthorized propagations for analysis and investigations.

A Responsible Modality to Achieve the Invention in Every Application (La Technique)

The progression always starts with existing COTS and then continues to develop the PFN/TRAC unit and system to support FACT security for better public safety, national defense and Home land security and then to improve and refine the technology. Money and backing are essential for such a large undertaking. This is the reason the technology is explained with application use and impacts. Issues and use have to always be at the forefront of any system or unit design, programming and implementation. This is a Science Technology and Society (STS) utility teaching for patent. It is meant to maintain a thinking process with all the public as each skilled individual embarks on their respective task to realize the impact that they are responsible for and act professionally and with respect for their fellow citizens in the development and use of the invention. Cooperation and collaboration is sought for the development from all stakeholders. TRAC Aviation will seek government support and assistance to include funding, technical expertise, and technical transfers in an effort to partner up with major vehicle and equipment manufacturers to develop (vehicle PFNS).

FIG. 23

Transportation Machine Messaging Matrix

Figure 23:
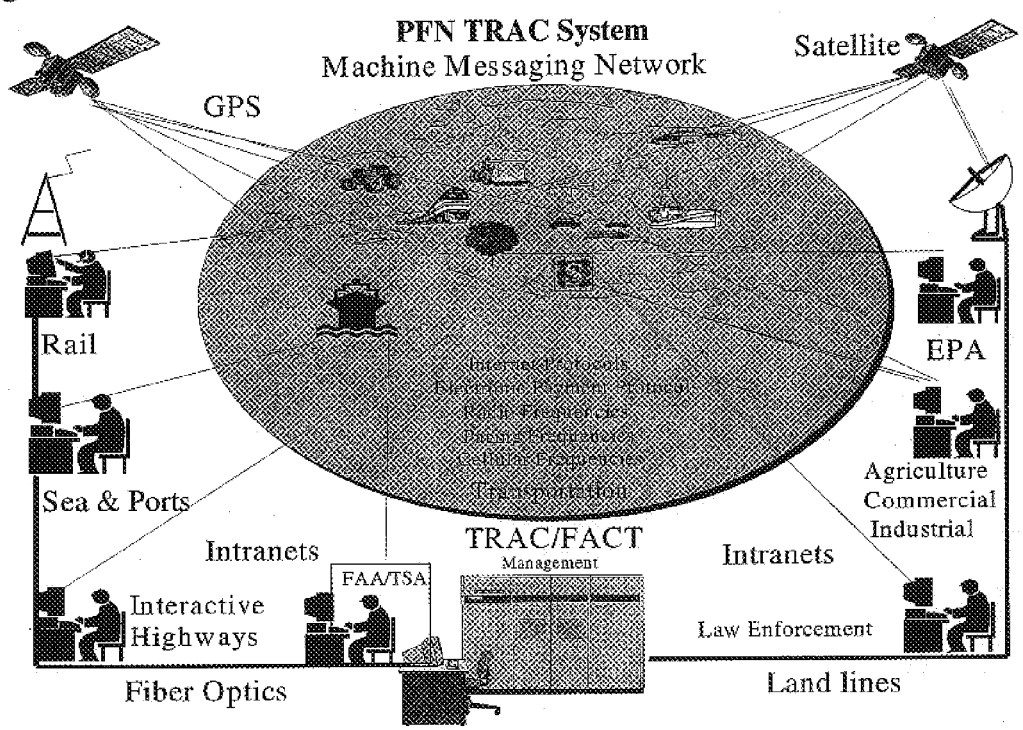
FIG. 23 Transportation machine matrix with a world of machines having PFN/TRAC units.

FIG. 23 is too taken from earlier an related patent filing and shows the Transportation machine matrix with a world of machines having PFN/TRAC units communicating with wireless intranets and being connected to a transportation machine messaging matrix including the FAA/TSA and other networks via IP protocols and telecommunications. These intranets will provide for greater equipment management and traffic movement as well as improve the data acquisition for government agencies and their ability to monitor safe use of robotics and remote control equipment for public safety and home land security. This invention meets the challenge our technologies is impacting on us n the century. Both here in the united States and all around the world. This system operated by a responsible public, both those in government service and those serving in the private sector can provide greater proficient use of equipment with a more rapid public safety notification system and quicker government response to emergency situations. It can provide the private sector the organizational platform to coordinate safe and profitable ways to do business and stand ready to defend and serve the nation's needs. There can be greater coordination between government agencies with tighter communication and understanding between industry and government and our public at large. The invention is a structure to build trust and respect throughout the world to include an individual's freedom and rights to privacy. It can be a fair and just management system for processing machine and resource use along with evaluating impacts on the world and humanity. Not to stop technical development but to know better what we are doing with it. The PFN/TRAC system could open a new era as to how we efficiently do good and safe business. One worthy of universal global respect and a willingness to emulate rather than one that causes jealousy dislike and distain. Especially from those not well franchised in any method to improve the quality of their lives. If knowledge is a power for change, people are the instruments for that change. It is redundant to say it, but it takes us all to make a good and positive difference in any change. Decent is as important as consent in any life decisions. The system provides structure and/organization to gather and deliver knowledge and a public means of analysis and implementation a necessary requirement for all humanity to determine what kind of life they want together. (This illustration is well documented and is self explanatory, but provides understanding of the intranet connected by the system in the transportation matrix) Uniquely different from today's dispersed computer networks is the multiple mailing of data packets sent to these dispersed intranets from the local level that are data recovered by the individual PFN/TRAC processor/router. It is a complete nervous system for the nation, both to sense and perform motor functions (automated activities).

Figure 24:
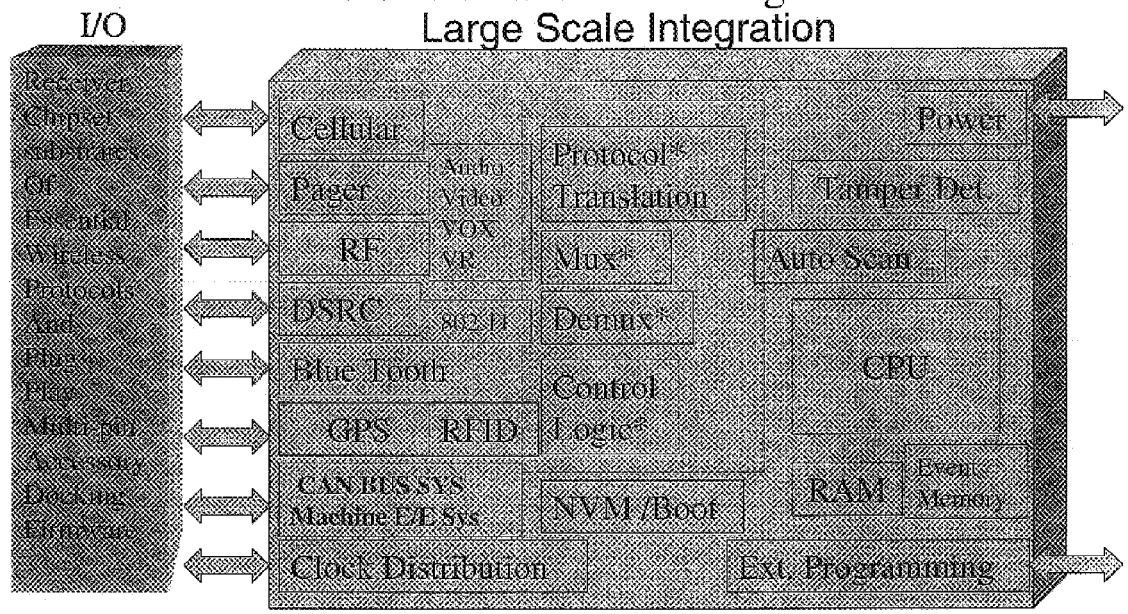
FIG. 24 ASIC for all the surface applications to include 1SV for surface vehicles 1E for the stationary vehicles and 1Ps PFN for standalone and 1P for the personal PFN processors.

FIG. 24 This diagram shows the standard wireless interfaces for all the surface applications to include 1SV for surface vehicles 1E for the stationary vehicles and 1Ps PFN for standalone and 1P for the personal PFN processors. They could range from very simple tracking operations and ID telemetry to extremely sophisticated robotics processing and communication routers. The ASIC in FIG. 24 is different in power sources with 1E PFN/TRAC being energized by building current transformed to computer control voltages and service current to drive silicon relays, motor starts and high low voltage solenoids to perform remote and automated activities controls on a host piece of equipment.

These 1 E PFN controller routers are used on stationary equipment applications in and around the airport and come from earlier related patent filings. These circuits and applications are detailed more extensively in these earlier filings. These separate filings explain the technology and the specific cross-environmental use for larger scale integration into a machine-messaging matrix. This discussion is deliberately detailed to illustrate and isolate the Aviation intranet applications for these circuit designs.

1SV PFN will have all the same wireless for in and around the airport and the milti-pin connector or interface to connect up to the automobile CAN bus system and/or drive direct connections to actuators and service power control circuits for activity controls. Power requirements are to energize the processor and recharge the emergency power. Vehicle power to be transformed ranges in DC current from power supplies from 12 volts DC to 48 DC volts DC and the power is transformed to operate the PFN/TRAC processor and electronics at computer voltages The circuit concept is the same for the 1P and 1PS but the level of complexity varies immensely and is explained throughout the filing.

The six squares to the left in the ASIC represent the interface protocols from the various wireless communication technologies that are connected in a plug in hybrid substrate chip set and can be changed to meet the application specific need of any specific primary focal node PFN. This drawing is exemplary and in no way should limit the reviewer or reader as to the nature and scope of the invention to create any specific intranet or support local interfacing for cross environmental communication links as a local router. This ASIC shows CAN Bus interfacing if used for automotive to include J1850, 1939 ISO and any of the other new LAN Vehicle Bus systems. Local clock time is updated by the GPS—Satellite or communication technologies. Tamper detection is an earlier FACT integrity check procedure detailed as a security process protocol in earlier related filings. Most all is self explanatory in the circuit design. It is understood that systems will be consolidated via SOC technology and this event is within the nature and scope of the invention.

Many types of encryption are available today (PGP, DES, the wireless payment industry has more as well. FACT is to be a security program format that code will have to be written too and the types of codecs and encryption standards for high security and commercial and private security communications as well as public statistical information protocols have to de determined legally first as well as these frequencies will have to be approved by FAA and FCC and law enforcement agencies. The technology has a multitude of modular configurations to support these options for most any discriminatory programming and data processing along with an evolutionary capacity of the technology to interface with present and legacy systems and to consolidate and integrate, combine these linked circuits and systems into SOC technology or systems on a Chip for future applications when proven beneficial and a worthy advance after reviewing their impact in isolated operations. Then they can be drawn up and constructed as SOCs to reduce hardware size and weight and increases proficiency and capacity. Providing for entire systems to be less expensive and redundant to safe air travel with multiple options. RFID radio frequency ID program (EZ pass) and Blue tooth a short range RF technology for wireless telephones to interface with some automotive telematics. These are existing technologies interfaced via the PFN platform in the ASIC and would have the appropriate hybrid chip sets interfacing these technologies to track, identify and sense materials, equipment and people approaching and entering the aircraft and the aircrafts compartments. Via, this connection the 1A PFN or series of 1A PFS on board would work in harmony to identify the carryon device (ESN recognition and look for alerts) as well as manage the use or restrict any such use of cellular phones and other wireless carryon equipment as determined best for flight safety. As part of this invention's nature and scope these SUC technologies and systems would write code into their protocols to immediately transfer all PFN/FACT directives via access through any cellular service that the phone provider is part of for emergency action messages to be delivered into the surface IP/TSA gateways. This gives a continual down feed of identifiable data packets and information of a troubled flight to surface receivers or satellite connected to data receivers/receptacles for further data resources in real-time and for later analysis. Special arrangements with these providers to support secure gateways into this IP security matrix of TSA and other agencies will have to be arranged and constructed.

Figure 25:
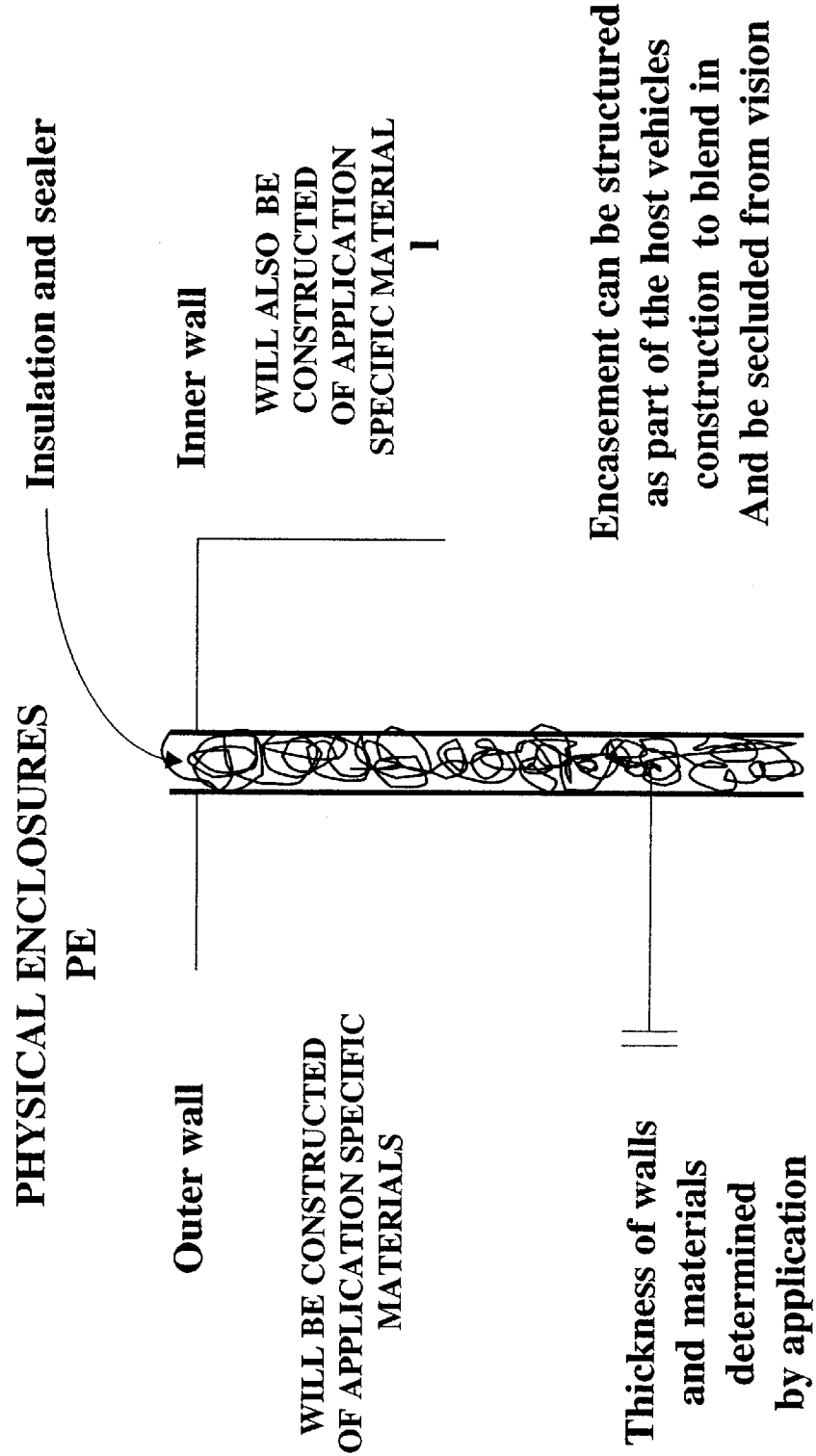
FIG. 25 is a simple drawing showing the general approach to the PFN structure or encesement.
Figure 27:
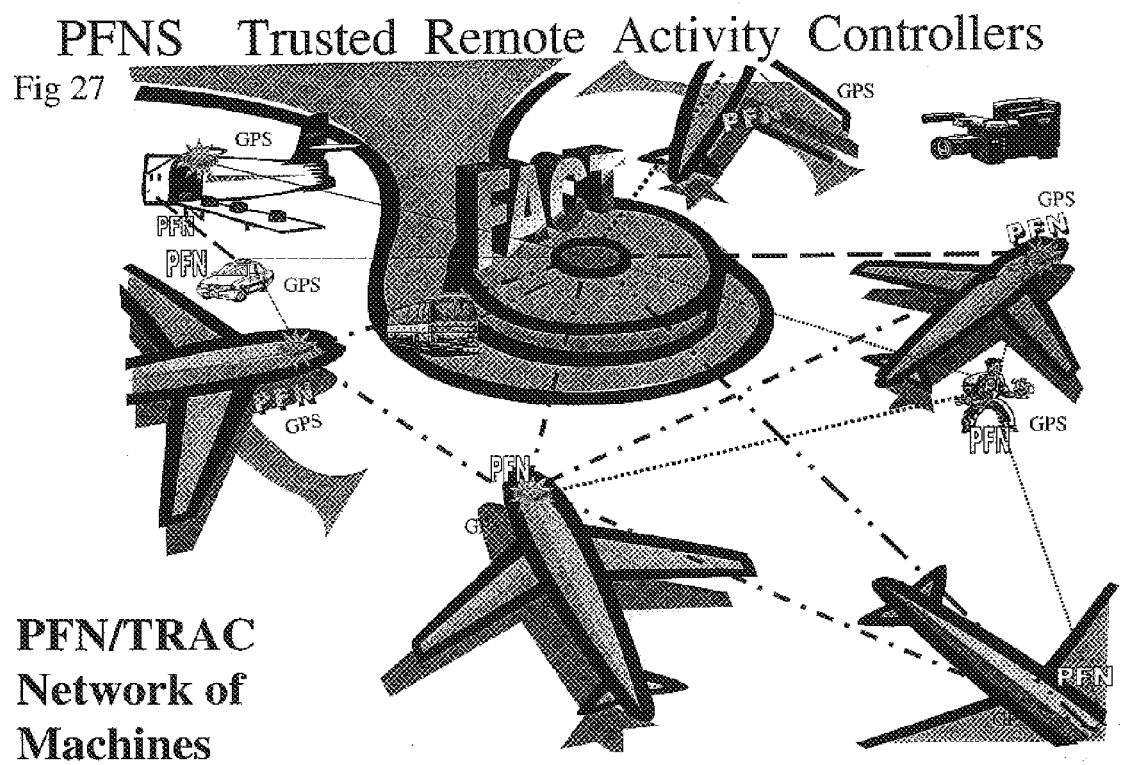
FIG. 27 is an overview of the TSA FACT 1100 command center for TSA at the airport.

FIG. 25 FIG. 25 is a simple drawing showing the general approach to the PFN structure. There are ten separate filings with descriptions of PFN protection specific to application and innovative product and calling for those skilled in hr art to use standards for the specific industry and application in the final design of any particular enclosure. Even in this application the FACT ball is another complete description of a specific enclosure for aviation applications. Here the specific protective encasement has to take high impact and protect the even memory and electronic components.

Generally speaking the memory storage is the most import part protected to analyze what the unit was doing at the time of any critical event or failure. However, the Primary Focal Node is a Protected primary focal note and so are all the actuators to perform accountable remote control and robotics. For this reason the electronic circuits and connections are made for robust and rough service and the coverings and encasement designs are constructed for the same purpose. Reliability is the other major reason the structures are made for rough service. And another is that the PFN/TRAC unit is made to restrict the authorized use of equipment and vehicles to include aircraft. Therefore its management system has to be impregnable while a vehicle is being operated. So if it is operated in an unsafe and unauthorized manner the PFN can control the equipment to a safe shut down.

To the left in FIG. 25 the outer wall can be constructed of any material suitable for the application however must of the 1SV, 1E, and 1A PFNs will have some kind of a metal exterior resistant to drills and sharp objects with heat resistant plastics like poly suphone for antenna ports like internal or patch antennas that are impregnated into the unit. The exterior wall might have a Teflon coating or special electrical insulator or rely on a metal chassis to make a ground connection with a host machine.

Rough service plastics and composites may be used for some applications. The inner section between the two walls is and thermal section and will be filled with insulators like solid smoke the space shuttle tile material, gypsum, dyper jell or just an air space.

Once again the inner wall like the outer wall can be constructed of whatever materials best serve survivability of the electronic package and the application desired.

Engineers will consult standards for explosion proof and firebox and black box standard when configuring suitable protection for the 1A aircraft PFNTRAC ASICs. All PFNs have restricted access and physical locking as well as unique electronic locking and tamper resistant as well as tamper detection technology built right into the encasement design and the same is true for the electronic designs as well. These devices are well documented and detailed throughout all the related filings.

No design or configuration detailed in this filing or any PFN related filing should be construed as the only protective embodiment or all the protective means for the invention. Any and all protective means to maintain reliable and accountable remote control and robotics falls within the nature and scope of the invention.

FIG. 26

These applications could involve wireless or direct connect data links to interface all the machines, equipment and vehicles in a specific area. The different PFNS are commercially flexible for the various technologies and companies to interface, access and control any or all of the airport equipment e.g. ground service people, different airlines, private security contractors, local police, and the TSA etc. The individual PFNS represented in FIG. 26 recognize new vehicles people and materials transported as they enter their geographic area via GPS, triangulation or other positioning technologies and/or other senor arrays and technologies interfaced e.g. RFID. The 1E Routers have all the various and relevant communication interfaces and can translate emergency messages across the various communications interfaced (SEAM, TEAM PEAM and EAM messages etc.) and router via TSA FACT 11OO Command control center at the airport to each PFN unit as part of the FACT Security Program. Each machine, vehicle or personal PFN is a broad local receiver and broadcast station in the FACT security and PFN/TRAC Management system. They have stable and reliable power in redundant form with emergency battery backup. The following outline provides prototypical examples of the types of equipment and personal accountable wireless controllers that the TRAC Aviation Company will provide to air travel and aviation traffic management and security both aloft and on the surface. The product lines are: the (1a,b, c TRACker) (1A PFN Series) Aircraft controllers, (1E PFN Series) Equipment controllers stationary applications, (1SV PFN Series) Surface Vehicles, (1 P PFN Series) Personal Communicator/Controllers, and the FACT™ Security program (1100 FACT-AV) Aviation Controlled Security and Management Intranet for TSA. All equipment and personnel are linked in a seamless security for Homeland Security It is transportation with law enforcement.

FIG. 27

Is an overview of the TSA FACT 1100 command center. The planes, the security cruiser, the shuttle bus and video are all connected to application specific PFNs that can interconnect with other assets and the FACT command and control center. This creates a flexible sensory web or network at the airport and an integrated system. Additionally, many equipment and vehicle PFNS are running the automated frequency scan technology and can identify all electronic devices in proximity and most especially identify unauthorized signal or wireless activities. This is a necessity if there is to be reliable and accountable remote control.

Frequency counting and recognizing is an important part of FACT Security as well for example. Even the plane in the picture TRACker unit or 1A PFN is detecting movement around it and identifying with known ESNs etc. This would include mechanics wearing PFN belts, bracelets, bands or implants or RFID Tags.

Also, baggage is being sensed as well via 1Ps stand alone PFNS, RFID technology, barcode readers and the proprietary bag sign technology. This data rendered by other PFNS is transmitted back to FACT control at the airport to follow and match up materials and people traveling together or suppose to be e.g. The air craft TRACker unit discovers a piece of left behind carryon luggage when a passenger departs the air craft. Additionally much of the equipment having PFNs attached to them is material handling pieces of equipment, tugs, and forklifts baggage elevators, conveyor belts, shuttles. They too are scanning materials and luggage by the added sensor array that can be interfaced with their PFN/TRAC unit and the sensor software if not unit firmware can run and is supported by PFN/TRAC processor. This data recovered is all part of the data assimilated in the FACT command an control center and then acted on immediately via direct connect through the WR wireless router station in the Protected center and the individual hybrid chip sets interfaced in the Plug and play portion of the optimal individual PFN transceiver to effect a response. Of course local operators and security are notified as well.

Additionally, the 429 TSA FACT airport command centers will have alternative power both onsite diesel generators and battery backup as well as solar and wind where applicable. The compound is to be fenced and jersey walled and the operations centers must be able to withstand a reasonable attack with explosives (traditional Block house or under ground construction with concrete reinforced walls. Antenna towers and satellite dishes are to be fenced and jersey wall protected and guarded. A reasonable restricted area has to be put in place. The compound t include the restricted area is to have PFN/TRAC unit driven or interfaced video and audio surveillance and detection technology with thermal and infrared heat sensing, light and movement sensing and a state of the art electronic Id access set of systems. A well trained and armed defending force must maintain 24 hour guard 7 days a week for ever and not become involved in any other security functions or duties at the airport no matter what. There has to be two of every thing at all times Servers, Memory storage displays and monitors communication components and reserve equipment to insure the redundancy in case one of anything goes down. The protecting force should have all the necessary small arms and bio chemical nuclear hazmat and protection gear and hand held stinger missiles and a battery of patriot missiles and/or phalanx machine cannon should be in place with in the compound as well to protect against incoming radar and transmission tracking missiles. (This may seam a bit extreme to protect the 429 TSA FACT command centers at the commercial airport at this level, but this is to be a progressive process and ultimately, these centers will house remote control stations to fly FACT flights and they need to be protected at the highest level to insure we do not have any unauthorized people interfering with aircraft aloft or the people who are aiding these troubled flights. Initially there will be 5 FACT Safe bases planed and they will be thoroughly guarded, but ultimately as flight and landing software libraries are developed guiding a trouble flight to the nearest commercial airfield may be a desirable choice to help an inexperienced pilot, like JFK Jr. If we have the capacity to operate an aircraft from the airport we have to guard that control system properly. And this invention is all about flying a troubled aircraft remotely and robotically to a safe landing if at all possible.

FIG. 28

This is the biggest challenge for the PFN/TRAC System. To develop a cooperative environment for working with all manufacturers and industries to construct this vast machine messaging matrix and make it efficient. This technology was created to solve, the unsafe and unauthorized use of vehicles and equipment and reduce driver distraction from cellular phones and carryon wireless devices via navigational aids interfaced with driver assist programming and remote control. Virtually anything making machines and vehicles more robotic to assist human workload in operating, equipment, machines, vehicles and aircraft use are to be interfaced with the invention the PFN/TRAC system and specifically this innovation in air travel management with FACT security. The main object is to coordinate and control movement on and near the earth's surface for more; safety, better security, efficient use of resources, a healthier world environment, and more stable economy to improve the quality of life. Since the recent terrorist events in New York and Washington, eyes have been opened and American cooperation between corporations in the aircraft industry and the airlines have been very responsive. But it is somewhat stifled for the need of an excellent organizational plan. One that can pull all of our great technologies together. This baffled state is nothing for our great nation to be ashamed of. Nor, should there be blame thrown around at the government organizations and agencies like the newly formed TSA or the fledgling homeland security program orphan for a year and jus becoming a Department with a cabinet position in the executive branch of government.

The first real step in any effort starts with architecture of good management. This is the PFN/TRAC System with FACT Security FIG. 28 states what needs to happen commercially to begin to correct the problems facing the country. STEP 2 is that coordinated effort to construct the organizational management system for the lasting type of security America deserves and the world needs this invention can truly help America's security and economy to include the world economy and quality of life for a more stable and secure existence. It can help us address our individual needs and differences and properly mine and distribute resources through an organizational architecture and accountable machine-messaging matrix.

FIG. 29

Shows a man walking on earth and his position derived from GPS Satellites to a GPS receiver on a belt system that is interfaced with a wireless telephony (in this case a 2 way paging system—via a stamp computer or microcomputer or Motorola COTS Creat a link II product). This figure is shown to introduce the personal 1P PFNs. The GPS data (NEMA data) is modulated into data packets and paging protocols and transmitted back to a monitoring program displaying the man's position on a calibrated map via the commercial paging service and protocols to a land line dial up server retrieving the data packets at the application level deciphering them via the appropriated Paging and GPS programming and driving the view monitor to see a representative maker of the man walking on earth.

FIGS. 29 through 35 are expansions on this first personal tracking device. It has been taught in filings with different RF technologies and to include cellular telephony and not just for tracking. It has been specified with event memory and local interface capacity and indeed products like the TRACker and the 1Pc PFN PDA are personal 1 P PFNs. They interface multiple wireless and perform routing functions they have event memory storage and perform accountable remote control. E.g. administer medication from a doctor's remote command.

In the next figures, personal PFNS will be detailed in depth as the relate to the airport sensing matrix and FACT security network. Even this 1997 first personal PFN repeater tracker unit could be functional at the airport. With paging protocols interfaced in the TSA/FACT 1100 Wireless Router and in the individual PFNS. Of course this relies on the protocols developed and implemented by the pager company to process EAM SEAM TEAM and PEAM messages and then these signals and individual identifiers would be delivered to the matrix via the pager signal and displayed on FACT airport commands calibrated mapping screen.

This drawing's parts are not detailed as they are detailed in earlier filed applications and used here to introduce the air travel 1p personal PFN products.

FIG. 30 illustrates the use of pager technology specifically 2 way paging coupled to GPS. Motorola reflex 2 ways paging via their Creata link II technology providing a minimal microprocessor to allow for remote activation of a limited number of accessories interfaced via the belts electrical bus and connectors. Other more sophisticated processors can be interfaced with reflex II paging protocol products, or Rim, and Europe's Ermies paging technologies in other PFN/TRAC applications.

This figure is also from another filing and it is the interface belt concept focused on in the next five figures that is of most importance. These commercial tracking/telemetry products were created to perform accountable remote control and be accountable remote controller units. They could be the last and only critical link at times for local or nearby human machine interface with controls via equipment PFNS and vehicle PFN controller routers.

For these 1P belt applications they have one or a multiple wireless technologies interfaced, however size, weight and power requirements are always going to be considerations. The important point is universal inclusiveness of all the wireless technologies that exist today in the aviation and air travel industry. The belt interfaces allow for a plug and play combination of wireless devices and connectable to be interfaced via the 1P PFN TRAC processor to be responsive in TEAM.SEAM, PEAM and EAM messages. FIG. 30 has a 2 way pager connected to the 1 P PFN TRAC processor 17 via pager data port cradle connector. Additionally, the GPS 16 would be connected to deliver time and hot geographic coordinates. All the pagers have a data access port now. The processor is connected or has embedded protected and secluded event storage. In fact the belts, bands, etc can be as complete as the ASICs in FIGS. 24, 25 and miniaturized to a SOC in the future, or as simple as a RFID passive tag, however probably at least an active tag with the power available and minimal processor and memory (if desired). Additionally, concealed passive RFID Tags or FACT Chips discussed later and in earlier related filings are to be used on each belt as a double check for tampering with the 1P PFN belt unit. These assigned electronic identities have to jive in the local 1P PFN TRAC processor running a FACT compare program and also in the intranet registry of known equipment signatures on file or there is a level one FACT flag and the belt system is marked for inspection as well as the person wearing it. Other identity checks to include pin codes and video and face or iris scans through out the security matrix from time to time can be requested from TSA FACT Command/or as one passes through the facility wearing the belt.

Normal Operations

The real advantage is that this already in use paging technology has it's wireless power used to increase the capacity of TSA Security via the interface PFN/TRAC belt and FACT sensing network of communications. Now other readers sensors, digital cams that capture snapshots jpegs, can download to the TRAC processor and simple ID card swipe data can be connected to the TRAC processor and buffer to deliver packet data into the FACT system via paging microwave frequencies to the local WR router hub at the TSA Fact command center or through the 1E,SV PFNS with chipsets capable Additionally two way messaging protocols will have their higher application translated for the family of emergency action messages. In the lower right corner is a minimal PDA display that can be interfaced to receive a Jpeg photo (snap shot image for a FACT security alert delivered to the belt buffer or to a more sophisticated 1Pc PDA PFN.

Microwave commercial paging signals migrate through buildings very well and are a chosen modality to send directives to preprogrammed and robotics programs running in equipment and vehicle PFNs that just need an initiation signal to a specific address and/or cut off signal. These 1Ps stand alone PFNs with or without any other interfaces may receive there signals by this modality.

Additionally, in the monitor display is TRACs public information products to help manage flow in relation to real time equipment operations in the airport (windows applications). TSA FACT center can release statistical movement figures and screen security data for public information. Additionally commercial service and airline companies can efficiently communicate with each other and maintain privacy as well as they provide flow traffic to the FACT security matrix that is also monitoring movement.

These pager products functioning in normal airline and airport operations are given a more robust role via their communication capacity and PFNTRAC belt interfacing.

FIG. 31 One initial point is that in the FACT center all data and mobile assets will be displayed on the same screen for easy tracking, however the individual wireless intranets could support their assets on intranet monitors and TV screens as well. As is the case with the pager the belt will provide a securement and connection of the COTS cellular phone on the belt with data access connections to the TRAC processor. GPS is also TRAC interfaced and there is additional memory and power to interface a host of other sensors readers and direct connection with or the PFN equipment and down load or up load data and programs as is necessary. Displays PDAs as well as keyboard number pads, finger print technologies and full digital cam can be interfaced with the belt and TRAC processor. Here again is the awesome power of the cellular phone service being used at the air port by airlines and law enforcement by simply plunging it in a 1 P PFN interface belt and it is recognized logged and connected to the TSA/FACT security matrix immediately.

This drawing as well is from the earlier PFN/TRAC writings so an overview of this specific belt is given to explain its use in the PFN/TRAC System of FACT Security at the airport.

In 31 this specific system is more COTS embedded. This is a cellular PCMCIA Complete modem™ #5 interfaced on the belt 7 with a 104 microprocessor or mini computer. 6 with also GPS #7 unit that modulates packetized position data to the left monitor 1 which receives transmissions from the belt through total wireless at both ends. This is a mobile-to-mobile real-time transmission and can carry digital cam images or receive them from the TSA FACT command Center. In the right the No. 3 monitor is a stationary application in the TSA FACT command center and receiving these CDMA, TDMA STDMA and analog wireless telephony via the master universal wireless router interfaced with the TSA FACT command and control center servers (redundant).

Local displays on the belt can be connected directly or if DSRC is integrated in the PDA display device and the 1P PFN cellular belt the image can be delivered by wireless.

Figure 32:
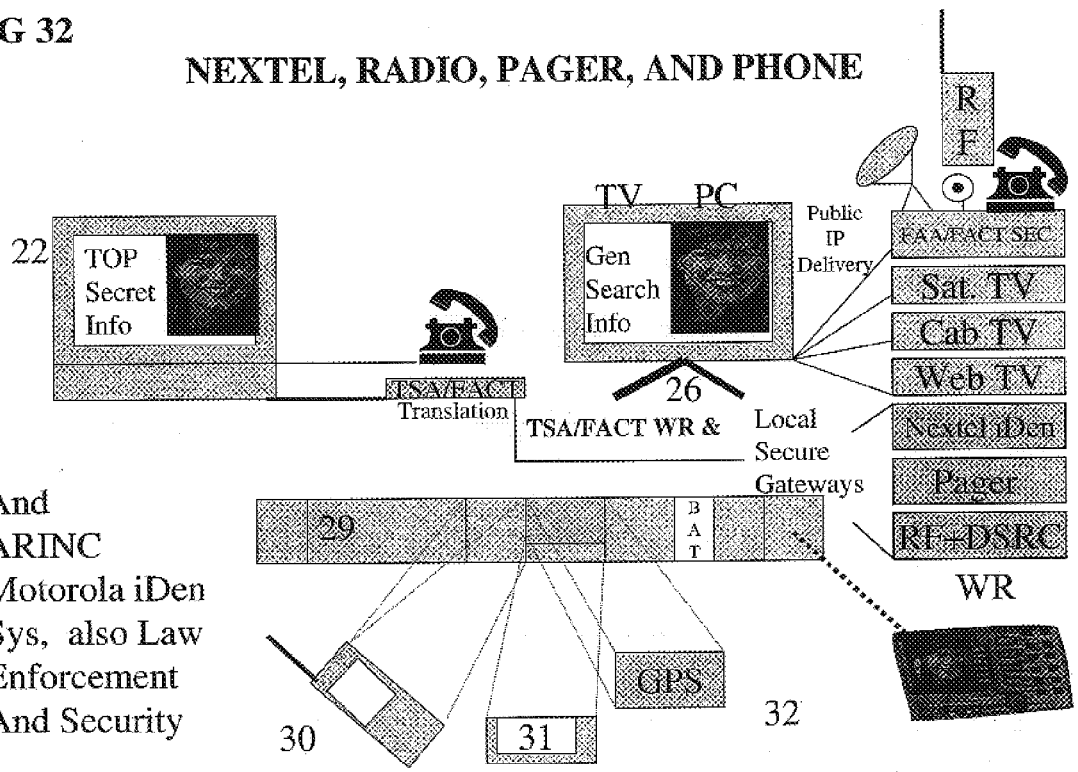
FIG. 32 shows the share ware cellular application and multiple applications.

FIG. 32 interfaces the latest cellular protocols like Nextel, and ATT uses Motorola's shareware protocols with digital paging, digital 2 way radio and TDMA digital cellular ARINC and Motorola's iDen share 2 way radio function text messaging and cellular phone service systems are shown on the 1P PFN belt configuration and interfaces a transceiver unit with a processor or micro computer and GPS with an event memory and utilizes this technologies wireless capacity to report to TSA/FACT and deliver commands to a mobile asset interfaced or perform RC for 1Ps stand alone units or perform remote control to a human or animal. Any wireless technology can be used to deliver data back to the FACT system in a number of ways. They can be interfaced with the belt as earlier detailed either by hardwire connectables or DSRC like blue tooth of 802.11 these modalities are all detailed in the patent and protected writings of the PFN/TRAC System. And not all the numbers will be detailed in this figure either.

Basically the Nextel products can be connected to the TRAC processor via their data connection port as well and other interfaces can be made to transfer data back to the TSA/FACT Wireless routing stack at the airport or port or any facility desired to support a multiplex router for the PFN/FACT System FACT Security matrix.

This diagram is suppose to display multiple wireless interfacing with 31 being a pager and 30 being cellular phone or DSRC and/or FM radio. All of could be carried and interfaced through the belt bus and TRAC processor. Once again the PDA and keypad assembly can be interfaced and allow the belt wearer to send DSRC signals to surrounding equipment and give local remote control commands. These commands can be given audibly by the person into a microphone interfaced or repeater system. Earphones can be interfaced to allow the wearer to hear information privately. 22 shows the TSA/FACT monitor simplified for illustration purposes. And 26 shows the upper commercial and public information stack the PEAM and EAM messages where the TSA/FACT or Department of Homeland Security public filter is asking for assistance. To the left is the TSA secret data FIG. 33 shows a top and side view of the belt system and accessories that can be interfaced through the personal PFN. 33 is a special electronic lock connecting with 39 that transports a special digital signal randomly generated in the PFN to insure when the belt is applied it can not be removed with out sending a signal to FACT control. 43 is a finger thaw print reader connected to the interface belt bus 37 which is connected to 42 the processor. 49 is a card scanner, smart chip reader and digital camera. 38 is the power source, 40 the wireless transceiver, 41 GPS if used, 45 local memory storage, 36 sensor array with other biometric connected options. These are the normal 1P PFN utility belts. It has an electronic lock where a signal has to be provided from 42 and received from FACT command control to release or lock the belt on. This to guarantee the person has been identified before their shift and the authorized person is wearing the device. 36 is a perspiration sensor that can detect acidic and salt changes to detect alcohol and some drug/chemical use or exposure. All sorts of biometric devices can be connected to the belt or send their data via DSRC and even be implanted internally to include RFID tag technology. Sensors attached to implants of course can deliver positive evidence to a persons identity and relative health condition in real time and these applications would be used for pilots and other mission critical operations and security personnel.

On the other side of the law, criminals being transporter by public air transportation would have the belt locked on before they depart from their lockup with automated medication vessels and delivery systems charged and interfaced with 39 the belt electrical bus (medication known not to be an allergen to the prisoner) 35 is an electrode contactor either connected to the skin or ⅙ pin prick extension upon being energized by the TRAC processor and providing a Tazer type shock to the unruly prisoner provided by a capacitor and the power pack (High voltage low amp (and the prisoner' cardiac health, any history of ellipse or health conditions known to be life threading is known by the authorities tracking with GPS and telemetry to include audio and video of the transported criminal any remote controlled subduing application performed locally by the attending guard or remotely would be performed to protect the public. (Protocols and procedures to be determined) This is not like house arrest technologies this is a full accountable remote control PFN unit managing and following the criminals movement anywhere and everywhere the security matrix exists All security will know where this individual and have all their vitals and photo during the transport process.

In a more positive application the belt system can be worn by those requiring close monitoring for compromised health and can have cardiac sensors interfaced and deliver telemetry to the doctor's computer server and alert the physician that his patient at 40,000 feet is going into ventral fibula ion and needs to have the automated mediator deliver adrenalin to jump stat the art beat and eve have a paddle pad adhered to the patients chest wall and can activate the adequate charge to start his heart. I this case the personal PFN would route through the TRACker unit or 1 A PFN/TRAC controller router in the aircraft. In the airport it could be the metal detector relaying the signal or more likely the FACT Center Router.

In the best case scenario would be the implementation of the 1PFN belt system as a personal routing platform to all the airport and aviation equipment routers. This means all workers and regulars at the airport would wear one. Then all transients or passengers or visitors could be if the nation was at a high tend security level issue magnetic paper passes read license magnetic information RFID everyone entering the airport barcode them use bag sign to have their identity easily fast and with readers connected to the belts keep track of people and bags in transit. The belts of course would enter their recovered data with TSA FACT Command to be transferred to TRACker and applied to the individual's destination with all the identifiers and materials Baggage in transport as an accountable portable network and inventory.

Additionally, all types of scanners and detector could be attached to these belts to detect Nitrates for EDS explosive detection sensors, Geiger sensors and radiation transducers for radiation detection, and bio hazards with gas spectrometry and resonate imaging. Additionally the nose could be used. This technology detects odors 2000 times that of the humans nose and generate a digital signal that can be compared to known toxins and dangerous substances in an electronic library either in the TRAC processor in the belt and/or reported to the FACT command and control center at the air port or dial direct to CDC for a substance they have download to all FACT intranets and PFNS. This is the responsiveness of the PFN/TRAC system for seamless FACT security via 1P PFN 1Ps PFN, 1E PFN 1SV PFN, 1a,b,c TRACker unit, the 1PsPFN FACT ball and the FACT 1100 command and control intranet for TSA and the Department of Homeland Security.

Current Effort to Commercialize This Technology 4. 1 P PFNS Series) Personal Communicator/Controller Fourth of Four Aviation PFN Products with FACT Security TRAC Aviation seeks government support and assistance to include; funding, technical expertise, and technical transfers in an effort to partner up with major electronics and telecommunications manufacturers in developing (personal PFNS), a patented and protected accountable remote control and personal tracking technology. (FACT), a security control component of the PFN/TRAC System, performs security functions through PFN belts or personally secured units. These miniature Trusted Remote Activity Controllers, TRAC units, will be constructed as Systems on a Chip or SOC technology. They will be responsible for personal security and identity checks in and around the airport facility pertaining to human movement. Federal Access Control Technology (FACT) receives direct communications from personal PFNS and through aircraft (1A) PFNS, equipment (1E PFNS) surface vehicles (1SV PFNS), by having their signals relayed from these other PFNS more powerful transceivers. Personal PFNS have improved communications and confirmed tracking via the repeating capacity of this airport machine-messaging network (FACT). All PFNS have a GPS component and redundantly verify location via automated triangulation software in the relay and routing process. (FACT) security is a real-time human machine interactive accountable security matrix for surface and airborne activities with real-time interagency coordination to enhanced public safety and national security as well as build public confidence in air travel.

FIG. 34 This original PFN figure is likewise from an earlier filing but displays the more universal configuration of the IP personal PFNs. It shows a protective enclosure 53 (with an appropriate robust construction per size and weight possibly and/or concealed in the belt or band structure) a self contained power source 52 with a current and E/E bus system that integrates the components provides a plug in connections and additional external interfaces indicated by the units upper left components like, Skin contact sensors, breathalyzer, transducers, finger print ID, iris scan, pulse sensor & galvanic sensors. As an example of belt interfacing with the PFN/TRAC unit, this shows an individual biometrics array and related application for guarded medical conditions or for the conditionally released or guarded during transported (the criminal).

However, this invasive 1P biometrics 1P PFN application is proposed for TSA FACT security and all that work at the nations 429 airports, all airport operations personnel, all flight crews, all airlines personnel, all service personnel, material handling and baggage personnel, local law enforcement, and commercial venders, and at all Safe Bases across the nation. To first interface all these disparate communications and then identify them continually in the AOC/TSA FACT security system at the local airport and through out the TSA FACT security matrix across the nation. To include; all seaports and/or ports of entry into the country, at boarder crossings and worn by TSA/Customs/Immigration nationalization system checkers INS (other applications than commercial air travel and air transport require additional licensing from the intellectual property holder(s) of these related application(s) patented or protected filings).

These units, rather than a COTS device connection would be the ASIC constructed in a more embedded circuit board (surface mount or event chip configuration (hybrid substrate and/or with SOC technology). Commercial COTS components as discussed for the other PFNs can be used as well e.g. (PC 104 architecture for certain 1P and 1Ps PFN/TRAC ASICs (or for Tracking elephants, J) As a general rule the miniaturization and reduction in weight is the progressive direction for these product innovations with size and rugged constructing being replaced by seclusion and short range position detection and data recovery. The following figure is the reduction of the PFN/TRAC circuit to a SOC chip and insertion or surgical implantation into a person with the introduction of a unique power source—the human body as an electrolytic cell.

The types of communication interfaced have been covered and would depend on the application, but the options are vast. Encryption is necessary and would also be determined by the application but the personal belt would be configured to be connected in cross-environmental applications for TSA/FACT applications with at least one DSRC wireless or a universal one if and when one is chosen and standardized.

DSRC for TSA/FACT Standardization is a possibility—not a requirement for cross environmental and cross Intranet connectivity for DOT TSA FACT homeland security matrix between the intranets of Air, Sea, Rail or Interactive Highways, etc. for intermodal coverage example (seamless security).

Additionally the multi-wireless units will have a capacity to direct connect to the different levels of the FACT security matrix from local at the air port to the regional services by state or area depending on the government agency and service the PFN/TRAC/FACT unit programming is attempting to connect with or the Nation Homeland Security Command/or it could contact all simultaneously with each computer server and terminal decrypting and ciphering the application buffers for complete real-time messaging on any receiving end.

The belt systems are not to limit the configuration of the IP personal PFN/TRAC units They may have their components dispersed in garments either connected by hard wire or wireless portable mini networks with DSRC technologies and daisy linked set of micro processors. All are with in the nature and scope of the invention to connect with the PFN/TRAC system and FACT security web.

Track a Con.COM an earlier detailed PFN/TRAC product parole boar and Law enforcement intranet always interfaced with FACT Security This system would allow for parolees to be back in society, while their movements and activities were monitored and governed by an automated computer system that would track physical movement through GPS, or LoJack or Cellular and/or RF triangulation on a personally carried device that monitors body temperature, pulse rate and provide for positive identification, e.g., fingerprint or eye iris evaluation The device would be controlled by the master controller and support local Web page access and hyper-link capability. Tactile and galvanic sensors would be capable of detecting chemical changes in perspiration and determine the chemical equivalent for a specific person drinking and provide a specific electrical signal that is transmitted back to the parole center for a convict beep and directions to either report in or take a skin prick check or a breathalyzer.(earlier belt system) Locations of area liquor dispensing or known drug activities and be plugged in as trail markers on the GPS programs to flag a convict=s questionable activities or ask for the above checks or a phone call.

Prior victims of crimes that an ex-con is convicted for will be notified via a beep or their 1P PFN/TRAC unit that the TRACK A CON is in close proximity and the police will be alerted and the conditionally released picked up for interrogation. The convict will be given a reasonable distance to stay away from the victims. Once again the appropriate trail markers will be posted as GPS, etc. Geographic coordinates and will notify authorities and victims of flagged improper movements. The convict will be alerted as will and warned to report in and move out of the area. Additionally, the victims can be outfitted with a mobile page and/or Track system warned directly of a past ex-cons close proximity. Additionally, the victim and community can track the parolee on a public system by contacting their state and local web page. Or this information could be restricted to school offices or just police precincts (protocols and procedures to be determined) These issues and technology are well covered in prior related filings and defer to those applications for licensing outside the safe and secure commercial and public Air Travel and Air Transportation industry.

FIG. 35 These 1PI PFN-PFN Implants and 1PIsb—Soma Battery PFNs which uses a person's body as the power source are subcutaneous inserted and/or injected under the skin or into soft non vital adipose or fatty areas of a person's or animals body. They are a miniaturization of the 1 P Personal PFN circuit that is first miniaturized from COTS products on a belt to a smaller version placed on a belt, band, bracelet and/or woven into garments and then reduced in size further to a SOC micro chip circuit for implantation in to living animals. The encasement is made of high quality surgical stainless steel or noble metals or coated by them that are known to be non allergenic and safe for internal use in the body. The chassis ground current will be contact with the conductive noble metal which in turn is in contact with allow the body's internal moist conductivity properties to enhance the minimal signal and patch antenna. Then a personal carrier of a 1 PI & 1 PIsb can just touch the chassis of another host machine or PFN to complete a ground side connection and deliver data in the PFN/TRAC System matrix with the most minimal current levels (ID and GPS data)(person and last known location).

These 1PI and 1PIsb PFN versions first and foremost have a DSRC dedicated short range communication wireless connection that can normally transmit hundreds of feet or up to a mile effectively to deliver a EAM (emergency action message) to all other 1 E-1SV and 1A PFN and equipment PFNs in the PFN/TRAC machine messaging matrix and FACT security and registry data bases. At this point local first responders are to be notified immediately with the IP notification of all relevant agencies and FACT registry data bases (e.g. Local police and regional and national FBI computer networks for a lost child or person scenario as well as directions and info uploaded to any local amber alert system or intelligent highway system, public media, civil alert system and web page alert. Special security applications include military, police, fireman, mental and medically at risk persons. (e.g. For military—these 1PI family of PFNs and their EAMs may be used to identify friendlies and combatants and release or with hold for use a remote controlled military asset on a battle field or base) or used to locate a lost person or one requiring medical assistance or even provide that medical assistance from a remote location via automated medicators also inserted in the body and interfaced)

Body Function Remote Control and Robotics (Cybernetics)

The PFN/TRAC unit is to give mindless machines a Brain or artificial intelligence and also to share activity controls in an accountable manner with humans for equipment to assist them when unsafe operation is transpiring. Why then should it stop there? Why not have this remarkable movement management system help those who do not have control over their motor functions to move as the desire. (e.g. the paraplegic and quadriplegic) (this portion defers to the prior healthcare and conditionally released PFN/TRAC telemetry and remote and automated control technology filed earlier).

1PI PFN unit sets would be constructed as a harmonious set of dispersed of SOC circuits interoperating by wireless and gaining their power from pacemaker type batteries or other power source technologies. Then they can be used to deliver a measured electrical charge to nerve bundles to stimulate a radiating synaptic response and cause a proportional tetanus in the muscle for controlled contractions by recognizing the amount of muscle contraction. (cybernetic robotics via local RC from the set of 1PI PFN/TRAC components. Thereby returning controlled movement where nerve function is absent. Via additional connected or wireless inter-muscular sensor implants sending a digital signal for processing by the local TRAC processor 1PI implant running a special individual movement algorithm, initiated and managed by the patient learning how to control bio-feed back tones for the desired muscle activity (to stretch and twist/turn walk and run. Also an audio implant for bio feed back would be implanted in the auditory canal or a hearing aid style of receiver outfitted. Also, muscle fatigue sensors for lactic acid build up are required. So sensors also implanted into muscle bundles to detect the PH would be done by injection or surgery. Then this conductivity change world provide a digital tone to the individual so that when the muscle was fatigued prior to cramp or damaging spasm. This change in conductance would be monitored and if the transfer of the potential energy between any over worked muscle and other portion of the body could result in the generation and storage of electricity in the PFN power supplies via the contrasting electrode innovation discussed above a charging circuit would be real-time constructed by energizing it via the monitoring program in the TRAC processor (or power supply firmware). This could also rapidly dissipate the toxic PH levels for the effected muscle group as well.

The only problem with these cybernetic is that the implanted individual would have to wear aluminum foil close for when they are driving a car through a radar trap or they might leap though the roof of the car by false activationsJ just kidding, but the system would have to be well engineered to reduce the chance of casual environmental RF noise EMF and EMW affecting the system These application specific to the Air travel air transport industry, might apply for any of the conditionally released or physically and/or mentally compromised. As a condition of transport of dangerous criminals injected motor controls over the physical actions by remote control may prove necessary. A hostile act detector may be constructed and might read adrenalin levels and other biometrics and restrict muscle movement via antagonist muscle stimulation to a detected aggressive blow for example. Obviously there is a number scenario that need the public to deliberate on and the inventor has stressed this already. But the possibilities are endless in controlling human activities and body functions, as well as machines. This is also why the innovations are divided application specific; to keep the stakeholders and public voices appropriately a lined to develop a reasonable good and free movement management system with security. And not just a monopolize and dominate with a master control technology that could be improperly applied by the few. That is not and cannot be a TRUSTED technology Commercial dispersion of the technology into the specific government and industries companies is a necessary element and so is a coordinated collaboration in system integration so they have to have a relationship to do business. Special structured Joint venture agreements and licensing will be in place to try to insure this diverse property of the technology. (Total Accountability all the time must be there).

FIG. 36 These 1PI PFN-PFN Implants and 1PIsb—Soma Battery PFNs that uses a person's body as the power source are subcutaneous inserted and/or injected under the skin or into soft non-vital adipose or fatty areas of person's body. They are a miniaturization of the 1 P Personal PFN circuit that is first miniaturized from COTS products on a belt to a smaller version placed on a belt band, bracelet and/or woven into garments and then into a SOC micro chip circuit for implantation. The encasement is made of high quality noble metals that are known to be non allergenic and safe for internal use in the body. The chassis ground current will be contact with the conductive noble metal which in turn is in contact with allow the body's internal moist conductivity properties to enhance the minimal signal and patch antenna. Then a personal carrier of a 1PI & 1PIsb can just touch the chassis of another host machine or PFN to complete a ground side connection and deliver data in the PFN/TRAC System matrix with the most minimal current levels (ID and GPS data)(person and last known location).

These 1PI and 1PIsb PFN versions first and foremost have a DSRC dedicated short range communication wireless connection that can normally transmit hundreds of feet or up to a mile effectively to deliver a EAM (emergency action message) to all other 1 E-1SV and 1A PFN and equipment PFNs in the PFN/TRAC machine messaging matrix and FACT security and registry data bases. At this point local first responders are to be notified immediately with the IP notification of all relevant agencies and FACT registry data bases (e.g. Local police and regional and national FBI computer networks for a lost child or person scenario as well as directions and info uploaded to any local amber alert system or intelligent highway system, public media, civil alert system and web page alert. Special security applications include military, police, fireman, mental and medically at risk persons. (E.g. For military—these 1PI family of PFNs and their EAMs may be used to identify friendliness and combatants and release or with hold for use a remote controlled military asset on a battle field or base) or used to locate a lost person or one requiring medical assistance or even provide that medical assistance from a remote location via automated medicators also inserted in the body and interfaced)

Body Function Remote Control and Robotics (Cybernetics)

The PFN/TRAC unit is to give mindless machines a Brain or artificial intelligence and also to share activity controls in an accountable manner with humans for equipment to assist them when unsafe operation is transpiring. Why then should it stop there? Why not have this remarkable movement management system help those who do not have control over their motor functions to move as the desire. (E.g. the paraplegic and quadriplegic) (This portion defers to the prior healthcare and conditionally released PFN/TRAC telemetry and remote and automated control technology filed earlier).

1PI PFN unit sets would be constructed as a harmonious set of dispersed of SOC circuits interoperating by wireless and gaining their power from pacemaker type batteries or other power source technologies. Then they can be used to deliver a measured electrical charge to nerve bundles to stimulate a radiating synaptic response and cause a proportional tetanus in the muscle for controlled contractions by recognizing the amount of muscle contraction. (Cybernetic robotics via local RC from the set of 1PI PFN/TRAC components. Thereby returning controlled movement where nerve function is absent. Via additional connected or wireless inter-muscular sensor implants sending a digital signal for processing by the local TRAC processor 1PI implant running a special individual movement algorithm, initiated and managed by the patient learning how to control bio-feed back tones for the desired muscle activity (to stretch and twist/turn walk and run. Also an audio implant for bio feed back would be implanted in the auditory canal or a hearing aid style of receiver outfitted. Also, muscle fatigue sensors for lactic acid build up are required. So sensors also implanted into muscle bundles to detect the PH would be done by injection or surgery. Then this conductivity change world provide a digital tone to the individual so that when the muscle was fatigued prior to cramp or damaging spasm. This change in conductance would be monitored and if the transfer of the potential energy between any over worked muscle and other portion of the body could result in the generation and storage of electricity in the PFN power supplies via the contrasting electrode innovation discussed above a charging circuit would be real-time constructed by energizing it via the monitoring program in the TRAC processor (or power supply firmware). This could also rapidly dissipate the toxic PH levels for the effected muscle group as well.

The only problem with these cybernetic is that the implanted individual would have to wear aluminum foil close for when they are driving a car through a radar trap or they might leap though the roof of the car by false activations J just kidding, but the system would have to be well engineered to reduce the chance of casual environmental RF noise EMF and EMW affecting the system These application specific to the Air travel air transport industry, might apply for any of the conditionally released or physically and/or mentally compromised. As a condition of transport of dangerous criminals injected motor controls over the physical actions by remote control may prove necessary. A hostile act detector may be constructed and might read adrenalin levels and other biometrics and restrict muscle movement via antagonist muscle stimulation to a detected aggressive blow for example. Obviously there is a number scenarios that need the public to deliberate on and the inventor has stressed this already. But the possibilities are endless in controlling human activities and body functions, as well as machines. This is also why the innovations are divided application specific; to keep the stakeholders and public voices appropriately a lined to develop a reasonable good and free movement management system with security. And not just monopolize and dominate with a master control technology that could be improperly applied by the few. That is not and cannot be a TRUSTED technology Commercial dispersion of the technology into the specific government and industries companies is a necessary element and so is a coordinated collaboration in system integration so they have to have a relationship to do business. Special structured Joint venture agreements and licensing will be in place to try to insure this diverse property of the technology. (Total Accountability all the time must be there).

Figure 37:
FIG. 37 shows the data telemetry monitored in the local TSA FACT airport command center and the various other monitoring stations.
Figure 38:
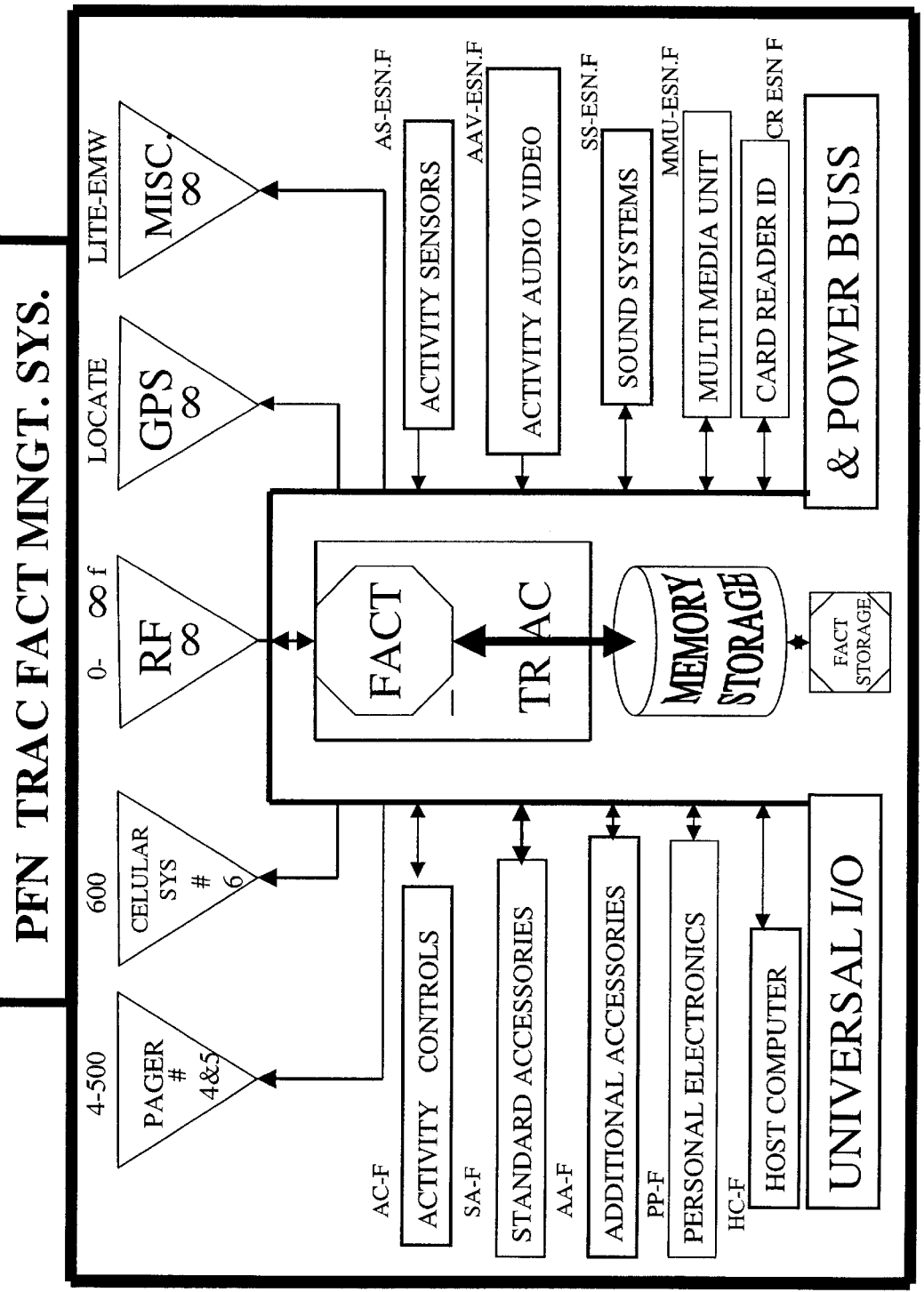
FIG. 38 FACT CHIP and soft ware functions in the system.

FIG. 37 FIG. 37 is the FACT terminal display. The entire FACT event will be viewable on a wall size screen in the TSA/FACT Airport command center at the airport with separate monitors breaking up specific data to present it for specific handling by trained professionals. For example, all the known ID data on the suspect women's passport is checked possibly by INS, while the FBI is running the face scan/iris scan data and recorded smart chip data from the pass port against all known records for a match. The first database is links to terrorism because her bag lower left of the monitor screen has triggered a flag alert as it passed an explosion detection sensor EDS connected to a PFN/TRAC equipment PFN on the baggage conveyor. The special ultraviolet light motorized video reader read her invisible to the eye signature on her bags and pulled up her travel file which was telecommunicated to all the airports on her ticket (this process could have started overseas and all relevant TSA FACT Security Airport intranets would have been preloaded via telecommunications and IP protocols to track her and her luggage identifiers by her projected flight plan, traceable technologies could include; RFID this proprietary Bag sign product or a 1P PFN combination of traceable ESNs and data sensing minimal telemetry product applications. Bar code readers and tags can be interfaced and read. The PFN PC platform is set up to run most every sensor software and drivers or to interface via the device controller and E/E bus to recover the data for the FACT Security System.

Once a FACT event is initiated the entire system is quarried to locate all components of the suspect transport party, any persons, their separate luggage and any groups traveling together should be identified if possible and in the appropriate manner. In the upper left corner of FIG. 37 is the woman who owns the bag that triggered the PFN EDS sensor on the luggage conveyor. The video cam at the airport exit doors captured her image and is running a face scan algorithm and an iris scan for a positive match with the luggage Travel file data recovered on her when she and her baggage entered the Air trans port intranet. Additionally, a TSA officer in the airport parking area visually sees her and confirms her image on his PDA/PFN or PDA display plugged into his 1P PFN utility belt and moves to detain her with backup already on the way. Her identity was also discovered at the airport exit when she passed her travel card with magnetic strip or her passport smart card or chip through the card reader (left center of FIG. 37). Or her RFID tag impregnated into her passport delivered her ID telemetry to a RFID reader antenna in the door jam which is interfaced with the 1E PFN in the card reader or responsively connected to the 1 E PFN in the automated doors for remote control and locking of the exit door. But in this scenario just recorded her exit microseconds before the FACT Flag from the conveyor initiated the process, so instantly searches the loop memory storage and notifies all TSA FACT security of her exit alerting the TSA officer to look up at the exit and spot the women.

If the conveyor flag hadn't gone up by the EDS sensor that Exit procedure would have quarried the materials registry of the airport air intranet for a travel file on her anyway And if the exit telemetry indicated she was going to leave the airport, while here luggage was still in the terminal and in this case booked on flight SD333 to San Diego through from Yemen to Heathrow and she was exiting the Kennedy Airport FACT flag would have been issued at this point.

Mean while the suspect bag has been removed via automated discharge actuators that have placed it into a mobile robotics explosive containment chamber via RC and robotics. The bag is whisked away in an underground conduit to a containment vault with chain-linked ceiling and ruptureable membrane that empties into a containment tank (bladder) that intern is pumped down under vacuum. Then robotics opens the bag and if it explodes or has toxins in it they are read by sensor arrays protected first during the opening procedure and exposed after the bag is opened the bladder like wise has sensor arrays to include radioactive, Bio or chemical toxins and also the "Nose" sensing technology is a good choice for this application. Obviously the containment chamber would be closed before the bag opening procedure was initiated.

Back to FIG. 37, the national alert classification is shown on the screen and the local alert level appears on the computer monitor as well and in this case National Home land security is at orange "high threat" and local alert with the bag incident has jumped to RED "Severe".

With the women detained and all her traveling assets located quarantined within ten minutes and during TSA questioning the rest of the traveling public continues to their known location with no delay or in some case any knowledge of the event.

This is all hypothetical, but the PFN/TRAC units set up an easy way to organize and link many disparate data generating technologies and isolated security devices with out a lot of hard wiring. It enhances their service to provide robust federal access and control defense for a free traveling public.

Additionally, when

1100 FACT-FAA/TSA Security project industrial applicability report

Commercial efforts are underway with government (DOD) in an effort to partner up with major military and security contractors initially for national air space defense. Other efforts are underway with commercial wireless technology providers, sensor technologies, computer/software manufacturers and system integrators to develop the appropriate wireless to 1P interface gateways, servers and connections to construct the TSA FACT Security network for the nation and to write code to the determined programs, FIG. 38 These regular system checks and PFN system data then downloads will to authorized service and maintenance centers for the APUs and PFN emergency power packs. All aircraft components essential to flight and PFN/TRAC/FACT operations will have these service integrity checks run on their performance, and these downloads will also go to manufactures. There is a FACT system auditor/inventory program locally run on the aircraft via the PFNs and a system wide redundant backup program done nationally/globally for everything that flies in commercial and general aviation via the FACT Registry discussed in FIGS. 38, 39, 40,41,42,43,44,45. This portion of the FACT registry is operated by the FAA, TSA, Preliminary FACT FAA tracking registry program. Basically, the FACT registry tracks the use of electrically interfaced components and any equipment desired inventoried on the aircraft PFN file (e.g. tires type lot number) as a quality assurance program, and quick security and safety comparison check. A running program in each 1A PFN aircraft checks all known components to be on board with no alerts downloaded from FACT AOC/TSA registry during pilot ACARS, during any service of components and periodically. New item recognition is flagged data and routed to the specific center for analysis. For example, a suspect piece of baggage is evaluated through the airport terminal FACT flow data base and appropriately responded to, while an aircraft circuit or new transmission is processed through the FACT FAA central registry and compared to known inventory and assigned RF equipment) In this respect It can be used to counter terrorism, antitheft and monitor the sale and resale or reuse of aircraft and components, much as the FACT registry is used for terrestrial PFN/TRAC units for automotive marine and rail vehicles and products. Additionally required are specially qualified service personnel and controlled progressive program with security clearance for all work perform as authorized service will have to be in place for service on any PFN/TRAC units and their responsive components operating in any FACT portion of the system. Ultimately, all PFNs will be operate in conjunction with the FACT system for national security in a transportation matrix.

This is a general flow chart of a self contained PFN TRAC/FACT management system that will be utilized by every piece of equipment. PFN=s may have all the listed components or any number of them; however no mater what is electrically interfaced it will have to be approved and registered as it is activated or deactivated. The very first triangle at the top numbered 4–500 refers to the one and two-way pager systems detailed in the FIGS. 4 and 5 of an earlier patent application detailing the pager interfaces like reflex I and II discussed in this application. These pagers as is true with all components will ultimately be provided FACT software to identify their activity and especially for those technologies that are responsible for providing communication data for remote control activities. The second triangle is for cellular phone systems more sophisticated communication systems and capable of handling and delivering very good data signal but narrow band Good enough for video, etc. The 3rd triangle ( )-infinity frequency refers to any and all kinds of Radio Frequency equipment including DSRC The 4th triangle with the word locate can be either cellular phone proximity tracking, GPS, Lorands, LoJack or part of any interactive highway control system or master surface transportation net work and system receiver and/or transceiver. Along with this locate system triangle the 5th triangle is a miscellaneous communication receiver and/or transceiver that is responsive to light, sound or any discernable electromagnetic wave or transmission.

Figure 39:
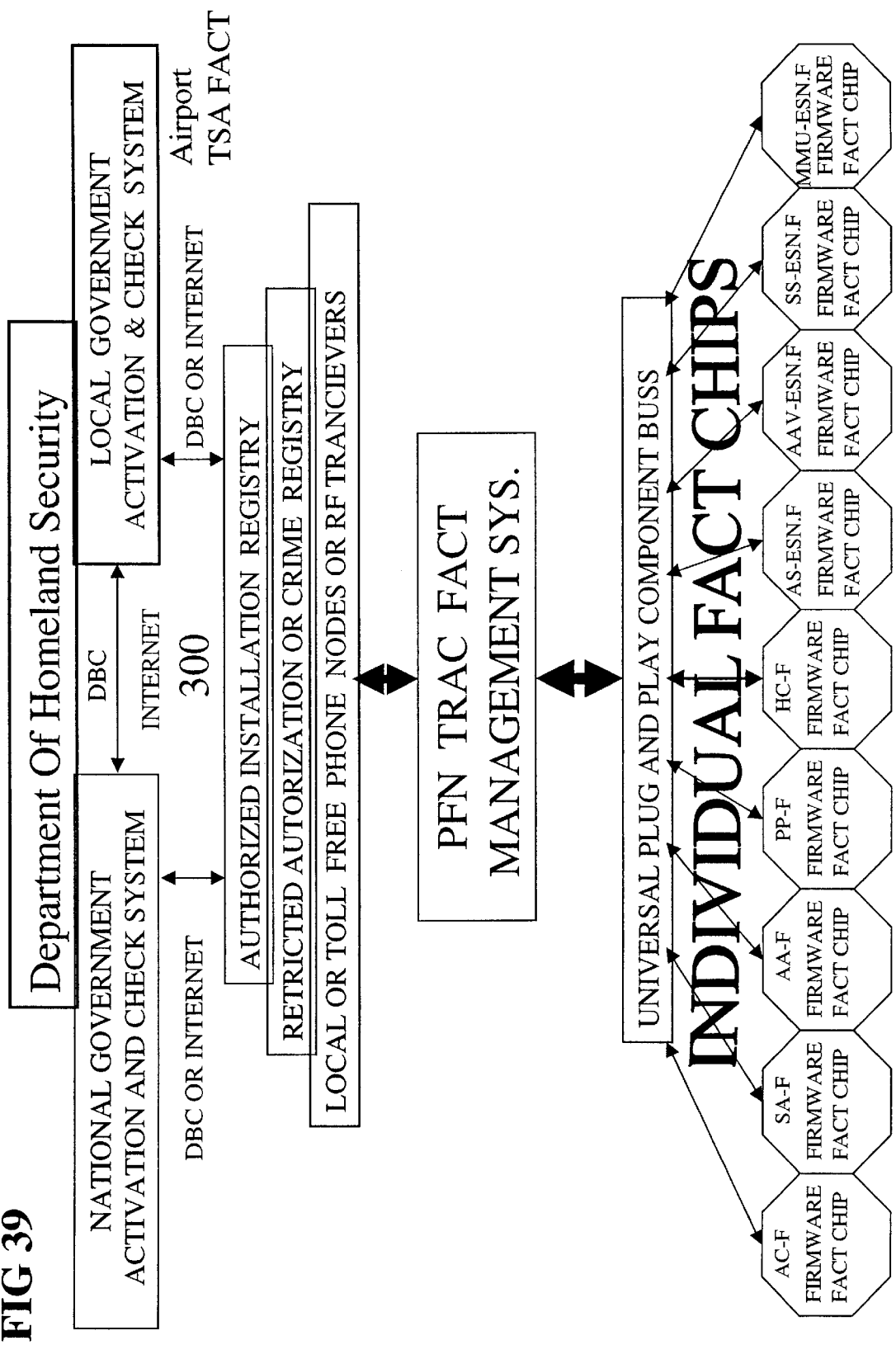
FIG. 39 FACT CHIP and soft ware functions in the system.

All of these PFN communication triangles devices or modalities shown as upside down triangles are not shown in FIG. 39 as having a FACT chip but they would also be provided with FACT software to report their activation and any specific role played in any remote controlled event as either as a receiver and/or any type of transmitting device. As is displayed in the drawing they are connected to the uni-bus connector O/I/ it could be a plug and play multi-pin docking station for hybrid chipsets with a modem and transceiver circuit etc. Any interface components that connect to the circuit are recognized by the unit and ultimately the entire FACT registry system via inventory integrity checks run locally and systemically. This first happen as the interfaced components connect to the PFN/TRAC controller/router and accompanying memory storage units. There is software with the resident FACT program to compare interfaced component electronic ID signals upon install, boot up and periodically. This local fact program can be updated and the TRAC is capable of storing and retrieving data back from its accompanying data storage. As detailed through out earlier related applications these PFN control circuits are sophisticated mini computers with extremely efficient processors like the various PC 104 boards.(from earlier filing). The TRAC processors are explained in all the technologies and are subject to the Improved capability and speed in processors is in the major reason for maintaining a flexible pug and play capacity to ensure flexible updating for future and legacy technology. TRAC has a modular based programming of which FACT the Federal Access and control Technology plays an intricate and unique role in recognizing and reporting new interfacing. These programs are run by the PFN min-computers and they send their commands and direct the data received by the uni buss to the appropriate data storage. Either a hard drive or the specially preserved non-volatile FACT memory that can either be down loaded or physically removed to be used in a court of law in the proper manner as determined by any rule regulations or laws governing evidence and its acquisition, preparation and presentation for a society. Both on the left side and right side of the uni-buss are all the interfaced controls. Accessories, personal items and electronic possessions and alternative data communication devices. These devices are coded in the upper corners with the initials or first letter of the words that describe their boxes as examples of connectable interfaces employing the individual FACT Chip. This becomes more evident in FIG. 39 where the bottom of the page supplies numerous octagon stop sign shapes filled with these same initials indicating FACT applications and tracking. Also before leaving FIG. 39 it is important to remember that in the ram memory of the mini computer the Fact ESN will be stored for all memory devices and the memory will always require the processors ESN or any comparable ID technology for any further or final review by the appropriate authorities or to comply with any legal proceeding. It should be also understood that this universal Buss can extend outside any protected area with the immediate electronic protected capability to recognize and protect against any deliberate shorting or questionable interface. At the bottom of FIG. 38 the universal buss illustrates its capability to handle power as well as in put and output control transmissions. It is also important to make clear that this involves a universal secluded antenna buss or reception will be provided for by certain types of physical structural elements in the PFN=s structure to allow for patch antennas or physically small profile antenna structure to function with in any standard regulation or legally prescribed manner.

FIG. 39 At the top of FIG. 39 there is a box to the left called the National Government Activation and Check System. From there—there is an arrow showing a Data Base Connection (DBC) or a world wide web Internet connection (encrypted if applicable) with the number 300 above indicative of any local and regional network as is evident between the left national box and the box on the right side of FIG. 38 which is termed Local Government Activation and check System. These most generally are the primary sources to PFN supplied data and/or to act on any SEAM,TEAM EAM and/or PEAM messaging data received that involves National security. However, simultaneously data is delivered to the National Homeland Security FACT command center if FACT fagged an event in the local PFN or at the regional level. Otherwise the data is delivered to the specific intranet operating the specific FACT regulatory registry for registration/activation and integrity check clearance for use of a component or piece of equipment with a FACT identifier chip or registry requirement before registration.

The National Registry will be a large routing system for mass management with a FACT alert data share processing and storage protocol in each system server/computing center, PC terminal and PFN/TRAC unit. All responsive levels of processing will handle data in a prescribed and secured manner through the 6 transparent IP layers to the appropriate seventh FACT application layer (or hybrid higher layer to be determined) where it is transposed by the specific agency intranet codecs and tracking software applications to include special encryption with agency specific message coding and personal identifiers (pin codes) for secure but accountable access to private and/or sensitive national security data to maintain professional processing and storage in every data base. This will be the same for all forms of communications wired and wireless as they are processed through their respective communication centers to IP gateways via the licensed wireless and IP data providers and servers, through the landlines, fiber optic cable systems or land cable systems from the PINS in the field to the individual databases. First for accounting and billing but most importantly to serve the and provide the management of the agencies Intranets FACT registries and services to the new to be formed Department of Homeland security.

The center three blocks are the technical connections and primary functions of the national and local registries to provide the specific government service Intranets, to develop security for the nation and provide better public safety and build trust within the populous, as a result accountability, fairness and just policies and practices. This is a safe guard system for man and machine messaging that should be review able by all of society.

As stated earlier Internet dialog and media awareness for mass and individual input will spawn a much more involved individual citizen and functional democracy. Obviously some critical FACT event data will be maintained at the highest of security levels and may never be shared with the general public. However there should be a review process in place that protects the publics' interest and involves the balance of powers to determine if nation a particular issue withheld is a National Security Risk.

Note

The inventor also suggests that one man and one women should be randomly chosen by the social security computer, per issue to serve with an Executive branch representative, legislative branch representative, a representative from the supreme court, and the two random citizens for a total of five. These FOIA issues forums can be called by the populous petitioning for it on a regular ballot during regular elections or any of the three branches calling for a FACT event issue to be disclosed and at one branch refuses to comply. Of course procedures and protocols need to be developed. Back to the Figure.

The first center block is termed AUTHORIZED INSTALLATION REGISTRY. This may be a network of secured computers in different locations or it might be one system in one location (at first it will be dispersed and it might well stay that way by the serving agencies responsive to FACT Homeland security but not housed under the same roof so to speak. The inherent account in system allows each agency to prove their involvement and participation and yet maintain sovereignty for the duties they were created fore. The inventions purpose is to create a realistic functional modality that can create this national and local registry progressively and in the best configuration and to maintain a level of flexibility and redundancy to protect and secure and safe public government and continual service. Specifically for the Transportation industries to insure good and safe movement. The Actual structure of course will be part of a large standards and on going effort and civil legislative effort.

Total purpose goal: The base system is to create a national directory of all products sold and re-sold in a country to better track their impact on economy, resources, environment, health and infrastructure all around the world and at the same time to allow nations to have a FAIR frame work to develop and use imported products, which are needed. The PFN system can help to develop trust to insure an accountable answer to all of Societies legitimate concerns first for individual survival and then to be part of a mutually healthy co-existence with all of humanity. The Authorization Installation Registry function is to record and make available by request and/or to recognize any PFN use of an electrical device in conjunction with the PFN and first run a compare function to any and all legally known produced, and legitimately marketed products in a legitimate sovereign locality through local and/or toll free telephony or RF or MISC. communications technology employing isolated network connection and/or the Internet (IP). To agency specific intranet registries.

The authorization installation will require a complete OEM specification and description that can be used to specifically identify individual devices and/or components. Requirements to be determined by the sovereign nations. This data will provide depreciating value levels and integrity checks that will be beneficial in tracking use and varying performance for securing public safety. Also the depreciation schedule will enjoy a diminished cost of operational tax relevant to the products prior use and/or time of use. This provides a use tax not a sales tax for governing structures to apply to real time use. These generated fees are fair and just and help defer the revenue generated by fuel taxes to lessen the economic need for a gallon of gas or barrel of oil. This frees the Internet to trade and free communication for general transactions and allows for the legitimate taxing structure for actual impact on society=s infrastructure and environment by machines and the work they do.

Shaping the Economy for Greater Security

These are some of the transition mechanisms in the PFN/TRAC System It is to function as a economic tool to provide commercial feasibility and opportunity to exploit alternative energy sources and not just continue to pay 41 cents a gallon of gas in tax to support our road system. The invention provides a quality of life and an opportunity for the oil-invested money to peacefully reinvest in other PFN measurable commercial energy technologies. This single event would do more to bring peace to the middle east and stop humanities 100-year wars over "who owned the oil economy" (and Power). Now that would be a security system, and the best use of the invention in the mind of the inventor. And we could fly planes on hydrogen converted from water (H20 in real-time) and the WTC 911 event would have been reduced to a crash with a splash and 10% of the losses.

Then again we might have the same relationship with the oil rich countries that help delude the minds of the 4 substitute pilots on 911 either. Security sounds better already. There is no doubt good, fair and just management of the world's resources, and environment is the best security. And management that shares knowledge and opportunity for an improved quality of life can sell and be the best export product we have.

Back to 38 the second block is the Restricted Authorization or Crime Registry. Once again this data is supplied by everyone and anyone but primarily cleared and reviewed by the national and state or regional governing agencies maintaining their intranets and servers. The really great part of this section of the system is that the private individual can in real-time participate in a personal injury theft by telephony with scan data or through personal contact with law enforcement agencies. With total accountability all parties will have to face their own actions in the proper legal settings. And basically there will be no use or miss—use of stolen property.

Basically, the stolen parts or components when interfaced with a new vehicle or piece of equipments E/E system are recognized by the local PFN or DRC, etc specifically mass contacted by the governing industry registries that are always uploading missing material data that is in turn down loaded in to the specific PFNS that always runs a system integrity check on parts inventoried or installed to the unit and/or interfaced with it. This also allows the FACT System a base to analyze the equipment that is being used in the country and be on the look out for anomies or FACT event Flags, for an example; the Department of Home land security has a bus blown up do to a specific type of wireless device attached to the DRC PFN carryon device. The DRC PFN protected memory recorded the DSRC blue tooth program contact with the cellular device and the alphanumeric signal sent to trigger the explosion. This recovered data and all similar ESN devices would locate and check automatically the total ownership and recent sales along with suspected perpetrators and dispatch this information to first responders as well as kill the services of all suspect wireless and retrieve them from all known locations if this was deemed appropriate. Additionally, manufacturers will be encouraged to install in their firmware an integrity program that FACT alerts the unit if there is tampering detected. The third center block deals with the communication capability. Ideally this will be accomplished by toll free telephony or RF nodes for the public in using the publics= privately owned equipment and PFN link ups as a hospitable commercial service with all other gained accessible service options and provided free by government or public providers for the tax and public interest provisions. The 4th block in the center of FIG. 39 is the Protected Primary Focal Node or PFN created as a protected electrical interface platform to merge, focus all host equipment=s, accessories and component=s power and control circuits into one local accountable control and communication center. This PFN on every vehicle or piece of equipment is then linked, coordinated and managed with all other machine use and activities by a greater mass communication and management set of computer network systems (through RF, telephony and nodes or gateways) either for surface (land and sea) coordination and/or for aviation and for TSA and homeland security all inclusive.

However in this figure we are concerned with developing an understanding of the FACT software in the PFN and/or possibly individual CHIPs that are at the bottom of the page as octagons or (mini-stop signs). Once again these might well be in the form of physical hard ware and read only firm ware or they might be integrated software programs interlaced and inter-reliant on the PFN/TRAC/FACT security encryption both in the PFN and in the National Registry systems. What is nice with the PFN/TRAC unit and system is that a multiple wireless routing translation station is coupled to computer terminal to have the same versatile receiving and transmitting power and capacity on both ends of the network. This forgiving architecture provides the opportunity for incredible versatility interfacing of all sorts of electronic technologies and with the traceable links reporting and recording function totally accountable a real deterrent for hackers.

Through out this entire drawing, FIG. 39 there is descriptive of two-way communication form the individual chips or FACT programs to the national government activation and check process. However, the PFN gives the commands to the individual chips via the universal plug and play buss. And retrieves their essential operational data e.g. ESN, and/or MIN and production Identification and seventh layer application security instructions in the ISO OSI networking Model. If for example a stolen audio or sound unit is connected to the uni-buss of a vehicle. The PFN computer will signal or request information from the individual FACT chip in the sound system (SS-ESN-F). This can either be sent by isolated control hardware (wires, etc.) or by sending a modulated digital signal on one of the power legs or it can be accomplished by short range transmissions if this modality is employed in future wireless vehicle and equipment control systems to ease plug and play capability and reduce the need for so much hard wiring. No mater the means the PFN will inquire for an individual fact chip as soon as it senses current draw. If there is a change in current from a normal operational level the PFN will request and/or review vehicle conformations for any trouble codes logged in the charging system or any battery draws or charging problems. This is performed by a TRAC software algorithm and standard current sensing micro chips in the uni-buss and in the host equipment=s electrical system, which can generate either analog or digital signal that the PFN/processor can receive and recognize through any of the above in vehicle communication modalities. This current sensing system is part of an anti-tamper system of the PFN. It will give driver alerts to the abnormal draw unless an individual component FACT chip sends an ESN and data signal that is recognized for a specific authorization or security protocol. At the very least all components can be individually judged for their current draw and reported to the display or checked against their OEM manufactured specifications (Data delivered by the individual FACT CHIP to increase security that a component has not been altered after manufacturing. Even a individual resister chip like that used in the present vehicle keys could be installed secluded in the board with the FACT Chip to add even greater security and integrity checks. While this idea is creative and new the technology to make these combined innovation are available as electrical components and any one who is skilled in the art could from reading this section create the necessary circuitry to complete these security tasks. All the components are listed through out my related patent applications for the trickster circuits and the security seal activation switch. The universal plug and play Buss as always stated will have to be a standardized effort for the most optimum development. The little octagon stop sign FACT chips at the Bottom f the page have letters on the top of the sign like AC-F which means (Activity controls-function). These correspond to FIG. 38 left and right blocks. Once again all the components operating in or though the PFN will have to have FACT chip identity capability, communication processors, data storage as well as all these listed that access the uni-buss. The RFID technology can be imbedded into a circuit board and maintain a component memory function for the life of the component reporting to the DRC PFN directly or via any other device interface or other PFN or as quarried by an RFID reader capable PFN. (These applications of RFID and other COTS tags and smart chips used to track component use if done for an organized theft detection of electronic devices and parts self reporting to a computer network or security registry as described is considered proprietary to this technology and within the nature and scope of the invention. (All applications outside Commercial air travel and air transport industry require additional licensing and coding for accounting and billing by the prior related PFN filings).

Figure 46:
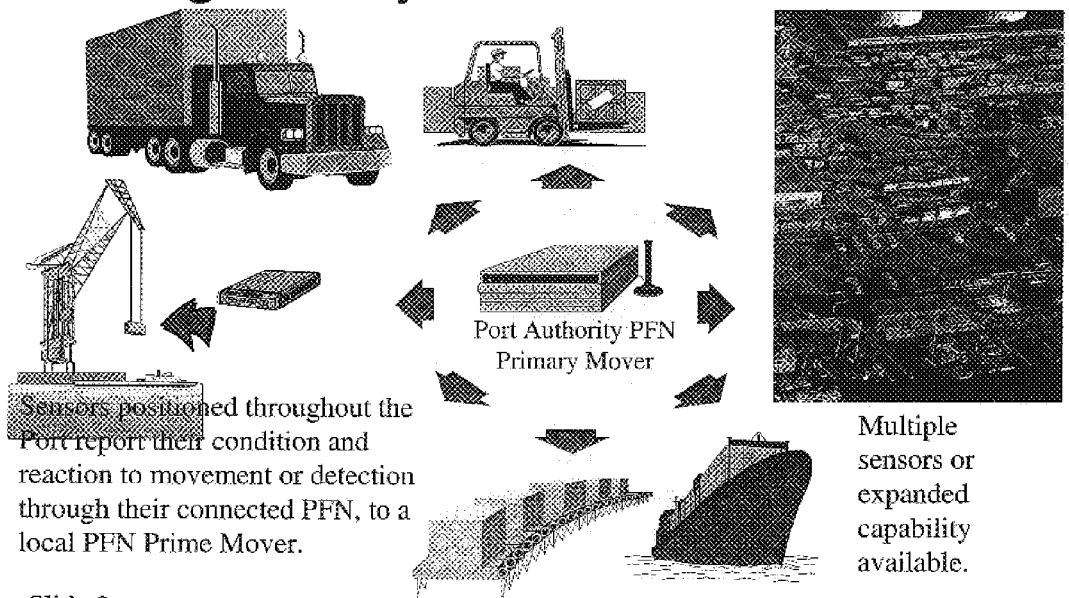
FIG. 46 Portable networking Application to keep a running inventory of a shipments contents and placement.

FIG. 46 This figure state the attributes of PFN/TRAC intermodal monitoring and tracking. As detailed in FIG. 37 for tracking persons and their baggage as well as detecting their condition and contents during transit can be done for materials and shipment in transit from boats to rail to trucks to aircraft to trucks and delivery vehicles again. There is however, a unique set of circumstances to each of the mode of transportation. As shown in FIG. 18—ground transportation internets involve both rail and roadway vehicle platforms and their special transportation machinery. These therefore are separate intranets.

The Railroad industry like aviation does not like rapid change or any physical interfacing with the E/E systems either on the train or to the rails. This is why the wireless TRACker unit is also employed in the passive receive and repeat function initially and more physically interfaced in time. Firs as a redundant system and then as a continual progressive and working interface with inherent redundancy and accountability. This is true for the Interactive highway internets that are infantile in their traffic messaging and public alerts the amber alert system of signs.

Obviously the PFN/TRAC will be much more of a tracking and telemetry service as Telematics in cars incorporate the PFN DRC Driver resource Center and rail cars the 1SV PFNs and inter modal containers are constructed and/or retrofitted with 1Ps PFN as well as components shipped in these vehicles and containers are packaged with 1Ps and 1Ps Soc units as well as RFID technology.

The PFN/TRAC system of wireless relaying supports a floating network inventory function for real-time accountability. When a shipment is prepared and logged into any intranet, to include secret or military shipment being transported on commercial carriers or some times on a commercial carriers the PFN DRC, 1 SV PFN rail 1 M PFN marine 1 E stationary PFN would be receiving signals from the passing minimal DSRC and would report these positions and telemetry via packet data to the wireless gateway for 1P routing encoded in the data packet. Prior to being shipped a shipping plan would be filed in the intranet. As the separate components went their different paths their beacon signals or quarried signal from the system would constantly provide their exact position to be compared with known shipping routes and practices. Alerts for misdirected transport and/or the absence of an asset in transit would or could trigger a FACT alert and system wide up load of the missing 1Ps PFN RFID tag or bar code marked package and the Air internet, Sea internet Rail internet and Interactive highway to include Onstar etc. Would be downloaded the missing ESN or code number signal for the missing shipping component.

All the shippers like UPS, FEDEX, DHL, the motor carriers and major rail and fright lines and cruise lines would all have responsive PFNs on the vehicle Platforms and all would be responsive to PFN/TRAC lost and found registry for commercial search and FACT registry for criminal investigations and/or National security FACT events.

The lost and found registry would be virtual and made up of all the stakeholders intranets. They would be notified if a tracer was sent out by a specific shipper or recipient and their intranet would notify all parties of the miss shipped piece FIG. 47 PFN/TRAC provides a portable network of repeating PFNs with sensor and wireless interfacing. It performs wireless sensing and relays data as part of a federal access and control technology for national security and public safety. The PFN on each prime mover harvests data continually from all the materials being carried and routes data recovered to the appropriate monitoring terminals in the various intranets as per pre programming or remote control requests.

Figure 48:
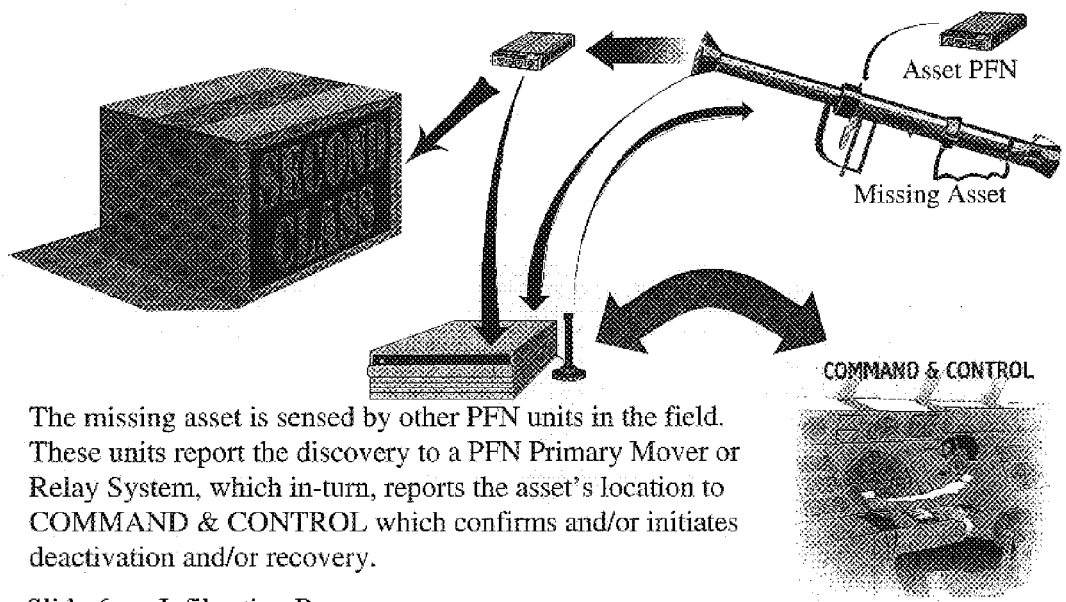
FIG. 48 Portable networking Application to keep a running inventory of a shipments contents and placement.

FIGS. 48 Obviously, some shipment components are more valuable and/or sensitive than other components. For this reason The PFN/TRAC System integration provides for minimal tracking and telemetry to be cost effective and extensive tracking and telemetry to insure public safety and national security. And sometimes the more sophisticated tracking and telemetry applications used during shipping survive the transport phase and are retained as interactive equipment PFNS for permanent use in reporting through the PFN/TRAC system to a specific FACT security intranet. FIG. 48 is an example of the myriad of possible components shipped and the diverse types telemetry technology interfaced in the complete PFN/TRAC controller router to provide the management and security matrix or web.

Not just proprietary 1Ps stand alone PFN units with some of the most extensive sensing and remote control capability interfaced and stored in the shipment component to report position and condition of a asset in transit. But also including existing technologies like, Texas Instruments RFID technology for a little less data recovery their (active) tag and basically ID recovery their (Passive Tag) product. Also PFN interfaced are bar code readers and the proprietary Bag sign technology. Mostly, interfaced by DSRC wireless to the prime mover PFNs or TSA/Customs/Law officer/ Dockworker/UPS man/Mechanics/receiving clerks/ mailroom people/baggage handlers/ticker writers/Pilots/ doctors/nurses janitors/via their 1P PFN belt or 1P PFN PDA or another more powerful 1Ps PFN possibly solar reenergized for more sophisticated stand alone repeater router operations to complete the flexible portable network of connections to locate any lost assets position and condition in transit.

Human movement is traced via by ID and surveillance technologies interfaced in the same manner. This is total movement management and seamless security for everything that moves is good for airports, ports, train stations, border crossings, state road inspection stations, interactive highway systems and on and on.

Figure 40:
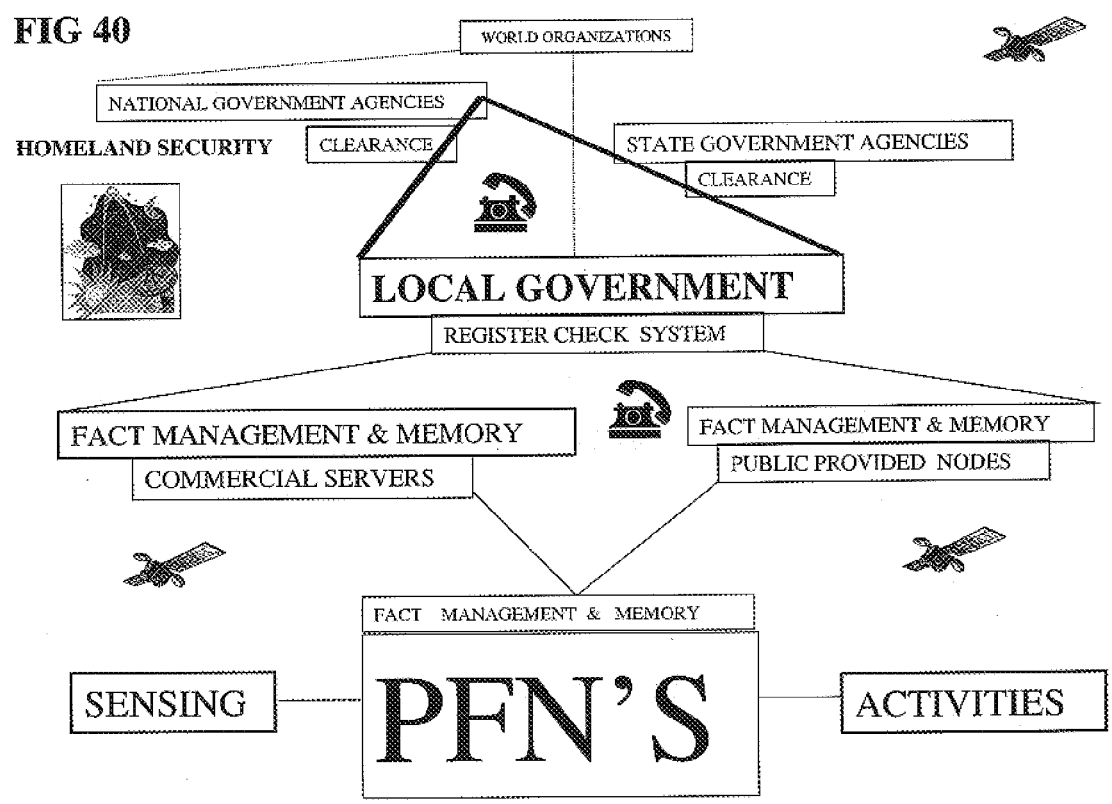
FIG. 40 FACT CHIP and soft ware functions in the system.

FIG. 40 This figure will detail the registry system in general. At the very top of the page is a small box that says World Organizations. This is the present state of World affairs with the national government agencies in control of the data involving any and all mechanized civil and industrial uses of equipment and any impact data specific to national sovereignty. Ultimately the PFN TRAC system can help to develop trust and fair play in the use of the world's resources and equipment as well as free humanity in an efficient manner. When humanity matures past present survival fears and accompanying paranoia to address only the real fears of peaceful co-existing the PFN management system will serve its greatest function. However, now it is best used and developed in the individual nations to reach this point of world peace. As communication and understanding is increased the natural sharing of data will take place and is already transpiring on the Internet. For the present all government agencies will serve to clear all PFN data that is earmarked for their attention through the National Registry and be responsible for its dissemination worldwide. The Departments of Defense and Homeland security will have control over all questionable data for final release at the highest FACT Command level. This is to include the National security agencies the President and (any congressional national security committee advisement group?). (this is regularly an Executive Branch operation and function of government)

This is why the big black triangle ends up with National Government Agencies for security. Additionally, taxation can be performed directly from every PFN(Sale and/or use tax) for the state and National government as has been described and addressed in earlier applications. Also credits can be applied back to the user or citizen for any community service performed by their equipment via the accurate accounting in place. Also aid can be applied with re-education programs carried out through PFN terminals for industries going through retooling wear old job skills resulted in lay offs. These attributes and commercial products and new industries are detailed in related filings. The bottom of the triangle has LOCAL GOVERNMENT in big bold letters. This is done for two reasons. First the local node (Subset of intranets with gateways and servers will keep cost down for Registry networking. The great advantage to the PFN/TRAC system supporting the FACT registries is that the PS base of Processors and at each level allows for data and processing to remain locally responsive from the PFN to the mass data systems to service the existing dispersed networks immediately. And second regional state and local government is the agencies that impact the individual in most cases. As has been detailed in earlier filings all the government agencies are now maintaining web pages and data phone nodes and through basic routing using ISDN and high-speed fiber optics (Cisco routing Systems) the capability for these agencies to process data and network efficiently is excellent. Data management for local regional and national Data base connectivity allows for fast local discrimination of data as well as provide much more data storage locally making the general availability of data in the intra nets much more responsive to web information products for the public or through the media while separating the sensitive data from the local PFN and through out the system. Below the local government registry are the FACT Management & Memory for commercial servers. And to the right side the same FACT Management but provided by public provider nodes. The difference being that individual commercial servers will be providing more fee for services from emergency service to computer down loads and the public nodes basically will be for government services FACT operations. Basically the PFN will use both systems commercial and public. It will do it automatically at the local PFN level via pre programming. An important note is that both these systems TRAC and FACT will provide accountable memory as does the PFN at the very bottom of the page, which is responsible for activities performed and authenticating the activities. As shown and discussed in FIG. 39 via landline wireless and satellite communications.

Figure 41:
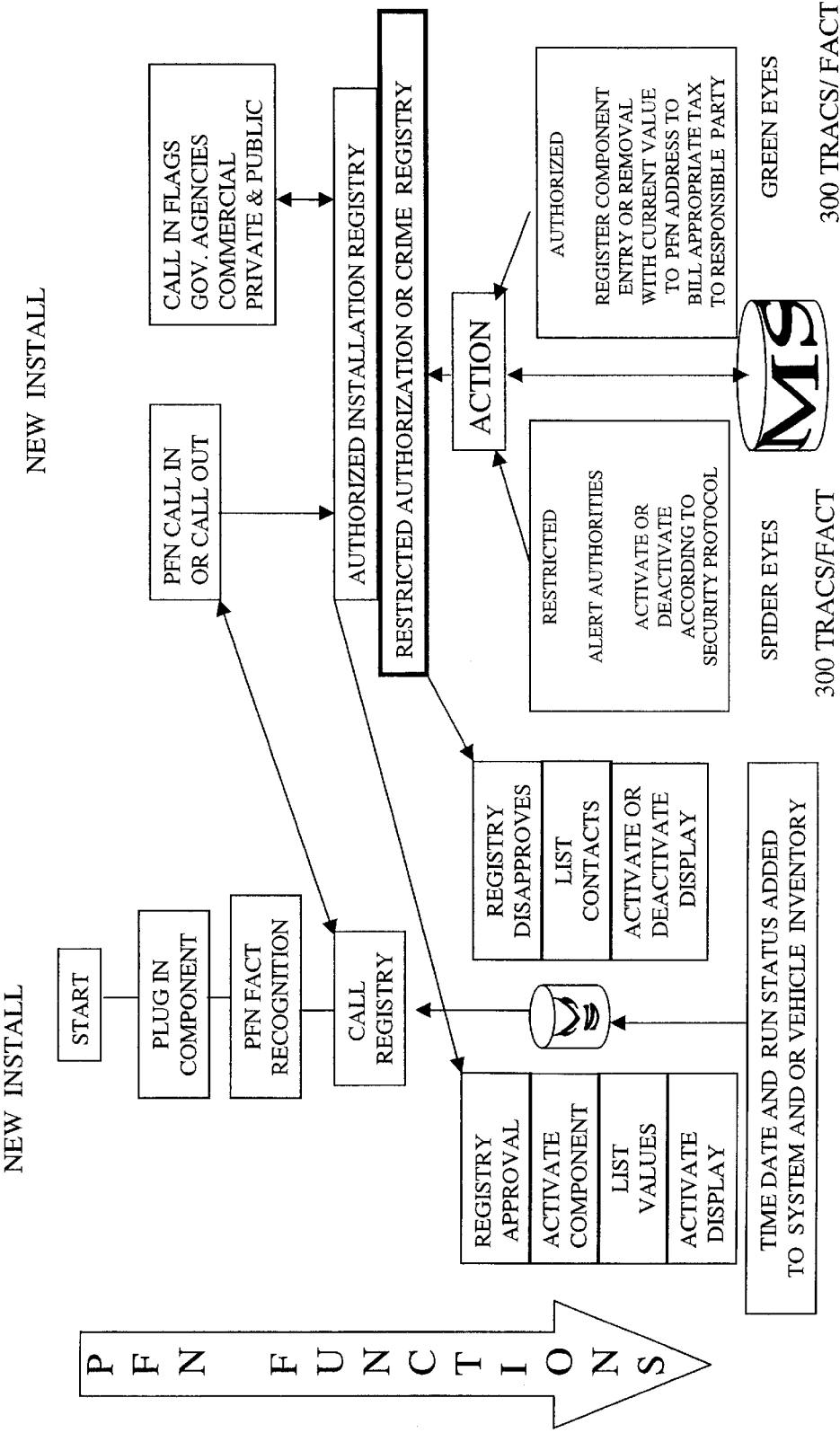
FIG. 41 FACT CHIP and soft ware functions in the system.
Figure 42:
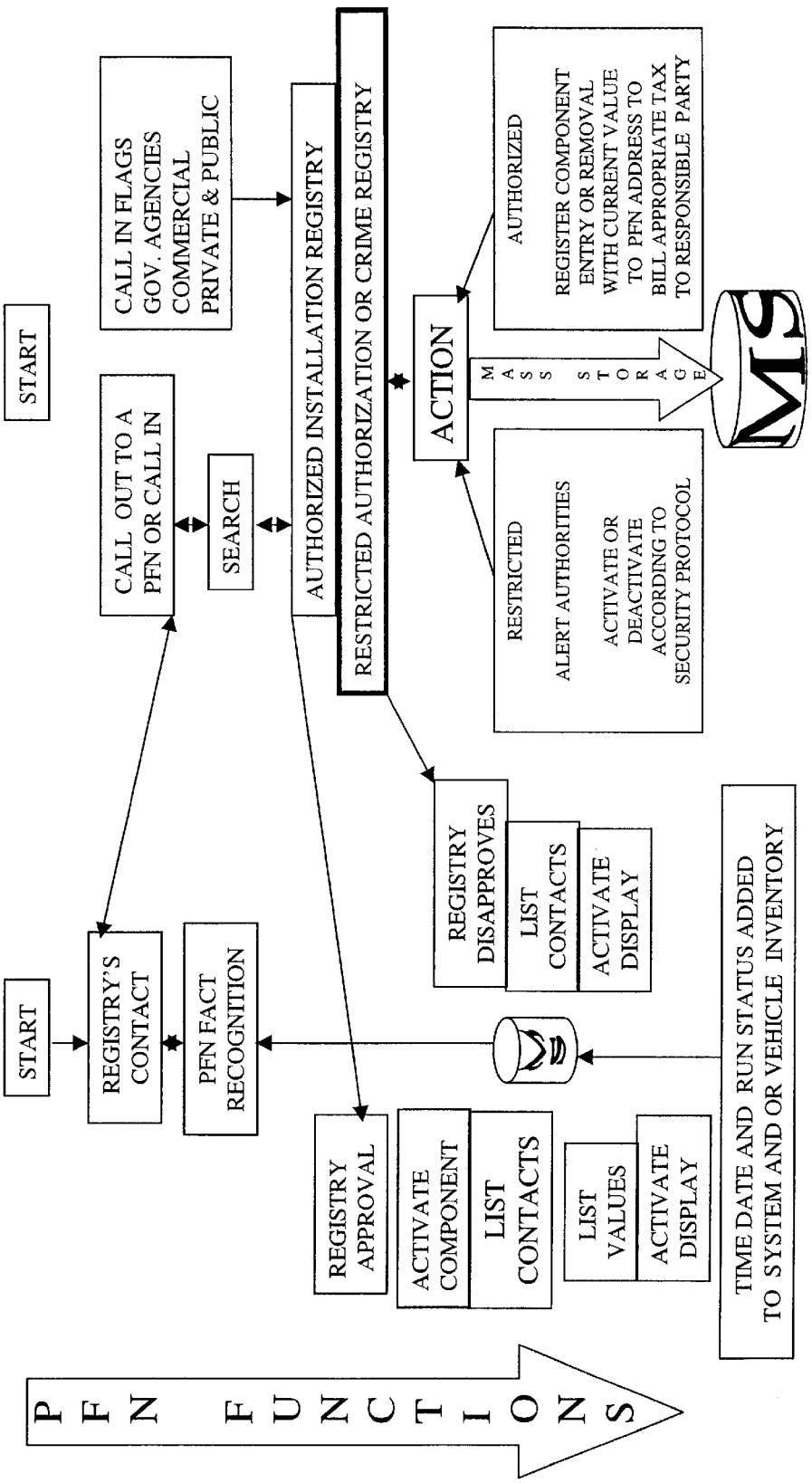
FIG. 42 FACT CHIP and soft ware functions in the system.
Figure 43:
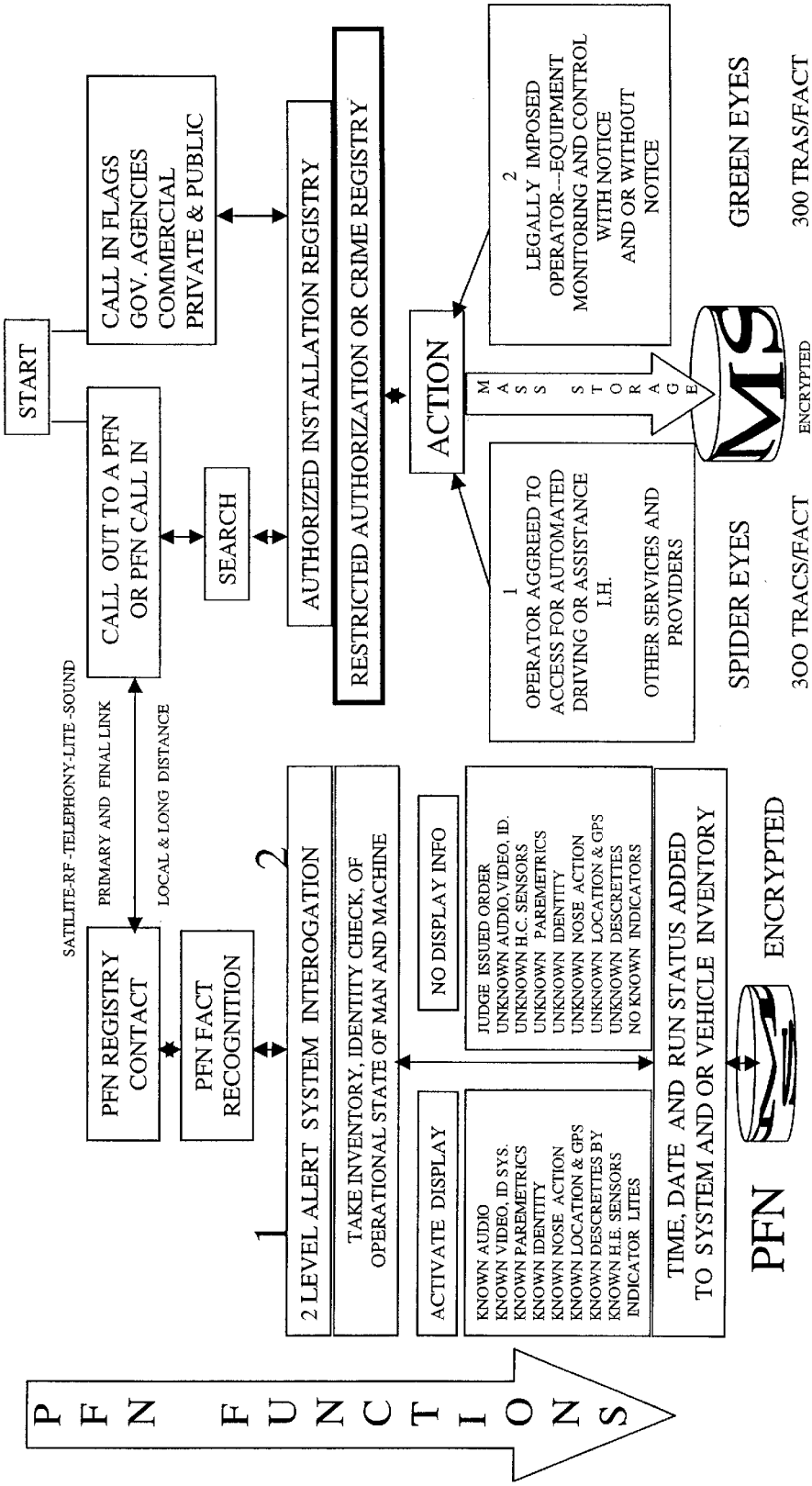
FIG. 43 FACT CHIP and soft ware functions in the system.

FIG. 41 This is a flow chart to detail FACT software in the PFN on a host piece of equipment and also the interaction with agency FACT software programming in the main registry. For a new install the process is started by plugging the component via one of the discussed interface connections. As illustrated by the second block down the PFN/TRAC/FACT software recognizes the Components Fact chip and calls a predetermined number. The call in number can be a commercial server or a public provided node that access the specific agency national registry (either locally first or vice versa or simultaneously as detailed earlier. The right half of the page is exemplary of FACT operational software in the main registry system. This is at both the national and state government registry system, which does clocked data updates to maintain uniform integrity throughout the system. The call received by the PFN data generated from the new component check process compares the ESN and manufacture data to OEM supplied registry lists and known crimes of stolen property entered in the registry by citizens and the automated UCR and IBRS programs converting voice recognition recordings generated in the onsite police investigation into a digital signal and text if desired from a DRCPFN repeater in the responding police cruisers. UCR and IBRS are FBI justice department crime reporting programs in existence. Their forms and format would be automated as a bases for their report-operating program. The data would be dispersed at the local level by the crime coding already established to reduce over loading the system. FACT event data would be proprietary and statistical would be assimilated in local accounting programs and passed on in data bundles at off times.

If all is clear the registry approval is given and transmitted back to an approved registration program in the PFN. The component is listed as its appraised value is taxed and shown on the display for the operator and/or owner of the host piece of equipment. The same redundant data is sent to the appropriate governing revenue agency intranet and a tax bill is prepared, unless the operator decides to pay in real-time with either a credit card or bank debit card in the card reader on the PFN. In which case the electronic payment is sent to the cash receivables database in the Bank for the state treasury and National IRS if appropriate. In any event the entire transaction is timed dated and the run status is added to the inventory list of the vehicle or piece of equipment. If hard copies of the transaction are required a return E-mail address can be sent to a home unit for printing or memory storage or printed on location from the PFN or downloaded to a laptop or portable printer. If a component is flagged with an alert it will be accompanied with specific software commands or additional alerts depending on the severity of the situation. A simple theft protocol might activate the unit normally with out notifying the user and alert the appropriate local authorities to the location of the stolen property and then regain custody of the stolen property and inquire as to how the person in possession received that property. If there is a Terrorist alert to a particular component as soon as the person installs the unit the alarms will be activated in all emergency responding agencies and even kill all power to the PFN and/or set off alarms and warnings.(if this procedure and protocol are determined desirable) This depends on the nature of the emergency and will allow for on the spot real-time commands to augment any response. As mentioned earlier FACT can provide a stealth eves dropping mode so that operator owner and occupants cannot tell that they are being monitored and/or recorded but this access mode will require a signed judges order and his personal real-time access codes derived from a synchronized pin number generator to electronically sign the writ or search. Once again any miss use or abuse will of this access activity will be accountably recorded and encrypted locally and in remote locations and abuse should meet with the most serious criminal and civil penalties. This activity is for FACT Homeland Security or severe public safety threats from known dangerous criminals. Freedom of information act will apply to any legal own of their PFN controlled equipment and they will be able to down load their individual memory that will show a complete access and use of their system coded with the agencies ID (local and national as well as for commercial access) (In light of 911 these exact applications and use have to be review but the nature of any abuse should not be minimized and the most profession use should always prevail.

The Exception is the court/FACT-ordered stealth surveillance: All normal government contact with personal or private DRC PFNS or other commercial contacts must first announce their access, to be recognized by the own/occupant and agree to the open communication process or it must be a time of national emergency, marshal law or a crime in progress. In any event all will be recorded and accountability will be part of any process to use or not use the PFN record as evidence in a court of law. The exact use of recordings and the preceding announcements or Miranda rights will be part of a legal standards effort. Also a redundant record will be kept in a remote location either in a licensed commercial FACT server or in government mass storage. These systems are detailed in earlier related patents. As the spider eyes and green eye software programs. These are the law enforcement (spider eyes) and environmental analysis programs (Green eyes) of the FACT Security program detained in earlier related patents. The Fact program will basically be operated with the Justice Department the FBI IBSR incident base Reporting system and The UCR the Uniform Crime Reporting system and it will be part of this technologies Spider Eyes system and will be totally accessible to local law enforcement and even the general public through national state and local agency editing as justified and presentation on the web or for public media notifications (PEAM and EAM messages).

However, all crime activity will be given ID=s either IBSR-UCR or local and all data can be retrieved from the mass data in any discovery to make everyone accountable for all decisions and use of data including editing from the public. MS is the mass storage in the TRACS/FACT system. Basically this drawing is self explanatory and I have outlined in writing what would be incorporated in any software algorithm as well as how humanity will be able to legally use this technology in a constitutional way. The deliberative process with the public should be fully engaged and the extent of personal privacy invasion should be closely monitored known by all and mirror The homeland Security threat codes. Red Severe, Orange High, Yellow Elevated, Blue Guarded, and Green low.

Obviously what actions are warranted for which level of threat requires further exploration with those skilled in public safety and national security and a good hard look and understanding by the public at large—This security portion of the technology is all about trade offs and freedoms and responsibility. With, that said this inventor joins responsibly with his fellow citizens to make the hard choices and work hard to minimize the negative impacts on our freedoms and rights.

FIG. 44 PFN/TRAC/FACT/ESN Operation Basic to the concept of operations of the TRAC and PFN, is a unique Electronic Serial Number or ESN, which maybe either installed by a device at the manufacturer, or programmed at the point of sale. Every component, device or subsystem within the accountability matrix (Local PFN) has an electronic identifier and in some cases a secure electronic power or processor cut off for FACT function. The ESN allows each element within the matrix to be securely and accurately tracked, inventoried or controlled, either through a local control loop or remotely, by an authorized FACT application or agency. An example of a remote application might be local law enforcement personnel disabling a vehicle being chased by police officers. In many ESN applications, proper security measures would obviously need to be taken to prevent replication or copying of device or system ESNs for the purposes of fraud, unauthorized control or interception of data, or other criminal or terrorist activity. The FACT ESNs would also be the basis for digital encryption of information passed between the PFN device and the controlling entity (A National set of agency Intranets for a complete FACT Registry) with local network processing nodes through public communications channels such as the phone lines or Internet initiated in many cases wirelessly from mobile PFNs accompanied by their Mobile Identification Number (MIN). This technology is nearly equivalent to that used in today=s wireless systems and will incorporate many of the COTS encrypted security systems at the application level. Therefore it will require little research and development to implement; only modification of currently used commercial technology is needed to expand these applications of ESN/encryption technology to other areas (components, devices, equipment) interfaced through the PFNs. The adoption of standards that allow multiple vendors to inter operate is of primary importance and should be pursued in appropriate standards organizations such as the American National Standards Institute (ANSI), International Standards Organization (ISO) or others such as the Institute for Electrical and Electronics Engineers (IEEE) Electronic Industry Association (EIA) and Consumer Electronics Manufacture Association (CEMA). As well as all the industry specific manufacturers and their associations e.g. for Automobiles.

The PFN provides for flexible interfacing during this process but agreed upon standards to further refine and define the variables is essential.

The importance of security in these systems cannot be under emphasized. While communications privacy within the PFN matrix is a concern, it pales beside the threat of spoofing of such systems. Digital has virtually ended spoofing as was experienced with analog system. And PFN accountability will system hackers NEW FACT CHIP General purpose possible modality to prove feasibility Component FACT chips are a micro-controller chip and/or smart chip that is integrated and/or interfaced with a silicon switching relay in every power regulating circuit or send the necessary data signal for any and every electronically controlled piece of equipment, devices and/or commercially available circuit. The FACT system will be able to interface into any control circuit and restrict operation through a chip or software and direct all input signals to a designated onboard memory that is also provided time, date, location and the author of command (pin finger print ID or iris eye) as well as the command strings and all responses there to; be they automated or due to human activities.

The individual software will be capable through PFN interface communications to provide their stored data (firmware or flash memory to the National Registry upon a new installations and will be able to immediately in real-time report this data. Once the data is receive and processed it will be checked to see if it has tripped any alert flags. If there is no criminal or suspect security flags the registry will record the new FACT component installation with accompanying (PFN operating inventory) to the appropriate PFN file in the main registry and apply the appropriate taxes and fees for the product installation. This will be accomplished through a publicly provided registry phone none or a licensed and bonded commercial server that is registered and periodically inspected and reviewed to have and provide a secure Data Base Connection or encrypted Web connection with the appropriate government agencies (the National Registry, FCC, FBI etc.). This is all part of the Trusted Remote Activity Controller System. This FACT program will provide a secure command string and access path from the origination to any mass memory storage system that is search-able from the National Registry by any appropriate authority or agency. Some failsafe security for the system is provided by the component software of FACT at the application level establishing a handshake with local memory in the PFN and legitimate remote registry equipment and a secondary integrity check from prior legitimate registry contact data. (possibly a Random code number established in the last contact with the PFN and Registry. The registry will provide all public providers and commercial servers with the alert flag data so any receiving system will be able to inform the PFN of national security alerts for potentially dangerous devices (terrorist altered components that could be used to activate explosives, chemical, or bacterial or viral microbes contaminants) through the commercial (PFN) remote and management control systems. Of course the appropriate authorities would be alerted to any of the national security high-risk installation attempts in real-time. The immediate action could be performed by either predetermined automated protocols or by real-time commands handled directly by the appropriate authorities. Because, the exact piece of equipment can be ID by its FACT chip along with all its Original Equipment Manufacture OEM=s firmware (Lot No. and any security codes, etc.) and of course this would be updated by any additional or subsequent use such as re-sales, retrofits or re-installments. An accurate record shall be provided with in the chips firmware or flash memory and in the national registry (mass storage to be either provided by public government or commercial servers licensed). This process will be readily supported to provide tracking for commercial trading of legitimate products (new and used) giving government the economic taxing tool for real transactions and real-time product use for new and used devices components products and total equipment packages such as (cars). This will also allow for immediate component analysis for any criminal activity and a clear record of component ownership and use through PFN/TRAC/TRACS/FACT programming. TRACS/FACT programming will be issuing Stolen alert bulletins, and/or any security alert flag at periodic times for PFN=s to do internal integrity and security tests as this information is reported or becomes available. Otherwise, any device, system and/or component will be assessed for its legitimacy and real-time use at the time date location of installation along with the PFN ESN and whatever other data is determined to be applicable. At this time it will be appraised and billed to the responsible party for its use and impact on society, its infrastructure and the environment. Obviously it is necessary to identify the host piece of equipment, and, any and all components the new installation is interacting with, as well as, all interactions from communication devices, control circuits, actuators, and responsible monitors, control an or management centers all of which is recorded in the PFN secure memory (recording devices) for (accountability) and in at least one remote mass storage facility for accountability. The primary purpose of this singular identity component chip is to track any and all use of the attached device and/or component that it has been incorporated into and to report any and all data in a complete and integral fashion, as prescribed by any code, regulation, law, and/or standard decreed by any sovereign or governing authorities. Number 2 in FIG. 16 is the SMART CHIPS and/or a magnetic strip can be provided as part of the components unit packaging and/or a bar code so that an immediate check of the component can be search either by a OCR scanner or a hand held magnetic strip reader. With the more extensive amount of data handled by smart cards and chips this is another inexpensive modality that will help in tracking and reporting stolen materials. A hard or plastic card would be issued to the purchaser of any TRACS/FACT device so that they could scan their stolen property data to the National Registry.

Number 3 is the universal plug and play buss inside the PFN containment that create the electrical interface platform for all the components. This buss will carry the appropriate power connection and control connections from the PFN/TRAC/FACT controller to activate, deactivate or specifically control any and all components. Power can be cut off to a specific component through the BUSS or it can instruct the individual component=s FACT CHIP to intercept power (power input or regulator circuit. All the electrical connections in vehicles and equipment are need of standardization and I have written to this in all my previous applications and these are areas that will be a standardization effort in each industry and/or application specific use of accountable remote and automated control. I have addressed how to complete these functions with present hardware connections firmware and software and have created some new modalities to interface all the present devices. However as shown in FIG. 6a the components and technologies are merging and this universal plug and play BUSS in the PFN is an ideal way to make compatible this electrical interface platform.#4 of 16 is just pointing out that the individual component FACT CHIPS must provide firm ware or stored data of identity, OEM data, last application, etc. to comply with any standard or regulation developed for a national registry or any such security system. Because FACT is a major part of the main operating system in TRAC its software is also modular and can be in any form or hardware application. The hardware chips and firmware modality detailed in this application should in no way be considered the only modality to create a nation wide security and management that is capable of real-time control of individual components, devices, and equipment. However, any other modality should be considered within the nature and scope of this invention. And this is area #6 of FIG. 16. The chip also can perform activation and deactivation of the component and that is what is meant by saying it A must provide control.

Note: In the description of the FACT component in this invention as described as a chip, does not have to be in every case, It can be as firmware in a chip or software programs loaded. That way the best form of security for data management is open to each individual manufacturer=s best options with their particular products to provide this function so long as it is approved by any governing standards for this use. It is obvious that a physical chip could be replaced or compromised in its firmware so additional means will be utilized to insure security, such as the random code exchange discussed above at the last legitimate contact or string of contacts with the Registry allowing only appropriate one-way communication at the time for the PFN compare list or component compare list is running to validate a legitimate registry contact or vice versa for the registry computers being accessed by a new PFN component application.

FIG. 45 This figure state the attributes of PFN/TRAC intermodal monitoring and tracking. As detailed in FIG. 37 for tracking persons and their baggage as well as detecting their condition and contents during transit can be done for materials and shipment in transit from boats to rail to trucks to aircraft to trucks and delivery vehicles again. There is however, a unique set of circumstances to each of the mode of transportation. As shown in FIG. 18—ground transportation internets involve both rail and roadway vehicle platforms and their special transportation machinery. These therefore are separate intranets.

The Railroad industry like aviation does not like rapid change or any physical interfacing with the E/E systems either on the train or to the rails. This is why the wireless TRACker unit is also employed in the passive receive and repeat function initially and more physically interfaced in time. Firs as a redundant system and then as a continual progressive and working interface with inherent redundancy and accountability. This is true for the Interactive highway internets that are infantile in their traffic messaging and public alerts the amber alert system of signs.

Obviously the PFN/TRAC will be much more of a tracking and telemetry service as Telematics in cars incorporate the PFN DRC Driver resource Center and rail cars the 1SV PFNs and inter modal containers are constructed and/or retrofitted with 1Ps PFN as well as components shipped in these vehicles and containers are packaged with 1Ps and 1 Ps Soc units as well as RFID technology.

The PFN/TRAC system of wireless relaying supports a floating network inventory function for real-time accountability. When a shipment is prepared and logged into any intranet, to include secret or military shipment being transported on commercial carriers or some times on a commercial carriers the PFN DRC, 1 SV PFN rail 1 M PFN marine 1 E stationary PFN would be receiving signals from the passing minimal DSRC and would report these positions and telemetry via packet data to the wireless gateway for IP routing encoded in the data packet. Prior to being shipped a shipping plan would be filed in the intranet. As the separate components went their different paths their beacon signals or quarried signal from the system would constantly provide their exact position to be compared with known shipping routes and practices. Alerts for miss-directed transport and/or the absence of an asset in transit would or could trigger a FACT alert and system wide up load of the missing 1Ps PFN RFID tag or bar code marked package and the Air internet, Sea internet Rail internet and Interactive highway to include Onstar etc. Would be downloaded the missing ESN or code number signal for the missing shipping component All the shippers like UPS, FEDEX DHL, the motor carriers and major rail and fright lines and cruise lines would all have responsive PFNs on the vehicle Platforms and all would be responsive to PFN/TRAC lost and found registry for commercial search and FACT registry for criminal investigations and/or National security FACT events.

The lost and found registry would be virtual and made up of all the stakeholders intranets. They would be notified if a tracer was sent out by a specific shipper or recipient and their internet would notify all parties of the miss-shipped piece.

The interfacing between internets and shippers and recipients can be made locally regionally and nationally via DSRC to the multiple application specific wireless.

Figure 47:
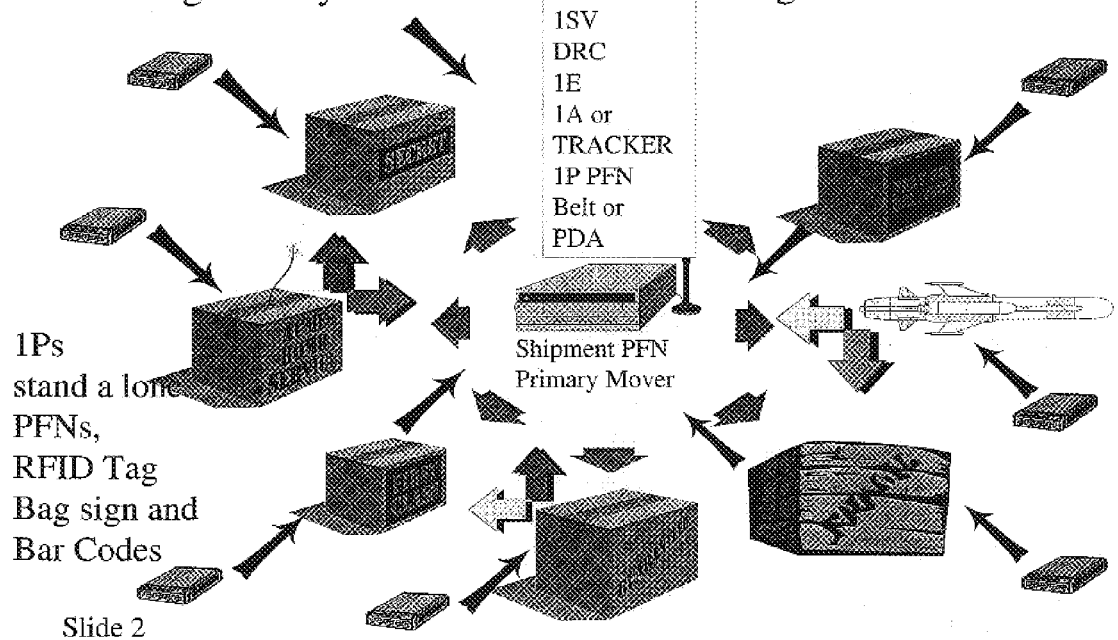
FIG. 47 Portable networking Application to keep a running inventory of a shipments contents and placement.

FIG. 47 Obviously, some shipment components are more valuable or sensitive than other components. For this reason The PFN/TRAC System integration provides for minimal tracking and telemetry to be cost effective and extensive tracking and telemetry to insure public safety and national security. And sometimes the more sophisticated tracking and telemetry applications used during shipping survive the transport phase and are retained for permanent use as a PFN reporting through the PFN/TRAC system to a specific FACT security intranet. FIG. 48 is an example of the myriad of possible components shipped and the diverse types telemetry technology interfaced in the complete PFN/TRAC controller router provides forming the management and security matrix. Not just proprietary 1Ps stand alone PFN units with some of the most extensive sensing and remote control capability but also including Texas Instruments RFID technology for a little less data recovery (active) and basically ID their (Passive Tag) products and to include Bar code readers interfaced and the proprietary Bag sign technology. All interfaced by DSRC wireless most of the time to the prime mover PFN or TSA/Customs/Law officer/ Dockworker/UPS man/Mechanic 1P PFN belt or 1Ps more sophisticated stand alone repeater router unit to complete the flexible portable network connections to locate lost assets in transit. Human movement traced via by ID and surveillance technologies interfaced in the same manner. This is total movement management and seamless security for that movement for airports, ports, train stations, border crossings, state road inspection stations interactive highway reporting and on and on.

FIG. 49 This figure illustrates the FACT security program via PFNs locating a missing military asset from another shipment. In this case a military shipment lost a hand held rocket launcher that had a 1ps PFN unit imbedded in it for shipment. When a tandem tractor trailer carrying the launcher swerved to miss a stalled vehicle on an overpass the launcher was dislodged and ejected to the road below, where it landed on an open top dump truck going 60 miles an hour perpendicular to the tractor trailer on the elevated road. Immediately the tractor trailer DRC PFN via DSRC running a timed radio quarry program ask by RF for a return signal from all 250 known assets in the shipment on both trailers. Additionally do to the extreme truck movement recognized in the DRC PFN of the tractor another Flag in the on board FACT surveillance program was satisfied for the radio handshake. The DRC PFN interfaced with the vehicles E/E system processed a sway sensor recording the movement that was connected to the trucks J1939 can bus in the tractor. The DRC tractor sent an alert signal to the driver of the tractor-trailer and also to the nearest TSA FACT Motor carrier telemetry center and to all appropriate personnel instantly including the local police who are routed to the truck-traveling blow that ended up with the lost launcher. Because the launcher signal was retrieved in the Dump trucks DRC PFN and relayed to the TSA FACT center additionally the driver was notified and asked to pullover in the closest safe shoulder section on the right. This is just a hypothetical example of how the matrix keeps track of objects in motion even with out GPS.

Avionics Acronym List and Definitions as It Relates to PFN/TRAC and FACT Security.

The initial acronym list was taken from the "Allied Signal Terms and Definitions of Avionics" offered on the internet. It is used to key note, begin discussion and direct the specification of the PFN/TRAC System in aircraft implementation for the DOD, FAA, Airlines and major Aircraft Manufacturers. The PFN/TRAC System by design is a living work or work in progress. It is meant to serve as a tool to address the issues, teach and improve this technology in aircraft for optimum public safety on a continuing basis. The basic invention is well defined in this application seven related filings. This and three other applications specifically deal with the specific problems facing the air travel industry today and for the foreseeable future. The focus is protected accountable machine controls, artificial intelligence (robotics), communication and data routing and system interfacing with an inherent concern for impacts on humans and the environment.

This list of definitions is edited to deal with aircraft systems, ground systems and the affecting, sovereign nations, their government agencies, their rules, regulations, law, protocols and standards. The PFN/TRAC System is designed to organize and make more universal and secure interfacing between machine systems, people and their societies; both on the surface and near the surface of the earth to increase public safety and to protect the environment for a free, respectful and peaceful world The Following is:

A 220 page white paper (manual) included with the best mode of carrying out the invention and to be used with the drawing descriptions and when viewing the figures.

This portion of the specification is for those skilled in the art of avionics, air travel and transport to reference familiar terms, components and systems and better understand the drawings and how to construct this movement management hardware and software interfacing and FACT security system. The section, describes remote control and accountable robotics implementation via an alphabetical listing of avionic terms and descriptions for system integrators, code writers, and component engineers to structure and base the operating system's integration and interface designs for the various aircraft and terrestrial systems linked. Because, of the diversity of aircraft the alphabetical list of avionics and viable modalities to accomplish specific protected, automated and accountable FACT flights and landings will be expansive, especially in this general format. But essential in light of the terrorist acts of 911 and why this document follows the FAA report made in April of 2001. The PFN/TRAC System can carry the nation in the proper technical direction to insure and better secure our freedom of movement and respect our privacy in air travel.

There will be optimum modalities and redundant systems for each aircraft. Some such systems may prove universal across the boards and be standardized in all aircraft. Then there will be very individual aircraft engineering challenges to accomplish the same desired FACT function for everything that Flies. Standardization of accountable remote control and robotics in any transportation platform is basic to the nature and scope of the invention the PFN and The PFN/TRAC System™.

This tool provides the means for those skilled in the art to assess any aircraft and airport facility along with all related equipment to determine the best way to construct and implement the PFN/TRAC movement management system with FACT Security. The teachings of this patent filing and related filings provide a set of options and system interfaces to help proficiently out fit America's aircraft with a progressive development in remote control and security. Additionally, the work provides DOD and the FAA the system architecture to construct and implement at least 5 national Safe Base airports (SBs) that are coordinated with air to air remote control and robotics flight of compromised aircraft, and to provide final approach and surface/flight control systems to locally control landings, thus providing, greater public safety and national security, both in the air and on the ground.

The technology goal is to teach a progressive architecture to advance accountable robotics and Remote Control (RC) flight as and enhanced Humanity Machine Interfacing technology. A Science Technology Society or STS HMI to include ground system flight controls and management appropriately interfaced with real-time flights. First with present technology, and then plan for future integration and consolidation of systems to systems on a chip or SOC technology for the optimum circuit and system interface combinations. For this reason the PFN/TRAC architecture or ASIC design will always provide a secure and protected plug and play access capacity for future engineering concerns and flexible component interfacing which also is responsive, recognized and accounted for in the FACT system as change occurs.

Bold face print in the following describes the relevant combinations and teachings to construct and implement the PFN/TRAC/FACT system with respect to commonly known avionic terms and acronyms, which are defined prior in small print. The terms are used to stimulate dialog and understanding at the component level for skilled artisans to engineer and construct the PFN/TRAC machine messaging network, interfaces, human participation, and support machinery and equipment use, to include traffic flow and security through the airport and gate to gate in the skies. There are specific specifications to envision and construct the invention. However, the specific technical architecture in many instances has been deliberately left open so as not to restrict component engineering and to systemically accommodate a with variety of aircraft and machinery in today's air travel industry.

A 3D, 4D Three or Four Dimension

4096 Code The octal base, four-digit code used between framing pulses of a reply to identify the aircraft or for general use and emergency codes (XPD). XPD use and adaptation for TRAC FACT protocols; Federal Access & Control Technology FACT is a emergency communication and computer program used in all equipment and vehicle platforms and coordinates all the necessary government agencies in a secure Transportation matrix of transportation intranets for surface transportation land &, sea and also air. Aviation in general is much more technically developed in communications and computers or telematics then land transportation as a general rule. With 4096 code and XPD in existence, this secure communication link can be used to fulfill the first generation FACT program in aviation. Ultimately many different communication protocols will be interfaced via the PFN/TRAC system to include cellular telephony and special encrypted FACT software communications will be developed.

A300 Airbus Industries Model 300 Aircraft TRAC/FACT IN) 60 days FACT gen 1

A310 Airbus Industries Model 310 Aircraft TRAC/FACT IN) 60 days FACT gen 1

A319 Airbus Industrie Model 319 Aircraft TRAC/FACT IN) 60 days FACT gen 1

A320 Airbus Industrie Model 320 Aircraft TRAC/FACT IN) 60 days FACT gen 1

A330 Airbus Industrie Model 330 Aircraft TRAC/FACT IN) 60 days FACT gen 1

A340 Airbus Industrie Model 340 Aircraft TRAC/FACT IN) 60 days FACT gen 1

AAAE American Association of Airport Executives To take part in the planning of the Safe Bases and the safe procedures employed in the regular commercial airports as well as standard FAA operations AAC Aeronautical Administrative Communications to be connected to PFN/TRAC/FACT FAA/home land security central control AAL (1) American Airlines all C&D classified aircraft TRAC/FACT in 60 days FACT gen 1

(2) Above Aero Dome Level

AAMP Advanced Architecture Micro-Processor TRAC processors/ASIC hybrid substrate SOC, custom AAS Advanced Automation System Developed to lock out local flight controls and automate protected flight controls for FACT robotics and RC flying and landing AAT FAA Air Traffic Control Service to be subservient to FACT regional and national FACT Flight command center either as a hybrid for existing FAA national flight control, or newly created, as part of homeland security in a lager transportations matrix of intranets for surface, land, sea, and air traffic control and management. The installment of PFN/TRA/FACT provides a more robust, accountable response via each aircraft compromised as an enhancement, not as a replacement, to an already great aviation control system.

AATT Advanced Air Transportation Technology (NASA Program) NASA to help develop PFN/TRAC/FACT for traditional aircraft via it's progressive and architectural implementation of organizational structure of artificial intelligence technologies already being utilized in many aerospace applications.

A/B Auto Brake

A-BPSK Aeronautical Binary Phase Shift Keying

ABRV Abbreviation

ABS Absolute

Absolute The altitude of the aircraft above the terrain.

Altitude Also known as AGL (above ground level) Data provided by the various on-board sensors to the TRAC/FACT processor for FACT SB flights and landings via robotics and RC piloting.

AC (1) Advisory Circular (2) Alternating Current

A/C Aircraft

ACAC Air-Cooled Air Cooler

ACARS Airborne Communications Addressing and Reporting

System ACARS OOOI to be the program differentiating points for protocols and course of action for the FACT robotics system and the PFN/TRAC/FACT procedures in the aircraft and in the ground or surface management system. Much is detailed out in this Patent as a white paper, however the inventor realizes the actual software programming and procedures are to be determined by many skilled professionals and the public as to the implementation of the PFN/TRAC/FACT invention for robotic and Remote Control RC flight with real aircraft.

ACAS Airborne Collision Avoidance System is to be a part of the robotics flight and RC landing system in all application specific aircraft as sub systems and Systems Under Control of the TRAC/FACT system and program.

ACC Active Clearance Control to be under the command of the PFN/TRAC/FACT-FAA air command control center in a FACT event.

ACCC Area Control Computer Complex will be flexible intranets IP created by event protocols to coordinate agency and systems in real-time through a higher application level of software termed FACT for all PFN/TRAC applications in a large transportation matrix or secure encrypted isolated internet but capable of accessing the web and providing public secure data via the WWW.

Acclrm Accelerometer as well as other velocity an speed sensing devices and systems will provide data locally, on board aircraft to the TRAC/FACT program, and report data to the surface system the PFN/TRAC System running FACT software for robust remote control and robotics flying of a compromised flight ACE (1) The control character meaning technical Acknowledge will be certified as TRAC/FACT approved with secret and security clearances to be the pros working on the TRAC processor, interfaces and protected connectables and actuators.

(2) Actuator Control Electronics will be protected to perform lockdown of local controls and to automate the flying controls on board in unobtainable modalities while in flight for humans to tamper with (3) Advanced Certification Equipment a must for all TRAC/FACT equipment and component applications ACI Airports Council International to help develop the GPS or geographic handoffs for the separate FACT control software and to help structure the implementation of PFN/TRAC/FACT technology globally.

ACI-NA Airports Council International-North America to help develop the implementation of the PFN/TRAC/FACT system and technology in the United States/Canada and Mexico and establish the handoffs needed for national Federal control programs.

ACIPS Airfoil and Cowl Ice Protection System

ACK The control character meaning technical acknowledgment of an uplink, used in an ACARS system Same concept for the up link to FACT programs running in TRAC but probably encrypted for both the surface and the on board TRAC/FACT processor to confirm a legitimate FACT message for robotics and RC flight and landings as well as in flight robust aggressive but accountable activity controls e.g. sleep gas activation for a confirmed FACT/Wojack event.

ACM Air Cycle Machine connected to a sensor array to detect contaminants on board and airborne Bio or chemical HAZMAT ACMF Airplane Condition Monitoring Function interfaced to TRAC process/processor and FACT monitor for FACT event software program ACMP Alternating Current Motor Pump ACMS Aircraft Condition Monitoring System tied to or interfaced an protected as needed to TRAC/FACT system as a SUC system to TRAC ACNSS Advanced Communication/Navigation/Surveillance System interfaced and/or integrated with the TRAC/FACT protected robotics and RC flying and landing systems ACP Audio Control Panel recorded for a real-time FACT event and interfaced to monitor with voice recognition technology a voice ID technology for the TRAC/FACT system to be responsive to.

ACR Avionics Computer Resource the whole PFN/TRAC/FACT system is made up of the entire aircrafts ACR with the essential systems protected and more integrated via upper level ACR software FACT interfacing and processing TRAC applications to provide enhanced and accountable human machine interfacing of human and machine intelligence both in the aircraft and on the surface insuring better public safety in flying and landing the aircraft under the most trying of circumstances.

ACS Active Control System TRAC/FACT is the ACS in a FACT/WoJack event, but active with accountability all recorded with command strings in a number of Event Data Recorders both in the aircraft and reported to the surface buffers and mass data handling and storage facilities.

ACU (1) Apron Control Unit to provide signals in the OOOI first ON stage on the ground as a ACARS FACT triggered event recognition and progression to deal with a WoJack or Fact event condition—to help make a decision to stay on the ground most likely—however, flight to safe base controlled isolated area might be a possible scenario if the safe transport of the threat can be assured or deemed a greater public safety options (e.g. a sealed for flight contaminated aircraft) these are scenarios that all mentioned organizations, government agencies, and the public have to weigh-in on as to acceptable policy and procedures to be programmed as software in robotics & RC FACT systems and protocols.

(2) Autopilot Control Unit is to be interfaced with the TRAC/FACT process and protocols and interfaced and protected as an integrated system, first starting as an adaptive auto pilot with the 5 safe flight to safe zone areas and SBs for possible semi-controlled landing and boarding.

(3) Antenna Control Unit TRAC the process, or processor, will have as a SUC-RF equipment in scanning activity and checking readiness to include any internal and external antennas and/or their controls on board the aircraft. A major function of the TRAC system is the capability to use all forms of communications in a FACT emergency to afford the maximum and optimum communication and data exchange between the surface and the troubled aircraft for humans and machine systems.

A/D Analog-to-Digital and DAC digital-to-analog conversion equipment will be part of any PFN/TRAC/FACT system to incorporate and interface all the avionics providing electrical signal on board the aircraft and within the surface control and data management loop.

ADA Computer Programming Language Standard IP protocols and wireless protocols via firmware in chipsets/hybrid substrates and electronics modalities will be incorporated in the first generation of TRAC/FACT processing and protocol application. However, the majority of interfacing will be accomplished for the specific PFN/TRAC architecture via higher-level FACT software including special encryption for accountability and secured management. Part of the software developed is an emergency translation software algorithm that all communication protocols can be operated and linked to create a flexible vast matrix of communication and data messaging without compromising subsystem securities and operations.

ADC Air Data Computer (Direct TRAC interface)

ADF Automatic Direction Finder (Direct TRAC interface)

ADI Attitude Direction Indicator (Direct TRAC interface)

ADIRS Air Data Inertial Reference System (Direct TRAC interface)

ADIRU Air Data Inertial Reference Unit (Direct TRAC interface)

ADLP Aircraft Data Link Processor (Direct TRAC interface)

ADM Air Data Module The seven above-defined categories are interfaced and subsystems or SUC to TRAC/FACT protocols. The data is used in the determination of proper flight path and a FACT event and in the robotics flight of a plane in trouble.

ADMS Airline Data Management System

ADP Air Driven Pump

ADRAS Airplane Data Recovery and Analysis System

ADS (1) Automatic Dependent Surveillance ADS will be preformed by TRAC/FACT process or ASIC processor as a standard procedure for subsystems SUC to TRAC/FACT on boot up and periodically.

(2) Air Data System

ADSB Automatic Dependent Surveillance—Broadcast TRAC/FACT subsystems and ultimately integrated and interfaced and used as needed between surface and aircraft unit.

ADSEL Address Selective. A SSR system electronically arranged to address each transponder selectively. Only a particular transponder will respond, thus obviating garbling. ADSEL uses a mono-pulse technique to provide more accurate bearing measurement. ADSEL is compatible with DABS. (Refer to Mode S transponders.) All automated markers and their data to be used by the TRAC process and FACT software for plane verification of position and to fly the aircraft by robotics and remote control.

ADSP Automatic Dependent Surveillance Panel Videoed and recorded with the electronic signals processed in the TRAC process and ultimately the TRAC ASIC and recorded locally and remotely ADSU (1) Automatic Dependent Surveillance Unit Any such devices will be automated with TRAC/FACT software and interfaced in the system to monitor for a FACT event and to better implement FACT protocols and programming.

(2) Automatic Dependent Surveillance System

AECU Audio Electronic Control Unit will be interfaced with the PFN/TRAC system onboard the aircraft with voice recognition software and ID voice software to allow for hands-free commands as determined necessary for FACT programs and protocols. The system will support other voice dependent technologies, interfaced cellular telephony etc.

AED Algol Extended for Design

AEEC Airlines Electronic Engineering Committee will review and approve all the TRAC/FACT processes and using existing hardware and their interfacing as well as future generations of integrated ASICs, SOCs and hybrid substrates for TRAC processors.

AEP Audio Entertainment Player (interfaced and controlled as needed by TRAC) to deliver FACT instructions to the passengers and crew during an event and to interrupt the entertainment programming as needed.

AERA Automated En Route traffic control (Direct interface with TRAC) for monitoring for a FACT event like a WoJack incident and to re-program a RC flight or robotics FACT flight.

AES Aircraft Earth Station

AFC (1) Automatic Frequency Compensation all automated radio control technology to improve transmission and reception for the auto scan TRAC processor and the FACT communication needed during an event will be fully utilized in the construction of subsystems and their interfaces to create the initial TRAC/FACT process and the ultimate ASIC or SOC system developed in the future.

(2) Automatic Frequency Control used for TAC/FACT performance to be optimal

AFCAS Automatic Flight Control Augmentation System will be responsive to the TRAC/FACT processes or processor running FACT on board the aircraft and the surface systems monitoring the questionable flight in progress or a FACT event and ready as a subsystem or fully integrated and protected FACT function to control the aircraft to a safe Base via safe flight route by robotics immediately.

AFCEA Armed Forces Communications & Electronics Association will help develop the DES/DET and FACT interfaces for standard and commercial avionics and communication to insure the compatibility to work responsively during any FACT event.

AFCS Automatic Flight Control System is to be interfaced with the onboard TRAC/FACT process to determine a FACT event and operate the automate FACT flights.

AFD Adaptive Flight Display videoed and the electronic signals provided the TRAC/FACT process and recorded and reported to the surface.

AFDC Autopilot Flight Director Computer to be made part of the TRAC/FACT adaptive auto pilot for the first generation FACT program detection and flight to SBs and the following landings.

AFDS Autopilot Flight Director System incorporated as an adaptive autopilot to perform the FACT flights to the SB landing zones and SBs AFEPS ACARS Front End Processing System to be incorporated in the FACT OOI from ACARS segmented process to monitor the take offs and initial management of a FACT robotics flight takeover.

AFIS (1) Automatic Flight Information Service (2) Airborne Flight Information System both these 2 above terms will be incorporated as SUC to the TRAC/FACT system and protocols and will vary from aircraft and equipment involved and changes over the course of time. Through the TRAC/FACT system the system will be more fully automated and diverse.

AFS Aeronautical Fixed Service will be used traditionally with other position and location/communication service interfaced to better track and guide the aircraft.

AFSK Audio Frequency Shift Keying will be employed, recorded, and reported for accountability as it is presently utilized, be used to carry FACT emergency translated messages from other communication protocols, and additionally be decoded and provide emergency messages translated to other interfaced communication links.

A/G Air-Ground continual communication links will provide for dual processing and redundant storage in real-time as part of the PFN/TRAC/FACT system of accountable robotics and remote control.

AGACS Automatic Ground-Air Communication System (also known as ATCSS, or DATA LINK) will be directly interfaced as part of the TRAC/FACT first generation system as described directly above. If this does not exist for all aircraft, it will be created, as part of the qualifications to be an accountable TRAC/FACT systems so it is inherent that this AGACS would be a sub-system and SUC to TRAC and the automated TRAC scan function.

AGARS Advanced General Aviation Research Simulator will be used to practice FACT programs and procedures and design the TRAC process and ASIC processor. The options are so numerous in wireless communications, LAN, Ethernets, and computer interfaces in just one aircraft—let alone the vast amount of possibilities for all the individual planes—the AGARS is a logical choice to experiment with the myriad possibilities.

AGC Automatic Gain Control. AGC is used to maintain the output level of the receiver. This function will be a TRAC/FACT communication control, automated in the TRAC/FACT system, as a SUC subsystem for already existing technology or for any future RF architecture designed for the PFN/TRAC units.

AGL Above Ground Level

AGS Air/Ground System an integrated real-time link for the FACT event aircraft, the chase assist aircraft, the surface support en route command center FAA/homeland security, the surface SB RC crew, and terminal tower.

AHOE Air/Oil Heat Exchanger

AHRS Attitude Heading Reference System the electronic signal provided for the TRAC system doing processing and running the FACT programs to determine flight deviation and correct FACT headings to SB via Safe fly zones for the troubled aircraft.

AI Alternative Interrogator will be a common practice for the FACT program to determine a Flight course deviation via the many position, speed, and heading generating systems SUC to the TRAC process/processor and operating FACT software.

AID Altered Item Drawing. A drawing that details what alteration or change is made to an already existing component. Examples may be shortening the shaft of
- a variable resistor, or adding a program to a circuit card to produce a programmed circuit card. The TRAC/FACT system will generate many AID drawings for existing devices and avionics technology to create the TRAC process construct, the ASIC, or interface existing processors and micro-circuits, as well as take the form of software flow-charts to structure the higher FACT language or code, including encryption. There is a great deal of AID drawings in the related 7 patent application for the PFN/TRAC System and there will be more to structure the accountable, robust, remote control and robotics necessary to operate this next generation of automated aircraft.

AIDS Aircraft Integrated Data System is to be a major function of the TRAC/FACT system in aircraft and for air travel, as part of a larger machine-messaging matrix for data acquisition, equipment management, and data storage for humanity to better manage vehicle/equipment use and environmental and societal impact of equipment use on the infrastructure.

AIEM Airlines International Electronics Meeting conducted for many organizations and agencies to test, review, and write standards, rules, regulations, and code for TRAC architectural development in ASIC design, integration, and interfacing with existing aviation avionics.

AIL Aileron automated and controlled by the TRAC processor with respect to FACT programs running.

AIMS Aircraft Information Management System will be an integrated function in the PFN/TRAC/FACT System and TRAC has always been designed to perform this function as part of a large machine-messaging matrix and management system.

AIP Aeronautical Information Publication AIPs will be a basic medium to inform those in the arts of aviation and avionics about the characteristics of TRAC/FACT in aviation and to help network interface across the varied flight platforms and avionic architecture to get the most economic and efficient configuration for any particular aircraft.

AIRCOM Digital air/ground communications services provided by SITA. A system similar to ACARS. All such dedicated RF services will be coordinated to interface and be SUC to FACT. This is done because the automatic take-over of the aircraft in robotics will be the highest level of secure accountable encrypted function taking place in US airspace and all communication and computations, or processing, need to be sub-systems to a more focused control and management system. This is a basic characteristic of the PFN/TRAC system and FACT protocols for all equipment and transportation management. As stated earlier, aircraft is far ahead of surface vehicles and stationary equipment in terms of equipment control, but the need for a completely organized management system of accountable robust controls is great and can be accomplished via the PFN/TRAC/FACT machine messaging matrix of specialized intranets communication linked with wireless and IP protocols.

AIR DATA Those parameters that can be derived from knowledge of the air mass surrounding the aircraft. Air Data is provided to the robotics flight control whether it is a drafter autopilot, flight computer, adapted autopilot, flight computer, a specifically designed ASIC, a custom processor, or any hybrid interface the TRAC/FACT processor running FACT flight plans and FACT control technology is provided in a protected state.

Airways The standard ICAO IFR routes will be monitored by FACT surface control, and for planned flights en route, for deviation. However, once a FACT event has occurred, a dedicated team is assigned to the troubled flight and the scrammed flight assist and pursuit aircraft along with the troubled aircraft is robotically flown to a safe airspace away for all other air traffic and sensitive surface areas as an en route FACT flight program to the assigned safe base. The Safe Base is chosen by proximity and can be overridden by surface command, if the troubled aircraft poses a unique threat that requires special handling. However, SBs and safe flight zones will be designed to handle most everything.

AIS Aeronautical Information Services will be supportive of FACT/FAA/homeland security command central.

AISC Aeronautical Industry Service Communication will be a standard method to inform the industry and personnel of TRAC/FACT technology available and developed.

AIV Accumulator Isolation Valve this will be a system used to divert hydraulic local controls pressure when a FACT event is sensed and activated to keep the system ready for local controls to be reinstalled and to absorb the activation of such controls isolated and/or otherwise dead-headed by the protected solenoid diversion-valve, providing hydraulic supply to the TRAC/FACT protected auto pilot control valve or vein pump flying the FACT flight plan, by delivering the appropriate hydraulic fluid to activate the flight surfaces in a hydraulically controlled aircraft.

A/L Autoland

ALC Automatic Level Control. A circuit used to maintain the output of a transmitter regardless of variations in the attenuation of the system. A sub-system to the TRAC/FACT process/processor to that must be protected and unobtainable by human hands during a FACT event.

ALS Advanced Landing System to be integrated into the TRAC/FACT landing and approach with robotics-operated or part of a RC system in a assist aircraft or on the surface as a flight station simulator at the SB.

ALT (1) Airborne Link Terminal to be integrated into the FACT system and monitored by the FACT homeland security and full functions and interfacing to be determined in the development of the FAA/FACT command and control center.

(2) Altitude

Altitude A continuous return across the display at a range Ring equivalent to aircraft altitude (WXR).

ALTS Altitude Select The three lines above refer to the elevation of the aircraft and all such data is relevant to flight of the aircraft and is provided, protected, to the process FACT is running in.

ALU Arithmetic and Logic Unit

AM Amplitude Modulation. A signal where the carrier signal is varied in amplitude to encode voice or data information. These duel communication functions will be used in TRAC/FACT and scanned for as well as done with other frequencies to allow for the greatest amount of communication a data transferred, timed, and recorded together both in the aircraft and surface systems.

AMASS Airport Movement Area Safety System

AMC Avionics Maintenance Conference To aid in the development of the TRAC/FACT process in all existing avionics and legacy aircraft and help plan for the ASIC or future integrated SOC technology of combined systems. Especially in deciding aircraft placement of the protected TRAC/FACT processors and memory storage and the protected links leads and interfaces needed to insure the uninterrupted service of FACT components during a FACT event. And finally, AMC will assist in determining the proper security and training for technicians, designers, and programmers for the TRAC/FAC system and protocols in aviation.

AMCP Aeronautical Mobile Communications Panel to be videoed with an audible recording, including time and dated records, to coordinate and review with other timed and dated records of a FACT event data nature. Additionally, all communications will be placed into a hierarchy of communications controlled by FACT surface-to-air communication links, in an affected area. Capable of handling a number of communications on any given ded frequency—this is for all frequencies and communication links during a FACT event. (Surface FACT control Master all other communication link subservient subsystems or SUC to FACT control).

AME Amplitude Modulation Equivalent. An AM-type signal that processes the modulated information signal and carrier frequency separately, then reconstructs the two signals to make an equivalent AM signal. Any modulation function needed to complete a FACT communication link can and will be configured for FACT use by FACT communications control on both ends of the transmission. If AME proves to be a good modality to code and decode or send encrypted messages/data in an efficient more secure manner, it should be used. These and other uses of AME will be reviewed by FCC and the FAA as well as all organizations, professional associations, and government agencies required to determine the correct use of any AME frequency for FACT System use.

AMI Airline Modifiable Information FACT reviewed during an event and for any publication on policies and procedures provided to the public and professionals.

AMLCD Active Matrix Liquid Crystal Display used as applicable for HMI with TRAC/FACT equipment and programming.

AMOSS Airline Maintenance and Operations Support System will have a special division with FACT-approved and qualified technical teams. This will include technicians and security personnel teamed up in an unpredictable rotation schedule for each work schedule and/ordered service. This procedure involves the unsealing of any restricted FACT system on an aircraft, the protected actuators sealed processors any interfaces and connections or access to any programming or recording device or memory storage. To be determined is how and if these individuals will be provided or financed by the airlines the federal government or both. They must be trained through federal programs and pass a FBI security clearance check initially, annually, and periodically as well as pass drug test and have the most extensive ID information on file for automated security test by the individual FACT units being serviced. Systems will have fingerprint, iris, DNA, and pin-number checks for the whole team and the service is to be videoed and viewed by FACT surface control supervisors also on a random assignment. All FACT personnel are to be continually passed though an alert list augmented by every security agency deemed appropriate to look for any known terrorists, criminals, or other security risks. Additionally, photo recognition (or face ID print) is to be on file for personnel working in FACT or that are known to be suspects, as detailed above. All forms of security can be employed and reviewed for error or improper use, to include profiling, as per possible FACT event alert. Any questions are to be handled in a review process with no loss of pay but an interruption in the individual's capability to service or be in proximity of FACT systems or components until cleared.

AMP Audio Management Panel recorded and monitored by TRAC/FACT and SUC to FACT for PA purposes.

AMPL Amplifier

AMS Apron Management Service will be tied into the FACT surface system and control TRAC/FACT robotics and RC on the ground.

AMS(R)S Aeronautical Mobile Satellite (Route) Service to be used, monitored for TRAC/FACT events AMSS (1) Aeronautical Mobile Satellite Service Same (2) Aeronautical Mobile Satellite System Same All geographic and communication links are to be accessible and SUC to TRAC/FACT event and the appropriate control systems.

AMTOSS Aircraft Maintenance Task Oriented Support System.

An automated data retrieval system will be incorporated to include TRAC/FACT systems and be responsive and interfaced with FACT data storage.

AMU Audio Management Unit SUC to TRAC/FACT system on board.

AMUX Audio Multiplexer part of TRAC/FACT process and ASIC processing when constructed application specific for each aircraft.

A/N Alphanumeric used to locate TRAC/FACT involvement in this avionics list of definition. However, A/N data will be used as needed for HMI coordination in TRAC/FACT programming and messaging.

Aneroid An evacuated and sealed capsule or bellows with a Capsule that expands or contracts in response to changes in pressure. Any sensing technology for atmospheric pressure will be used as needed and transduced with an electric signal to be processed by FACT interfaced avionics or TRAC ASICs or micro processors to determine a FACT event, or to fly and land the aircraft via FACT robotics and RC.

ANC Air Navigation Commission will help determine the safe flight plans to the safe bases that will be programmed software for the robotics FACT flight. They will also help to determine the cafe crash and landing zones as well as the technology used to determine a FACT event as well as fly the FACT aircraft and land it.

ANP Actual Navigation Performance will be a real-time event in the TRAC/FACT airborne process or ASIC processor and in the monitoring Surface command center.

ANPRM Advance Notice of Public Rule Making will be done for most all TRAC/FACT implementation. However there will be secret policies and technology due to better public safety and national security. These secret portions of the technology must have documentation AND APPROVAL BY OVER SIGHT COMMITTEES AND OTHER SECURITY PROTOCOLS TO RETAIN A PRIVATE STATUS.

ANS (1) Area Navigation System all area navigation systems will be linked for a national/FAA/homeland security command and control center to access and provide position data to individual aircraft and other FACT platforms.

(2) Ambient Noise Sensor will record and compare normal sounds and report unusual sounds to be reviewed for FACT flags in the software program; a trained human ear's review.

ANSI American National Standards Institute will help to create TRAC/FACT standards, codes, rules, regulations, and law.

ANT Antenna protected and kept serviceable to TRAC as much as possible.

ANTC Advanced Networking Test Center to aid in the creation of the TRAC/FACT FAA aviation intranet for FACT command and controls—both in the aircraft and on the surface nationally, regionally, and on the SB.

AOA Angle Of Attack to be defined for aircraft boarding as per condition and current state of the aircraft—and for the successful termination of a doomed flight.

AOC (1) Airport Operational Communications all SUC to FACT during a FACT event.

(2) Air/Oil Cooler (3) Aeronautical Operational Control SUC to FACT as a subsystem (4) Airport Obstruction Chart data provided to FACT as a subsystem data I and part of any flight plan (5) Aircraft Operational Control an accountable protected FACT robotics and RC flight and landing function—from the troubled aircraft via robotics and to include RC from other assist air craft and surface control systems AOCC Airline Operation Control Center SUC to TRAC/FACT FAA command and control center AODC Age of Data Clock (GPS term) The FACT program will always receive the hottest GPS or location data from all such systems on board.

AODE Age of Data, Ephemeris (GPS term) All data will be evaluated by TRAC for the necessary FACT event flags and the GPS will be used to help synchronize all area clocks.

AOG Aircraft On Ground

AOHE Air/Oil Heat Exchanger

AOPA Aircraft Owners and Pilots Association an organization to be consulted for advice and input in the development, use, and application of TRAC/FACT system protocols and procedures.

AOPG Aerodrome Operations Group IP connected with TRAC/FACT aviation intranet.

AOR Atlantic Ocean Region to be connected in surveillance and tracking of aircraft traveling around and over the ocean to any country TRAC/FACT system with all bordering ocean countries alerted for a FACT event ready to take the handoff for a FACT response in their area. If the flight is in neutral air space over the ocean, an air assist crew will be dispatched from a close pre-arranged, allied country of the troubled aircraft's host country and flown to the appropriate pre-arranged SB. The TRAC/FACT response and policy should be directly linked to international treaties and agreements for airspace use and shared airspace and be adjusted in perspective to relations between countries to provide for the most consistent application of civil law for any illegal act perpetrated in a FACT event. Ideally, all countries via the United Nations and other international treaty organizations will set specific rules and regulations that are consistent for a FACT response.

A/P Autopilot. A computer commanded system for controlling aircraft control surfaces. This device will be adapted for the TRAC/FACT system by being protected from Human contact in flight. The fight surfaces it controls will also be protected from in-flight tampering. The A/P a direct subsystem of the TRAC process, or processor, will operate the 5 safe base flight plans on a FACT event flag. This whole system has to be protected prior to any flights requiring SB automation for security.

APA Autopilot Amplifier all such assist sub-systems to the autopilot have to be protected if they can influence the performance of the flight or the aircraft. Any surface guidance system for auto pilot technology has to be securely protected on the surface and be connected to the FAA/FACT homeland security command control center. If need be, all components will include surface transponders (on flight and landing) are to have their signals monitored and protected armed guard with sign replacement equipment and the ability to take out malfunctioning equipment. New transponder equipment to be sent reconfigured FACT encrypted signal to initiate encrypted FACT location data transmissions with tracking group confirmation.

APALS Autonomous Precision Approach and Landing System will be incorporated in the TRAC/FACT/FAA/homeland security command control center at each SB and at any air field used in a FACT event OOOI triggered emergency landing and regional mobile FACT response—a specialized containment area at the end and side of the runway away from the terminal and of the highest security and containment. (Plane bags and windscreens with all the equipment to securely ventilate the aircraft and contain the waste air. Additionally a Bummed explosive bunker parking area.

APANGPRIG ICAO Asia/Pacific Air Navigation Planning and

Implementation Regional Group will plan their TRAC/FACT programming and procedures for a FACT event. It is hoped that cooperation among nations can reduce phobias and address the real fears of unauthorized and unsafe aircraft flights and will able to coordinate their efforts.

APB Auxiliary Power Breaker No power switching mechanism is to be available to the in-flight passengers or crew that services FACT reliant automated technology. Automatic fuse/breaker systems with redundant backups for connectables/leads are integral for any TRAC/FACT system to include self-contained, completely protected, emergency power and service to actuated flight surfaces to complete the FACT flight as per direction of the FACT control center, on the surface.

APC (1) Autopilot Computer is to be protected and made part of the initial TRAC/FACT system and carry the pre-programmed FACT flights. Whatever augmentation is needed to complete this task in the prescribed TRAC technology requirements is the first step in providing FACT flights to safe fly-handling zones and a first step in the implementation of robotics flight for public safety.

(2) Aeronautical Public Correspondence to be open to suggestions and complaints on the TRAC/FACT system. An important characteristic of PFN/TRAC System technology is that all TRUST it. Obviously, any management system having this real-time control over life and death in the air and on the ground will have to be open to discourse in a free society to be TRUSTED.

APEX IMA Application/Executive Software Interface The TRAC/FACT software will interface and run at the highest level and control via software command all other sub-systems in a FACT event.

APP Approach Control will interface data and voice commands or dialog to TRAC/FACT command center of the SB and to all homeland security system's IP connected for real-time coordination.

APPR Approach monitored and managed by TRAC/FACT robotics and RC at the Safe Bases.

APU Auxiliary Power Unit will be accessible in any so-equipped aircraft with a specially protected APU for the FACT interfaced systems.

APUC Auxiliary Power Unit Controller Managed as a SUC system for TRAC/FACT system but not reliant and to put at risk, via these connections.

AQP Avionics Qualification Procedure This procedure will be made flexible with the equation of public safety and national security the delineating factor. TRAC/FACT control capability will be required for anything that flies. If the systems are not fully airworthy or poof-tested and used, they must err on the side of robotically flying the aircraft to a safe crash zone to be dealt with by the FIRST FACT teams. Obviously, these flights should not take place at all and any anyone on them should have to sign off that they understand these deployable conditions of flight exist and they wish to go on the flight at their own risk. Equally obvious, all aircraft is not going to be fully ready for robotics flight and landing in the next 60 days. So these are the conditions of flight as a minimum requirement for FACT automation. Another parallel security measure is trained security for all FACT under equipped aircraft. This is a procedure that is in place presently.

A-QPSK Aeronautical Quadrature Phase Shift Keying

AQS Advanced Quality System a commercial by-product of TRAC/FACT technology. This system will allow for better coordination between surface and air transportation to better serve the flying and driving public, long overdue management and coordination in real-time for emergency weather conditions, holidays, as well as more direct flying routes.

ARA FAA Research and Acquisitions to help develop and get in place the PFN/TRAC system in the aircraft and as a surface flight management system ARES Advanced Railroad Electronics System will be interfaced in IP protocols via the PFN/TRAC/FACT transportation matrix of different transportation platform intranets.

ARINC Aeronautical Radio, Inc.

ARF Airline Risk Factor will be an ongoing process for different scenarios that must be played out by investigators, researchers, engineers, insurance companies, law enforcement, and the military prepare and become efficient in use of the TRAC/FACT system for protecting life in the system and on the ground. Complete risk assessment needs to be done on a continuing basis.

ARP Air Data Reference Panel videoed and data provided to FACT command control and any in flight TRAC system.

ARS Automated Radar Summary chart. These are hourly-generated charts showing location and intensity of radar echoes. Continually monitored in real-time with projected flight pans and watched by the TRAC/FACT Command center for a FACT event by an automated computer-tracking program.

ARSR Air Route Surveillance Radar to monitor all registered flight plans for FACT events.

ART Automatic Reserve Thrust

ARTCC Air-Route Traffic Control Center. Approximately 20 centers cover the air traffic routes in the United States using numerous radars and radio communication sets. These RADAR systems will be linked to the FAA/TRAC/FACT command and control center to monitor flights in progress for the FACT event and robotics flight activations.

ARTS Automated Terminal Radar System interfaced with FACT IP system of computers locally in the SBs and for the essential agencies nationally.

ASA (1) Autoland Status Annunciator (AFDS) all automated voice or audible alert activations will be recorded during a FACT event.

(2) Aircraft Separation Assurance any such sensed data essential to FACT robotics flight and landing must be interfaced.

ASCPC Air Supply and Cabin Pressure Controllers SUC to TRAC process and FACT programs.

ASD Aircraft Situation Display videoed and interfaced in FACT system for RC or robotics augmentation in real-time and recorded in the aircraft and in surface systems.

ASDE Airport Surface Detection Equipment interfaced in TRAC/FACT system for enhanced collision avoidance on the surface via FACT robotics and RC commands.

ASDL Aeronautical Satellite Data Link interfaced into FACT command center.

ASECNA Agency for the Security of Aerial Navigation in Africa and Madagascar to set up their own TRAC/FACT system and protocols.

ASG ARINC Signal Gateway

ASI Avionics System Integration into the TRAC/FACT system would include the automated lockout of local flying controls in the aircraft.

ASIC Application Specific Integrated Circuit the design of the TRAC processor as well as many other processors.

ASM (1) Airspace Management (2) Auto throttle Servo Motor SUC to FACT flying and protocols ASP (1) Altitude Set Panel Videoed and interfaced data in the TRAC processors monitoring and FACT flying and landing and dual recording.

(2) Aeronautical Fixed Service (AFS) Systems Planning for data interchange to include the PFN/TRAC system and upper level FACT programming.

ASPP Aeronautical Fixed Service (AFS) Systems Planning for data interchange Panel to include the PFN/TRAC system and upper-level FACT programming.

A-SMGCS Advanced Surface Movement Guidance and Control Systems to include the PFN/TRAC system and upper level FACT programming.

ASR Airport Surveillance Radar to include the PFN/TRAC system and upper level FACT programming and monitoring.

ASRS Aviation Safety Reporting System to be an ongoing, progressive analysis of FACT implementation to improve application safety for each system.

ASSTC Aerospace Simulation and Systems Test Center To help develop TRAC/FACT systems from previously tested and proven technology and aid for the rapid implementation of state of the art FACT systems for robotics flight and landing.

ASSV Alternate Source Selection Valve Any selection valve for fuel or hydraulic or airflow in the aircraft has to be SUC to FACT during a FACT event.

ASTA Airport Surface Traffic Automation to be SUC to FACT command control during a FACT event—either locally or remotely to be determined.

A/T Auto throttle SUC to TRAC/FACT systems

AT (1) Air Traffic SUC to FACT/FAA homeland security command and control center.

(2) Air Transport subject to FACT implementation and special cargo sensing and PFN/TRAC communication units.

ATA Air Transport Association to help in designing and setting standards rules, regulations, codes, and laws for FACT and TRAC system use in the industry.

ATC Air Traffic Control Ultimately handled by FACT/FAA/command control center.

ATCA Air Traffic Control Association to help set the tracking and handling of aircraft in and around a FACT event and to help set up the handoff of the troubled aircraft to the FACT system.

ATCC Air Traffic Control Center to be incorporate as the FAA/FACT command center or at least a handoff and isolated control center for each FACT event.

ATCRBS Air Traffic Control Radar Beacon System interfaced into FACT tracking and monitoring and used to follow FACT flights.

ATCSCC ATC System Command Center, the base development area for FAA/FACT command and implementation.

Inventor note: There is no attempt to replace or eliminate existing systems only to augment them into robotics and RC capability as the next best option to highly skilled and qualified humans working with exceptionally good equipment to provided the safest to date mass transportation industry. In the spirit of looking for the best an safest in air travel, TRAC/FACT is being created form COTS existing and proven air travel technology to offer more choices for public safety in our free and mobile society.

ATCSS Air Traffic Control Signaling System. A system to provide information between the pilot and air traffic control using the VHF communications transceiver in conjunction with data link equipment. Interfaced with the TRAC/FACT system.

ATCT Airport Traffic Control Tower

ATE Automatic Test Equipment (A TRAC Performance check protocol w/failure flag)

ATIS (1) Automatic Terminal Information System
(2) Automatic Terminal Information Service
ATIS (1) Automatic Terminal Information System
(2) Automatic Terminal Information Service ATNP Aeronautical Telecommunications Network Panel (TRAC Accessible)

ATOMS Air Traffic Operations Management System (control TRAC protocol)

ATP (1) Acceptance Test Procedure (Air Transport) (Confirmation test of TRAC)
(2) FAA Air Traffic Rules and Procedures Service ATP (1) Acceptance Test Procedure (Air Transport) Confirmation test of TRAC and equipment readiness.
(2) FAA Air Traffic Rules and Procedures Service (To be programmed as needed in TRAC software.)

ATS (1) Autothrottle System (TRAC Access and Control)
(2) Air Traffic Services (Connectable as needed)
(3) Air Turbine Starter (TRAC connected)

ATSC Air Traffic Services Communication (DATA Connected TRAC)

ATCSS Air Traffic Control Signaling System. A system to provide information between the pilot and air traffic control using the VHF communications transceiver in conjunction with data link equipment (Direct interface with TRAC).

ATSU ATS Unit (Interfaced)

ATT Attitude

AUX Auxiliary

AVIC Aviation Industries of China All foreign powers to develop their own security codes and encryption for FACT in their geographic area determined by the location equipment interfaced with the TRAC/FACT processor onboard the aircraft.

AVLAN Avionics Local Area Network (Interfaced w/TRAC)

AVPAC Aviation VHF Packet Communications (Interfaced w/TRAC)

AVR FAA Regulation & Certification (For TRAC)

AWOS Automated Weather Observation System. A system that gathers surface weather information and transmits the information this system to be interfaced with TRAC system and used for aircraft in known FACT flights for computer algorithms to process in the robotics flight of the aircraft.

AVM Airborne Vibration Monitor all such data sent as an electrical signal to the FACT process or TRAC/FACT processor to determine its relevance.

AVOL Aerodrome Visibility Operational Level

AVPAC Aviation VHF Packet Communications SUC to the TRAC/FACT system with data used for preprogrammed robotics, and RC flight.

AVR FAA Regulation & Certification for PFN/TRAC/FACT technology as well as develop and implement all regulations.

AVSAT Collins Satellite-Based Avionics interfaced with FACT with FACT operating at the highest most secure interface level. Question: How capable is Collins language for this task with DES/DET and how much has to be developed with new code written and encryption technology? TRAC/FACT is a progressive interface system structured from COTS and improved. What are the possible software packages that can be incorporated immediately?

AWO All Weather Operations will be interfaced with TRAC/FACT system technology

AWOP All Weather Operations Panel videoed and interfaced with TRAC/FACT technology AWOS Automated Weather Observation System. A system that gathers surface weather information and transmits the information to the pilot via VOR, Comm Freq, or telephone lines. TRAC/FACT connected and used in flight augmentation of robotics flight AWPG All Weather Planning Group To help set up the protocols and interfacing with FACT systems around the globe.

B

B717 Boeing Model 717 Aircraft (formerly the MD-95) (TRAC/FACT IN) 60 days FACT gen 1

B737 Boeing Model 737 Aircraft TRAC/FACT IN) 60 days FACT gen 1

B747 Boeing Model 747 Aircraft TRAC/FACT IN) 60 days FACT gen 1

B767 Boeing Model 767 Aircraft TRAC/FACT IN) 60 days FACT gen 1

B767ER Boeing Model 767 Extended Range Aircraft TRAC/FACT IN) 60 days FACT gen 1

B777 Boeing Model 777 Aircraft TRAC/FACT IN) 60 days FACT gen 1

B7x7 Boeing Model 7x7 Aircraft TRAC/FACT IN) 60 days FACT gen 1

BA British Airways TRAC IN or part of) FACT & TRAC for any flying Domestically)

BAP Bank Angle Protection—over speed (sensed by TRAC processor or subsystems controlled by TRAC for programmed flights to safe base Baro—Corrected Pressure altitude-corrected local barometric pressure. Altitude (Data & connection acquired & protected from any subsystem as needed By TRAC processor SUC)

BGI Bus Grant Inhibit. A term used in CAPS transfer bus processing. (Utilized as needed to complete TRAC SUC system and protocols.)

BIST Built-in Self Test For TRAC to determine system failures and to be standardized and approved as a TRUSTED system for remote and automated flight controls.

BITE-Equipment

BPCU Bus Power Control Unit (Access to operate and maintain TRAC power requirements sustain TRAC emergency power pack readiness and energize all essential TRAC peripherals in a TRAC event.)

C

CAA Civil Aviation Authority. A regulatory agency in the United Kingdom. (Test and approve TRAC and develop national FACT command codes) All commercial aircraft will have geographic location sensitive FACT key codes and identification communication protocols activated by TRAC processed I/O data for the sovereign airspace.

CAAC Civil Aviation Administration of China (situational determination of FACT protocols and use will be determined by the owned and operating country of the aircraft.)

CAASD Center for Advanced Aviation System (to play an appropriate role in TRAC System Development) Development (The Mitre Corp.)

C/A Code (1) GPS Course Acquisition Code (2) Course-Acquisition Code SUC system to TRAC and used jointly with other navigational data to determine air space and operate the aircraft.

CAC Caution Advisory Computer (Tied into TRAC computer and running FACT command software communications.

CACP Cabin Area Control Panel (electrically monitored and video recorded and reported by TRAC locally and to ground support regional IP buffers and FAA, NTSB mass data storage unit or any other agency determined as necessary.)

CAE Component Application Engineer to address TRAC & FACT System protocol configuration, interfacing, and deployment with forward and backward engineering concerns.

CAGE Commercial Avionics GPS Engine (on board TRAC system responsive)

CAH Cabin Attendant Handsets all audio and video in the cabin and in the cockpit and storage compartments—as well as all sensed data—is recorded and reported in real-time both locally and to the ground via stream data or packetized data with reception confirmation. Some data acquisition is determined as continual monitoring and event programming dictates data handling. Protection for all such systems is to be application-specific for aircraft with special consideration to seclusion and limited access.

CAMI FAA Civil Aero medical Institute along with the Center for Disease Control is to be an intricate part of the WoJack (War OPS) protocol, a FACT protocol for compromised flights that have to land at safe bases due to biological or chemical contamination.

CAPT Captain TRAC identification and monitor for Competency Assessment system software algorithm (Eye evaluation) HMI over control reaction as a symptom of fatigue or diminished consciousness, head tilt, and atmospheric changes in the cabin sensed by spectral analysis (or the nose) fight crew outfitted with bio-telemetry transmitted to the TRAC processor monitoring flight crew and critically ill passengers wearing PFN/TRAC personal units. (telemetry accomplished either wirelessly or connected.)

CAS (1) Computed Airspeed (interfaced with TRAC programming)

(2) Collision Avoidance System SUC Interfaced system with TRAC)

CAT III c Operational performance Category III c. An ILS facility providing operation with no decision height limit to and along the surface of the runway and taxiways without reliance on external visual reference. An absolute minimum for SAFE BASE field technology along with a ground based virtual RC pilot in a converted flight simulator with actual troubled aircraft flight data telemetry and video imaging for the RC pilot to flight the pilot-less aircraft to a safe landing.

CBA Cost Benefit Analysis (Always TRAC)

C-BAND The frequency range between 4000 and 8000 MHz. TRAC interfaced

CCIR International Radio Consultative Committee types of communications/frequencies and emergency cross translation protocol approved by the committee CCITT International Telegraph and Telephone Consultative TRAC approval CDI Course Deviation Indicator SUC TRAC interface and an initial flag for the Wo Jack Protocol to sense the change of control of the aircraft or determine the plane is being used in an unauthorized manner CDR Critical Design Review should incorporate all effected agencies and industry organizations and safety stands for all technologies interfaced in the RC program or robotics programming for the PFN/TRAC System™

CDTI Cockpit Display of Traffic Information captured on video for TRAC system automated flying use and record.

CDU Control Display Unit directly interfaced with TRAC Processor.

CEPT Conference Europeene des Postes et Telecommunications To approve communication interface protocols with (TRAC).

CF Change Field SUC as determined necessary.

CFDIU Central Fault Display Interface Unit direct connect with TRAC processor

CFDS Centralized Fault Display System Video and audio recorded with all possible data transmitted to the surface for as long as the event is occurring via any and all communications available to include passenger cellular phones wirelessly interfaced to the TRAC processor (like bluetooth) and transmitted to a preprogrammed phone address and computer modem set-up as part of emergency protocol for cellular and wireless telephony with IP connections to FAA and government real-time emergency air emergency response computers involved.

CFIT Controlled Flight Into Terrain (As part of TRAC)

CHI Computer Human Interface (As part of TRAC)

CHOL Collins High Order Language (if acceptable to be used in FACT programming)

CI (1) Configuration Item (2) Cabin Interphone is recorded with voce recognition technology and identity algorithm.

CIDIN Common ICAO Data Interchange Network TRAC interfaced.

CIDS Cabin Interphone Distribution System (quarried for flags in TRAC boot up and monitored.

CIE Commission Internationale de I Eclairag Approval for TRAC

CMS Cabin Management System SUC by TRAC

CMU Communications Management Unit is a subservient SUC to TRAC with redundant connectables physical or wireless links between the systems if they are distributed.

CNDB Customized Navigation Database interfaced with TRAC.

CNS/A Communications, Navigation, and Surveillance/Airborne interfaced with TRAC.

Coasted a track that is continued based on previous track. Track characteristics in the absence of surveillance data reports (TCAS). Plus Surface track data up-loads through the TRAC system.

CODEC Coder/Decoder Redundant in TRAC

COMAC ICAO's Communications Advisory Committee (To approve communications and interface protocols used and routed through TRAC.)

COMM Communications

Compass A low-powered radio beacon, used in conjunction Data queried by TRAC to confirm event activation protocols.

Locator with ILS. A compass locator has a two-letter identification and a range of at least 15 miles. Also monitored by TRAC and used in determining event protocol and robotics flying via software algorithm running in the processor as well as data reported to RC Pilot for final approach and landing.

COMP Compressor TRAC will monitor and control the compressor for cabin air pressure and be capable of stopping it as a SUC if determined necessary under any WoJack or FACT protocol.

CPC (1) Cabin Pressure Controller TRAC will have SUC here as well.

(2) Cursor Position Control

CPCI Computer Program Configuration Item. A CPCI number identifies the configuration of a computer software program. All such TRAC/FACT Config and module software numbers will be created with the strictest of security and individuals will be aware strictly on a need-to-know basis. Sovereign nations should write their own code and SN them in a proprietary manner, unless it is determined that allied security is acceptable.

CPDLC Controller-Pilot Data Link Communications This is an obvious data link for the TRAC Flight system for robotics or remote control flying and will provide data to the local TRAC unit on board and down to the RC station for final robotics hand-off RC landing. First generation, two-step remote and auto-control protocols (Proprietary to this PFN/TRAC System)

CPI Continuous Process Improvement TRAC evolution

CPM Core Processor Module if not with in the TRAC protected system must be subservient to TRAC processor and have redundant option to TRAC if deemed essential in TRAC protocol.

CPS Cabin Pressure Sensor SUC interfaced under TRAC.

CPU Central Processing Unit Existing systems, if capable, can be set up to perform first generation TRAC protocols as rapidly as possible with systems becoming more consolidated.

CR (1) Change Request All CRs to the TRAC system require special accountable security clearance and identity checks before the system will allow access.

(2) Contrast Ratio

CRADA Cooperative Research and Development Agreement this is an absolute necessity for TRAC technology to be put in place.

CRES Corrosion Resistant Steel An obvious component construct for protective cans packaging essential TRAC components.

CRC (1) Cyclic Redundancy Code (2) Cyclic Redundancy Check Both CRCs are to be employed to insure security and reliable service in the TRAC system.

CRPA Controlled Reception Pattern Antenna As necessary TRAC

CRS CourseTrac monitor

CRZ Cruise

CSC Cargo System Controller Nose senses explosives, Biohazard, radiation, video audio weight TRAC monitored and warning Flag software pre-flight during and post-flight residuals.

CSCP Cabin System Control Panel interfaced or SUC to TRAC

CSDB Commercial Standard Data Bus Connected to TRAC with multiple or redundant ACCESS FOR TRAC AND TRAC PROTOCOLS.

CSDS Cargo Smoke Detector System monitored by TRAC recoded and reported event.

CSEU Control Systems Electronics Unit SUC by TRAC

CSMM Crash Survivable Memory Modules Redundant in TRAC and event reported to the surface.

CSMU Cabin System Management Unit Subservient and event SUC to TRAC.

CU Control Unit Either TRAC or subservient to TRAC processor and protocols

CVR Cockpit Voice Recorder Redundant in TRAC and REPORT via versatile high-speed communication options of TRAC Routing C & W Control and Warning TRAC providing as to event TRAC/FACT protocols and Monitoring and responding to as to TRAC/FACY protocols CWP (1) Controlled Working Position if necessary TRAC monitored (2) Controller Working Position (TRAC interfaced)

CWS Control Wheel Steering SUC TRAC

D

DARC Direct Access Radar Channel. An independent backup to main ATC computers. TRAC system Access DARPA Defense Advanced Research Projects Agency TRAC developed by and with this agency support and management Data Link A system that allows exchange of digital data over an RF link. ATCSS is a data link system used by the air traffic control system. ACARS is a data link system used by airline command, control and management system, using vhf communication frequencies. TRAC directly connected and interfaced, to provide real-time accountable emergency control of unauthorized aircraft use.

D-ATIS Digital Automatic Terminal Information System TRAC connected TRAC event master.

DBU Data Base Unit TRAC connected any system in place presently in any part of the PFN/TRAC system can be incorporated to complete the more secure and remote control system.

DC10 Douglas Model DC-10 Aircraft TRAC outfitted aircraft systems interfaced and subservient to TRAC DCE Data Communications Equipment interfaced and SUC to TRAC DCGF Data Conversion Gateway Function any present system performing communication translation between protocols (wireless or connected) to handle data or process commands can be incorporated in the TRAC protocol of a specific aircraft, made redundant by TRAC if deemed appropriate, or inexpensively duplicated across the industry if deemed practical, and expedient to complete TRAC PFN Routing functions.

DCMF Data Communication Management Function (obvious TRAC/FACT interface and Protocol application.

DCMS Data Communication Management System (TRAC operation and Protocols locally and systemically)

DCN (1) Drawing Change Notice (2) Design Change Notice (3) Document Change Notice all 3 of the above DCNs are to have an efficient but secure review and handling on a need-to-know basis when pertaining to TRAC components and interfacing—(reasonable to service needs but all identity clearance for access and change orders) (Secret clearances with respect to national security) (depcon rating)

DCP Display Control Panel video and audio recorded and reported to surface in real time and per TRAC/FAACT event of deemed necessary protocol 30 second loop to surface buffers for data dumping if deemed unessential.

DCPC Direct Controller Pilot Communication DCS is additionally connected to TRAC and management and use to be determined for TRAC protocols.

DCU Data Concentration Unit TRAC system can utilize any DATA compression or storage system in place both in the air and on the ground if determined adequate for TRAC/FACT.

DCV Directional Control Valve (possible SUC)

DDA Digital Differential Analyzer (utilized by TRAC)

DDD Dual Disk Drive Redundant systems in place can be used and with TRAC/FACT protocol.

DDM Difference in Depth of Modulation TRAC use to be determined

DDP Declarations of Design and Performance. A control document required by the United Kingdom Civil Aviation Authority (CAA) for certification of avionics equipment. A must for TRAC to be Trusted in the United Kingdom for commercial use.

DDS Direct Digital Synthesizer SUC for TRAC or SOC or hybrid substrate for any necessary Data recovery from disparate protocols to TRAC system DDT Downlink Data Transfer (to TRAC surface controls and storage facilities)

DECCA A navigation system widely used by shipping in Europe. The ground facilities consist of a master station and several subservient stations interface hybrid substrate to TRAC processor or comparable technical solution for position confirmation protocols to TRAC/FACT/WoJack I/O processor for robotics flight or remote control for location and timing information Dedicated as determined by the proper authorities for standard TRAC routes of communication and an emergency ded response for any communication protocol and frequency used by TRAC/FACT processor in a flagged emergency event to include a specialized cross communication emergency translating software algorithm to make more universal and extensive essential messaging.

DEFDARS Digital Expandable Flight Data Acquisition And Recording System This system when present employed in or by TRAC, with real-time reporting capability and event storage at the surface via TRAC directed and interfaced communication systems.

Demand Mode AN ACARS mode of operation in which communications may be initiated by the ground processor or the airborne system. Used imperatively by TRAC system DES and FACT with present security for first generation and higher language and code developed by defense contractors and DOD (Omaha div)

DEST Destination (any deviation from flight plan throws a software flag in TRAC/FACT WoJack Programming DEV Deviation TRAC Software Flag for any flight plan DEV DFA Direction Finding Antenna Date supplied to TRAC system for processing DFCS Digital Flight Control System as a consolidated part of future TRAC systems or interface as available.

DFDAF Digital Flight Data Acquisition Function Continual monitoring process for TRAC processor and this SUC will be used in robotics or remote control flying scenario if it can be reasonably protected from tampering to satisfy TRAC/FACT security requirements.

DFDAU Digital Flight Data Acquisition Unit. The DFDAU samples, conditions and digitizes the flight data. (protected and used in TRAC systems)

DFDR Digital Flight Data Recorder

DFDU Digital Flight Data Unit

DGNSS Differential Global Navigation Satellite System

DGPS Differential Global Positioning System

DGSS Data-link Ground System Standard

DH (1) Decision Height—all five of the above in BOLD lettering are all SUC to TRAC for robotics and remote control flying and supply the necessary data to flag a FACT Wo Jack response.

(2) Data flash Header on all FACT transmissions for accountability and encoded for security.

DI Data Interrupt A TRAC control Function if output and flag in data input for on board preprogrammed TRAC robotics for any affected sub-system or SUC DIAS DGPS Instrument Approach System all instrument data essential to robotics or remote control flying is provided to and from TRAC processor and PFN TRAC system as Master in a flagged event DID Data Item Description part of TRAC accountability (encrypted for FACT headers)

DIP (1) Dual In line Package. The most common package configuration for integrated circuits. And used in TRAC system or created by the necessary components to meet/TRAC redundancy requirements determined by developed protocols component engineers.

(2) Data Interrupt Program to be a TRAC monitored and managed function

Directed A DME operating mode that allows an FMCS to select

Mode one to five DME stations for interrogation. Data employed by TRAC system and protection of this system a requirement of TRAC DITS Data Information Transfer System used where present or performed by TRAC as an up grade or second generation DL Data Link for all essential SUC to the TRAC processor DLC Data Link Control Display Unit video and audio recorded and reported per TRAC event.

DLGF Data Load Gateway Function either performed by TRAC (hybrid substrates or soc interfaces or SUC in present and legacy aircraft)

DLM Data Link Management Unit a part of or interfaced with TRAC

DLODS Duct Leak and Overheat Detection monitored by TRAC

DLP Data Link Processor a part of TRAC physically protected or interfaced with first generation.

DLS Data Load System interfaced with TRAC

DLU Download Unit protected and connected to TRAC communication routing system, when appropriate.

DMA Direct Memory Access but accountable and recorded TRAC/FACT DES Collins protocols as determined.

DME Distance Measuring Equipment. A system that provides distance information from a ground station to an aircraft. Interface for FACT WoJack programming flagged events and for robotics flight and remote control flying via TRAC.

DME/N Abbreviation for a DME normal system.

DME/P Abbreviation for a DME precision system. Both quarried for essential data to TRAC operations DMM (1) Digital Multimeter (2) Data Memory Module redundant in TRAC system DMS Debris Monitoring Sensor monitored recoded and reported by TRAC if needed.

DMU Data Management Unit (a TRAC protected function)

Doppler The change in frequency observed at the receiver Effect when the transmitter and receiver are in motion relative to each other. Data used by TRAC system DOTS Dynamic Ocean Tracking System Additionally, used and interfaced data when applicable and present to a TRAC system Downlink The radio transmission path downward from the aircraft to the earth. This is in multitude through TRAC communication routing especially in second-generation units.

DPR Dual Port RAM (special to TRAC/FACT and Wo jack programming

DPSK Differential Phase Shift Keying reg electronics and present in TRAC system.

DRER Designated Radio Engineering Representative (FAA) to have high security clearance and part of the design review used for TRAC/FACT and Wojack in aircraft.

Drift Angle The angle between heading and track. It is due to the effect of wind currents. Sometimes called the crab angle. Computed data for remote control landing and robotics flight with TRAC.

DSARC Defense System Acquisition Review Cycle a necessary process to update TRAC FACT and wojack from time to time.

DSB Double Side Band. An AM signal with the carrier removed. Requires the same bandwidth as the AM signal. Incorporated for location and communication as needed by TRAC system.

DSDU Data Signal Display Unit video and audio recorded and reported in real-time flagged event stored.

DSF Display System Function—monitored by TRAC

DSNS Differential Satellite Navigation System Data incorporated in TRAC programs DTD (1) Data Terminal Display TRAC video DTE Data Terminal Equipment interfaced and represented as need be for TRAC DTU Data Transfer Unit will connect or be able to down load TRAC with proper security protocols Dual Mode An airborne DME rt capable of processing DME/N reg. To TRAC ops DME and DME/P ground station signals. Operation is in the L-band frequency range. Monitored data recovered for TRAC Ops DUATS Direct User Access Terminal System has accountable access recorded in TRAC/FACT security for accountability and management control-identity check TRAC.

Duplex A communication operation that uses the simultaneous operation, to transmit and receive equipment at two locations. TRAC employed real-time data transfer for RC.

Dynamic RAM constructed of capacitor elements. Memory (TRAC employed, as standards require Dynamic RAM constructed of capacitor elements. Memory (TRAC employed, as standards require RAM cells must be periodically refreshed to keep capacitors from discharging and losing data (see "Static RAM"). TRAC employed application specific or in sub systems EADI Electronic Attitude Director Indicator TRAC robotics uses DATA recovered to fly EANPG European Air Navigation Planning Group consulted and approval for TRAC EAP Engine Alert Processor monitored in the subsystems by TRAC EAROM Electrically Alterable ROM—possible technology for FACT flight plans if can be secured from tampering.

EARTS En route Automated Radar Tracking System TRAC continual communication to surface.

EASIE Enhanced ATM and Mode S Implementation in Europe All air traffic management will be SUC to PFN/TRAC/FAC command centers in every country. They may very well be created out of existing ATM as the highest level of ded. Dedicated control. However it is suggested that they can be isolated during an event and securely staffed at all time 24/7, both on any region and national or international level and including final approach Safe Bases and control handoffs if indifferent locations.

EATCHIP European ATC Harmonization and Integration Program could possibly be integrated and interfaced with TRAC/FACT technology and protocols in the most logical way for this area. ATM & ATC is well established and all the organizations, countries and professional and commercial associations are well represented in European politics and governance (European Union). The inventor is in no way attempting to tell any group of people how best to set up TRAC/FACT in their homelands, only mentioning logical established system components that are already in place that may help implement the FACT program in an efficient manner.

To help implement TRAC/FACT integration through existing hardware and software in aircraft and in surface systems in Europe—how ever FACT codes would have to be set up per geographic for command robotics and RC scenarios. These are all European questions best answered by Europeans.

EATMS European Air Traffic Management System to be incorporated and set up with TRAC/FACT system technology.

EC Event Criterion For FACT events and wojack have to be determined and that EC has to be written in code to be able to utilize all the (1) electronic signals supplied any TRAC process or TRAC ASIC.

ECAC European Civil Aviation Conference the five above will be used in all TRAC/FACT systems and protocols in Europe.

ECAM Electronic Caution Alert Module will be monitored by TRAC and signaled to surface for remote flight and surface response.

ECEF Earth-Centered, Earth-Fixed TRAC interfaced guidance

ECP EICAS Control Panel SUC to TRAC

ECS (1) Engineering Compiler System. An automated data storage system. Used for TRAC accountability function.

(2) Environmental Control System TRAC SUC as needed to manage the planes occupants and public safety.

(3) Event Criterion Subfield Coordinated or altered for preferred TRAC/FACT protocols.

ECSL Left Environmental Control System Card TRAC sub system SUC

ECSMC ECS Miscellaneous Card TRAC interfaced as applicable

ECSR Right Environmental Control System Card TRAC sub system

ED EICAS Display monitored.

EDA Electronic Design Automation a major renovation activity to create the automated remote control and robotics flight in all commercial aircraft and data routing.

EDAC Error Detection and Correction (used interchangeably with EDC) Subsystem SUC to TRAC-TRAC governance.

EDC Error Detection and Correction TRAC highest level processing.

EDCT Expected Departure Clearance Time all scheduled time will be augmented by the monitoring TRAC/FACT system that downloads current cleared data to less secure systems like air line display systems—there is a more secure information level for every airline, but all data is monitored managed and transmitted via the TRAC/FACT system net work of interrelated integrated and interfaced nodes of wireless gateways and NENA numbers.

EDI Engine Data Interface to be SUC to TRAC/FACT robotics Flight and landings.

EDIF Engine Data Interface Function to be SUC to TRAC/FACT robotics Flight and landings.

EDIU Engine Data Interface Unit to be SUC to TRAC/FACT robotics Flight and landings.

EDMS Electronic Data Management System is directly interfaced as part of the TRAC system in the first generation and ultimately dispersed to redundant differently located TRAC ASICS in any applicable aircraft. For the source system of mass data management and storage the system will have En route buffers at communication ink markers for all preprogrammed flights either regular routes or the safe base flights that will have data repositories and broadband wireless communication links frequency to be determined by the appropriate FCC/FAA authorities. These repositories will be linked by land lines, satellite, microwave fiber optics as part of an isolated but fastest intranet to FACT central command and all other FACT response units necessary SBs. The data is available in real time to all locations with specialized station monitors at each location for a FACT flight and it is recorded locally in the aircraft directly below in the position marker repository and in each FACT system hard drive (TIME/DATED with command strings and headers. If no FACT event occurs the data is erased to open for new space (length and time data is kept to be determined by the appropriate standards group and authorities.

EDP (1) Electronic Data Processing the 6 above data generating and handling functions will be interfaced in the appropriate manned for efficiency and rapid application to TRAC.

(2) Engine Driven Pump (3) Engineering Development Pallet to be drawn for each TRAC/FACT system and PFN configuration for legacy aircraft and for new aircraft design.

EDU Electronic Display Unit videoed and signals sent to TRAC system.

EEC Electronic Engine Control SUC to TRAC.

EEPROM Electrical Erasable Programmable Read Only Memory SUC to, responsive to and protected as part of TRAC/FACT essential flight controls for uninterrupted flight FACT flights and landings in the aircraft.

EEU ELMS Electronics Unit monitored for tampering and any TRAC/FACT system must be completely operable without the normal aircraft power to energize it or it's essential actuators. Additionally all power in service to charge the TRAC system FACT programs must be protected from power surge deliberate or incidental and/or any shorting of terminals. Sensing circuits for completed operations and programs to detect ineffective commands are to be an integrated part of the TRAC processors capability in robotics as soon as it can be provided.

EFD Electronic Flight Display Videoed and the electronic signals recorded and reported if from a FACT flight in progress. All ground systems for TRAC/FACT should be recorded 9with delete times and memory storage size determined and standardized.

EFIP Electronic Flight Instrument Processor SUC to TRAC/FACT flight process either incorporated and protected from local control and/or a sub system over ride by a ASIC TRAC/FACT processor that controls all the essential flight controls and receives all sensed data for completed operations in robotics and RC commands.

EFIS Electronic Flight Instrument System SUC or sub system to TRAC/FACT management monitoring and control.

EFIS CP EFIS Control Panel the eight above will be utilized or interfaced with TRAC as appropriate for TRAC/FACT effectiveness.

EGNOS European Geostationary Overlay System interfaced for flight deviation detection in Europe TRAC/FACT Systems.

EGT Exhaust Gas Temperature sensed data reported as relevant to TRAC process and the ground to detect fuel contamination etc. Also, Fuel sensing in the aircraft tanks, airport storage facilities and ground support trans port vehicles to detect reactants via equipment and free standing PFN/TRAC application specific fuel sentry units to guard against chemical agents that when heated in a jet burn could cause tainted or contaminated atmosphere in a significant area of the jet s operation to cause sick ness or death on the surface. Especially in takeoff and landings.

EHSI Electronic Horizontal Situation Indicator TRAC used with SUC systems for automated flight.

EHV Electro-Hydraulic Valve SUC to TRAC/FACT systems and programs and utilized to isolate local human control and effect automated flying in hydraulically controlled aircraft.

EIA Electronic Industries Association to help in standardized electronics to help universal ASICS to lessen cost for each sophisticated application.

EICAS Engine Indication and Crew Alert System Videoed and sub system to TRAC/FACT systems. FACT can be used to help the legitimate flight crew handle a problem for as long as they are able and take over the control of the flight as they are incapacitated. Thus, the plane to the surface safely as rapidly as possible—For normal flight emergencies—a controlled smoke black out could be allowed to occur with all crew and passengers on O2 masks with eyes closed and the aircraft landed safely using the thick smoke to suffocate the fire but not the people on board.

EIS Engine Indication System videoed and essential electrical signals for flight SUC to TRAC/FACT control.

EISA Extended Industry Standard Architecture TRAC/FACT is to be EISA. The PFN/TRAC system is created to be the standard in accountable robust robotics and RC avionics control of an aircraft for the present and long into the future. The PFN/TRAC System is meant to provide an accountable machine messaging matrix of equipment platform specific intranets as part of a massive human machine management interface for societies to better control equipment use in harmony with the earths environment and societies infrastructures to preserve human life and maintain it's quality in a free society. Many standard efforts will define the specifics in hard ware soft ware and procedures, protocols, codes, rules, regulations and law to be applied to the use of any PFN/TRAC unit or system application. EISA is an ongoing process designed into the inventions purpose and architecture to be progressive to meet humanities needs.

EIU EFIS/EICAS Interface Unit this interface as well as many other industry standard interfaces will be employed as needed.

ELAN Ethernet Local Area Network will be use as needed to set up internal aircraft interfaced and used for in house computer connections in surface stations for TRAC/FACT systems.

ELC Emitter Coupled Logic used and all protocols discernable or translated via hybrid substrates, chipsets or ASIC or SOC architecture for the TRAC/FACT process or application specific processors.

ELEC Electrical

ELM Extended Length Message ELM used as data require for complete transmission in TRAC/FACT service.

ELMS Electrical Load Management System monitored by TRAC/FACT system and FACT to control for flight as protect-able or to replace this energy source.

ELS Electronic Library System a special ELS will be started for 5 initial TRAC/FACT robotics flight and landings at designated Safe Bases as first library on board everything and application specific to any aircraft in US airspace. Additionally ELS robotics flight for all air craft to robotically land at all airports will be an on going proprietary product and technology of the TRAC/FACT system and related patent and protected technology. It will be possible to up load robotics and/or RC command from anywhere to a troubled aircraft due to a compromised pilot and safely land the plane at the desired airport or help the deficient pilot where they are inept provided it is not a FACT event, e.g. Wojack—these flight are automatically going to safe air space and contained and secured SB landings, unless otherwise routed due to TRAC/FACT programming and protocols form Command center.

ELT Emergency Locator Transmitter will be augmented with a GPS packetized location signal NEMA etc. modulated on there emergency beacon to be picked up by any surface or seaworthy PFN/TRAC unit and translate the emergency signal to the best wireless gateway and NENA data link number for the area TRAC/FACT avionics system for accurate location coordinates. As part of the data stream for a troubled aircraft, data will be transmitted during a crash event for 5 sec until impact and at battery saving intervals if the hot GPS reading is functioning. Additionally all the other wireless cellular phones and navigational aids will be quarried by the protected TRAC processor unit to record and report back all functioning wireless devices for debris field recognition, and to contact any survivors to aid emergency response workers.

EMC (1) Entertainment Multiplexer Controller interfaced and used as needed as applicable in any specific aircraft avionic component for the initial TRAC/FACT process and protected accordingly, but ultimately part of the TRAC/FACT—ASIC.

(2) Electro Magnetic Capability TRAC processing protected from EMFs

EMER Emergency

EMI Electro-Magnetic Interference TRAC protected from

EMS Engine Management System Sub system SUC to TRAC

EP (1) External Power—Charge TRAC systems—FACT protocol isolated from TRAC system EPCS Engine Propulsion Control System Sub system to Autopilot/Flight computer/interfaced with TRAC via higher software application or direct connect to TRAC processor as per security needs and aircraft architecture.

ENQ Enquire

EOT End-Of-Text

EP (1) External Power TRAC system has internal power for FACT protocol and normally operates on external power—however TRAC is to be protected from external power tampering to disable TRAC.

(2) Engineering Project PFN/TRAC System implementation in to aircraft into ground system and into secure transportation matrix or network, EPC External Power Contractor Secured and Protected to TRAC integrated System.

EPCS Engine Propulsion Control System SUC sub system configured for essential control functions (secured and protected as applicable).

E-Plane The E-Plane is the plane of an antenna that contains the electric field. The principal E-Plane also contains the direction of maximum radiation. All forward looking radar and aircraft location data deliverable to the TRAC System or interfaced subsystems will be used at a higher level by the TRAC processor via FACT software running final function flight robotics or remote control.

EPLD Electrically Programmable Logic Device

EPROM Erasable Programmable ROM The 2 above hardware components implored in subsystems and interfaced as needed to customize present disparate human dominant controls to a more secure automated system for TRAC management protocols.

Equivalent Airspeed is a direct measure of Airspeed the incompressible free stream of dynamic (EAS) pressure. It is CAS corrected for compressibility effects. The two above data supplied to the robotics FACT program running and the ground support TRAC system for robotics flight and RC landing (I) DATA.

ERP Eye Reference Point

ERSDS En Route Software and Development Support TRAC Data for Robotics flight and interfaced with surface monitoring system.

ERU Engine Relay Unit Sub system SUC to TRAC as practical and necessary

ESA European Space Agency needed approval for TRAC in Europe and necessary in the development of the technical changes protocols, standards and regulations, as well as helping to supply the necessary satellite tracking and communication technology for the most responsive real-time remote and robotics control over the European continent.

ESAS (1) Enhanced Situational Awareness System (2) Electronic Situation Awareness System to be more enhanced and incorporated and interfaced with the TRAC system FACT protocol of Homeland Secure Transportation via accountable monitoring/management aggressive remote and robotics control in emergency situations.

E-Scan Electronic Scanning

ESD Electrostatic Discharge TRAC electronics must be especially protected form this event with surge protection on any ASIC or crucial IC circuit that is a sub system or essential SUC to TRAC Systems automated control of aircraft functions.

ESDS Electrostatic Sensitive Devices. Also known as ESSD. Protected for all TRAC/FACT functions and protocols.

ESID Engine and System Indication Display Usable electronic signal provided as necessary to TRAC controller and FACT programming locally and to any ground support virtual flight crew assisting and of course the RC pilot.

ESIS Engine and System Indication System all electronic data provided the local robotics and remote flight crew. Additionally to improve and increase the distance of Remote control Flying accuracy a special software algorithm both in the aircraft and in the surface RC flight station need to be developed to use the forward looking weather radar or any pre flight path sensing equipment data or external surface or satellite data and adjust the RC fight stations experience to portrait real-time conditions in the distant aircraft. Future project for long distant remote control with optimum flight control insured by robotics backup monitoring real-time condition.

ESR Energy Storage/Control monitored SUC and used as safely available to the PFN/TRAC System ESS (1) Electronic Switching System any essential controls TRAC interfaced.

(2) Environmental Stress Screening All TRAC systems must comply with the necessary requirements for impact and environmental packaging, however ESSD Electro Static Sensitive Devices (see ESDS)

ETA Estimated Time of Arrival monitored and adjusted by TRAC/FACT involvement.

ETD Estimated Time of Departure monitored by TRAC System for FACT events or flags.

ETI Elapsed Time Indicator

ETM Elapsed Time Measurement all timing data monitored by TRAC for FACT alert flag and to prompt automated quarries of system and personnel.

ETMS Enhanced Traffic Management System a major purpose for TRAC/FACT management as well as coordination with other TRANSPORTATION. Another purpose enhanced public safety.

ETOP Extended Twin Engine Operations to be monitored by TRAC/FACT systems and coordinated with air speed head winds and other sensed and RF supplied data for the automated robotics flights to safe bases by TRAC/FACT process or ASIC processors.

ETRC Expected Taxi Ramp Clearances FACT monitored for an early ACARS OOOI event FACT flag and then controlled by TRAC/FACT command control both locally and centrally depending on the nature of the FACT event—(handled locally in designated isolated area of the end of a runway or cleared to fly out to a safe base for handling with specially trained FACT personnel.

ETX End-of-transmission EXT will have a FACT encrypted secure signature to designate to all TRAC/FACT units a legitimate signal. (The exact technique and implementation of these unique signatures is to remain a trade secret to be disclosed to the proper security personnel at the time they construct there own secret code writing for operational FACT commands for their air space EUR European Eurocae European Organization for Civil Aviation Electronics. A regulatory agency for avionics certification in Europe This agency will most definitely determine the TRAC integration process of existing avionics in legacy aircraft and help design and approve the ASICs and support computer and wireless systems needed for TRAC/FACT to operate in European air space.

EURO—European Organization for the Safety of Air Navigation.

CONTROL Operations Obviously EURO-CONTROL will be directly involved with determining the safe airways over Europe to Safe TRAC/FACT Bases.

EVS Enhanced Vision Systems are to be interfaced with recognition software to transduce the image to a signal for good (I-data) to any TRAC/FACT processor to use if this proves beneficial to robotics flight and landing. Using a similar technology to video lane maintenance in collision avoidance systems in surface applications and judging distance by size of an object in a calibrated field via a software algorithm running in the real-time flight processor) (possible taken form a calibrated Screen presented for enhanced pilot vision) whether for normal light or night vision enhanced applications.

Event recording device note for any data for voice/audio/video or transmitted communications all elements required for accountable memory storage must have RF beacon (FAA standard and DSRC like Bluetooth to activate any hand held telephony in an event (crash or impact) to narrow the search area and help determine debris field prior to search, rescue, and recovery operations to generate accurate maps in Real-Time. Additionally memory units will be outfitted with a GPS receive with protected patch antenna to give one hot reading of an initial stationary detected state, if another movement is detected from this resting state-battery saving GPS readings are delivered via any beacon or transmitting function if not terminated by the appropriate authorized parties—Also the unit will be capable of repeating emergency communications to any other local PFNs and/or dial out to NENA-FAA and security group with GPS coordinates-personal PFN technology minimal Processor IC custom Hybrid substrate in a can or simple IC micro computers like stap—Standards to determine configuration and use protocol.

F

FAA (1) Federal Aviation Administration (U.S.)

(2) Federal Aviation Authority to approve and implement the PFN/TRAC System in the United States for air travel.

FAC Flight Augmentation Computer SUC or sub system interfaced and used as available or needed to affect safe superior and secure control or the aircraft.

FADEC Full Authority Digital Electronic Control a base technology of PFN/TRAC System hardware constructions and used and interfaced with as well as analog systems complete the secure control technology to perform accountable robust robotic & remote control.

FAF Final Approach Fix at this point or some where close the first generation TRAC landing for troubled aircraft performing under FACT robotics software will be contacted to release controls to the ground RC flight crew for the final approach and landing—Robotics programs will run a guardian copilot soft ware use and protocol to be determined (quickly).

2nd generation will provide robotics software to help inexperienced pilot with on-board, automated equipment to reach this landing point and beyond to the pilot feel sure the can make a safe landing-programs to be up linked as well as RC pilot help as it becomes avail able locally or virtually.

FAI First Article Inspection. PFN TRAC will run it's own preflight inspection to check all systems interfaced and during the flight monitor system. Pilot must clear ID check and log in the system highest technical identity as well as his filed preflight report is required—FAA-override and clear.

FAATC FAA Technical Center—to approve all TRAC applications and interfaces as well as all systems interfaced with TRAC—this center has to provide the SECRET and security cleared personnel to access any aviation PFN/

TRAC unit in the aircraft and on the ground. Security clearance and qualification is checked on a regular and intermittent basis as a condition of this job—Homeland and the appropriate security agencies to assist on he standards and be in direct communication with these technical inspectors with the latest security information as to threats to compromise the PFN/TRAC system for aviation.

FADE FAA-Airline Data Exchange Monitored/managed or SUC a SUB system to the surface FAA-Homeland Security PFN/TRAC System architecture in the Transportation intranet for aviation. This intranet operated as part of the Internet will have a higher level of access and control during FACT conditions. During a FACT event limited access to view or acquire data in a particular transportation intranet will be evoked with only security DET/DES or FACT Homeland Security/agency cleared and specific to have access to these involved data bases. Separate interactive DOT intranets will monitor surface vehicles for land roadway, rail and seaways. The PFN/TRAC System ties all these systems together.

FADEC Full Authority Digital Electronic Control (TRAC Protocol Master Control)

FANS Future Air Navigation System with more Direct GPS supported flights rather than the traditional hub flying should have special designed safe air space flight plans to the safe bases that protect surface public safety, with an emergency response air cavalry dispatched to intercept and escort a FACT/WoJack event with the air escort RC pilot. This team will follow and assist the troubled flight if it is forced don or crashes prior to SB landing and terminate the flight if this action is warranted.

Fan Marker A marker beacon used to provide identification of positions along airways. Standard fan marker produces an elliptical-shaped pattern. A second type produces a dumbbell-shaped pattern. TRAC/FACT robotics will use this position information data either in existing autopilot or flight computer systems as a SUC system to TRAC or they will use the data through direct Flight controls in the case of second generation self contained and protected TRAC/FACT System.

FAR Federal Aviation Regulation will be responsible for helping to develop FACT ESNs for aircraft and components interfaced and inventoried by TRAC locally—which will flag the PFN/TRAC System in real-time of any change both in the aircraft and in ground control. Authorized Technicians will have direct personal PFN connect to answer any FAA or homeland security questions and meet any security check in real time.

FAST Final Approach Spacing Tool this system will be employed in later PFN/TRAC Systems as a general rule— first generation TRAC/FACT systems will be sent automatically to the Safe Bases. As flight and landing software libraries are forth coming regular troubled flight emergencies where flight skill is the only concern will be spaced automatically by the Robotics system in TRAC and connected to FACT ground support as needed to affect a safe landing or help a JFK Jr. type pilot land his aircraft in overpowering conditions for their skill level. By using the automated onboard systems to assist them where they are most deficient—store the corrected errors and provide to a simulator experience for the pilot to practice his skills for future flying.

FBL Fly By Light This system can be used for TRAC robotics to control the landing in conjunction with the RC pilot so that data is being shared between the TRAC system in the plane and the TRAC/FACT RC simulator station— protocol for master controls to be determined. Some of this decision may be done by policy and some by the technologies in use at the time of any given event.

FBW Fly By Wire These systems will prove far easer to eliminate local control and divert it to the PFN/TRAC unit for FACT protocols and of course all Flyby wire controls and their redundant systems will be SUC to the TRAC/FACT program in an event like a WoJack Scenario.

FCAF Flight Data Acquisition is an ongoing process for the TRAC system with the FACT software searching for an event, if an event is detected robotics flight is initiated away from all other air traffic—onboard sensor systems are further quarried through TRAC processor via data communications and acquisitions in a real-time with memory storage active, the personnel are quarried and so is the surface support to decide if the criterion is met to continue a robotics flight to the safe base or return the flight to local pilot control and the adjusted flight path and new approved flight plan.

FCC (1) Federal Communications Commission will assign ded or Dedicated frequencies as well as DSRC frequencies to manage all carryon devices via TRAC system for FACT protocol. Additionally, FCC will sanction and help develop with other security agencies a universal high application software that can translate emergency messages through any wireless protocol for chipsets, hybrid substrates or SOC technology for the PFN/TRAC unit to scan for emergency communications process and retransmit to the appropriate emergency response intranet and services via other TRAC interfaced communication protocols to act as a local wireless router in a large flexible matrix or web for networking better communications.

(2) Flight Control Computer will be part of the COTS TRAC first generation and must be altered to have flight control uninterrupted locally to meet TRAC/FACT specifications—and must activate as a SUC system to perform robotics flight. These advanced Flight systems may evolve as the central processing component of many PFN/TRAC systems in specific aircraft. This is the call of industry standards government and for system and component engineers. These are workshop adjustments to better construct the TRAC/FACT component from existing technology. The goals are clearly stated and the base modality for every step is to increase public safety and national security while consolidating and protecting the system for isolated control and confirmed and approved access.

FCDC Flight Critical dc These power bus systems should be protected as part of the flight control system SUC under FACT protocol and where ever possible energized by TRAC/FACT system PFNs to complete any robotic or remote control commands to include DSRC wireless or wireless Ethernet interfacing for cost effective redundancy. CODEC in these PFNs to be additionally encrypted with FACT communication Software to thwart any undesirable command communication attempts. Additionally, disregard and report any non-inventoried ESN transmission from known onboard interfaced equipment. All new interfacing must be accomplished through FACT surface security protocols FAA and whatever homeland security protocols deemed necessary.

FCP Flight Control Panel Video and audio monitored and control functions neutralized in a FACT event e.g. WoJack incident as soon as detected with all these controls turned over to TRAC/FACT control of robotics and remote control. If the panel contains vital components Flight computer autopilot processors or control modules that can influence flight or critical flight systems they must be protected and unusable to local human control.

FD (1) Flight Director During an event-FAA position with Home land security team) Termination of flight decided at the highest level as possible for the best real-time response needed—decision tree needed.

(2) Final Data

FDAF Flight Data Acquisition Function a continual process during a TRAC/FACT event.

FDAU Flight Data Acquisition Unit part of TRAC system and protected as needed to provide uninterrupted service to any FACT program running.

FDB Flight Plan Data Bank a unit that could store the 5 safe base flights and landings subsystem of or SUC to TRAC/FACT.

FDDI Fiber Distributed Data Interface All data communications, be they wire wireless or light communications are interfaced through the TRAC system and managed as needed.

FDE Fault Detection and Exclusion

FDEP Flight Data Entry Panel All access must be accompanied by the highest personal Identity check feasible a TRAC protocol.

FDH Flight Deck Handset Same security ID required Finger thaw pulse and thermal sensor or Iris read to activate with personal smart card swipe or individually issued to flight crew.

FDI Fault Detection and Isolation SUC to FACT program analysis.

FDM Frequency Division Multiplex is a system where the messages are transmitted over a common path by employing a different frequency band for each signal. This technology can be used for the final approach or local remote control encrypted signals to fly the plane separate channels for critical controls.

FDMA Frequency Division Multiple Access Could be a SUC system used by TRAC in a FACT protocol if the Access to the transmission can be controlled and secured.

FDR Flight Data Recorder and an intricate part of the PFN/TRAC system. Presently we have the highest protection for the recordings of a flight. PFN TRAC protocols call for this level of secure protection or greater for communication routing and computer controls necessary to fly and land an air craft—This is a major proprietary difference between what is and what this technology brings to the world of flying—Accountable automated flying and advanced and enhanced Human Machine Interfacing.

FDRS Flight Data Recorder System Sub system to TRAC/FACT protocols or a redundant technology SUC to TRAC's function to deliver same stored data to surface repositories or mass data buffers transmitted to while flight is in route and cleared if non event related or stored with FAA mass data and any manufacturer data base.

FEATS Future European Air Traffic Management System PFN/TRAC constructed with the appropriate communication frequencies and the proper FACT encrypted software. FACT software is activated by sovereign airspace determined by position location technology on board and confirmed in many redundant software passes—exact protocols for emergency TRAC/FACT scenarios like a WoJack event—involving numerous airspace restrictions must be pre approve for the robotics flights prior and coordinated with all appropriate governments.

FEC Forward Error Correction SUC for TRAC robotics flight

FF (1) Free Flight (2) Flitefone (TRAC monitored

FGC Flight Guidance Computer Can be an integrated part of TRAC or SUC to TRAC or finally an element of a 2nd generation TRAC system.

FHA Fault Hazard Analysis Interfaced process SUC to TRAC

FLT CTRL Flight Control PFN/TRAC System TRAC interface and emergency control.

FLT INST Flight Instrument

FLW Forward Looking Wind shear Radar data interfaced into FACT SB Flight and landing robotics programs as well as reported to any RC pilot controls and any real-time fuzzy logic algorithm to fly the plane more responsive to actual conditions where communication lag may hinder real-time flight.

FM Frequency Modulation

FMA Flight Mode Annunciator Application to be determined for FACT programmed flights.

FPA Flight Path Angle data to be processed by TRAC for coordinating real-time surface safety information and to control aircraft via robotics and remote controlled flight and landings.

FPAC Flight Path Acceleration Monitored and governed by TRAC/FACT as need be FPC Flight Profile Comparator a program and protected function SUC to TRAC/FACT programming either as an integrated function or interfaced.

FPGA Field Programmable Gate Array A processor configuration that TRAC may use in application specific aircraft needs, also a custom gate array, and the following TRAC Processors cover a wide variety of hard ware configurations for the correct ASIC in the patent and protected technology. The following out of alphabetical order.

COTS Based list is seven such possible architectures
PC, Programmable Controller
Custom
Logic Sequencer
mP (Micro processor)
FPGA (Field Programmable Gate Array)
Custom Gate Array
Systems On a Chip (SOC)

FPV Flight Path Vector interfaced and protected data to the TRAC/FACT program.

FQIS Fuel Quantity Indicating System

FQPU Fuel Quantity Processor Unit SUC in TRAC system

Frequency (1) Function in 860E-5 (-005/-006) to allow tuning 2

Agile by-5 inputs from on-board FMCS/PNCS systems. Channeling may be as often as every 5 seconds. The 6-wire output data is modified for input to an FMCS or PNCS.

FRP Federal Radio navigation Plan

FSE Field Service Engineer Secret and security qualified and approved for TRAC/FACT access.

FSEU Flap Slat Electronics Unit and sub systems autopilot, flight computer SUC to TRAC/FACT protected control FSIC ATA Flight Systems Integration Committee To help configure the various interfaces and configurations of TRAC generational employment, by setting standards and regulations.

FW Failure Warning interfaced to TRAC via sub systems initially and ultimately a TRAC protected function.

FWS Flight Warning System SUC to TRAC with application specific TRAC response programming.

FWC Flight Warning Computer Sub system and SUC to TRAC ultimately to be a protected function of TRAC processing ASAP.

GAMA General Aviation Manufacturers Association to assist standards efforts to determine progression of TRAC/FACT protocols into each aircraft.

GANS Government Air Navigation System a crucial element of the ground TRAC/FACT system with GBSTs to determine aircraft deviation either generated from the Aircraft checks or ground generated—also monitor and tracking.

GBST Ground Based Software Tool used in monitoring all flights and aiding in robotics and remote control landings.

GCA Ground—Controlled Approach. A system that uses a ground-based controller to control the approach of an aircraft by transmitting instructions to the pilot This system will be converted to communicating directly with the TRAC processor in a FACT protocol and deliver data rather than voice.

GCAS Ground Collision Avoidance System used as needed and developed for Robotics and RC landings.

GCB Generator Circuit Breaker

GCS Ground Clutter Suppression

GCU Generator Control Unit TRAC monitor

GDLP Ground Data Link Processor interfaced or integrated with TRAC processor GDOP Geometric Dilution Of Precision. A term referring to error introduced in a GPS calculation due to the positioning of the satellites and the receiver. This algorithm employed to provide the most accurate position data to TRAC.

GDP Ground Delay Program

GECAS General Electric Capital Aviation Services to help construct TRAC

GEN Generator

GEO Geostationary Earth Orbit

GEOS Geostationary Earth Orbit Satellite To provide location and communication Links for greater RC at a distance nearer real-time responsiveness.

GES Ground Earth Station to provide correction GPS signal and possibly be used to retrieve data downloads from TRAC flights.

GG Graphics Generator employed in simulator RC station and ground support PFN/TRAC System.

GH Ground Handling and Robotics the priority system in a FACT event

GHz Gigahertz minimum speed for TRAC processing

GIB GNSS Integrity Broadcast

GIC GPS Integrity Channel

GICB Ground-Initiated Comm-B

GIGO Garbage-In Garbage-Out

GIS Geodetric Information System

Glide path The approach path used by an aircraft during an instrument landing or the portion of the glide slope that intersects the localizer. The glide path does not provide guidance completely to a touchdown point on the runway. TRAC Used as applicable to landing by robotic and remote control, also a point for a handoff from robotics WLS to RC final touch down or an assist protocols for the JFK, Jr. scenario.

Glide slope The vertical guidance portion of an ILS system. TRAC ILS approach use for SB landing prior to RC handoff GLONASS Global Navigation Satellite System (Russian) Used in the Soviet Union for TRC navigation.

GLS GPS Landing System used in the TRAC/FACT programming

GLU GPS Landing Unit used in TRAC Processing

GM Guidance Material

GMC Ground Movement Control

GMPLS Global Multimode Precision Landing, System used where available for robotics and remote controlled landing TRAC processing.

GMT Greenwich Mean Time. GMT is a universal time scale based upon the mean angle of rotation of the earth about its axis in relation to the sun. It is referenced to the prime meridian that passes through Greenwich, England.

GND Ground

GNE Gross Navigational Error

GNLU GNSS-based Navigation and Landing Unit data used and interfaced with TRAC robotics and Remote control where available Europe and 2nd generation.

GNR Global Navigation Receiver SUC system to TRAC

GNSS Global Navigation Satellite System Data used applicable to aircraft TRAC

GNSSP ICAO Global Navigation Satellite System Panel

GNSSU GNSS Unit SUC to TRAC system when present

Goniometer A device that combines the two signals from two loop antennas. The goniometer (or resolver) contains two fixed coils and one rotating coil. The rotating coil is connected to the ADF bearing indicator needle to indicate the relative bearing from the aircraft to the NDB station. The mechanical position of the rotor represents the bearing of the station, and the position is electrically transmitted to the RMI. Used with hub flying position this data will be SUC to TRAC and compared with GPS and other position equipment on board.

GOS Grade of Service

GPADIRS Global Positioning, Air Data, Inertial Reference System data processed in TRAC system to check other systems readings for error. All position and velocity data to be checked by TRAC systems to determine if the flight plan is deviated from and if there is a FACT event.

GPIB General Purpose Instrument Bus Possible connecting point for the Primary Focal Node Trusted Remote Activity Controller to be attached if it can be properly protected.

GPNS Ground Proximity Warning System sub system to TRAC and delivering data to any robotics or RC flight program running in the air or on the surface.

GPS (1) Global Positioning System (see NAVSTAR)

(2) Global Positioning Satellite

GPSSU Global Positioning System Sensor Unit all of the 3 above to deliver data to the TRAC processor and FACT program when available and needed.

GPU Ground Power Unit

GPWC Ground Proximity Warning Computer

GPWS Ground Proximity Warning System The 2 above subsystems delivering data to the TRAC processor during a FACT programmed flight.

Gradient The rate at which a variable quantity increases or decreases.

Gray Code Special binary code used to transmit altitude data between framing pulses of a transponder reply. A cyclic code having only one digit change at a time.

Used in Mode C to transmit aircraft barometric altitude. Also known as Gilham code. For all special code and protocols chip sets hybrid substrates or a running program in the TRAC processor will decode the necessary data for the TRC system to use this data as available and needed for the best flight performance.

Ground Wave A radio wave that travels along the earth's surface.

GRP Geographic Reference Point

GS (1) Glideslope an important element to a robotics and remote control landing.

(2) Ground Speed read, determined used or generated as necessary for the TRAC system to perform with the RC ground support pilot to land and stop the troubled aircraft.

GSE Ground Support Equipment Special access tools and procedures ID protocols to the Primary Focal Node with the Trusted Remote Activity Controller.

GSP Glare Shield Panel

GSV Gray Scale Voltage(s) Readable binary code for altitude and barometric pressure as needed by the TRAC processor for robotics and RC flight.

GT Greater Than

GTA General Terms Agreement

GTC Data Link Ground Terminal Computer TRAC/FACT download to a FACT/DES/DET or similar database protected for mass data—special authorization to perform the process and special access and accountable access protection whether it is a physical connection or special wireless encrypted process.

GTR General Technical Requirements For TRAC are spelled out in this alphabetical list of avionic terms.

GUI Graphic/User Interface

GVE Graphics Vector Engine

GWS Graphical Weather Services same data (via electronic/digital/analog signal provided the TRAC processor for all three of the above.

Gyroscope A rotating device that will maintain its original plane of rotation, no matter which direction the gyroscope mount is turned. Data transduced if necessary to an electrical signal when not present and provided to the TRAC processor for the Robotics flight to determine horizon and level flight reference.

H

HDBK Handbook Written to detail out the TRAC/FACT protocol in the specific aircraft.

HDG Heading Data delivered to the TRAC processor for flight deviation recognition function.

HDLC High Level Data Link Control A major function of TRAC

HDOP Horizontal Dilution Of Precision

HDP Hardware Development Plan For TRAC—is to start with existing air craft architecture and interface and protect any existing hardware that can support TRAC/FACT robotics and remote control flight and landing, additionally augment these systems with the necessary ASIC and local HMI lockouts to complete these first generation and aftermarket changes. 2nd generation HDP Forth coming. For surface systems utilize all the computer hardware systems in the agencies either existing or augmented in DOT, FAA, NHTSA, NTSB, DOD Homeland Security link w? DOJ/FBI, CIA, NSC via FACT communication and software protocols to create an entire secure transportation management system.

Heading The direction of an aircraft path with respect to magnetic or true north. All location equipment to determine true heading on the aircraft is to be quarried by TRAC/FACT to insure the FACT program triggers on proper event flags in the program to take robotic control and fly the plane correctly.

HF High Frequency. The portion of the radio spectrum from 3 to 30 MHz. HF communication systems operates in the 2 to 30 MHz portion of the spectrum.

HFDL High-Frequency Data Link All communication is SUC to TRAC as needed with redundancy as needed for reliability, ded frequencies have to be determined for the RC flight and encrypted communication links, the bandwidths have to accommodate the best handling of the determined essential data for each fact function and be translated by TRAC for redundant messaging when one communication link is compromised.

HFS High-Frequency System

HGA High Gain Antenna

HHLD Heading Hold Any change of the heading in a flight plan is to be recovered by video and all information is to be considered TRAC/FACT event record and report flag status.

HIL Horizontal Integrity Limit any real-time flight data sensed or generated is delivered to the TRAC Processor or protected sub system SUC to the TRAC processor running any FACT preprogrammed robotics or for RC downloads.

HIRF High Intensity Radiated Field TRAC protected from with a mesh composite in the physical protection if needed to protect against EMWs—Protection to be determined by standards effort HLCS High Lift Control System SUC to FACT robotics flight programs either protected distributed TRAC node—autopilot or flight computer or a consolidated second-generation PFN/TRAC system.

HLE Higher Layer Entity TRAC processor and programming

HLL High Level Language FACT code

HMI Human Machine Interface Enhanced by TRAC with accountable shared control scenarios.

HMOS High Density Metal Oxide Semiconductor All electronic component technology used in TRAC construction.

HOW Hand-Over Word cock pit and cabin video for TRAC recording and RC communications and for gesture recognition program in TRAC also voice command recognition software in TRAC.

HP High Pressure

HPA High Power Amplifier hPa hecto Pascal

HPC High Pressure Compressor

H-Plane The H-Plane is the plane in which the magnetic field of the antenna lies. The H-Plane is perpendicular to the E-Plane.

HPR High Power Relay SUC to TRAC

HPSOV High Pressure Shutoff Valve SUC to TRAC

HPT High Pressure Turbine

HSI Horizontal Situation Indicator. An indicator that displays bearing, glide slope, distance, radio source, course and heading information. Video and Data lined appropriately as to TRAC.

HSL Heading Select Video and data linked to TRAC

HSR High Stability Reference Interfaced as needed

HUD Heads Up Display TRAC connected

HVPS High Voltage Power Supply SUC to TRAC

HW Hardware

HX Heat Exchanger

HYD Hydraulic

HYDIM Hydraulic Interface Module sub system and SUC to TRAC

Hz Hertz (cycles per second)

I

IACSP International Aeronautical Communications Service

Provider

IAF Initial Approach Fix Data to TRAC/FACT programs

IAOPA International Council of Aircraft Owners and Pilots A group to help determine and set Standards codes regulations and use of TRAC/FACT with government.

IAP Instrument Approach Procedure to include complete protocol for RC and robotics landing via TRAC/FACT programming at the 5 SBs for FACT events. Second and future generations of PFN/TRAC to complete robotics and RC landings at traditional airports of all WLS approaches.

IAPS Integrated Avionics Processing System incorporated as TRAC in first generation where applicable—further protected and managed via FACT software.

IAS Indicated Air Speed all data delivered to TRAC

IATA International Air Transport Association to take part in the forming and implementation of standards rules regulation and law incorporated in TRAC/FACT protocols.

IC (1) Intercabinet used as applicable to TRAC/protocol for security (2) Integrated Circuit ICAO International Civil Aviation Organization (Montreal) another group to be incorporated in determining the procedures and rules standards, regulation codes laws that TRAC will be applied by and FACT programming will be coded and written for ICC IAPS Card Cage to be constructed to meet the TRAC/FACT protection requirement for any essential processing system to perform the FACT protocols un-abated.

ICD (1) Installation Control Drawing for each TRAC/FACT flight system for each aircraft.

(2) Interface Control Drawing TRAC/FACT for each aircraft (3) Interactive Design Center used to develop the proper TRAC/FACT configurations for each aircraft type from what is COTS and what has to be interfaced and augmented to be certified TRAC/FACT ready.

ICNIA Integrated Communications, Navigation and Identification Avionics an essential automation to all flying platforms for TRAC/FACT certifications, additionally this is to be a protected avionics package with an onboard inventory program for an avionics FACT package deliverable by wireless and recorded in protected memory. This ICNIA package when present will provide data to the TRAC process and/or computer running FACT robotics flight and landing programming.

ICU Instrument Comparator Unit to be monitored by TRAC for any flagged instrument failures or possible tampering event flag for FACT.

IDC Indicator Display/Control videoed combined with data streams sent to surface system to evaluate.

Ident The action of the transponder transmitting an extra pulse along with its identification code (at the request of a controller). Used for essential TRAC communication link, and this Ident modality to be used by TRAC components dispersed by an accident to communicate location data between existing operating PFN/TRAC components and rescuers establish-most accurate debris field for best rescue and recovery.

IDG Integrated Drive Generator

IDS (1) Ice Detection System (2) Integrated Display System

IEC IAPS Environmental Control Module TRAC connected and interfaced

IED Insertion Extraction Device

IEEE Institute of Electrical and Electronic Engineers to take part in the standards efforts for all TRAC hardware.

IF (if) Intermediate Frequency. A frequency to which a signal is shifted as an in-between step in the reception or transmission of a signal. TRAC is a communication router and therefore this function is part of the TRAC scan processor for all communications interfaced with a FACT priority scan recognition algorithm. Any wireless system also on board would be a sub system or SUC to TRAC.

IFALPA International Federation of Airline Pilots Association an organization to take part in the standards, codes and rules regulations and laws pertaining to the implementation of TRAC/FACT System and protocols.

IFATCA International Federation of Air Traffic Controllers O

Associations This organization will also take part in the construction of protocols for TRAC/FACT software action for the robotics flight plan and the surface RC pilots handling the final approach.

IFPS Integrated Initial Flight Plan Processing System This system will be access able in real-time and be part of a software program comparing the flight in progress and trip both surface and air systems upon a deviation as a FACT flagged event.

IFR Instrument Flight Rules

IGES Standardized Graphics Exchange File

IGV Inlet Guide Vane

ILM Independent Landing Monitor Data interfaced as needed to TRAC system

ILS Instrument Landing System. The system provides lateral, along course and vertical guidance to aircraft attempting a landing. Data provided the robotics and remote controlled landing program for FACT.

INA Integrated Modular Avionics How TRAC software will be configured and consolidated.

INC Instrument Meteorological Conditions data supplied as available and needed by FACT flight programming.

IMPATT Impact Avalanche and Transmit Time. This type of Diode, when mounted in an appropriate cavity, produces microwave oscillations and amplification.

IMTEG ICAO ILS/MLS Transition Group Europe to take part in the standards on how TRAC/FACT will be configured and implemented in Europe.

IND Indicator all indicators will be videoed and their electrical signal will be transmitted to the TRAC Processor.

INU Inertial Navigation Unit will provide data to TRAC for FACT programming.

IAS Indicated Airspeed is the speed indicated by a differential pressure airspeed indicator which measures the actual pressure differential in the pilot-static head. It is the actual instrument indication for a given flight condition. This electrical signal will be provided to the TRAC processor. All such reported data during a FACT event is recorded locally and transmitted to the surface for redundant storage and use in RC piloting.

Indicated The altitude above mean sea level (uncorrected for Altitude temperature). Used data as relevant to flight operations in FACT robotics and RC piloting.

INMARSAT International Maritime Satellite Organization to be instrumental in ded dedicated frequencies procedures and protocols in using satellite communications for accurate positioning of aircraft in 3 dimensions and communicating long distant for real-time or near real-time RC or robotics augmentation on board a troubled aircraft.

I/O Input/Output. Refers to bidirectional data ports. As many as necessary to handle the data streams to fly the air craft and communicate with the surface Processors will range to meet application specific needs of the aircraft originally with future configurations more standardized and consolidated, however more redundant and more difficult to defeat system integrity.

INPH Interphone All communications are monitored by the TRAC system and voice recognition command identity capability will exist locally, however the ultimate control over TRAC can rest at the surface via encrypted FACT commands if deemed appropriate and wise.

INS Inertial Navigation System. A self-contained, dead reckoning system that senses the acceleration along the three axes of the aircraft and calculates the distance traveled from a reference point. Accuracy of the system decreases with respect to time. Never the less this systems electronic signals and data will be provided to the TRAC processor running FACT software running an appropriate algorithm for error to use and confirm FACT program choices and to correctly navigate the plane and/or check flight progress on the pre register flight plan.

INST Instrument All essential data provided to TRAC with instrumentation videoed.

Intruder An altitude reporting aircraft that is being considered as a potential threat and that is being processed by the threat detection logic (TCAS). Any TCAS protocols and tracking system as well as scramble fighter response to protect airspace will be incorporated into a troubled FACT event like WoJack protocol, Additionally, the FACT event on the troubled air craft will initiate a TCAS response with special new protocols to include an RC pilot in an assist escort fighter.

IOC Initial Operational Capability first TRAC/FACT systems in 120 days with 100% cooperation of government agencies/military and commercial contractors.

ION Institute of Navigation

IOR Indian Ocean Region

IOT & E Initial Operational Test and Evaluation 90–120 days for TRAC/FACT deployment.

IP Intermediate Pressure

IPB Illustrated Parts Breakdown

IPC (1) Intermediate Pressure Compressor (2) Illustrated Parts Catalog

IPD Industrial Products Division to participate and approve the configurations and help create standards rules code.

IPL Illustrated Parts List

IPT (1) Intermediate Pressure Turbine (2) Integrated Product Team (FAA) for TRAC/FACT system and responsible for setting the progressive steps for specific aircraft as per there application and risk to meet FACT protocols.

IRP Integrated Refuel Panel all flight data provided to the Flight system of TRAC/FACT or any protected sub system performing FACT flying IRS Inertial Reference System data provided TRAC/FACT system as available or needed.

IRU Inertial Reference Unit data provided the FACT program in use and data supplied to surface management systems.

ISA (1) Industry Standard Architecture (2) International Standard Atmosphere the 2 above are a conditions of TRAC/FACT System.

ISDN Integrated Services Digital Network to be interfaced or assimilated/made a part of the PFN/TRAC System and further encrypted as appropriate with FACT software ISDOS Information System Design and Optimization System ISLN Isolation The TRAC processor and FACT program must be isolated from any air born contact.

ISO (1) International Organization for Standardization (2) International Standards Organization these two above are absolutes for TRAC/FACT system as inherent in the architecture of TRAC.

Iso-Contour Refer to contour

ISPA International Symposium on Precision Approach and Instrument Landing in the future to review TRAC/FACT robotics and RC landing with WLS data links are fed to the TRAC system and surface RC station with a count down for touch down estimate verbally for ground response team readiness throughout the base handling a FACT event. For all teams medical/CDC, law enforcement/military readiness-additionally the ILS data is fed to the TRAC processor or Flight controller or adapted autopilot handling robotics flight for glide path or final approach application specific per aircraft equipment.

ISPACG Informal South Pacific ATC Coordinating Group all groups agencies governments and/organizations to participate in the FACT structure and protocol development for their geographic area and any general applications that effect all.

ISSS Initial Sector Suite System. All tracking or position placement systems or data to be feed to the surface system and transmitted to an airborne TRAC system querying accurate location for confirmation is to be available to TRAC/FACT.

ISU Initial Signal Unit All transmitted data to be feed to TRAC/FACT system for robotics flight/glide path and landing, additionally provided surface RC station and ground support team.

ITM Information Technology Management is the ground-based portion of an ADMS (see also EDMS). Immediately used to run FACT programming and protocols.

ITO Indium-Tin Oxide

ITS Integrated Test System internal testing of all systems interfaced to or as a part of a TRAC System processor must run a self-test and component check on boot up and periodically as part of any operational algorithm. As well as be able to determine new interfaces and include reject, record and report their connection, ESN/FACT ID and/or removal locally if appropriate and to the surface ITM, ADMS, EDMS via wireless and IP connections. One important part of being TRUSTED is that the TRAC/FACT system in place at any given time can report to the proper people a system failure, real-time reporting to authorized people and locations in the air and on the surface to be defined by proper standards codes rules regulation and governing agencies.

ITT (1) Interstage Turbine Temperature (2) Inter-Turbine Temperature

ITU International Telecommunications Union an organization to help determine the use of wireless systems by TRAC/FACT and help set up the matrix of communication options for the TRAC/FACT system per geographic area with the appropriate sovereign powers and commercial interests.

IV Isolation Valve This device will be an electrically controlled solenoid valve on hydraulic assist and complete hydraulic systems to lock out local control. Full hydraulic control systems will have their delivery lines primary and redundant from the pilot controls to their actuators blocked or diverted to an absorbs ion bladder or accumulator cushioned with nitrogen to control pressure. This diversion must take place in an unobtainable area in the aircraft during flight and the access and service must require FACT system avionics/hydraulics certification on the ground.

ITWS Integrated Terminal Weather System FACT RC Station connected and data transmitted to TRAC processor or adaptive autopilot for automated landing to receive crosswind surface data, Doppler radar/down bursts etc.

J

JAA European Joint Airworthiness Authority to approve and help create the appropriate TRAC/FACT operation and use for European airspace and the sovereign powers and publics affected.

JAL Japan Air Lines All airlines will work with their host country's government and any foreign government they fly into to provide the correct TRAC FACT programming as per confirmed air space they are in. TRAC processors through various communication systems and locating technologies will activate the appropriate program codes and international flight and coordination must be determined via the proper named organizations and government agencies-working together for the safest most optimum public safety and security for all in the air and on the surface.

JAR Joint Airworthiness Requirement TRAC/FACT self test and FACT inspections should be a FAA/homeland security regulation and part of any airworthiness requirement to fly air aircraft per airspace. Certification transmitted or IP connected prior entering new airspace another r requirement with all sovereign air space approval and ultimate control.

JAR-AWO Joint Airworthiness Requirements—All Weather

Operations TRAC/FACT approved and part of, as well as interfaced with, all necessary equipment in an air worthy and protected state to perform robotics flight and RC flights.

JFET Junction Field Effect Transistor, any electronics components can be used either directly or as part of a subsystem in the construct of a TRAC system and/or FACT protocol.

JPO Joint Program Office all agencies and any essential flight or air travel organizational offices will be linked DET/FACT software and other unsecured IP links will be provided generic messages from the fact system to be determined as appropriate for the circumstance to provide information in a less secure environment to the public during a FACT event.

J/S Jammer to Signal Ratio

JTAG Joint Test Action Group

JTIDS Joint Tactical Information Distribution System To be connected with by and for FACT protocols.

K

KAL Korean Air Lines All airline will work with their host country's government and any foreign government they fly into to provide the correct TRAC FACT programming as per confirmed air space they are in. TRAC processors through various communication systems and locating technologies will activate the appropriate program codes and international flight and coordination must be determined via the proper named organizations and government agencies— working together for the safest most optimum public safety and security for all in the air and on the surface.

Key A hand-operated switching device or the act of operating such a device. A special key stroke for FACT communications that are dated and coded to communicate with FACT/Homeland security to alert of FACT event and transmit essential data to be set up and determined and to determine who should know such communication Links— key pads on handheld flight communicators or personal PFNS as well as DETs on the flight stations and instrument panels.

KGLS Kinematic GPS Landing System used for the FACT/RC robotics landing

KHz Kilohertz (1000 cycles per second)

kb/s Kilobits Per Second The fastest communications and processing is to apply to the necessary Real-time flight and landing controls with all other data transmitted in near real-time always with the most critical FACT data being handled with the highest priority.

KBU Keyboard Unit on all FACT/DETs throughout the system onboard the aircraft and in the ground support system.

KPS Kilobytes Per Second, Real-time Flight controls to have the highest data rates.

kts Knots. Landing knots due to inertia/size of the aircraft is a FAA classification system and such classification system will be used to apply FACT deployment through out the aircraft industry in this paper a chart is presented of the aircraft classifications here.

The FAA provides the following categorizations of aircraft.

Categorization by Stall Speed (which determines the basis of landing or approach speed):

TABLE 1

Aircraft Approach Category

| Aircraft Category | 1.3 Times the Stall Speed in Knots | Maximum Speed (Circling Approaches) | Typical Aircraft in This Category |
|---|---|---|---|
| A | less than 91 knots | 90 knots | small single engine |
| B | 91 to 120 knots | 120 knots | small multi engine |
| C | 121 to 140 knots | 140 knots | airline jet |
| D | 141 to 165 knots | 164 knots | large jet/military jet |
| E | above 166 knots |  | special military |

(source: FAA, 1976, United States standards for Terminal Instrument.

Additionally knots kts or aircraft speed will be provided via an electrical signal to the TRAC processor performing FACT robotics and RC flights and landing.

In the Chart above Categories C&D are focused on for the most rapid deployment of FACT due to the high fuel and inertia destructive value of these aircraft to surface targets when used by hostile forces or terrorists. Basically, this patent allows for the DOD & military to use FACT and apply it with DES/DET as they see best and therefore security applications are left unstated. These systems are of the highest security and their exact implementation will not be detailed here in this international forum. However, this inventor is willing to help the United States of America expand on this technology in anyway possible or needed at anytime to increase public safety, national security and preserve freedom and democracy.

kVA Kilovolt-ampere

L

L Left

L1 Frequency on which GPS SPS signals are transmitted, will be incorporated into the TRAC/FACT system.

L-Band carrier (1575.42 Mhz) Monitored and interfaced with the TRACT communication router.

L1011 Lockheed Model 1011 Aircraft First generation TRAC/FACT ready in 90 days—this is a C-D category aircraft.

L2 L-Band carrier (1227.6 MHz) interfaced with the TRAC scan and router section ASAP otherwise TRANS-CEIVER a sub system or SUC to current to TRAC/FACT management.

LAAS Local Area Augmentation System

LAC Lineas Aereas Del Caribe (an airline) All airlines will work with their host country's government and any foreign government they fly into to provide the correct TRAC FACT programming as per confirmed air space they are in. TRAC processors through various communication systems and locating technologies will activate the appropriate program codes and international flight and coordination must be determined via the proper named organizations and government agencies working together for the safest most optimum public safety and security for all in the air and on the surface.

LADGPS Local Area Differential GPS All of the most accurate systems for GPS will be interfaced with the air and surface system under TRAC/FACT control to safely determine FACT events and perform robotics and RC flights and landings.

LAN Local Area Network all such net works are to be interfaced as needed and SUC or protected sub systems to TRAC system and/or FACT protocols which ever is present in any given system LAT Latitude a coordinate important to determining flight deviation and in flying and landing FACT controlled flights.

L-Band A radio frequency band from 390 to 1550 MHz. Interfaced and used to perform FACT programming and monitored by TRAC RF routing and scanning.

LCC Leadless Chip Carrier as a hardware socket employed as needed, additionally any RF device is SUC to TRAC/FACT management and control and interfaced with the system- and if any chip mount can be used to precipitate TRAC/FACT interfacing with the least of connectable effort any ware in the Aircraft to the control buss and be done in a secure solo manner wired or wireless it is to be used as much as necessary.

LCD Liquid Crystal Display on all components integrated with the TRAC/FACT system with the displays covered to anyone other than FACT cleared Technical teams.

LCP Lighting Control Panel TRAC can control all illumination in the aircraft for FACT protocols to limit local control capability to prevent unauthorized or unsafe use of an aircraft so compromised. The FACT robotics and RC via TRAC can use infrared cameras and heat sensing system during such an event to determine the proper illumination for an event.

LCSTB Low Cost Simulation Test bed all test means to insure the highest safety in TRAC/FACT design construction deployment and use are to be employed in the most efficient manner with respect to the need for TRAC/FACT per aircraft and support system.

LD Lower Data less important data will run at slower computing speeds and communication protocols, however in a FACT event all data can be important and local and surface software programs will evaluate data importance sensed on board. Human controls on the surface can prioritize this process (protocols to be determined).

LDCC Leaded Chip Carrier All systems

LDGPS Local Area Differential Global Positioning Satellite used to determine FACT event and to fly the FACT flight plans and Landings.

LDU Lamp Driver Unit

LED Light Emitting Diode used as needed for TRAC error recognition and general illumination in authorized servicing—work or utility lighting used to recognize personnel determine their actions and to alert others to unauthorized work as well as distract or hinder unauthorized tampering by flashing/blinding or abstinence.

Leg The section of the flight between two waypoints. To be TRAC/FACT monitored for flight plan deviations also the area of a FACT flight over the least populated or sensitive Surface areas for FACT flights to SB waypoint air space.

LF Low Frequency. The frequency range from 30 to 300 kHz. All communication L frequencies to be set up for TRAC/FACT DATA communication links and SCAN routing—actual frequency use to be determined by RF component engineers and government agencies as per physics characteristics and desired use.

LGA Low Gain Antenna all necessary antennas protected secluded FACT inspected and TRAC/FACT tested on boot up and periodic auto testing as part of TRUSTED system protocol.

LH Lufthansa

LHP Lightning HIRF Protection TRAC/FACT components protected for lightning strikes and static and ground spiking to disable the system.

LIB Left Inboard

LISN Line Impedance Stabilization Network SUC for TRAC

LLP Left Lower Plug. Identifies the plug on the rear connector of an avionics unit. All connections including LLPs are to take place in physically protected cans as well as have protected leads with one-way power service regulated to restrict tampering and protect against current overload.

LLWAS Low-Level Wind Shear Alert System This data provided to the RAC flight station and the TRAC processor or Adaptive autopilot for robotics flight adjustment and landing.

L/M List of Materials

LMM Locator Middle Marker. An NDB that is co-located at the same site as the 75 MHz middle marker beacon.

LMP Left Middle Plug. Identifies the plug on the rear connector of an avionics unit. All connectors and leads for essential energy or communication Links are to be shielded or protected.

LMT Local Mean Time

LNA Low Noise Amplifier

LNAV Lateral Navigation is programmed in the flight plans for fact and processed through the TRAC processor or the Adaptive auto pilot/flight computer. Actual lateral position monitored throughout he various onboard position-sensing systems.

LOB Left Outboard

LOC Localizer. The lateral guidance portion of an ILS system. Incorporated into TRAC/FACT programmed and RC flights and landings.

Lock-On The condition that exists when the DME receives reply pulses to at least 50 percent of the interrogations. Valid distance information is then available. A technology used to determine plane position and used in the automated flying of the TRAC/FACT programs.

LOM Locator Outer Marker. An NDB that is co-located at the same site as the 75 MHz outer marker beacon. All markers used to line up aircraft for landing will be used in the FACT final approaches for robotics and RC coordinated landings.

LON Longitude

LORAN Long Range Navigation. A system using a ground facility composed of a master station and a subservient station. The airborne receiver computes the position of the aircraft by using two or more received dominant-subservient.

pairs of signals. LORAN-A operates at 1850, 1900 and 1950 kHz. LORAN-C operates at 100 kHz. LORAN A was replaced by LORAN C in 1980.

LORAN C Long Range Navigation System The loran system along with GPS will be used in together for FACT to determine a deviation and for FACT flying.

LOS Line Of Sight as part of the RC station one RC pilot will maintain line of sight while another maintains an instrument approach as part of the surface team landing a FACT flight. Additionally, RC pilots in assist escort craft will maintain LOS with the FACT flight for as long as possible. Ultimately, the FACT flight can be safely landed robotically, remotely controlled with 3 skilled pilots as a coordinated team—protocols to be determined and developed.

LPC Low Pressure Compressor

LPT Low Pressure Turbine

LRA (See RALT)

LRM Line Replaceable Module ultimately PFN/TRAC units will be constructed as LRMs or LRUs and be placed in several areas along the control bus.

LRRA (See RALT)

LRU Line Replaceable Unit ultimately PFN/TRAC units will be constructed as LRMs or LRUs and be placed in several areas along the control bus.

LSB (1) Lower Sideband. The lower sideband is the difference in frequency between the AM carrier signal and the modulation signal. All RF Communication On the aircraft will be routed through PFN/TRAC system for total Communication access.

(2) Least Significant Bit

LSD Least Significant Digit

LSI Large Scale Integration PFN/TRAC and FACT programming is LSI and will be in the form of an ASIC as time passes.

LSK Line Select Key

LTP Left Top Plug. Identifies the plug on the rear connector of an avionics unit. All connectors and essential leads are protected, for SUC or sub systems for TRAC System and FACT.

Lubber Line A fixed line placed on an indicator to indicate the front-to-rear axis of the aircraft. Data electronic signal provided FACT flight programs running in sub systems or in TRAC/FACT system.

LV Lower Sideband Voice recorded and controlled by TRACor FACT programming for FACT event.

LVDT Linear Voltage Differential Transducer (used with aircraft control surface servos) monitored by TRAC/FACT and emergency power provided by protected PFN/TRAC System.

LVLCH Level Change monitored and Managed by TRAC/FACT programs as appropriate.

LVPS Low Voltage Power Supply avail able to TRAC operations and also inherent in TRAC Systems.

M m Meter m/s Meter per Second All measurements that equate to movement of the aircraft will be transduced into an electrical signal and provided TRAC processor or the FACT sub system to be used in the determination of a FACT event and how to fly and land the aircraft via robotics and RC controls.

MAC Medium Access Controller all essential controllers will be incorporated for the FACT protocols as subsystems or SUC to TRAC and especially a good access point that must be protected with restricted access or any translation processor that will allow for a higher application software to control the system.

Mach Number Mach number is the ratio of the true airspeed to the speed of sound at a particular flight condition. It is the chief criterion of airflow pattern and is usually represented by the free-stream steady-state value.

Mag Magnetic

Magnetic The bearing with respect to magnetic north.

Bearing

Magnetic North The direction north as determined by the earth's magnetic field. The reference direction for measurement of magnetic directions. The four above terms and definitions involving the heading of the aircraft using the traditional compass will be provided as an electrical signal indicative of the instrumentation to the FACT algorithm to equate the true aircraft direction and heading the pilot is reading on the instruments. This will be determined by satellite and GPS, Lorands other RF and locating devices on board and dead reckoning to determine true intent of aircraft and controlling operators and to assist the local real-time operators in maintaining the correct course for the real-time circumstance and providing the proper air and surface support for the troubled air craft to in sure better public safety in the air and on the surface.

MAMS Military Airspace Management System will be connected directly in a FACT event. And military bases will be chosen and outfitted for FACT operations (to be determined as a National air guard/coast guard response or regular military or all three of the above with local law enforcement and emergency response air support assisting immediately until relieved all coordinated by local FAA/FACT air space controllers handling a FACT event.

MAR Managed Arrival Reservoir

Marker Beacon A transmitter operating at 75 MHz that provides identification of a particular position along an airway or on the approach to an instrument runway. The marker beacon is continuously tone-modulated by a 400-Hz, a 1300-Hz or a 3000-Hz tone. Marker beacons along an instrument runway provide along-course (range) guidance and designate when an aircraft should be at a certain altitude if the aircraft is following the glide path. An audio algorithm will transduce this signal or a digital or electrical analog signal with identifiable characteristics will be transmitted to the troubled aircraft overhead at the appropriate position for the Flight glide path algorithm to adjust the aircraft control surfaces (Flaps etc.) to obtain the proper altitude and later al position for the airport approach and landing. This data is also provided the RC stations in the chase aircraft and in the surface support. The system used to deliver this important data should be universalized or multiple technologies have to be available on the ground on these safe bases. Additionally these beacons have to have the highest of surface protection with a vigilant monitor on any near Safe Base wireless communications that could be misinterpreted as a marker signal SB signal should have an encrypted code recognized by on board TRAC/FACT programming.

MASPS Minimum Aviation System Performance Standards any FACT configuration that is to be used by aircraft flying must meet this standard and that will probably require a special customized inspection by the most skilled in aviation/avionics to determine flight readiness. These first generation systems will not be easy, simple or perfect, but they each have to improve air security and public safety as much as possible in each step and continue to improve until an entire safe PFN/TRAC System unit is obtained in every aircraft.

MAT Maintenance Access Terminal have to have FACT approved technicians and security surveillance over work performed with workers wearing PFN/TRAC units with audio and video record/report capability in real-time. Infrared/heat and human imaging sensing and system software algorithms with ESN quarries of these personal PFNS are to identify personnel with Identity check points Sync/timed PIN codes, Iris reading finger print non invasive DNA, face print recognition, voice recognition and finger print thaws on the PFN identity belt that the worker is wearing is needed. (Proper security is available at the installation and is rotated. Each PFN/TRAC/FACT component with it's anti-tamper sensing and electronic seals can communicate with security at any MAT and all other FAA security checks and inspections are observed.

MAWP Missed Approached Waypoint this signal is provided air born TRAC/FACT program and the RC pilot for any effort to land the aircraft or retry or deal with the situation as best as possible.

MB Marker Beacon all signals provided electronically to the FACT program and the RC surface support.

MBE Multiple Bit Error Algorithm in FACT programming will always be running parallel queries of multiple redundant systems to determine the most accurate data to use. Additionally, the surface flight crew is monitoring all the same data and communicating with the chase RC pilot at the long distance and the surface RC pilot for close in landing.

MC Master Change any change in avionics to FACT performance must be approved recorded/logged in with all persons involved S/N etc. and inspected for proper working order by FACT inspectors prior to any flight an FAA structured security.

MCB Microwave Circuit Board all radar or FACT operated systems have to be serviced by FACT cleared security and calibration and performance of these subsystem components have to be checked for proper FACT working order.

MCC Maintenance Control Computer has a special encrypted area for FACT service.

MCDP Maintenance Control Display Panel video and electronic signals generated are recorded and reported as determined to be a flag for a FACT System security Flag.

MCDU Multifunctional Control Display Unit videoed and signals recorded/reported as needed.

MCN Manufacturing Control Number registered in every PFN/TRAC unit and component memory on board and traceable in the system or any other system components are interfaced with or exchanged. FACT registration protocol for S/N ESN and OEM product and component numbers or ID/lot Nos.

MCP (1) Maintenance Control Panel FACT protocols to be determined and FACT qualified person monitoring the panel.

(2) Mode Control Panel

MCT Max Continuous Thrust

MCU (1) Modular Concept Unit (approximately ⅛-ATR, Airline Transport Rack)

(2) Multifunction Concept Unit

MD11 Boeing Model 11 Aircraft (formerly McDonnell Douglas)

MD90 Boeing Model 90 Aircraft (formerly McDonnell Douglas) The above 2 aircraft to be FACT fitted with first the first generation with in 90 days.

MDA Minimum Descent Altitude As a general rule the Descent in any FACT landing will take place at minimum levels needed for a gradual long slow glide path.

MDC Maintenance Diagnostic Computer will record and report all alerts and conditional data to the TRAC/FACT system if on board the Aircraft and to the surface. If part of a surface maintenance check the system will report all data to the TRAC/FACT system for on board records and the surface FACT mass data Base for future reference attention and clearance as determined necessary and prudent.

MDCRS Meteorological Data collection and Reporting System on the surface will provide all flight stations air born and on the surface with weather conditions applicable to flight and landing. Additionally this information is provided to medical or HAZMAT teams and law enforcement to ready response for the incoming troubled aircraft application specific to the public safety response and current weather conditions that can aggravate the situation.

MDS Minimum Discernible Signal. The MDS is the lowest RF signal level that can be detected as a valid signal. Has to be absolutely identified for the most radical of commands to be carried out in FACT programming. A protocol of equations for public safety and national security are to be developed in the event all communications are disabled. For this reason the TRAC scan and blue tooth wireless communication link with all forms of wireless communication is stressed for TRAC/FACT System to access NENA numbers and FACT/homeland FAA master control to communicate the appropriate codes to the central control station to intercede FACT termination programs or other radical defense programming.

MDT Maintenance Display Terminal videoed and recorded reviewed prior to final flight clearance.

MEA Minimum En route Altitude There is to be a high MEA for all FACT Safe Base flights as general programming.

MEC Main Equipment Center

MEDLL Multi-ath Estimating Delay Lock Loop any automated flight programming is to be interfaced directly with FACT programming and may be interrupted or secured and used as part of the TRAC/FACT system—1st generation.

MEL Minimum Equipment List. The list of equipment that the FCC requires to be aboard an aircraft before flying. The automated TRAC Communication scanner and router with wireless communication link DSRC should become a FCC/FAA/homeland security necessity for all aircraft as soon as possible to increase communication links with emergency inessaging protocols to be developed for FACT in 90 days.

MES Main Engine Start this electrical signal should run a FACT system check for immediate shutdown for an non-cleared TRAC/FACT system with an alert sent to control tower, company monitoring system and surface security with aircraft location ESN and audio and video on in the aircraft—engine should have FACT sensor and lead or wireless protected to TRAC/FACT System monitoring.

MF Medium Frequency. The portion of the radio spectrum from 300 kHz to 3 MHz. All communication links scanned by TRAC/FACT and used as determined appropriate.

MFCP Multifunction Control Display Panel videoed and recorded and reported as appropriate for function related to TRAC/FACT protocols.

MFD Multifunction Display Same as above with electrical signal monitored.

MFDS Multifunction Display System Same as above with electrical signal monitored MDFU Multifunction Display Unit Same as above with electrical signal monitored.

MFM Maintenance Fault Memory made part of TRAC/FACT system and dealt with accordingly.

MGSCU Main Gear Steering Control Unit SUC with any servo motor control to TRAC or FACT management for the surface collision avoidance or TRAC/FACT robotics or RC surface taxing.

MHD Magnetic Hard Drive used in TRAC and fully protected in any avionics as a FACT protocol.

MHz Megahertz (1,000,000 cycles per second)

MIC Microphone. Also refers to the output signal of the Microphone. To be recorded and used with voice recognition technology in TRAC/FACT systems. Reported to the surface during FACT event. For entire flight after event flagged.

Micro-EARTS Microprocessor En route Automated Radar Tracking employed in FACT determining software and to fly to safe Bases.

MIDU Multi-purpose Interactive Display Unit video captured with electronic signal recorded and reported for TRAC/FACT System.

MIL Military used for a fact event as determined appropriate by FAA/DOT/DOD/homeland security.

MIPS Million Instructions Per Second Data delivered to Fact for the surface

MLS Microwave Landing System employed by TRA/FACT automated flights and landings.

MLW Maximum Landing Weight—always the question to dump fuel and cargo will be part of FACT scenario with special restricted area provided with automated signals and automated dumping actuators on tanks and storage areas that release transponders to mark the debris dropped for immediate hazmat procedures.

MM Mass Memory a PFN/TRAC/system intra net for aviation FACT mass database

MMI Man-Machine Interface TRAC/FACT enhanced with accountable shared controls of aircraft.

MMIC Monolithic Microwave Integrated Circuit all Tracking and positioning technology for aircraft to be protected and controlled according to FACT protocols.

Mmo The maximum Mach number at which an aircraft has been certified to operate. Incorporated in the FACT programmed flights MMR Multi-Mode Receiver incorporated in to TRAC/FACT scanning functions and used as part of any application specific communication link for any applicable aircraft.

MNPS Minimum Navigation Performance Specification There will be a TRAC/FACT MNPS for every progressive step of the technology to be cleared to fly as time goes on and the system becomes more sophisticated and unified.

MNT Mach Number Technique

MO Magneto-Optical-FAA to determine inspection for FACT readiness and performance.

MOA Military Operation Area the safe bases will have a great military presence and the bases will have the highest security-whether it is all military DES/DET and physically protected is to be determined by homeland security DOD, DOT, FAA and any level of threat.

MOCA Minimum Obstacle Clearance Altitude will be on the floor for a good deal of the area up to the landing strip of a SB. As time goes on other airports may be rated to handle certain FACT protocols and have special area teams with law enforcement, hazmat and medical teams available and the MOCA in those programs might be more sensitive to elevation requirements in glide paths and final approaches.

MOD (1) Modulator with encoding and encryption for FACT (2) Modification is a continual state with TRAC/FACT system deployment.

(3) Magneto-Optical Drive

Mode A The pulse format for an identification code interrogation of an ATCRBS transponder.

Mode B An optional mode for transponder interrogation.

Mode C The pulse format for an altitude information interrogation of an ATCRBS transponder.

Mode D An unassigned, optional transponder mode.

Mode S (1) Mode Select (A transponder format to allow discrete interrogation and data link capability).

(2) Selective interrogation mode of SSR-FACT communication to utilize and recognize all pulse codes for each mode with programming written. Additionally the FACT protocol will supply headers of equipment interfaced and inventoried to provide the most update list of equipment as part of any compromised flight either via the aircraft trans ponder or the communication link to 2 way transponders or transceivers to store in local data repositories or buffers on the flight path or a FACT flight.

MODEM Modulator/Demodulator able to handle FACT encryption and SUC to TRAC/FACT

MOPR Minimum Operational Performance Requirements

MOPS Minimum Operational Performance Standards the above two to be determined for any given TRAC/FACT systems.

MORA Minimum Off-Route Altitude set by research for public safety routes and programmed in the FACT plight processors either TRAC or adaptive autopilot or Flight computer systems that are protected.

MOS Metal Oxide Semiconductor

MOSFET Metal Oxide Semiconductor Field Effect Transmitter

MOU Memorandum Of Understanding

MP (1) Middle Plug. Identifies the plug position on the rear connector of an avionics unit. To be protected as well as the lead for any avionics system crucial to the FACT performance.

(2) Main Processor

MPEL Maximum Permissible Exposure Level MPEL for toxins bacteria or decease and radiation will be determined sensed by on board systems and programmed and given protocols for the SB FACT flights and landings, and MPEL rating will be determined for each approved TRAC/FACT System approved for operation on any aircraft.

MROSE Multiple-tasking Real-time Operating System Executive

MRR Manufacturing Revision Request continually put out on all aircraft for an avionics update with TRAC/FACT protocols.

MS Millisecond

MSB Most Significant Bit

MSCP Mobile Satellite Service Provider will be communication linked to the FAA/FACT intranet with emergency translation messaging at the highest application level for wireless and GPS communication and TRAC\king.

MSD (1) Most Significant Digit

Suggested FACT mass data controls (2) Mass Storage Device is set up as part of all governing agencies with a sharing of the data. These agencies will have their own access codes and FACT security and read only access as a rule—all access is recorded and placed in the header of the file that is the same across all agencies. The highest level of security can maintain the file for special eyes. Agencies with linked MSD for FACT in transportation DOD/DOT/Homeland Security/FAA/FBI/CIA/NSC. FAA will have buffers a cross the nation that will have wireless gateways and land line connections to receive real time Data from aircraft and enter that data into the system. Additional gateways and buffers will be there for surface transportation and this intranet is linked at the highest level for all the agencies to monitor at the highest FACT level for public safety and national security. FACT is a fully accountable access technology that carries the strictest penalties for unprofessional or corrupted use of the system and technologies no matter who the perpetrator. FACT codes allow for the immediate access to any computer storage system and accompany a review process with all involved parties and their legal representatives in a proper agreed upon forum. Protocols and use must be constitutionally based to provide and preserve freedom and respect for individual privacy, but provide latitude in use for public safety and national security protection. The system will not be used or compromised for misdemeanor or simple crime prosecution and FACT trained professionals do all data released and destroyed. With out proper certification encrypted on the file it is the highest security breech and subject to high fines and imprisonment. Every citizen has a right to request if information is held on them and to view that data via a proper ID protocol and under the correct circumstances. All access to their file has to be decoded for there viewing and they have the right to request information on any data, collection process and use. The citizen can also request the file be destroyed and it is to be reviewed by FACT for this purpose. No file should be maintained for photo ID or any ID technology data DNA fingerprint for any regular citizen with no significant criminal past (violent). Non-citizens are to be followed through out the computer matrix as necessary by the sovereign powers. However the proper respect for each individual maintained. Obviously, these are suggestions in setting up the proper protocols for the use of FACT in the PFN/TRAC System. The inventor would like to say that it is the Freedom of the United States we want to protect for each individual citizen. This can only come from the greatest respect for every individual and their private life. Personal activities should always be monitored for a need to know basis only in public safety and national security and not be used or applied as a policing tool. In many cases the monitoring and use should be automated with the 3 laws of robotics applied. The use and access of all FACT access data should be quarried for personal ID, application and pertain to FACT protocols on a need to know basis. Otherwise all mass data should be FACT accessible for real-time use accompanied by a review of procedure for a FACT event with enough FACT officials available for case loads and review of use procedures. Additionally personal data used in any mass data system including credit and commercial streams should have to be approved by the individual. Intrusions of privacy of this commercial practice should also be stopped and have strict civil penalties—some automatic and others applied through tort laws. This is necessary for the citizen to trust FACT and mass data storage of a personal nature. This kind of data must receive the greatest protection and have the highest respect. All such data bases should have FACT access and run in a FACT approved mode—with a special FACT review of such data bases for the citizen with the ability to have data sponged from these data bases and prosecute those systems that continue to violate privacy laws.

MSG Message

MSI Medium Scale Integration The PFN/TRAC System progressive integration will encompass all subsystems and interface ultimately as LSI MSL Mean Sea Level MSP Mode S Specific Protocol to be developed and programmed for FACT MSSS Mode S Specific Services TRAC/FACT MSU Mode Select Unit MT Minimum Time MTBF Mean Time Between Failures. A performance figure calculated by dividing the total unit flying hours (airborne) accrued in a period of time by the number of unit failures that occurred during the same time. Where total unit hours are available, this may be used in lieu of total unit flying hours. A FACT file with MTBF data specific to equipment on board will be maintained with also a scheduled service file and response.

MTBR (1) Mean Time Between Removal (2) Mean Time Between Repairs. A performance figure calculated by dividing the total unit flying hours accrued in a period by the number of unit removals (scheduled plus unscheduled) that occurred during the same period. Same TRAC/FACT procedure as above.

MTBUR (1) Mean Time Between Unscheduled Removal (2) Mean Time Between Unit Replacements. A performance figure calculated by dividing the total unit flying hours (airborne) accrued in a period by the number of unscheduled unit removals that occurred during the same period. Same TRAC FACT components as above.

MTC Maintenance Terminal Cabinet

MTD Maintenance Terminal Display

MTF Maintenance Terminal Function The 3 above will have TRAC/FACT protocols to be followed as to the protection and service of all essential connectables and testing for FACT components.

MTI Moving Target Indicator. This type of radar display will show only moving targets. This system's data will be used in robotics flying and RC landing.

MTM Module Test and Maintenance for all TRAC/FACT hard ware & software there will be certified FACT inspectors and technicians to test any essential modules.

MTMIU Module Test and Maintenance Bus Interface Unit will be afforded guarded access and be used as a possible PFN/TRAC processor connecting point to access the control bus for vital FACT operations in first generations to retrofit legacy aircraft. If this proves doable this connection will be protected and require FACT certification to enter the area and perform testing or FACT augmentations.

MTTDA Mean Time To Dispatch Alert

MTTF Mean Time To Failure. A performance figure calculated by dividing the summation of times to failure for a sample of failed items by the number of failed items in the sample. The same item failing N times constitutes N failed items in the sample. This is different from mean time between failures since no allowance is given to items that have not failed.

MTTM Mean Time To Maintenance. The arithmetic mean of the time intervals between maintenance actions.

MTTMA Mean Time To Maintenance Alert

MTTR Mean Time To Repair. A performance figure calculated by dividing the sum of the active repair elapsed times accrued in a period on a number of designated items by the number of these items repaired in the same period.

MTTUR Mean Time To Unscheduled Removal. A performance figure calculated by dividing the summation of times to unscheduled removal for a sample of removed items by the number of removed items in the sample. This is different from MTBUR since no allowance is given to items that have not been removed. For the above 6 mean measurements—the TRAC/FACT protocol will establish a minimum time for these timed maintenance procedures to insure adequate service and optimum reliability. During all these maintenance procedures the strictest security with certified TRAC/FACT personnel is a standard requirement and the specifics will be determined in standards efforts and FAA/homeland security regulations. This may be flexible as intelligence determines threat to a free society regardless of cost.

MU ACARS Management Unit integrated SUC to TRAC and part of FACT

MULT Multiplier

MUS Minimum Use Specification. A generic description by parameter and characteristics of the test equipment and resources required for testing a unit or system. A protocol developed for FACT interfaced components and self tested during boot up and periodic auto tests to be a trusted system by recognizing failure a TRAC characteristic.

MUX Multiplexer FACT utilized in subsystems SUC and a crucial function in the TRAC ASCIC.

N

N1 Fan speed

N2 Intermediate compressor speed

N3 High speed compressor the 3 above monitored as needed by TRAC/FACT and SUCs.

NACA National Air Carriers Association to take part in TRAC/FACT standards rules regulations discussions but not to control policy procedures protocols or requirements—homeland security to make all final decisions via it's interagency matrix. (To restrict lobbing ( )—additionally government to aid in costly security conversions with a special committee to oversee cost and network technologies to reduce duplication and to much specificity—stop creating disparate systems—more universal application with less proprietary and better security.

NADIN National Airspace Data Interchange Network

NAS National Airspace System

NASA National Aeronautics and Space Administration

The 3 terms above—to be interfaced with home land security and the FAA direct FACT control flights with FACT security.

NASPALS NAS Precision Approach and Landing System interfaced with the FACT/TRAC system for the FACT landings.

NAS/TRB National Academy of Science, Transportation Research.

Board to provide development of the different PFN/TRAC System components and FACT protocols.

NAT North Atlantic Region

NAT SPG North Atlantic Systems Planning Group this group will help determine the regional application of FACT and determine the areas for SBs and safe En route flight plans to the safe zones.

NATCA National Association of Air Traffic Controllers will be helping to develop proper handling procedures for FACT flights and be an essential part of FACT implementation at the SBs.

NATRSSIG ICAO North Atlantic Reduced Separation Standard.

Implementation Group involved in approving TRAC/FACT implementation.

NATS (1) North Atlantic Track System involved in approving TRAC/FACT implementation.

(2) UK National Air Traffic Services involved in approving and developing TRAC/FACT implementation.

NAV Navigation

NAVAID Navigational Aid all onboard NAV aids will be quarried to report to the FACT program and the RC stations to be checked for FACT robotics and RC.

Navigation A medium holding the customized navigation.

Datacard database. This technology will be used as well as ASIC SOC and hybrid substrates as application specific to each aircraft.

NAVSTAR The NAVSTAR global positioning system (GPS) is a system using 24 satellites, all reporting precise time signals, along with location keys. Eight satellites are in each of three 63-degree inclined plane circular orbits at 1,000 nmi in altitude. The system is used for navigation and determining exact position. All navigation systems will be used and most especially NAVSTAR for FACT robotics and RC.

Nautical Mile Equivalent to 6,076.1 feet, or approximately 1.15(nmi) statute miles.

NBAA National Business Aircraft Association will have to have the fleet of business aircraft better protected as relevant to their threat. And the FAA and homeland security has to set up proper schedule for these various aircraft to be fully FACT ready and protected.

NC Numerical Control Flights and landing s at the Safe Bases will be handled by priority of emergency to the greatest public safety hazard presented. One person should function as a real-time NCA over these decisions in the governing agency or intranet for FAA/homeland security over air travel. There needs to be a study to determine all imaginable emergency flight scenarios and still the designated NCA at any given time will have to make the case of priority for each troubled flight. With time permitting the President of the US should be the final NCA for any decision to terminate a flight. However, there has to be a response decision tree for situations not allowing the time for any such decision. It is important to remember that TRAC/FACT protocols will make it next to impossible for a Hijacking there always is the possibility any security can be defeated if there is a will to do so. For this reason there will always be the need to handle the worst of decisions a caring humanity has to make to preservers the greatest number at risk at a given time of emergency. For this reason the decisions should be understood prior to any possible need for them.

N/C New installation Concept All tools to virtually experience TRAC/FACT system performance or FACT protocol Scenarios should be utilized in development and for the projected combination of present separate and disparate systems to construct the diverse levels of FACT development across the spectrum of Air craft prior to the actual construction or installation. There are design tools that can be used to calculate the assets and difficulties of many hardware combinations to determine how best to interface them for automated flight and landing.

NCA National Command Authority Set up with specific WoJack rules as to the Threat of life for the passengers and crew, and the threat to people on the surface. Every possible scenario should be considered with safe time decision markers put in place. A protocol has to be developed and practiced to insure the best decision is made and carried out in the proper time frames with the proper prudence and lack of hesitation to insure the greatest public safety under such extreme circumstances. The NCA should be an FAA or air command specialist 24/7. A team of such NCA executives at each SB and for all the En route WoJack or FACT event flights in constant monitoring and flight management. TRAC with FACT protocols is designed to give the NCA executive officer all the possibilities imaginable on any given aircraft to foil a FACT event and land the aircraft at a Safe Base for maximum public safety on board the aircraft and on the surface. As stated earlier and time permitting any doomed flight or one that must be terminated the president of the US in the US should become the acting NCA and additionally explain the NCA's decision to the nation if any such action must be taken along this command chain. However, as stated above, there has to be a response decision tree for situations not allowing the time for any such president involvement. It is important to remember that even though TRAC/FACT protocols will make it next to impossible for a Hijacking there always is the possibility any security can be defeated—if there is a will to do so. For this reason there will always be the need to handle the worst of decisions a caring humanity has to make to preserve the greatest number at risk at a given time. In this case the decisions should be understood prior to any possible need for them and the procedures well understood by those that might have to perform them. Of course, the NCA is an integrated part of the PFN/TRAC System FACT/WoJack protocols for air travel/transport intranet management.

NCD No Computed Data TRAC scanning function during no event has a NCA command function to allow the energizing of any phone via wireless interface to quarry passengers and crew on board GPS or locating systems if a FACT event is a real concern and there is no NCD to confirm an ongoing FACT event. All such connections are recorded and require accountable reports for their use and action.

NCR National Cash Register TRAC systems in surface transportation run wireless payment industry encrypted software and the aircraft PFN will have this capability as well with card swipe systems to handle regular cards and smart cards as well as other forms and mediums of credit payment personal ID/iris or DNA.

NCS Network Coordination Station PFN/TRAC/FACT System is the primary NCS while any FACT event aircraft is passing through or near any regular flight patterns until the aircraft is with Safe escort and in safe En route flight plan to SB. This is coordinated handoff with standard FAA flight controls. However immediately the troubled flight is given a RC and escort flight crew to in clued a surface NCA commander flight assist RC pilot with flight termination capability by either of the escort aircraft a safe base surface crew with RC flight crew for landing and the appropriate force assembling to handle the specific emergency. At the point of hand off the FAA flights are monitored by all SBs and there is an NCA overseeing all commercial and private aircraft activity in US air space the Military are put on alert and intercept and assist pilots are pre scrambled to aircraft on the tarmac. A FAA/DOD/homeland security NCA makes the call to ground all aircraft or pursue any FACT events due to flight deviation or sensed problems.

ND Navigation Display. An EFIS presentation substituting for the horizontal situation indicator (HSI). These instruments will be videoed and any electrical signal they generate will be used for to assist in or confirm robotics flight and landings. There use for such functions depend on how accurate there data and how protected they can be made for uninterrupted service during a FACT event.

NDB (1) Non-Directional Radio Beacon. A ground station designed specifically for ADF use that operates in the 190-to-550-kHz range. Transmits a continuous carrier.

with either 400-or-1020 Hz modulation (keyed) to provide identification. The FACT program will use all such transmissions and all communications are to be scanned and used as applicable to robotics flight and landings and confirming the identity of an aircraft and it's location and altitude during a FACT event.

(2) Navigation Data Base (as stored in FMC memory) If capable and secure protection possible the FMC NDB will be used in applicable air craft to RAM store and monitor the 5 SB flight plans via adaptive autopilots or flight computers for the first generation TRAC FACT robotics system flights.

NDI Non-Developmental Item

NEG Negative

NERC UK New En Route Center This center may well serve as England's coordination center and FACT event command center for air travel/transport. This inventor is not trying to suggest how any other foreign nations should TRAC/FACT protect their air space and public safety in the air or on the surface. This requires these countries to make the same tough decisions on how best to receive and handoff flights into their airspace and also how to deal with a FACT event when it occurs, as well as handle those flights to possibly international Safe Bases. Europe has so may sovereign air spaces so close together that their coordination and assistance to air and for surface protection and support will have to be determined via organizations like the European Union and NATO and each country's National Security Agencies/military. Obviously, there are national and international aviation agencies and/organizations that will all take part in the standards, rules, regulations, code and law making for these geographic areas and events. TRAC systems will provide for accurate position of aircraft over air space during a FACT event, but coordination and preprogramming and planning is essential for the optimum system use and public safety.

NH High Pressure Gas Generator RPM

NHE Notes and Helps Editor Used in user-friendly TRAC/FACT programming with assistant if determined safe and useful.

NIC AEEC New Installation Concepts Subcommittee will be review PFN/TRAC/FACT System and determine implementation of the progressive and flexible architecture across the diverse aircraft platforms.

NIS Not-In-Service is a FACT program state. The FACT program can determine as a TRUSTED system (TRAC) and automatically lock the aircraft down for service through auto checks or RC and the proper systems must be checked or in perfect working order before the aircraft can be used. This includes a progressive programming to stop the unauthorized use or unsafe use of aircraft as per the operational state of the aircraft. Either to stop a take off and taxi back with a seal and lock down mode to a special security section of the air port—ideally at the end of the take off runway just to the side of the run way path—a security compound with a diverse emergency response team. If airborne FACT event protocols apply to safe base decision tree for types of emergencies must be worked out and remain secret in some cases. (This may be the best way to keep perpetrators from defeating them).

NIST National Institute of Standards and Technology will fund and help develop and coordinate efforts in the United States and around the world.

N-Layer N is set for any layer name (such as link, network, etc.) or for the initial (e.g.-SDU mean LSDU at the link layer). OSI model definition. TRAC will have N-Scann/ hybrid substrate/for communication links and E/E bus interfaces as IC components.

NL Low Pressure Gas Generator RPM

NLR Netherlands National Aerospace Laboratory to help develop TRAC/FACT systems for all aircraft it is designing, testing or developing.

NLT Not Less Than There will be an NTL point for TRAC/FACT system goes for any flight.

nm Nautical Mile

NMI Nautical Mile

NMOS N-type Metal Oxide Semiconductor

NMT Not More Than there will also be NMT for a certain amount of deficiencies in the system as well—to be determined for all aircraft and aircraft specific as well.

NOAA National Oceanic and Atmospheric Administration will supply data and take part in the Safe flight and Base locations.

NOC Notice Of Change—a special NOC will be issued for all TRAC/FACT work with the highest of security and accountability in the planning and carrying out of any change orders.

NO COM No Communication. A NO COM annunciation indicates that a downlink message has not been acknowledged in an ACARS system. NO COMM is a FACT event automatically and RC surface commands are sent out to TRAC via all TRAC interfaced communication Links and the downloaded carryon personal wireless systems are automatically dialed for the ground support to establish contact with the air craft via passengers and crew to determine state of the flight if still air born—Command scenarios to be determined if this is a deliberate act to commandeer the air craft and use it in an unauthorized or unsafe fashion. Other wise TRAC is to continually supply communication links in triplicate for the coordination of air surface response to the safest landing of the aircraft. Due to the wireless link of TRAC to all carryon phones the TRAC scan processor will be able to deliver the communication via the pilots head sets or cabin communication Link system.

Noise Undesired random electromagnetic disturbances or spurious signals which are not part of the transmitted or received signal. In the construction of TRAC/FACT protection of a PFN or sub system SUC to FACT the construction should provide for the protection against undesired emfs.

NOTAM Notice to Airmen NOTAM to all the assist and RC crews are given at a FACT event automatically to a scramble state to man their posts—At this point the system has determined what safe base and an initial protocol response for the SB chosen. Further action is based on in flight developments and data received in the SB command center.

NPA Non-Precision Approach In the first generation a wide variety of disparate systems will create the possibility of NPAs in the early TRAC/FACT systems. When a aircraft is determined to be a FACT event it will fly to a SB safe fly zone and the best effort to RC it to the ground will be made as one better option than allowing for unauthorized and unsafe control. This is not perfect however necessary. As systems are refined for robotics landings and better suited for more accurate RC landings this NPA will be greatly reduced as a FACT event. Ultimately, there will be safe landings and skilled RC pilots for all troubled aircraft at the SBs and for may regular airport facilities to help the unskilled or compromised pilot handle their aircraft properly.

NPDU Network Protocol Data Unit Will be programmed with TRAC/FACT protocols.

NPRM Notice of Public Rule Making All PFN/TRAC/FACT notices will be reviewed for what information can be publicly disseminated for the optimum public safety and not to compromise the purpose of the system.

NRP National Route Program will be augmented as needed to provide for the SB en route flights and be altered by the FACT command structure to insure uninterrupted activities during a FACT event.

NRZ Non-Return to Zero all instrumentation will be videoed and the electronic signal reported to TRAC/FACT programming for comparison algorithm and additional fault detection.

NSEU Neutron Single Event Upset

NSSL National Severe Storms Laboratory To determine with storm simulation software the effects of weather conditions on various aircraft on a glide path in to SBs and sensing systems which will aid in real time flying.

NTF No Trouble Found (referring to testing or checkout of unit/module) NTFs NFT state must be found throughout the TRAC/FACT program both on boot up and any periodic system check.

NTSB National Transportation Safety Board will play a continuing role in reviewing the procedures and protocols for each aircraft for TRAC/FACT and the SB procedures to seek and fund better safer utilization of TRAC/FACT.

NVM Non-Volatile Memory will be used in event recording an RAM for TRAC/FACT with special physical protection for both.

NWA Northwest Airlines all airlines must perform appropriately to sovereign power rules regulations and laws in a particular established geographic area and air space and to their host countries law and rules in the proper use of TRAC/FACT System technology.

NWS National Weather Service. The NWS provides a ground-based weather radar network throughout the United States. The radar network operates continuously and transmits the data to the National Meteorological Center, where it correlates with other weather observations. NWS will be coordinated in a IP traditional PFN/TRAC System interface in the FAA/aviation intranet to provide the data electronically and visually to the FACT command center and the robotics and RC pilot stations as needed to flight the air craft and land it in the safest manner.

O

OAC Oceanic Area Control Center will be IP and wirelessly linked to the PFN/TRAC/FACT system to monitor and help manage aircraft over the far reaches of the planet covered in water. These flights will have robotics flights and all flights will have robotic options ara form any severe storms at sea and over land. Support seaworthy surface craft will be dispatched as well as air support and air fueling for troubled aircraft over the ocean. Tracking, support and emergency downing of aircraft will have options at sea including isolated island bases for troubled aircraft as a traditional SB.

OAG Official Airline Guide will have a section devoted to standard operating procedures for TRAC/FACT incidents—still to be determined on how it will be presented to the public and skilled professionals.

OAT (1) Optional Auxiliary Terminal. The OAT may be in the form of a CRT/Keyboard device capable of interfacing with other sources of data on the aircraft and supplying data to a hard copy printer. (Used in an ACARS system.) OAT and regular interface terminals are provided to TRAC and needed for humans to respond to FACT and other TRAC programming, however for them to be used with TRAC there human access points have to present no threat of disrupting TRAC/FACT programming by unauthorized and/or unsafe commands. The HMI terminal interface cannot be shorted or electronically disrupt the system even if the terminal is destroyed. All terminals have to have photo recognition and internal software locally to clear access demand the most stringent of security for any program change order has to be applied with total accountability.

(2) Outside Air Temperature. The uncorrected reading of the outside temperature gauge. Different types of gauges require different correction factors to obtain static air temperature. Corrected and valid external air temperature provided to the robotics TRAC/FACT control and reported to RC pilots on the ground.

OBS (1) Omnibearing Selector. A panel instrument that contains the controls and circuits to select an omni-bearing and determine the TO-FROM indication. All instrumentation that is used to hold a heading or data that can be used to recognize a flight deviation must be interfaced with the TRAC/FACT system to determine a FACT event and if the correct path is being followed.

(2) Optical Bypass Switch

Octal Base-8 counting system. Numbers include 0,1,2,3,4,5,6,7,8.

ODAP Oceanic Display And Planning system. Will present oceanic flight data to controllers in a display that will enable better route and altitude assignments. This system is SUC to TRAC/FACT systems and protocols if it is automated with data delivered to the aircraft in real-time or as part of the overall surface control system.

ODID Operational Display and Input Development

ODL (1) Optical Data Link (2) Oceanic Display and Planning System

OEM Original Equipment Manufacturer Will review this patent and white paper for applicable equipment on their aircraft and interface the systems and equipment use to meet the highest level of protected automation they can to perform FACT functions. They will advise all owners of suggested upgrades and changes for their aircraft (to include component manufacturers as well, and help arrange to do the necessary augmentations under the proper FAA/homeland security FACT procedure as possible—Government will subsidize as much as possible the upgrades and so should insurance companies private owners clubs and/organizations for the individual aircraft up dates. Additionally all aircraft owners should be allowed tax saving incentives for the TRAC/FACT upgrades.

OEU Overhead Electronics Units

Off-Block Time The time that the aircraft leaves the gate.

OFP Operational Flight Program are on file and electronic in medium for an automated tracking of every flight in the FAA command center and Homeland security, nay deviation initiates FACT interrogatories of the on board TRAC/FACT flight and authorized pilot in dialog. If the interrogatories in the command center are questionable the Center can flag a FACT event from RC. Additionally robotics programming can flag a FACT event and the plane is on it's way to a safe base via a safe route with communication open and the aircraft being analyzed—with proper justification and reason a new flight plan is approved and the aircraft is allowed to go on to it's destination or other approved airport.

OID Outline Installation Drawing

OIU Orientation/Introduction Unit

OLAN Onboard Local Area Network all LAN that are responsible for essential flight controls are to be interfaced in a protected fashion to isolate protected robotics and RC controls of the TRAC/FACT system on board.

OM Outer Marker like all markers will provide their position data to the TRAC/FACT processor or linked processors (earlier generations interfaced adaptive auto-pilot or flight computer systems protected and running FACT programs) on board for the FACT flight and landing programs to robotically control the air craft; or be used by the RC pilots either in the pursuit assist aircraft or the RC flight station at the SB (Converted flight simulator to land the aircraft with the must current real-time data of the air craft s position and glide path.

OMEGA A navigation system that uses two high-powered transmitter ground stations to broadcast a continuous wave signal. The receiver measures the range difference between the two stations to determine position. These inherent air navigation systems will be used with automated triangulation the position markers and beacon, lorands and GPS as well as other satellite tracking, Dead reckoning in a combined fashion to confirm flight plans programmed into the automated flight systems on board and registered in the national flight control command center FACT/FAA/homeland security regionally tracking aircraft movement and nationally. A local flag in the Fact software may question an aircraft with a diverted flight path or one recognized diversion from surface tracking. Either will cause an immediate robotics SB flight and real-time investigation/scramble of assist aircraft and SB readiness as well as a national alert throughout all of FAA/homeland security.

Omni bearing The bearing indicated by a navigational receiver on transmissions from an omni directional radio range (VOR). A standard in air avionic and navigation will be incorporated into FACT flights as well as GPS and the above-mentioned positioning technology for robotics flight RC flight and landings and to detect FACT events. These actual used systems will depend on the aircraft and FAA/homeland security standards for each country.

OMS (1) Onboard Maintenance System—if automated will be part of TRAC/FACT or FACT will run an auto check for maintenance.

(2) Order Management System TRAC/FACT is the master operation system or management system.

OOOI OUT-OFF-ON-IN. An OOOI event is recorded as part of the ACARS operation. The OUT event is recorded when the aircraft is clear of the gate and ready to taxi. The OFF event occurs when the aircraft has lifted off the runway. The ON event occurs when the aircraft has landed. The IN event occurs when the aircraft has taxied to the ramp area. OOOI is also sequence keys in the FACT program providing for options in robotics and remote control.

The inventor can list here possible FACT flags for robotics and RC aircraft control—for all the ACARS events however, understanding each aircrafts capability for the current FACT response to be applied is best determined and specified by the TRAC/FACT system of authorities to include government, professional organizations and public safety watchdog groups. However the final secure protocol actions may be kept a secrete from the general public for better effectiveness in public safety—for this reason the inventor will not detail out here all the possibilities he envisions but is willing to share them in the proper setting and the proper time.

On-Block Time The time that the aircraft arrives at the gate. All timed data is to be monitored for FACT events.

OPAS Overhead Panel ARINC 629 System

OPBC Overhead Panel Bus Controller the 2 above lines have to be protected if they can be used to alter flight performance locally.

OPR Once Per Revolution

OPS Operations Per Second All essential data sensed for flight operations is SUC to TRAC/FACT processing.

OPU Over speed Protection Unit is to be directly tied to the robotics flight system and protected as the TRAC/FACT system if there is not a protected PFN/TRAC/FACT ASIC processor on board. If there is the robotics flights will have over speed protection and stable flight plans. Basically robotic flight and local flight control lock out all happen at once triggered by a deviated flight plan to include safe airspeed limit flags in FACT robotics flight programs monitoring any OPU or other velocity systems will flag a robotics FACT event and communication with the aircraft from FACT control central.

OR Operational Requirements for TRAC/FACT systems will vary per aircraft, and national state of security via a Public safety equation yet to be determined. Aircraft will be allowed to fly absent of all the TRAC/FACT systems so long as there threat can be neutralized via other security means. And partial TRAC/FACT systems not fully safe for on board air travelers will be allowed to fly absent added human security if the aircraft can be controlled to a safe crash zone at least. Of course acceptability of these limited operational requirements starts with the air travelers willingness to fly under these conditions and ends with FAA/FACT/Homeland security approving any such limited FACT flights.

OSC Order Status Report

OSI (1) Open Systems Interconnection (2) Open System Interface used to connect with TRAC/FACT system monitoring but not to receive crucial security FACT data.

OTH Over The Horizon

OTS Organized Track System to incorporate as a TRAC/FACT IP component or be incorporated in the TRAC/FACT control system to handle all the telemetry which is to be divided up into flight station monitors on the surface both centrally and locally at the SB.

OVRD Override Surface FACT control center will always have full OVRD, Because the TRAC/FACT system will have so many routes of communication the total command and control over the flight will reside on the ground with special encoded communications that both surface and air systems recognize.

oxy Oxygen supplied as needed to sustain human life during a FACT event along with other atmospheric elements and compounds to control the passengers, occupants, and crew.

P

PA (1) Passenger Address recorded and processed by the TRAC/FACT processor voice recognition software for a FACT event announcement by hijackers or crew (and reported to a voice ID software algorithm in FACT control central) with a language translator function (local) for Keywords in every language. This will trigger a FACT flight robotics response to the Safe base and an automatic lock down of all local flight controls. The surface is alerted and cabin and cockpit video and audio activated for FACT surface response teams to monitor and manage the compromised aircraft, Additionally the passengers are alerted in their language to the event in progress. They can be given direction from the surface over the PA and are also give permission and freedom to beat the living crap out of any perpetrator and aid the crew or sky marshal in gaining control of the aircraft and subduing the ignorant son of a gun. If the PA is not an optimal mode the ground support team can activate passenger identified cellular phones on board and help direct a concerted effort via the camera surveillance as long as the cameras are operating or presenting visible data. When the video are disabled the phone contacts keeps the surface FACT support team in contact with the Processor via Blue tooth wireless if need be and can still provide voice communication with passengers to ascertain the nature of the threat in the troubled aircraft. Obviously cabin and cockpit surveillance audio and video equipment should be installed by FACT personnel in redundancy in secret locations and operated in the most professional manner at all times.

(2) Power Amplifier used as needed for TRAC/FACT equipment operations and protected in use and from tampering.

PAC Path Attenuation Compensation these automated flight algorithms will be used in robotics if not present in normal instrumentation for a TRAC/FACT system to perform a robotics flight and RC landing.

PA/CI Passenger Address/Cabin Interphone connected to the TRAC processor for FACT programming to determine a FACT event on the air craft and to recorded locally and reported to the surface control center and position marker data repositories so that all questionable dialog can be further analyzed and identified at the surface.

PACIS Passenger Address and Communication Interphone

System The same as above for TRAC monitoring

Paired Channels DME channels are paired with a VORTAC or WLS frequency and are automatically selected when the VORTAC or ILS frequency is selected. Most navigation controls have this feature. These systems of course will be incorporated into FACT flight, glide path and landing and be operated with special encrypted communication Protocols. Additionally they will be augmented to precipitate total robotics as available for all aircraft to return safely to the ground at SBs and ultimately as a pilot aid for the deficient pilot. They will be covered and copiloted from surface controls as determined advisable and optimal. Once again the TRAC/FACT invention uses all COTS and progresses to more sophisticated, integrated, consolidated and specialized systems to cover forward and backward engineering concerns for all flying aircraft.

PAL Programmable Array Logic this process and processors where available and involved in critical flight systems will be interfaced as the TRAC/FACT system as well as programmable field arrays, custom gate arrays, microprocessors and any other processing unit. The use replacement the augmentation and the custom interfacing of all these different control technologies will be determined by the manufacturers system and component engineers for each air craft. The goals will be the same—Locked out local flight controls—Protected Robotic flight systems to safe crash zones and/or SAFE BASE Landing Areas—robotics landings at the safe base areas—or RC landings at the SBs—ASAP—audio and video of the aircraft interior to the surface support and protected Recording systems—DSRC to all wireless system carried on board a ded Dedicated ASIC for TRAC/FACT processing protected and redundant. This is the progression. Much of the automation to fly the aircraft and land it is COTS and exists now, however not on all aircraft.

PAM Pulse Amplitude Modulation to be used in TRAC/FACT electronics as needed.

PAR Precision Approach Radar. An X-band radar, which scans a limited area and is part of the ground-controlled approach system. This system to be directly interfaced into TRAC/FACT controls on the surface at SBs and transmit essential data to FACT robotics landing the plane or utilized in the virtual flight image of the real-time flight simulation station for the RC pilot to fly the landing safely.

PATA Polish Air Traffic Agency will aid in determining safe fly zones and flight patterns as well as SBs and be trained to recognize a FACT flight. They might well have the FACT control canter in their center. These are for the sovereign powers of the airspace to determine how and who shall implement TRAC/FACT for them. Understandably PATA will play an essential role in this for Polish airspace.

PAU Passenger Address Unit PA monitored by TRAC FACT programming for voice recognition and ID as well as to aid coordinated efforts between the aircraft occupants and surface control—as explained earlier.

PAX Passenger

PBID Post Burn-In Data TRAC/FACT System will use this kind of firmware as it can be protected from alteration and FACT purpose to safely and securely control the aircraft by the proper authorities on the surface. This technology allows for easier interfacing of presently disparate systems in the inevitable menagerie of first generation TRAC/FACT systems, but must meet security protocols for it to be effective as part of any FACT system. And not more of a use as a remote control weapon in the wrong hands. Of course access in servicing and security in programming (encryption as well as physical and electrical protection are the critical issues governing any technology employed in the TRAC/FACT process and ultimate protected redundant community of ASICS scattered along and integrated with the E/E bus systems by wire and wireless to perform accountable reliable robotics and RC Flight control coordinated with the appropriate and authorized desires of those in control on the surface.

PBX Private Branch Exchange

PC (1) Personal Computer all computers and systems interfaced to TRAC/FACT anywhere is to have a running security program to be determined if security protocols in any locale or in any IP protocol has been breeched. Total accountability for all interfaced components and ID for all users at the highest level of ID assurance available. Continual system integrity checks for new interfacing or hacking, with a special response team to localize and apprehend and detain any person or persons causing a system tampering alert for full investigation of their activities and system compromised. Automatically an—isolate and redundant system takes over if a tamper event is detected. To handle any real-time FACT event occurring.

(2) Printed Circuit used in TRAC/FACT components or sub systems interfaced as needed.

P-Code The GPS precision code the most accurate of GPS signal will be employed for the TRAC/FACT system, but the FACT program will run an error correcting program and ground signal correction as well as a fuzzy logic program to quarry any other on board GPS receivers carried on and picking up hot GPS signals to confirm all FACT robotics commands and aircraft position analysis data. This data will be recorded locally but also reported to surface control for processing and deliberation and final decision regarding all FACT flight options.

PCB Printed Circuit Board used as needed for TRAC/FACT systems.

PCC Pilot Controller Communication interfaced with TRAC/FACT process/processor and running voice recognition and translation software to detect a FACT event on board the aircraft. The communication will be recorded locally as usual and made part of the TRAC/FACT protocol with real-time reporting and the voice recorder unit must be protected and un-accessible physically while the aircraft is in flight—all hand held communicators and personal PFNs as well as wireless mics should be recorded in simultaneously on separate digital tracks and time synchronized and presented to a specialist at a visual and audio monitor in the FACT control center. A number of specialist may be used to analyze to audible transmissions to determine Identity mental state of all involved and best course of action in the air and when boarding on the ground. There are obvious types of people for this team however this inventor prefers to leave this development and personnel determination to the appropriate government agencies and/organizations already skilled in dealing with extreme human behavioral conditions. The inventor does feel however this should be an odd number team that works well together and is trained and practices all types of scenarios imaginable. All real incidents recorded should be analyzed and used for preparation and as much as possible an automated software developed to shadow a situation and provide viable options to the team. The electronic library can be used for training simulations and real-time responses.

PCI Protocol Control Information. The N-PCI is exchanged between peer network members (OSI Model) to coordinate joint information. This may well serve as a basis of initial secure communication protocols for the TRAC/FACT system in air travel. It might use DES/DET for the interface with the military. However, this inventor feels these system have to interface but be kept separate for security reasons the FACT software protocols were designed for federal agencies including the military to set up their accountable access to the FACT system and control in real-time what they had to for public safety and National security. This is reflective of how the government is set up now with real-time selective and isolated marshal law imposed on all transportation via the TRAC/FACT machine messaging matrix. It allows for immediate agency coordination and cooperation for real-time FACT events yet provides freedom of movement and operations individually for government agencies and citizens. To develop the fact construct or operational software program it will require every agency to provide a secure FACT person or team to develop there secure code ID with the US Military Omaha and secret clearance contractors. This will be basis for the matrix of intranets to create the national PFN/TRAC system.

PCIP Precipitation Baby the rain must fall—and TRAC/FACT systems must be protected from it and the natural element including contact with earth wind and fire. The system must also tie all meteorological systems and automated systems as well as provide freestanding PFN/TRAC units to report and perform robotics and RC control functions due to meteorological events to insure the best system performance for the TRAC system to return a FACT flight safely to the surface.

PCM Pulse Code Modulation will be used as a digital transmission as needed in TRAC/FACT interfaced avionics.

PCU (1) Passenger Control Unit This will be expanded to mean the handling of technology that can help control behavior in flight like the administering of a sleep agent or tranquilizer to allow for uninterrupted surface control of the aircraft.

(2) Power Control Unit will be SUC to TRAC/FACT systems and the TRAC/FACT process or processor will be protected from tampering with the power control unit. If this system is a critical TRAC/FACT component it hast be protected and have protected redundant power and control capability or as part of any TRAC system a separate power controlled by a protected TRAC ASIC processor has to in place.

PDC Pre-Departure Clearance requires ACARS OOI FACT examination readiness meaning all inventoried systems are checked out and downloaded to the FACT control center. The inventory is a stand record of readiness for this aircrafts avionics critical services tires, brakes, carryon wireless electronics, navigational aids, personal PCs, palm pilots, and all E/E systems. TRAC FACT readiness to include crew and passenger ID checklist of known public threats to society—photo recognition technology fingerprint and DNA if Civil defense security alert high enough. Obviously these systems will be interfaced with FACT control centers and the terminal security checks also PFN/TRAC units and system provided. Accomplished by using COTS and enhancing them to PFN/TRAC system level of performance.

PDCU Panel Data Concentrator Unit the electronic signals provided the TRAC/FACT process as applicable.

PDDI Product Definition Data Interface. Standardizes digital descriptions of part configurations and properties needed for manufacturing. Used extensively to utilize cross-environmental technologies to interface with existing COTS technology to create the TRAC/FACT system.

PDF Primary Display Function

P-DME Precision Distance Measuring Equipment used for all robotics and RC flight sim programs to be processed for FACT flights landing and taxiing.

PDN Public Data Network Data to be supplied and approved by TRAC/FACT IP interface and appear on the internet as an informative transportation portion or web page for the public to view—this function is well defined in the extensive previous 7 patents and protected patent filings.

PDOP Position Dilution Of Precision. A GPS term for error introduced into the GPS calculations. This military skew to be eliminated or compensated for but FACT encrypted when used in FACT systems—the most accurate data a necessity for this application—equally the military have to feel sure it is used with national security in tact to include the termination of a fact flight using this guidance for unauthorized and as a guided bomb run—however the military has the ability to turn off the GPS in a grid fashion if this is deemed a better option.

PDOS Powered Door Opening System all to be SUC to TRAC/FACT to allow for the boarding of a FACT flight at a SB with a FACT command.

PDR Preliminary Design Review for every TRAC/FACT system deployment.

PDS Primary Display System videoed and signals recorded and interfaced as needed for TRAC/FACT operations.

PDU (1) Protocol Data Unit. The N-PDU is a combination of the N-PCI and the N-UD or N-SDU. The N-PDU is the total information that is transferred between peer network members (OSI Model) as a unit. The PDU is a forerunner to TRAC communication protocol translation and message routing and as such is to be protected and interfaced as a integrated TRAC/FACT component.

(2) Power Drive Unit—if this is a servomotor for flight control surfaces or critical in-flight controls it is to be protected and it's power leads are to be protected.

Performance Index A relative number used to compare the performance of different radar systems. It is calculated from transmitter peak power, antenna gain, pulse width, prf, antenna beam width, and the receiver noise figure. Any automated systems or algorithms to provide the best radar data for FACT flight and landings should be protected and utilized.

PED Portable Electronic Devices all having transmission receiving capability are to interface with the TRAC/FACT processor and be SUC to FACT commands deliverable in the PED protocol. Additionally the PFN/TRAC TRANSCEIVER should be equipped with a frequency scanner and locate and report any unknown RF oscillation. This also should be a standard PFN/TRAC free standing function throughout the airfields constantly canvassing transmissions and triangulating on their location via the matrix of receivers. FACT FAA command control center locally in the Tower should be monitoring these signals with an algorithm that identifies known signals and flags suspicious ones. Mobil PFN/TRAC RF sensors will also have GPS to tag exact location when they pick up an odd ball.

Any such in-flight new signal will trigger a FACT event status with aircraft flow to safe route zone and towards SB until the nature of the transmission can be identified.

PET Pacific Engineering Trials as needed for TRAC/FACT approval.

PF Power Factor

PFC Primary Flight Computer is immediately part of the first generation of TRAC/FACT and must be protected and interfaced accordingly. Additionally these units and autopilots will be adapted and programmed to handle the robotics flights.

PFCS Primary Flight Control System TRAC/FACT is the PFCS in a FACT event both in the aircraft and through the FAA/FACT command control Center.

PFD (1) Primary Flight Display. An EFIS presentation substituting for the ADI.

(2) Primary Flight Director.

PFE Path Following Error

PFR Pulse Repetition Frequency. The rate at which pulses are transmitted.

PGA Pin Grid Array

PHY Physical Interface Device

Phase A signal in which the phase varies (with respect to Modulation the original signal) with the amplitude of the modulatory signal, while the amplitude of the carrier wave remains constant. Similar to a modified frequency modulated signal.

PIO Processor Input/Output the 5 lines above defines elements of avionics and TRAC/FACT will incorporate them as needed PIREP Pilot Report an automated Pilot report will be filed electronically and in the written form printed out for each fact event from the onboard FACT robotics system and the Surface system and RC crew.

Pitot Pressure The sum of the static and dynamic pressures and is the total force per unit area exerted by the air on the surface of a body in motion.

Pitot Tube A forward facing probe attached to the outside of the aircraft to sense the relative pressure of the aircraft moving through the atmosphere. Named for Henri Pitot who first used this method of measuring fluid flow pressure. Transduced for forward speed into a electronic signal and inputted to the TRAC processor or TRAC process for FACT robotics flight.

PLA Power Level Angle TRAC controlled in FACT program

PLL Phase Locked Loop

PM Phase Modulation

PMA (1) Permanent Magnet Alternator 3 above avionics interfaced and monitored by TRAC as necessary.

(2) Parts Manufacturing Approval a standard process for all TRAC/FACT components and their interfaces.

PMAT Portable Maintenance Access Terminal a possible interface location for TRAC processor to E/E bus systems if protected in flight and secured for service for FACT protocols.

PMC Provisional Memory Cover must meet TRAC/FACT protocols

PMG Permanent Magnet Generator

PMOS P-Type Metal Oxide Semiconductor

PN Pseudo Noise

PNCS Performance Navigation Computer System directly interfaced with TRAC process in first generation.

PNEU Pneumatic

POC (1) Proof Of Concept for all TRAC/FACT modalities, components and interfaces are all ready in existence in COTS segments.

(2) Point of Contact

Polled Mode An ACARS mode of operation in which the airborne system transmits only in response to received uplink messages (polls). TRAC/FACT systems will have this function from the surface command control center and regional En route markers for FACT downloads.

POR Pacific Ocean Region will be set up for FACT TRAC handoff to the countries geographically in control of airspace.

POS Position

POS/NAV Positioning/Navigation the 2 above will be a constant monitor program to determine flight plan deviation and to control robotics flight for the TRAC processor and FACT program.

POT Potentiometer

PPI Planned Position Indicator. A type of radar display that shows aircraft positions and airways chart on the same display. Used in the command center and the electronic signal provided to the FACT program running in the TRAC processor on board the aircraft AND RECORDED IN BOTH LOCATIONS.

PPM (1) Pulse Position Modulation when available configuration algorithm in FACT software for position confirmation.

(2) Parts Per Million a reading transduced to an electronic signal indicative of the level and identity for a contamination in the cabin atmosphere.

PPS Precise Positioning Service

P/RAT Prediction/Resolution Advisory Tool an evaluation program to adjust operational parameters and will be used as applicable to accurately adjust automated systems to operate the aircraft safely via robotics and RC in the TRAC/FACT System.

PRAM Prerecorded Announcement Machine the robotics system will have prerecorded announcements in the TRAC/FACT programs.

PRAIM Predictive Receiver Autonomous Integrity Monitoring standard process in the TRAC/FACT system.

PRELIM Preliminary Data

PRESS Pressure

Pressure The altitude measured above standard pressure level.

Altitude Based on the relationship of pressure and altitude with respect to a standard atmosphere. Physical measurements transduced to an electrical signal for the TRAC processor and FACT programs to factor in their programming.

Preventive A resolution advisory that instructs the pilot to avoid advisory certain deviations from current vertical rate (TCAS). Transmitted to TRAC/FACT system as an electrical signal encrypted for the FACT program to factor in for robotics flight.

PRF Pulse Repetition Frequency used as needed for TRAAC avionics.

PRI Primary

PRM Precision Runway Monitoring part of the surface TRAC/FACT command control system and linked to aircraft performance on the surface as well as utilized by taxi programs and RC control stations.

PRN Pseudo Random Noise factored out in the ground RF monitoring via software program.

PROM Programmable ROM used as needed in TRA/FACT systems.

Protocol A set of rules for the format and content of messages between communicating processes. TRAC/FACT will set up a higher level software interface that crosses over communication protocols to transfer emergency messages universally encrypted as FACT messages via the TRAC processor interfaced with a divers number of communication chipset of different communication link protocols. This will create a large flexible machine-messaging matrix to include voice communication as well.

PROX Proximity is a continual set of functions always being performed by a number of software algorithms in communications and navigation programs running as a basic characteristic of the TRAC system. TRAC processors always provide location data via GPS systems or other location systems or data to determine the location of another transmission by identifying the transmission between two or more receiving PFNs of known location and running an automated triangulation algorithm to find the location of the transmission. This is factored locally and systemically and reported and recorded for accuracy and accountability.

PRSOV Pressure Regulating and Shutoff Valve used and monitored by TRAC/FACT systems for hydraulic diversions to lock out local controls or energize certain control surface actuators or control fuel flow or sleeping agent flows or 02 level or atmospheric pressure in the cabin.

P/RST Press To Reset

PRTR Printer there will be a printer connected to the TRAC/FACT system to provide printouts on systems status to authorized requesters.

PS Power Supply for TRAC/FACT systems will be protected and available and regulated and externally rechargeable, but not drainable or interruptible, during a FACT event and capable of energizing all necessary components and accessories to robotically fly the aircraft or receive RC commands from the surface and deliver data to fly and land the aircraft via the TRAC/FACT system.

PSA Power Supply Assembly protected if a TRACFACT main emergency system and/or SUC to TRAC/FACT system if another avionics system on board.

PSDN Packet Switched Data Network incorporated and interfaced as TRAC/FACT process or ASIC processor and Communication Link if essential to secure safe flight and landing capability with the system protected.

PSEU Proximity Sensor Electronic Unit data supplied to TRAC processor and used as a tamper detection sensor to quarry human activity around a TRAC sensitive component.

PSL/PSA Problem Statement Language/Problem Statement.

Analyzer used to test software interfacing for TRAC/FACT systems with OEM and COTS avionics.

PSPL Preferred Standard Parts List each aircraft manufacturer will be expected to generate PSPLs for the generations of TRAC/FACT systems to update their aircraft with TRAC/FACT technology.

PSR Primary Surveillance Radar. The part of the ATC system that determines the range and azimuth of an aircraft in a controlled air space. PSR will be employed at all SBs and be used for the robotics glide path by up loading data to the incoming troubled aircraft and providing glide path telemetry to the RC simulator to RC land the aircraft.

PSS Proximity Sensor System used for all movement applications from the micro to the macro in distance and size of object to supply relevant data to TRAC processors running vehicle operation algorithms e.g. collision avoidance in the air, with the ground, on the ground and anti tampering software programs.

PSU Passenger Service Unit.

PTR Production Test Requirements applied to all TRAC/FACT systems for the design state and aftermarket use, however some circumstances may warrant prior application and use to full and complete production approval to be determined by national security/public safety and risk management officials.

PTSD Production Test Specification Document provided for all TRAC/FACT systems and protocols.

PTT (1) Post, Telephone and Telegraph communication Links via TRAC/FACT routing.

(2) Push To Talk. Also refers to the switching signal that enables the transmitter VOX operated in the TRAC/FACT system and keyed up electronically and manually.

PTU Power Transfer Unit interfaced monitored and controlled as needed to the TRAC/FACT system.

PVT Position, Velocity, Time an absolute data feed to the TRAC system process of interfaced COTS avionics or TRAC/FACT/ASIC input of data for flight deviation recognition to trigger a FACT event and also to FACT fly and land the aircraft, via the 5 preprogrammed FACT flights and RC landings.

PWM Pulse-Width Modulation to be determined for FACT software and communication link protocols if different.

PWR Power

PwxA Pilot Weather Advisory transduced to an electrical signal for TRAC/FACT management and operation programs to factor for robotics flight and RC.

Q

QAR Quick Access Recorder all recorders to be protected and require FACT access personnel to access and recover.

QC Quality Control a paramount importance for any and all TRAC/FACT components their interfaces and connectables as well as security clearance in all major programming and flight readiness.

QEC Quadrantral Error Corrector for position to be used in flight tracking and data provided to the TRAC/FACT system.

QFE A method of setting the altimeter to compensate for changes in barometric pressure and runway elevation. Pilot receives information from airfield and adjusts his altimeter accordingly and it will read zero altitude at touchdown on the runway. Atmosphere datum −29.92 inches of mercury (1,013.25 mb). This setting is used in the United States airspace by all aircraft above FL180.

QNH The more common method of setting the altimeter to compensate for changes in barometric pressure. Pilot receives information from airfield, adjusts his altimeter accordingly and the altimeter will read airfield elevation, at touchdown. For the above 2, the information to be sent as an electrical signal to the TRAC processor reading barometric transduced data to run an adjustment algorithm for the TRAC process to read Barometric Zero on a robotic touch down with real-time aircraft data supplied to RC SB station helping to land the Troubled aircraft.

QNE The method of setting the altimeter to the standard and a standard for setting the Altimeter reading in the TRAC/FACT program can be termed QNET.

QOP Quality Operating Procedures to be determined for TRAC/FACT procedures and protocols.

QOS Quality of Service must be of a consistent high caliber for TRAC/FACT systems.

QRH Quick Reference Handbook for each area of TRAC technology.

Quadrantral Error in the relative bearing caused by the distortion of the received radio signal (rf fields) by the structure of the aircraft. To be compensated in existing COTS sub systems or programmed into the chipsets, hybrid substrate, or ASIC SOC for future TRAC/FACT processors for RF protocols.

R

R Right

RA (1) Resolution Advisory (generated by TCAS) all pilot waning advisories given for collision are to be provided to the robotics program running in the TRAC/FACT process/processor for robotics flight augmentation to avoid a collision.

(2) Radio Altimeter all altitude data generated is to be provided in the form of a recognizable electrical signal to the on board flight responsive TRAC/FACT system during a FACT event or to be used for FACT monitoring. In tern the data is transmitted to the surface FAA/FACT command control and assigned RC stations both at the SB and in any pursuit assist aircraft. If the signal is generated from a surface system the data is provided to the in flight TRAC/FACT unit and surface monitoring and management system for robotics flight program flight an RC flight coordination and control.

Rabbit Tracks Rabbit Tracks, or running rabbits, refer to the distinctive display produced by another (alien radar) radar system transmission. Military tracking and targeting systems to detect foreign military threats need to be evaluated to determine the need for recognition of rabbit tracks and their use in a FACT scenario. To the inventor, it is obvious if the aircraft detects rabbit tracks or the pursuit assist aircraft detects rabbit tracks within or near to the US boarders; FACT command center, en route controller and surface cabin analysis team have to determine if the rabbit tracks are related and part of an attempt to control the aircraft. If the radar can tot be recognized and determined friendly and the FACT aircraft is not controlled by FACT robotics and surface RC, 1. Time permitting pinpoint rabbit track location and track if a moving target and dispatch surface security force to apprehend persons and equipment and interrogate and report to FACT control center 1a. Do a TRAC/FACT scan communication sweep from all close to the rabbit tracks PFN/TRAC units and along the projected flight path to pick up suspicious RF signals—initiate same sweep for in the aircraft TRAC units and run a correlation algorithm to detect same alien frequency and jam at both ends. Determine locations of transmission and dispatch interdiction/interrogation force 1b. Simultaneously TRAC/FACT communication Scan for secure communication link to FACT command control center from troubled aircraft. FACT 2. Response (no time scenario) air to surface tracking missile from pursuit aircraft fired on rabbit track location. And ready to take out the troubled aircraft. Either from the control command center or from the pursuit aircraft (training, preplanning and a guardian TRAC/FACT program of options should always be running for the real-time FACT crew to try and help make the hard decisions).

Radar Radio Detecting And Ranging. A system that measures distance and bearing to an object. To be used as available on each air craft to provide data to the FACT robotics and RC operations via the TRAC system to the FACT components in the aircraft and on the surface.

Radar Mile The time interval (approximately 12.359 microseconds) required for radio waves to travel one nautical mile and return (total of 2 nmi). This physical fact of RF speed will be used to determine speed and positions as possible by sub systems and any primary focal node TRAC ASIC performing FACT software quarrying sensed data if this development of position and speed data in this manner is required either as an essential modality or as a backup data source for the FACT tracking and guidance algorithm to factor.

Radial A line of direction going out from a VOR station measured as a bearing with respect to magnetic north. All directional data provided like VOR technology in equipment on board any particular aircraft should be evaluated as a sub system to be interfaced for TRAC/FACT programming. Fact programming should be versatile enough either through application specific software version or if possible as a general operating system to run the protocols and software needed to utilize data from various positioning and locating technologies. This will require cooperation in the code writing and engineers responsible for existing embedded systems to determine the most proficient modalities to interface these disparate systems into one operating system or most appropriate configuration for any particular avionics available.

Radome The radome is the protective cover on the aircraft nose that fits over the weather radar system antenna. The radome is transparent at radar frequencies. This radar will be used to provide data for FACT to determine the smoothest flight pattern via robotics to SBs and report all such flight augmentations and data gathered. However, additionally a camera or video system of the highest caliber as well as night vision system should be mounted in the nose and sending data back to TRAC/FACT robotics and surface/(air assist if needed) RC control pilots for robotics flight and RC landing as well as taxiing.

RAI Radio Altimeter Indicator videoed with data provided TRAC/FACT system by electrical signal.

RAIM Receiver Autonomous Integrity Monitoring TRAC/FACT auto check of essential communications to incorporate RAIM in sub systems and direct integrated systems.

RALT Radio Altimeter (also RA, RADALT, LRA, LRRA) used as detailed above for TRAC/FACT applications.

RAM Random Access Memory. Generally used to describe, read, write integrated circuit memory. Used as a general electronics modality. RAM back up for 5 FACT flights will exist in redundancy and be reloaded in to any sub system flight controls responsible for FACT flights in a redundant fashion for a sensed FACT event.

RAPPS Remote Area Precision Positioning System the FAA/FACT command & control center will be able to be set up on Whitehouse multi-screen representation or Air force 1 as a RAPPS and with more telemetry and remote control during a FACT event or as desired by the President and command staff he wishes present. RAPPS and FAA/FACT command and control will be local and National and RAPPS as desired can additionally be provided commercial carriers and other relevant viewers.

RAS Row Address Strobe will be videoed in landing and used to position glide path by a video algorithm if it proves feasible and worthwhile.

RAT RAM Air Temperature is the temperature of the air entering an air scoop inlet. It is a factor in engine performance. This data will be processed and available via TRA/FACT processing to be used as needed for proper flight performance and for the surface crew to evaluate aircraft environment and total parameter of threat to and from the environment as to the particular circumstances of the FACT event.

RBS Ration by Schedule

R-C Resistor-Capacitor network used as applicable for TRAC/FACT process and construction.

RCC Remote Charge Converter TRAC/FACT systems are to be capable of inverting and converting current to meet any DC & AC requirements for essential subsystems and/or accessories via a protected emergency energy system.

RCP Radio Control Panel audio/video record/report and to be directly interfaced with TRAC and protected during a FACT event for uninterrupted secure surface access and control.

RCVR Receiver interfaced with and monitored by TRAC as much as possible either physically or by wireless means.

Rd R-Channel used for data TRAC/FACT major Surface to air communication link to carry special encrypted data for FACT event.

R & D Research and Development to go in to High gear in all commercial and government labs to develop interfaces and connections for TRAC/FACT processing in surface application and for avionics past, present and future modalities for the PFN/TRAC/FACT technology.

RDMI Radio Distance Magnetic Indicator transduced signal—used and interfaced as much as possible for TRAC/FACT flight deviation monitoring and robotics flight.

RDR Radar a major tool to determine aircraft position and flight the aircraft to the SB and land it safely for TRAC/FACT protocols, Systems to be developed and integrated for traditional flight routes, SB routes and new more direct GPS route. Additionally aircraft collision avoidance RDR to be made more usable for robotics flight.

RDSS Radio Determination Satellite Service used in the positioning of aircraft as appropriate and doable.

RE&D Research, Engineering and Development for the construction of the TRAC/FACT system in hardware/software and interfaces to construct minimum flight requirement systems in everything flying in the US in the next 180 days.

RECAP Reliability Evaluation and Corrective Action Program a continual process for every TRAC/FACT system/generation.

REFL Reflection—not for light but for the TRAC/FACT System. Reflection on how it is being used what make it safer and what is the proper application for a free society and one under attack or in some sort of danger that is alleviated via FACT applications.

Reflectivity Factor (Z) This is a measurement of the ability of a target to reflect the energy from a radar beam.

Relative Bearing The bearing of a ground station relative to the direction the aircraft nose points, or the direction of an aircraft to or from an NDB. To be used as applicable in controlling TRAC/FACT flights.

REL Relative

Resolution Advisory A display indication given to the pilot recommending a maneuver to increase vertical separation relative to an intruding aircraft. A resolution advisory is also classified as corrective or preventive. This data to be provided to TRAC system running FACT robotics flight to alter the aircrafts flight path for the safest un interrupted flight to the safe fly zone and SB landing zone—all such maneuvers and data causing course and altitude change relayed to SB RC simulator and monitoring stations on the surface with data recorded and reported in both locations for accountability.

RET (1) Rapid Exit Taxiway used for a FACT emergency to the local control and containment area or provide as a take off or landing parallel standard runway and taxi lane for immediate FACT flight, landing or local dealing—these exist on safe bases for sure and should be built with this consideration, however construction at standard FAA airports should be constructed or augmented in the future with this capability.

(2) Reliability Evaluation Test TRAC FACT systems self perform on boot up and periodically and qualified approved personnel perform physically.

REU Remote Electronics Unit

RF Radio Frequency. A general term for the range of frequencies above 150 kHz, to the infrared region (1012 Hertz).

RFI Radio Frequency Interference The above two to be monitored and manage by the TRAC/FACT scan and routing.

RFP Request For Proposal

RFTP Request For Technical Proposal RFTP need to be written from each area of the PFN/TRA/FACT technical area for OEMs of aircraft and avionics to prose constructing the components of the system.

RFU Radio Frequency Unit

RGCSP Review of the General Concept of Separation Panel

RIB Right Inboard

RIN UK Royal Institute of Navigation to help set up the NAV systems used for TRAC/FACT in Europe and England.

RLS (1) Remote Light Sensor used for security and other TRAC automation (2) Reliable Link Source RLY Relay used in the TRA/FACT system for remote switching.

R & M Reliability and Maintainability are always important element for any system and paramount for public safety and National security in TRAC/FACT.

RMI Radio Magnetic Indicator signal converted to electrical signal and used as needed for TRAC/FACT system.

RMP Remote Maintenance Panel

RMS Root Mean Square

RNAV Random Navigation/Area Navigation

RNG Range

RNGA Range Arc

RNP Required Navigation Performance the above 5 lines are important radar and navigational aids to aircraft tracking and each such locating system will be used as needed in the TRQAC/FACT system applicable by aircraft.

RO Roll Out

ROB Right Outboard

ROC Rate Of Climb

ROD Rate of Descent will be tracked and controlled by TRAC/FACT robotics flight during a FACT event.

ROI Return On Investment always good business and should be good for TRAC/FACT implementation from government funding Insurance rebates, the airline industry.

ROM Read Only Memory used in TRAC/FACT systems as needed possibly for the safe flight boot ups.

ROTHR Re-locatable Over-The-Horizon Radar used for the control of robotics and RC flights.

RPM Revolutions Per Minute

RSP Reversion Select Panel

RT Receiver-Transmitter (rt). Also referred to as a transceiver (see T/R). An interfaced portion of the TRAC/FACT scanner system.

RTA (1) Receiver Transmitter Antenna protected but efficient for TRAC/FACT communication link (2) Required Time of Arrival to be monitored and updated by TRAC/FACT system.

RTCA Radio Technical Commission for Aeronautics to take part in determining the essential RF systems and scan functions for TRAC/FACT.

RTF Radiotelephony to be interfaced and controlled by TRAC/FACT processor and DSRC.

RTI Real-Time Interrogate all the I/O and for the proper personnel security responses and sensed data check as part of standard operational program for TRAC/FACT system.

RTP Reliability Test Plan to be determined for each TRAC/FACT system partially determined by OEMs and government agencies.

RTO Rejected Takeoff there will be a v point or take off abort electrical signal marker to Fact program to know to kill the flight and go to slow, stop, secure program on the ground and taxi to the secure holding area.

RTP Radio Tuning Panel to be locked down and protected from local access and available and interfaced with the TRAC/FACT system.

RTS Request To Send this communication command will be controlled by TRAC/FACT interfacing.

RTU Radio Tuning Unit SUC to TRAC/FACT operation.

Runway The act of inadvertently crossing the runway holding.

Incursion point without ATC clearance—limited or eliminated by FACT collision guardian program running in the TRAC unit and in the ground FACT control center both giving pilot notification and controlling the traffic pattern along the taxi ways and runways.

RVDT Rotary Voltage Differential Transducer interfaced and monitored by TRAC/FACT system RVR Runway Visual Range enhanced by Radar and night vision interfaced into TRAC/FACT systems.

RVSM Required Vertical Separation Minimums to be programmed in the Fact robotics programs.

RWM Read-Write Memory. A memory in which each cell is selected by applying appropriate electrical input signals, and the stored data may be either sensed at the appropriate output terminal or changes in response to other electrical input signals. RWM memory storage will be employed as determined by stand by applications in the TRAC/FACT technology.

RWY Runway

RZ Return to Zero the term used for setting gauges—however all FACT programs will run data check programs to constants to recalibrate their electronic programs for the signal they are receiving and processing. In the TRAC/FACT system.

S

SA Selective Availability the TRAC/FACT program will be written with as much SA code as possible to allow for similar processors to use different location and communication and actuator control mechanism.

SAA Service Access Area

SAARU Secondary Attitude Air Data Reference Unit

SAE Society of Automotive Engineers to take part in the interfacing of surface transportation intranets like On star, Wing Cast and Tele-aid with the aviation intranet for high security applications and public information and better traffic management as all part of a large machine messaging matrix—the PFN/TRAC System.

SAI AEEC Systems Architecture and Interfaces.

Subcommittee to help determine standards rules regulations codes and law for TRAC/FACT.

SAMS Special Use Airspace Management System SAMS may well be a System to start developing the FACT SB flights zones and bases. The inventor is going to quarry government agencies and the military to locate property and existing bases that are capable of quick conversion for SBs.

SAR Search And Rescue will be changed to have a FACT response officer and crew to respond from FAA/FACT homeland security. Every agency like the FBI, NTSB, Coast Guard/Military etc, area law enforcement will have FACT training and be directly responsive to FACT command control center until released by FACT Homeland Security/ the President of The United States or the Homeland Security Cabinet Member. When no threat to public safety and Homeland Security is satisfied a normal accident investigation team or activity continues the work on the lookout and monitored by a FACT representative and all information transmitted back to FACT center either the individual law enforcement agencies or the joint agency FACT center. Otherwise, SAR is handled the same only with a chain of command, a FACT trained commander in the field who is trained in FACT procedures and protocols from SAR as well and makes the call that it is safe enough for normal SAR personnel to proceed or whether there is a greater risk-more Terrorist activities etc. The air pursuit assist teams will have air cav helicopter teams with EMTs SWAT assault teams and CDC and HAZMAT skilled teams regionally scrambled by FACT control center. These personnel are recruited from the best in their specific areas and trained in FACT procedures and protocols. To start the program Air National guard in all the respective services can set up the aircraft teams. SWAT teams should have Police and, Military skill with trained psychiatrists and emergency medical people. Each regional area should have in triplicate people speaking every language known to man on pagers for a second wave helicopter to transport a FACT trained translator to tem up with the specialists. If people are not available translation programs on palmtops and lap tops with voice recognition technology should be available and this automation should be available a soon as possible.

SARPS Standards And Recommended Practices will be set up for TRAC/FACT technology and it's use. Much of the basics are covered in this patent white paper filing. TRAC the machine-messaging matrix is well documented through out the writings and skilled personnel can finalize applications of the technology to best suit the incident and their understanding of the job they perform. Additionally bomb squad robots and other robotics devices can be FACT approved or configured and interfaced to be part of any early SAR response entering high heat/high risk and dangerous environments and performing robotics rescue. Along with K-9 teams special personal PFN/TRAC units can be out fitted with the Nose, a sensor that sniffs at 2000 times that of a human being and is able to detect molecular structure. Equipped with an electronic library of odors this sensor on all SAR FACT people personal PFNS can record orders matched to accurate GPS coordinates at the event site all the time they are working and supply these detailed telemetries back to the FACT center on a calibrated map of the debris field or landing zone for analysis. Additionally the software running in the personnel PFNS can be set to FLAG dangerous odors or odors to help locate passengers or crews.

Finally as a standard recommended action from the inventor is that all second response teams to a second FACT incident should be listening to FACT central and their regional center where assigned staff is monitoring the first FACT event and issuing hazard bulletins in real-time to counter for any planned multiple attack like 9/11, or future event out of a present attack-like a secondary explosive device. The FAA did well to halt all flights with the management technology available 911. Hopefully, with a more responsive technology like TRAC in place to perform accountable real-time robotics and remote control we can continue to have the best response possible to save as many lives in the aircraft and on the surface for such future heinous acts. Emergency bulletins from FACT central of this nature should interrupted communication links with a real-time buffer in each personal PFN receiving all local communications and continuing local communications immediately after the critical central announcements. These announcements should be as short as possible—basically clear the area commands.

The many organizations and agencies and the general public in each society will help create the SARPS standards and roles everyone will be involved in for a FACT event and to use the PFN/TRAC System. This document is to detail this technology's architecture as a machine-messaging matrix of accountable robotics and remote control. TRAC is created to help humanity provide a safer existence, through the intelligent and authorized use of equipment vehicles and machines. It is designed for the long social learning curve and short life span we humans have on this wonderful spinning hydrosphere. Hopefully, for all us trying, we can travel, live and learn with each other peacefully and respectfully for a full 100 yrs each. It will require Peace, tranquility and accommodation for our differences as well as the intelligent use of our technology and the world's resources. TRAC addresses these important issues and helps organizes them respectfully for our learning humanity on a global scale with the least amount of individual anxiety and social and cultural turmoil. It manages humanities different needs, time and communication as a critically conscious part in all of humanity's technology.

SAS Situational Awareness for Safety SAS will be written and structured for FACT.

SAT Static Air Temperature is the total air temperature corrected for the Mach effect. Increases in airspeed cause probe temperature to rise, presenting erroneous information. SAT is the outside air temperature if the aircraft could be brought to a stop before measuring temperatures. SAT algorithms will be used in the subsystems for measuring air temperature or run in the TRAC/FACT ASIC receiving direct input data from a sensor experiencing MACH air resistance.

SATCOM Satellite Communication System will be integrated for TRAC communication and location of FACT flights globally.

SB Service Bulletin for TRAC/FACT require specific encoding encrypted that has to be scanned and handled by FACT equipment and personnel with proper repair security team dispatched for any physical repairs.

SBE Single Bit Error—a certain amount of fuzzy logic or error correction will be in the FACT software, however the error in encrypted commands will not allow for any error of the slightest and is to be worked out and tested extensively before approved and placed in service.

SC-186 RTCA Special Committee 186 (Responsible for ADS-B technical standards) all surveillance systems radio and radar standards to be applied and augment for FACT application by any standards effort operating or effected commercial interests and government agencies to FAA/FACT homeland Security.

SCAT Special Category in first generation systems there will be a lot of SCAT and I mean literally as well as special category TRAC/FACT configurations. The SCAT trail to TRAC/FACT ready aircraft will need some cleaning up as time goes on with universal consolidation and integration in future aircraft automation and avionics and further retrofitting. But anything that flies has to be approved into a FACT category so that the FAA/FACT command control system has the most control of the aircraft possible during a FACT event. I imagine the SCAT trail to be loaded in these early days with the scramble to interface disparate systems, so I suggest an on going alphabetical FAA/FACT access web site with a firewall and secure registration to include individual ID level to access a share ware program of hardware and soft ware with open lines of contact communications between manufacturers to upgrade legacy aircraft with what ever it takes to FACT ready planes in the US Skies. Government should fund and industry compensated reasonably for this collaborative effort with respect to cast loss and profit for any such system update. For this to happen it requires all to give a little but not to get hurt even profit in the expanding economy.

SCAT 1 Special Category 1 (approach)

SCD Specification Control Drawing

SCDU Satellite Control Data Unit

SCID Software Configuration Index Drawing The 4 above lines are all SCAT activities and must meet final FACT approval. OEMs avionics manufacturers can take any approach they feel will work for them—there should be a FAA/FACT assist board but not one to approve every step. The manufacturers must build it to be TRAC/FACT ready, and not just by this document but what is determined to be the FACT standard, which might well change from time to time. Additionally the 4 above lines are part of an ongoing process of development and deployment of TRAC/FAC technology but the crucial steps are the initial ones everyone will know the process for FACT approved components and systems when the organizational structure is in place.

SCIU Radio Altimeter Indicator Data transduced and SUC to TRACFACT management system.

SCMU Special Communications Management Unit will be exactly what each PFN/TRAC system will be and especially when operating FACT Event Software. However any electronic control units should be appraised for the their conversion to be a PFN/TRAC/FACT unit and augmented and upgraded to be interfaced as COTS into the system.

SCPC Single Carrier Per Channel all radio modalities will be approved for TRAC/FACT protocols and be SUC to TRAC/FACT.

SCS Single Channel Simplex. A communication system that uses simplex. All radio modalities will be approved for TRAC/FACT protocols and be SUC to TRAC/FACT—in this case with a simplex interface.

SCSI Small Computer System Interface SCSI will be security protected for interface at the secure levels of FACT data and tracked in a standard IP modality for general new access not just stored on local hard drives but sent as system reported inventory to FACT buffers or mass data handling and storage with time and date ESN or any other S/N and personal ID at the time of interface and/or access and use. There may be DES/DET configurations or other FACT security protocols used with SCSI interfaces, serial, parallel or USB or fire wire interfaces or protocols. The most important is the security and the firewall to sensitive TRAC/FACT data systems the hardware and software can start with present COTS systems as much as possible and be made more universal consolidated and integrated.

SCU Signal Conditioning Unit

SD (1) Side Display (2) Storm Detection. It is the designation for the hourly transmitter radar observations from the NWS and ARTCC radars. Individual SDOs are combined and transmitted once an hour as collectives (SDUOs) over the aviation Teletype circuits. All data related to flying conditions to be provided for robotics FACT controllers and RC landing stations in electronic format.

SDD Standard Disk Drive

SDI Source Destination Identifier on all transmissions for TRAC/FACT transmission and command codes as part of the software command structure.

SDM Speaker Drive Module SUC to TRAC/FACT systems.

SDRL Supplier Data Requirements List to be determined for TRAC/FACT components and system as a result of evaluating goals and this list.

SDU Satellite Data Unit

Search In this mode, the DMS scans from 0 mile to the outer range for a reply pulse pair after transmitting an interrogation pulse pair. TRAC/FACT System will provide any recovery and rescue vehicle or aircraft a calibrated GPS/Rf triangulation calibrated map pinpointing last known and/or most recent transmissions on a monitor to lay in the debris monitoring sensors reply pulse and conversely this image is to be transmitted to FACT control central. Sensors for toxic substances, radiation, poison bio toxins HAZMAT are to identify objects and be marked on rescuers maps and central command monitors.

SEC Secondary

SED Secondary EICAS Display videoed and recorded and reported by TRAC/FACT system with possible course of actions from monitoring and management program.

SEI Standby Engineer Indicator

SEL Select

SELCAL Selective Calling System. A system used in conjunction with HF and VHF communication systems that allow a ground-based radio operator to call a single aircraft or group of aircraft without the aircraft personnel monitoring the ground station radio frequency.

Sensitivity Level Command An instruction given to the TCAS equipment for control of its threat volume. All such above communication links for coordinated ground movement must have a recording in the aircraft TRAC unit and in the surface control system and during a FACT event data delivered in electronic medium for the TRAC/FACT processor to control the aircraft—additionally and as soon as possible any voice transmission should be run through voice recognition technology for the TRAC/FACT unit to evaluate and respond as appropriate and confirmable to detect a FACT event and to perform robotics control.

SEPC Secondary Electrical Power Contactor monitor and manage by TRAC/FACT systems as determined appropriate.

SEPP Stress Evaluation Prediction Program For TRAC/FACT components to be determined and implemented—and for people performing FACT operations. There is to be software algorithms to read voice and sense other indications for all types of physical states that might less or be indicative of a FACT event or unsafe operating performance for all jobs.

SERNO Serial Number to accompany all transmissions for the aircraft and a header of equipment serno inventoried as safely possible for data handling of crucial commands.

SEU (1) Single Event Upset Flag for TRAC.FACT program (2) Seat Electronics Unit

SFE Supplier Furnished Equipment

SG Signal Generator SUC to FACT

SGPNS Enhanced Ground Proximity Warning System used in robotics Taxiing by FACT.

SI (1) Standby Instruments (2) Supporting Interrogator

SICAS Secondary Surveillance Radar Improvements and Collision Avoidance System

SICASP Secondary Surveillance Radar Improvements and Collision Avoidance System Panel the three radar components to deliver flight data to TRA/FACT processor for robotics flight and RC stations.

SID Standard Instrument Departure to be used as applicable for future robotics for TRAC flying.

Sidetone The reproduction of sounds in a headset (or speaker) from the transmitter of the same communication set. This allows a person to hear his/her own voice when transmitting.

SIF Standard Interchange Format used as applicable and not demeaning FACT security.

SIGMETS Significant Meteorological Observations to be transduced in real-time for TRAC robotics flights and landings.

SIL (1) Systems Integration Lab to determine the beset sub system integration for COTS to create FACT and consolidate it to a ASIC or SOC on a chip.

(2) Service Information Letter special handling for TRAC/FACT service paper work.

Simplex A communication operation that uses only a single channel for transmit and receive operations. Communications can take place in only one direction at a time. No matter how limited a RF system appears it is to be evaluated for TRAC/FACT monitoring interfacing and management via universal PFN/TRAC units and their Radio scanner process. As for aviation the simplex communication links for markers and beacons should be augmented with more comprehensive PFN/TRAC units able to receive ded return broad cast from overhead aircraft of packetized data and store the data in local buffers and retransmit them to a IP gateway or connect to land lines and transmit the data back to FAA/FACT command control center.

SIP Single In-line Package used as needed.

SITA Societe Internationale de Telecommunications Aeronautiques This organization to be involved in setting up the area TRAC/FACT systems and developing standards in it's region.

SIU Skywave Satellite Interface Unit employed as needed. A radio wave that is reflected by the ionosphere. Depending upon the state of the ionosphere, the reflected radio wave may propagate along the layer of the ionosphere or be reflected at some angle. It is also known as ionospheric or indirect wave. SW/sky wave will be monitored and utilized as needed and as relevant to maintaining communication with FACT aircraft.

SL Sensitivity Level

S/L Sub-Level

Slant Range The line-of-sight distance from the aircraft to a DME ground station. Data linked to TRAC/FACT robotics and RC f&l.

SLEP Service Life Extension Program

SLM Standard Length Message packaged for best speed and accuracy on the most favorable frequencies for RC in the ded RF for TRAC/FACT RF system.

SLS Side-Lobe Suppression. A system that prevents a transponder from replying to the side-lobe interrogations of the SSR. Replying to side-lobe interrogations would supply false replies to the ATC ground station and obscure the aircraft location SLS employed in TRAC/FACT for the most accurate Tracking signal the aircraft can provide to the surface system, additional back up via other tracking provided to the surface FAA/FACT command control center and additionally all beacons must be TRAC/FACT protected from in flight deactivation.

SLV Sync Lock Valve

SMC System Management and Communication SMC is the PFN/TRAC system.

SMD Surface Mount Device used as needed.

SMGCS Surface Movement Guidance and Control Systems For ground robotics and collision avoidance and coordination with aircraft landing in a controlled fashion and uncontrolled fashion—all telemetry entered in to the TRAC/FACT system and presented in a usable form for humans and machines to coordinate the best interaction for public safety and smooth operation in general movement.

SMI Standard Message Identifiers and FACT encrypted Identifiers

SMR Surface Movement Radar interfaced with the TRAC/FACT process or processor as available.

SMSO Space and Missile Systems Organization to review FACT protocols to terminate a FACT flight by air-to-air and surface to air and satellite to air missile attack. Additionally, to research the strategic capability to partially disable an aircraft and semi control a crash landing in a safe zone. And finally to plant with an adhesive or puncture clamp device a wireless PFN/TRAC unit to reestablish FACT surface control where original wireless units interfaced have been damaged or compromised.

SMT (1) Aileron/Rudder Servo Mount (2) Elevator Servo Mount (3) Servo Mount (4) Stabilizer Trim Servo Mount The 4 above lines for servo controls and their mounts are to be protected for TRAC/FACT operations and inspected by FACT approved tech teams.

(5) Station Management—will be determined for a TAC/FACT FAA/FACT control center with a chain of command and an odd number of people in any decision tree. Decisions will be pre conditioned and timed for efficiency—each local station will have a similar structure. For RF station management SMT the TRAC/FACT processor will control all sub systems in the first generation and always manage all communications on board.

SNR Signal-to-Noise Ratio will be a determining factor for the RF options carried out by the sophisticated scan function of the TRAC processor or first generation drafted RF automated tuning equipment from existing COTS in aircraft. Normally there will be a number of dedicated FACT frequencies for the system to robotically and RC fly and land the aircraft. However the TRAC FACT protocol calls for the complete control over wireless communications at all time on board the aircraft with the capability to FACT contact the surface FAA/FACT center via any usable frequency and protocol for all devices on board. Understandably this requirement may be 6 months to a year in the construction and 24–30 months before all carryon devices are interfaced. It should and will be done for regular flight safety with normal wireless communication management concerns and an absolute must if we are prepared to smoke an aircraft carry our fellow citizens to protect others on the surface. This wireless interfacing exists for surface transportation to control driver distraction and to operate collision avoidance systems as an operational aid to the driver for PFN/TRAC technology in cars. So if the phones are to have a wireless connection to our operational programs in our cars the PFNTRAC units in the planes should also control them.

SOIT Satellite Operational Implementation Team should have FACT security checks.

SOP Standard Operating Procedure There will be standard operational procedures and they should start with security as the first step of implementation to any Operating procedure for FACT.

SOS Silicon On Sapphire

SPATE Special Purpose Automatic Test Equipment all FACT TEST equipment will be SPATE an have to be logged in and out and keep a record of it's use and handling locally and be capable of reporting this and it's data directly to TRAC/FACT mass data handling and storage. As part of FACT secure handling the system will quarry the ID's of the tech handler and the ESN of the unit and have a special a special self test for integrity check with FACT encryption—Inventor to provide an additional security element to the encryption security as a trade secrete when the proper time comes.

SPC Statistical Process Control—in every local command and control center a guardian FACT software program will run parallel at a manned station based on all the technical data recovered in real time. It will be running software scenarios and providing probabilities and tradeoffs as well as decision trees with count down markers for decisions and new scenarios until the event is concluded. This is from all levels ACARS—Air born—landing and ground response for as long as it takes. It might be decided that there should be an Air Commander a different surface commander or there might be a need to change personnel due to fatigue or some other reason.

Additionally all real-time recorded data will be processed for statistics and to create an electrical library for better options from past experience and to create virtual FACT events for practice and guardian programs.

SPD Speed always monitored and factored by TRAC/FACT for danger and deviation.

SPE Seller Purchased Equipment As part of the FACT program in the PFN/TRAC System there will be a national registry in which all manufacturers register their products and provide a hardware or software component that provides a ESN and lot No or Vin when interfaced with the TRAC processor. An inventory program on system boot up or as a periodic procedure—still to be determined for aircraft—probably every pre-take off check) quarries all interfaced E/E systems to include passenger carryon devices equipped with DSRC (blue tooth etc). Equipment removed is time and dated by the system and it s recorded and reported to FACT central registry. When any thing is added the same process takes place. This allows for the immediate recognition of stolen equipment and illegal use of that property in another aircraft, vehicle or equipment. It was designed to stop parts theft in automobiles and vehicle thefts as well. Also with sensors on removable mechanical parts the system asks for the service personnel's ID and the LOT and S/N for the new part in stalled. If there is a crash the entire equipment inventory is down loaded to FAA/FACT control center (with NTSB/FBI and all other proper homeland security having the data in real-time) the statistical algorithms is going to kick out hi probability commonalities with all the current data concentrated in the appropriate agencies and manufactures immediately.

Equally important is the FACT registry was designed for national security. It tracks all electrical components and provides for a nations security forces to implant their legitimate code identifiers to thwart the possibility of any wireless device being used in remote control sabotage of a piece of equipment. This system and process is discussed in surface transportation systems in earlier filings. Some of the crucial implementations are deliberately kept as a trade secret at this point.

Speed of Represented by the symbol c and has a value of Light 2.9979250×10 meters/second or 983,571,194 feet/second.

SPI Special Position Identification will be issued for each FACT triggered event in FAA/FACT command center on a calibrated map with the immediate download of flight telemetry data and robotics flight and local control lock out. Stations monitored, like a NASSA control with trained FACT mission staff, are scrambled from their recreational ready room next to the command center.

SPIP Designation for a transponder ident pulse.

SPKR Speaker

SPM (1) Surface Position Monitor reported to FACT control center with all critical signal data in a useable format for the TRAC processor for FACT robotics programming to factor.

(2) Stabilizer Position Modules protected and interfaced with TRAC/FACT system for robotics flight and RC landings.

Spoking Spoking refers to a display presentation that radiates outward from the display origin like the spokes on a wagon wheel. All displays to be videoed in the FACT control centers and in the FACT event aircraft with their data in an electrical digital form for the FACT software programs to process. Data to be recorded in both locations as it is transmitted and received and as it is reconfigured (error corrected and consistent).

SPR Sync Phase Reversal (term used in Mode S transponders) This transponder may be capable of the DATA link and FACT upload telemetry. If SPR can help protect critical flight data exchange for robotics augmentation in flight via small packetized commands or as a confirm signal given over other dedicated frequencies it should be set up with the proper encryption and special recognition technology to function for these applications.

SPS Standard Positioning Service all such data generated to be incorporated in the TRAC/FACT system.

SQ or Sql Squelch auto squelch and RF signal fix control and monitor and management to be performed SUC to TRAC/FACT operation.

Squall Line A squall line is a line of thunderstorms and developing thunderstorms. Read by forward searching radar, Doppler, ground and satellite systems and data provided in a concise confirmed format for robotics flight and RC landing by TRAC and FACT programming.

Squawk Reply to interrogation signal (XPD). Prepared in a protocols usable by TRAC/FACT programming and recorded and timed on location for FACT record Squelch A control and/or circuit that reduces the gain in response of a receiver. The squelch is used to eliminate the output noise of the receiver when a signal is not being received. Auto controlled by TRAC management or interfaced sub-system.

Squitter (1) The random pulse pairs generated by the ground station as a filler signal.

(2) The transmission of a specified reply format at a minimum rate without the need to be interrogated (filler pulses transmitted between interrogations).

[XPD]. Used as needed in any system to maintain the optimal tracking of the aircraft during the FACT event (3) Spontaneous Transmission generated once per second by transponders.

SR SwissAir to set up their TRAC/FACT System as applicable if they return.

SRADD Software Requirements And Design Description to be constructed form this paper for the TRAC System and FACT protocols.

SRAM Static Random Access Memory used as needed to construct TRAC/FACT system for each application as per COTS available.

SRD Systems Requirements Document to be generated individually for model and series of aircraft and for custom and home built aircraft. First SRD submitted by OEM manufacturers for all commercial production aircraft to develop their own automated local control locks out and summit SRD to FAA/FACT homeland security for review. The second SRD submitted is for a processor system either from adaptive autopilot or flight controller or flight computer units with automated controls to control the flight surfaces un-interrupted locally. The controller must use onboard location sensing and guidance equipment that is protected locally from in flight tampering and factor the positioning data via one of five robotics or preprogrammed flight plans running in the protected controller. The flight plans conduct the aircraft along FAA/FACT determined safe traceable routes to 5 Safe Bases/controlled crash Zones for the proper surface response and most complete possible response.

The system information and design via FAA/FACT secure handling is to be properly made available and priced feasibly for all legally registered aircraft to be equipped properly and cleared to fly in US airspace under TRAC/FACT conditions. The first TRAC/FACT condition that must be met by all aircraft is:

Deviation=complete robotics SB/Z flights without local control

If the aircraft can via proper communications and data recovered from the FACT event aircraft and TRAC/FACT tracking systems via communications to surface convince FAA/FACT command and control there is good reason for the deviation. Then the controls of the aircraft should be returned with flight instructions given to return to original heading or alternate approved course to the registered destination or approved new destination if FAA/FACT acceptable.

With communications established with the troubled FACT Event aircraft and suspicion still high pursuit assist fighters ASAP along the robotics flight path will escort the aircraft. The fighters as determined appropriate can place the suspect aircraft on a missile laser lock and the same is done from the ground with missiles or phalanx machine cannon with discernable different audible sounds provided to the FACT event Pilot via TRAC/FACT communications with the air craft communication signal broadcasted from a functional antenna location away from bunker protected surface personnel at the SB. Any hostile action from the aircraft can result in the immediate wasting of the FACT event aircraft or some real-time disable measure discussed through out the technology filings. One such system employs laser light (possibly when locked on the FACT target) can transmit RC control signals to the FACT vehicle or in this case air craft and shut down motors off or cut their power settings or perform other RC flight controls if radio controls are non functional.

With this FACT command control capability in place when over the Safe Base/crash zone in as much as a glide path to land the robotics, preprogrammed or RC FACT Event aircraft A FACT command can return the flight controls (so long as they can be re locked to the FACT Event pilot to land on the extra-extra long and large runway if this proves to be advantageous, feasible and prudent for a minimal robotics/RC controllable FACT flight—SB airfields fully fire and EMT equipped will additionally a have protected access tunnel way with sealed accessible ceiling for SWAT and EMT teams to approach the FACT flight when on the surface—The tunnel to have blinking light and audio tone at the closest tunnel access to the plane—video monitors in the tunnel with images from video cameras from PFN/TRAC/FACT units along the runway. FACT control center has all the images and the images most relevant to first board or deployed surface support.—Robtics Tillies or hi lifts to bag the air craft if contaminated and protected atmosphere systems for the bag and direct connect to aircraft cabin atmosphere with sensor system and compressed contaminant for atmosphere extracted from the aircraft. Additionally, protective gear for any first board individuals. Full complement of weapons and training for the first team in.

Note: this is a minimal system that can be accomplished by protection and programming of present aircraft relatively fast considering the nature of the threat and enormity of the change in aircraft control and TRUST in flight management from human to machine.

As stated by the inventor for PFN/TRAC car jack security systems; there are no real good options to very bad acts that misguided people want to do. However, the first goal is to limit the time and space the intentionally deviant event takes place. This is hard, to do with people in a free society. More possible for the immediate future is to better manage our machines and technology. These first robotics and local control lock outs save more lives on the ground during a suicide hijacking and provide more time, better places to land/control a crash with generally more options for the people in the aircraft. Perfect solutions for imperfect behaviors are tough, and even tougher to do rapidly. The TRAC/FACT System/process is a good progression to grow accountable Machine/Human management of our technology during these extremely dangerous human situations.

Obviously SRDs will continue to be issued for new systems and technology updates for legacy aircraft in an ongoing process to provide fully controlled robotics and RC landings for every aircraft. And not just at SBs, but also at any airport a pilot is experiencing difficulty in landing their aircraft. The point here being—you have to get the system and process in place and the PFN/TRAC/FACT System is architecture to organize and progressively accomplish that. And not just in aviation but also in all of transportation and machine use via The PFN/TRAC System machine messaging matrix.

SR Service Request Special security protocol for TRAC/FACT System and components.

SRU Shop Replaceable Unit much modular and component repairs tracked electronically through the TRAC/FACT system of registries will be done.

SSB Single Sideband. An AM signal that has a reduced carrier, with the power applied to a single sideband. Since the bandwidth of the information-carrying signal is reduced, a better signal-to-noise ratio is obtained at the receiver. This physical characteristic will be appraised for the application of data or communication desired in a TRAC/FACT communication link application by FAA/FCC security agencies and standards efforts to determine ded regular communications. Additionally the multi-translation protocol ASIC in the TRAC system will pre pare data in appropriate data packets for the physical characteristic of any frequency and receiver system it is transmitting to via FACT communication software.

SSCVR Solid State Cockpit Voice Recorder to be interfaced with the TRAC/FACT System and time and date synchronized.

SSEC Static Source Error Correction data to be factored by TRAC/FACT when available.

SSFDR Solid State Flight Data Recorder incorporated and interfaced with the TRAC/FACT system.

SSM Sign Status Matrix

SSR Secondary Surveillance Radar. A radar-type system that requires a transponder to transmit a reply signal. Used as needed by TRAC/FACT robotics and RC flight programs.

SSSC Single Sideband Suppressed Carrier. A SSSC signal is a band of audio intelligence frequencies that have been translated to a band of radio frequencies without distortion of the intelligence signal. Used as beneficial to the TRAC/FACT system communication link.

SSU Subsequent Signal Unit

STA Station the 2 lines above to be used as needed to complete the development interfacing and implementation for the TRAC/FACT system.

STAB Stabilizer automated for TRAC/FACT

Standard Atmosphere Represents the mean or average properties of the atmosphere. At sea level static pressure is 29.92 InHg and temperature is +15° C.

Standby Mode A DME mode that applies power to the DME RT but the unit does not transmit.

STAR Standard Terminal Arrival Routes

STARS Standard Terminal Automation Replacement System

Static Ports Flush-mounted openings in the skin of the aircraft fuselage used to sense static pressure.

Static Ambient atmospheric pressure or static pressure is pressure the force per unit area exerted by the air on the surface of a body at rest relative to the air. The 2 above terms—data recovered for external air pressure via sensing to be used by the TRAC/FACT processor as needed.

Static Ram constructed of bi-stable transistor elements. Memory cells do not require refreshing (see "Dynamic RAM").

Static Source Error (SSEC) A correction applied to static source pressure measurements to partly or completely correct for pressure errors, which are caused by airflow changes. It is computed as a function of Mach and altitude based on measured errors for a particular static system, a software algorithm in TRAC/FACT processor to account for this.

STBY Standby

STC (1) Sensitivity Time Control. A control circuit used in radar applications to control receiver gain with respect to time. SUC or sub system to supply data to TRAC/FACT system.

(2) Supplemental Type Certificate

STCA Short Term conflict Alert all alert or collision avoidance data is to be provided in useable input data to the TRAC/FACT robotics and RC flights programs and control stations.

STCM Stabilizer Trim Control Module to be SUC to TRAC/FACT control

STD Standard

STP Standard Temperature and Pressure

STS Stable Time Subfield

STVS Small Tower Voice Switch

SUA Special Use Airspace there is to be declared SUA routes and zones to and around safe bases for TRAC/FACT operations.

SUL Yaw Damper Actuator SUC and responsive in FACT robotics flights.

SUO (1) Aileron/Elevator/Rudder Servo (2) Servo Actuator the above 2 lines to be made an intricate part of the Robotics control of an aircraft during a FACT event with the controls and components protected.

Super-heterodyne Receiver A receiver in which the incoming RF signal is mixed to produce a lower intermediate frequency, to be used as applicable to provide enough frequency for the data transfer by isolated channels in a TRAC/FACT application.

Suppressor A pulse used to disable L-band avionics during the pulse transmitting period of another piece of L-band airborne equipment. It prevents the other avionics aboard the aircraft from being damaged or interfered with by the transmission and any noise associated with that transmission the coordination of conflicting transmission equipment on board the aircraft alleviated by having and automated preprogrammed component in TRAC/FACT that quarries for other L-band airborne equipment. And provides a suppressor pulse or times equipment use.

SUT (1) Auto throttle Servo a component protected for FACT control robotics flying and RC landing when available and installed when not.

(2) Stabilizer Trim Servo same as above protected and SUC for TRAC/FACT.

SV Space Vehicle to have PFN/TRAC units.

SVC Service special security protocols for TRAC/FACT systems and components.

SVO Servo protected and SUC to TRAC processor and FACT protocols

SVT Servo Throttle used in the FACT robotics flights and landings

SVU Satellite Voice Unit

S/W Software

SYS System the 3 lines above applicable to TRAC/FACT technology and detailed though out the filings.

T

TA Traffic Advisory issued by TRAC/FACT system and each unit will be able to compare geographic position and elevation to be responsive in real-time to relevant TA information.

TAC (1) Test Access Control the test port on all TRAC/FACT equipment are ID access sensitive and protected against tampering or disturbing crucial connected TRAC/FACT components.

(2) Thrust Asymmetry Compensation SUC to FACT robotics flights.

TACAN Tactical Air Navigation System Provides azimuth and distance information to an aircraft from a fixed ground station (as opposed to DME providing only distance information). This data to be used by TRAC/FACT programming in robotics flight and landing and software code written to use the data in concert with other location and position and speed data source systems.

Tach Tachometer

TACIU Test Access Control Interface Unit a special connection and ID access process must be provided for any TACIU to be used and recognized by TRAC/FACT units and components as part of the security protocol in place in FACT protected avionics.

TAG AEEC Technical Advisory Group to aid in the development and use of TRAC/FACT technology and Protocols.

TAI Thermal Anti-Icing data sensed conditions data provided in usable form for FACT robotics flight programming to deploy proper counter measures.

Target An aircraft within the surveillance range of TCAS reported to TRAC/FACT command control and the TRAC/FACT unit on board with robotics being SUC to surface RC station controls—control to be determined by individual aircraft and conditions.

TAS True Airspeed always converted for accuracy and compared with surface calculations via GPS and any or all speed sensing technology available on the aircraft and on the surface.

TAT (1) Total Air Temperature. The air temperature, including heat, rise due to compressibility. To be equated and compensated for via surface upload data and recalibration software algorithm in the TRAC/FACT processor or sub-systems integrated in the earlier generations.

(2) True Air Temperature determined as above in the same manner recalibration software and protected temperature sensors.

TATCA Terminal Air Traffic Control Automation to be SUC to TRAC/FACT command and control during FACT event and interfaced with TRAC/FACT monitoring system to search for FACT Event flags.

TAU TAU is the minimum time a flight crew needs to discern a collision threat and take evasive action. It represents the performance envelope (speed and path of aircraft) divided by the closure rate of any intruder aircraft (TCAS). TAU greatly reduced with direct data fed to both aircraft TRAC/FACT systems and aircraft diverted from each other in plenty of time as they are in continual contact and electronically aware of their relative positions robotics flight can control or shared coordinated controls with dual human and machine control either airborne or from the surface.

TBB Transfer Bus Breaker

TBD To Be Determined a great deal of TRAC/FACT system configurations and protocols by OEMS avionics Manufacturers standards groups, Nations government agencies and the public.

TBS To Be Supplied

TC Type Certificate

TCA Terminal Control Area there is to be a special Control area to be set up a way from the Terminal with high security protocols and personnel to physically handle TRAC events not yet air borne TCAS Traffic Alert Collision Avoidance System interfaced into the TRAC/FACT system.

TCAS I A baseline system that provides a warning (TA) to the flight crew of the presence of another aircraft (potential collision threat) within the surveillance area. No avoidance maneuver is suggested. interfaced into the TRAC/FACT system.

TCAS II A collision avoidance system providing traffic information (within approximately 30 nmi of the aircraft) to the flight crew, in addition to the resolution advisories (RA) (for vertical maneuvers only). A TCAS II equipped aircraft will coordinate with TCAS II equipped intruder aircraft to provide complementary maneuvers. interfaced into the TRAC/FACT system.

TCC Turbine Case Cooling

TCCC Tower Control Computer Complex interfaced into the TRAC/FACT system.

TCM Technical Coordination Meeting

TCS Touch Control Steering interfaced into the TRAC/FACT system with local control eliminated.

TCXO Temperature Controlled Crystal Oscillator

TDLS Tower Data Link System interfaced into the TRAC/FACT system.

TDM In the Time Division Multiplex Systems a common carrier is shared to transmit multiple messages (to multiple receivers) by time-sharing the carrier between the message sources. interfaced into the TRAC/FACT system.

TDMA Time Division Multiplex Access. When multiple transmitters are using a single carrier to transmit to a single receiver, the carrier is time shared between each of the transmitters, so the multiple messages are not garbled at the receiver. interfaced into the TRAC/FACT system.

TDOP Time Dilution of Precision. A term used to describe the error introduced by variances in the calculated time.

TDR Transponder interfaced into the TRAC/FACT system

TEC Thermo-Electric Cooler

TEI Text Element Identifiers interfaced into the TRAC/FACT system.

TEMP Temperature

Temperature A sensor protruding into the air stream to sense air.

Probe temperature. Requires correction to get static air temperature. interfaced into the TRAC/FACT system.

TERPS Terminal Instrument Procedures interfaced into the TRAC/FACT system.

TF1 RTCA Task Force One, GNSS Transition and Implementation Strategy interfaced into the TRAC/FACT system.

TF2 RTCA Task Force Two, Transition to Digital Communications

TF3 RTCA Task Force Three, Free Flight Implementation interfaced into the TRAC/FACT system.

TFM Traffic Flow Management interfaced into the TRAC/FACT system.

TFM-ART TFM Architecture and Requirements Team interfaced into the TRAC/FACT system.

TFT Thin Film Transistor

TG Transmission Gate

TGC Turbulence Gain Control interfaced into the TRAC/FACT system.

Threat A target that has satisfied the threat detection logic and thus requires a traffic or resolution advisor y interfaced into the TRAC/FACT system (TCAS).

TIS Traffic Information Service interfaced into the TRAC/FACT system.

TK Track Angle interfaced into the TRAC/FACT system.

TKE Track Angle Error

T/L Top-Level

TLA Thrust Lever Angle interfaced into the TRAC/FACT system.

TLM Telemetry Word interfaced into the TRAC/FACT system.

TLS Target Level of Safety interfaced into the TRAC/FACT system.

TMA Terminal Airspace For SBs TRAC/FACT protected.

TMAC TFM Modeling and Analysis Capability.

TMC (1) Thrust Management Computer TRAC/FACT interfaced.

(2) RTCA Technical Management Committee For TRAC/FACT implementation in every commercial company and government agency.

TMCF Thrust Management Computer Function FACT programmed.

TMCS Thrust Management Computer System interfaced into the TRAC/FACT system.

TMS Thrust Management System interfaced into the TRAC/FACT system.

TMU Traffic Management Unit interfaced into the TRAC/FACT system.

TO Take Off

TOC (1) Top of Climb (2) Traffic Operations Center interfaced into the TRAC/FACT system.

(3) Transfer of Communication interfaced into the TRAC/FACT system.

TOD Top Of Descent

TO/FROM Indicates whether the omni bearing selected is the Indicator course to or from the VOR ground station.

TOGA Take-Off, Go-Around. Also seen as TO/GA. interfaced into the TRAC/FACT system.

TOR Terms of Reference

Touchdown The point at which the predetermined glide path interfaced into the TRAC/FACT system intercepts the runway.

TOW Time Of Week

TP Telecommunications Processor interfaced into the TRAC/FACT system.

TPMU Tire Pressure Monitor Unit

TPR Transponder interfaced into the TRAC/FACT system.

TR Temporary Revision. A document printed on yellow paper that temporarily amends a page or pages of a component maintenance manual.

T/R (1) Thrust Reversers interfaced into the TRAC/FACT system.

(2) Transceiver (see RT)

(3) Receiver-Transmitter

TRA Temporary Reserved Airspace interfaced into the TRAC/FACT system.

TRAC Terminal Radar Approach Control interfaced into the TRAC/FACT system.

Track (1) The actual path, over the ground, traveled by an aircraft (navigation).

(2) In this mode the DME transmits a reduced pulse pair rate after acquiring lock-on (DME).

(3) Estimated position and velocity of a single aircraft based on correlated surveillance data reports (TCAS). interfaced into the TRAC/FACT system.

TRACON Terminal Radar Approach Control

Proprietary Name for PFN/TRAC System™ processor

TRAC Trusted Remote Activity Controller is the primary protected communication and machine-messaging node in an aircraft. Ultimately, a protected ASIC that performs accountable Robotics flight/landing and interfaces Remote Control commands from a TRAC/FACT command center. The PFN/TRAC unit in the aircraft also interfaces with all wireless communications and can route communications and data from the E/E system of the aircraft via any interfaced RF protocol by a higher level software interface for emergency communication via a Translator scan program running as FACT software in the TRAC processor.

Return to avionics terms

TRACS Test and Repair Control System. An automated data retrieval system. TRACS functions include: 1) provide the location of any given unit at any time; 2) provide an efficient flow of work to and from test stations; 3) provide quick access to quality information generated by the actual testing process (performed by the technician); (4) provide statistical and historical data regarding throughput time for products, failure, yield rates, WIP, etc. TRACS is an excellent system that should be incorporated and augmented to provide FACT security protocols and testing wherever it is in use for all the avionics sub systems interfaced in a TRAC/FACT system.

Traffic Advisory Information given to the pilot pertaining to the position of another aircraft in the immediate vicinity. The information contains no suggested maneuvers. (Traffic advisory airspace is 1200 feet above and below the aircraft and approximately 45 seconds distant with respect to closure speed of the aircraft).

[TCAS] This data provided these systems will be SUC to the TRAC/FACT robotics running in the aircraft and should be used to avoid collision in any robotics flight or RC scenario.

Traffic Density The number of transponder-equipped aircraft within R nautical miles (nmi) of own aircraft, divided by p×(R nmi)½. Transponder-equipped aircraft include Mode-S and ATCRBS Mode A and Mode C, and excludes own aircraft (TCAS). Density air traffic for any SB route crash zone or SB will be determined by these different digital address transponders of area aircraft and TRAC/FACT command and control will clear with standard FAA flight control all unessential aircraft during a FACT event immediately upon an alert.

Transceiver A receiver and transmitter combined in a single unit.

Same as RT. To be SUC to TRAC/FACT unit

Transponder Avionics equipment that returns an identifying coded signal. To be linked with TRAC/FACT system and the TRAC ASIC or sub system interfaced capable of returning coded FACT signal back by other wireless systems interfaced to TRAC/FACT command and control centers on the surface.

TRK Track a major function of the TRAC/FACT monitoring system for flight deviation.

TRP (1) Mode S Transponder all data link capability via transponders or RF/wireless equipment will be interface with the TRAC/FACT processor and scan communication router and be capable to receive packetized data in a protocol they can handle.

(2) ARPA Technology Reinvestment Program

TRR Test Rejection and Repair

TRSB Time Reference Scanning Beam. The international standard for MLS installations. This microwave landing beam should be evaluated for landing applicably equipped aircraft for the guidance on the glide path to the final approach and used in conjunction with the TRAC/FACT robotics software and RC preprogrammed systems to land the FACT event flight absent of local cockpit controls.

TRU Transformer Rectifier Unit uses as needed.

True Airspeed The true velocity of the aircraft through the surrounding air mass. Data provided to the TRAC/FACT processor or the sub systems accurately or for sub routine algorithms to factor for accurate data for the robotics and RC programming.

True Altitude The exact distance above mean sea level (corrected for temperature). Data provided to the TRAC/FACT processor or the sub systems accurately or for sub routine algorithms to factor for accurate data for the robotics and RC programming.

True Bearing The bearing of a ground station with respect to true north. Data provided to the TRAC/FACT processor or the sub systems accurately or for sub routine algorithms to factor for accurate data for the robotics and RC programming.

True North The direction of the North Pole from the observer.

TSA Tail Strike Assembly

TSE Total System Error The TRAC/FACT integrity self test system will provide any system failure/error/or incongruity to be discovered—it will check for backup systems and the entire system is to have redundancy in all critical flight functions with designated compromised system states to Flag the TRAC/FACT system as down with the TRAC unit securing all flight controls. Because of the diversity of equipment these standards of certification will be somewhat flexible. However, no aircraft should fly with out ultimate control from the surface and control locks and communications and controls in working order prior take off.

TSM Autothrottle Servo Mount (without Clutch) this system to be controlled with the TRAC/FACT processor or sub systems SUC to FACT for at least flight and landing.

TSO Technical Standard Order. Every unit built with a TSO nameplate must meet TSO requirements. TSO operating temperature extremes are not the same as the manufacturing burn-in limits. All data is to be recorded and dated in the TRA/FACT processor as critical inventory data as well as any inspections for defects or standard maintenances—this data downloaded to buffers in the TRAC/FACT command and control center to be factored in any event pertaining to the host aircraft.

TTFF Time To First Fix calculated on board unit and reported to FAA/FACT command control/owner/airline and matter of public web presentation as appropriately determined information for monitoring.

TTL Transistor—Transistor Logic all electronics used as applicable.

TTR TCAS II Receiver/Transmitter Interfaced with TRAC/FACT

TTS Time To Station, an indication that displays the amount of time for an aircraft to reach a selected DME ground station while traveling at a constant speed. Obviously this system must be capable of providing data in a usable format for the TRAC/FACT processor or the sub systems SUC to TRAC would process the data for FACT robotics. Probably a system like TTS would be along the FACT safe flights corridors to confirm and control the robotics flight. The exact equipment requirements for the robotics flight might well be a series of ground stations encompassing position data ground to space weather conditions and down loading and up loading to the aircraft from these local markers and the FAA/FACT command control center running a parallel software program to the FACT flight Event underway in the protected adapted auto pilot or PFN/TRAC/FACT processor. Additionally same data to escort assist aircraft and the flight station simulator at the safe base. It becomes a complete team effort with the best real-time control commanding the flight. A combination of preprogrammed flying experience interfaced with real human skill and a speed of transmission algorithm software interface program to make the best real-time flight controls. As the aircraft nears the final SB the flight controls will be at the highest real-time responsiveness and may prove to be the best way to land legacy aircraft with limited avionics other that the mandatory flight controls.

TTY Teletypewriter recorded and interfaced as available for the ultimate communications via the TRAC/FACT system. The software program protocol send an electronic signal to type for TTY must be SUC to FACT programming either if it is running in the TRAC processor or some interface unit or as a sub system already in existence.

TURB Turbulence

Turbulence The US National Weather Service defines light turbulence as areas where wind velocity shifts are 0 to 19 feet per second (0 to 5.79 meters per second) and moderate turbulence as wind velocity shifts of 19 to 35 feet per second (5.79 to 10.67 meters per second). The above two terms. Sensing for turbulence in critical areas for a FACT robotics Flight should have the appropriate sensors in location and the national weather forecasters and FAA/FACT system connected with the all weather reporting satellites. Doppler and radar in and on the surface all should be reporting in route atmospheric conditions as close to the elevation that the FACT flight will be encountering prior to it happening for real-time flight adjustments.

TVBC Turbine Vane and Blade Cooling

TVC Turbine Vane Cooling

TWDL Two Way Data Link to be interfaced as much as possible to the on board TRAC/FACT system and SUC as much as possible to TRAC/FACT processing.

TWIP Terminal Weather Information for Pilots Data available electronically to the TRAC/FACT system to factor best robotics FACT flight from the instant the plane is airborne, this is an on going condition during flight until the aircraft in landed. The terminal pilot data translated to an electrical data stream allow for the aircraft to hot read GPS and other location technology on board and plot the best course with known and projected flying conditions in each individual aircraft. These FACT flights will be immediately cleared by FAA flight control and handed off to FAA/FACT command control with all the proper encoded signals for surface evaluation and concurrence. Basically the TRAC/FACT flight computer is ready to fly the plane in a nanosecond of a FACT event and knows exactly what is around it and what has to do to go to the safe zone as fast as possible.

TWP Technical Work Program Special for all TRAC/FACT components

TWT Traveling Wave Tube

TX Transmit (see XMIT) Fact monitored and controlled.

U

UART Universal Asynchronous Receiver/Transmitter used and SUC to TRAC/FACT system.

UAL United Airlines to be equipped with TRAC/FACT ASAP

UB Utility Bus Interfaced with the TRAC/FACT System, but the TRAC/FACT system has to be able to energize the essential flight and landing control component if the utility bus is compromised. And the processor running FACT robotics has to be protected from the utility bus being tampered with to disable the TRAC program. The processor component if not a PFN/TRAC system unit must have it's own emergency power source to operate the FACT programming and necessary accessories.

UBI Uplink Block Identifier to be encrypted special for FACT protocols.

UCS Uniform Chromaticity Scale

UD User Data. The N-User data may also be transferred between peer network members (OSI Model) as required. The OSI and all interface gateways to be evaluated by system and application for the FACT data transfer for all IP and wireless connections and gateways. A basic security evaluation may be in order and would make all parties more comfortable. However FAA/FACT homeland security cannot be compromised what so ever. For this reason as part of the Homeland security teams affected agency representatives have to be provided with full and complete security clearance over sensitive agency data.

UFDR Universal Flight Data Recorder to be incorporated in to the TRAC/FACT system and/or replaced.

UHF Ultra-High Frequency. The portion of the radio spectrum from 300 MHz to 3 GHz. Interfaced and used as needed with transmission formatted in an encrypted FACT code as used.

ULB Underwater Locator Beacon

ULD Unit Load Device For software or programming to be done by special FACT equipment and/or wirelessly by special FACT transmission. Additionally, special tools and learns as unit load devices to install and access the PFN/TRA/FACT unit and system. Same install and uninstall special modules for software applications.

UMT Universal Mount as much as possible but to be as secure and tamper proof as possible for any TRAC/FACT component, unit or interface.

Unpaired A DME channel without a corresponding VOR or ILS Channel frequency.

Uplink The radio transmission path upward from the earth to the aircraft. To be used in the precision FACT landing with data presented to the program via sub systems in a format useable for the program to factor and send commands to the appropriate actuators to affect a proper landing. This includes activating landing gear servomotors or solenoids on hydraulic systems at the appropriate time for landing.

UPS Uninterruptible Power System all PFN/TRAC Systems units have this quality as a standard component to be a PFN/TRAC unit. However any first generation subsystems interfaced and carrying out FACT programming must have redundant and protected power systems. They are not to be interrupted locally by any means.

USAF United States Air Force or air national guard to deploy members of the crew with pursuit aircraft to be a part of the FAA/FACT command and control process. They will be both the strong arm and the helping hand in the air. They will be scrambled from strategic location and scattered to reach a trouble FACT flight within 12 minutes—7 if a known high security risk and air cover is being flown they will fly escort with an assist RC pilot and they will have full capability to take the FACT EVENT aircraft out if this un thinkable option is the only solution for the maximum of public safety and/or national security. Additionally, as part of the unthinkable, strategically place will SAMS under the FAA/FACT command structure but manned by military (to be DOD determined). A FACT event triggers a ground response from these SAMS/Patriot to track/monitor and lock on. If the FACT flight is on the safe base flight plan they just monitor the flight through their effective range area and this is a continual process to the SB Landing. FACT command has the trigger. The inventor is not trying to state the type of ordinance to be use automated machine cannon or automated anti-aircraft weapons (determined by DOD) Chase assist aircraft to have a transponder recognized by the target selection process in the weapon system to differentiate them from the troubled target FACT Event aircraft.

If appropriate the Air force and military will be participating in the safe flight and landing of the troubled aircraft and in the construction maintenance and operation of the Safe Bases and safe crash zones protected around the Safe Bases. They will also supply much of the personnel to handle special opps in boarding the aircraft as well as the best in police hostage and SWAT teamwork—(to be determined by the best in these areas). Military to also provide expertise in weapon disarming from explosives to people.

The inventor retains a detailed set of writings and figures of the US—showing areas that could be used for safe fly zones and as safe bases to land at—they are not detailed in this paper for a number of reasons. The inventor feels it is not his place to make those statements in a possible public forum—he is willing at the appropriate time to elaborate on his thoughts to the appropriate authorities responsible for public safety and national security.

USB Upper Sideband is the information-carrying band and is the frequency produced by adding the carrier frequency and the modulating frequency. USB RF will be used and formatted with FACT protocols to handle data and ded dedicated as needed.

USGIC U.S.GPS Industry Council will be consulted and take part in determining how to construct there equipment for direct Avionics applications for TRAC/FACT procedures and protocols and to have their locating receivers owned as personal products be interfaced with the on board TRAC/FACT unit via DSRC and any other wireless to be managed while on board an aircraft and used to provide confirming location data. Additionally USGIC to aid in the FACT flight path redundant markers to certify in real-time the validity of a marker that is suppose to have a stationary address as a tamper resistant measure.

USTB Unstabilized to be sensed by TRAC/FACT programming for FACT event recorded and reported with all operating systems reporting for analysis.

UTC Universal Coordinated Time to be used for TRAC/FACT operations and stored on board and in FACT command and control centers as usual.

UUT Unit Under Test will show in a display to qualified and identified FACT team attendants at the units and any station terminal or control panel. System video cameras and infrared sensors and ID programming to quarry the persons present for TRAC/FACT clearance before displaying data. Any tampering will be recorded as needed for tampering snap shot to full video recorded locally and reported to the FACT command and control center for response.

UV Upper Sideband Voice all radio systems evaluated formatted and SUC to FACT management.

UW Unique Word the use of encrypted commands and formatting special and secure for FACT commands in each interfacing program.

V

V1 Critical engine failure velocity safe operational limits preprogrammed into TRAC/FACT program and engine performance sensed locally.

V2 Takeoff climb velocity preprogrammed in to flight robotics in the future for future robotics flight. Safe operational parameters for V2 for FACT monitoring for FACT event flags.

VA Volt-Amperes monitored for operational alerts by TRAC/FACT system and for switching to TRAC/FACT power system.

VAC Volts AC Monitored

VAP Visual Aids Panel videoed and electronic format recorded and reported for redundant storage.

VAPS (1) Virtual Avionics Prototyping System (2) Virtual Applications Prototyping System these two to be used in the development of the TRAC/FACT system and components and incorporated in a proof tested form as a virtual RC simulation pilot station operation and for total system practice to simulate a FACT event for crew drills.

VAU Voltage Averaging Unit to be monitored by the TRAC/FACT system and a final regulator and fuse able link protection to critical TRAC/FACT components.

VBV Variable Bypass Valve controlled and monitored as deemed critical to TRAC/FACT system of management.

VCCS Voice Communication Council System electronic translation programs and voice recognition to run in TRAC/FACT aircraft with universal (Eng) language. Additionally electronic data communication link timed with voice communication to shadow and verify message accuracy in the aircraft and on the surface This message protocol should be part of an emergency message protocol developed for cross communication via different wireless protocols interfaced and processed in the TRAC translation scan portion of the PFN/TRAC/FACT unit. It can be further encrypted for FACT command controls.

VCD (1) Voltage Controlled Device (2) Variable Capacitance Diode

VCO Variable Controlled Oscillator

VDC Volts Direct Current the 4 electrical component lines above will be SUC to TRAC/FACT systems as their application is critical to flight control and accountability in real-time. Either, directly connected or by interfacing with controllers, sub-systems or electrical bus in the appropriate FACT manner to insure uninterrupted service during a FACT event.

VDL VHF Data Link will be used to handle audio/video and large quantity of compressed digital telemetry data in to short packets from aircraft to surface gateway & data repositories for TRAC/FACT control command centers. Priority screening for data transmitted progression will be controlled in real-time by the FACT event software able to quarry the appropriate systems and/organize the transmission. This is done in both directions and timed universally by constant satellite timing. Actual frequencies will be determined by industry standard efforts and FAA and FCC approval and dedication.

VDOP Vertical Dilution of Precision monitored and compensated by appropriate sub-systems with alert flags for out of acceptable parameters possible FACT trigger.

VDR VHF Data Radio

Vertical Speed The rate of change of pressure altitude, usually calibrated in hundreds of feet per minute. Transduced to a format for the TRAC/FACT program to monitor rate of clime for FACT event flags.

VFO Variable Frequency Oscillator FACT implementations to be determined by application and system placement.

VFOP Visual Flight Rules Operations Panel Videoed and electronic signal stored.

VFR Visual Flight Rules To be equated as an electronic signal on board the aircraft via flight cams/night vision/radar equivalents factored by a software algorithm and configured as per visual flight rule requirements to be used in human machine interface applications to create virtual flight for real-time FACT event aircraft in simulator and monitoring screens. Also possible use for local pilot help if trusted Pilot determined. And additionally employed for Robotics via data formatted for FACT program to manage the Flight controls more responsive to real-time obstacles in the flight path.

REMINDER NOTE: On addressing terms. Bold face comments are made to define and teach the PFN/TRAC/FACT system not to further any base understanding of terms and acronyms listed and defined in small print. They are used to stimulate dialog and understanding to how this machine-messaging network interfaces all machinery equipment and vehicles for aviation with surface management and transportation.

Understandably VFR rules refer to flight conditions and not normally used by automated landing systems. They refer to pilots rather than an ILS landing. However as time goes on the robotics and RC assist systems will be better able to assist compromised pilots or limited skilled pilots (possible JFK Jr. scenario) if this proper software has been developed for even good and clear flying conditions. Obviously, it is needed for FACT event flight and landings at SB ASAP. This paper is dedicated to employing all the elements that make up aviation flying and conditions for FACT rather than local pilot to control and deal with in a real-time instant.

VHF Very High Frequency. The portion of the radio spectrum from 30 to 300 MHz. To be used as detailed and needed for TRAC/FACT applications with local control managed by FACT protocols.

VHS Very High Speed

VHSIC-2 Very High Speed Integrated Circuits—phase 2 These 2 above will be employed as much as possible and be an ongoing work in progress and better speeds are available. Always the fastest data speeds are given to real-time flight controls in processing and communications.

VIGV Variable Integral Guide Vane

VISTA Virtual Integrated Software Test bed for Avionics to be used to test interfaces and sub system integration and design for new ASICs to be TRAC/FACT units in avionics.

VIU Video Interface Unit will be expanded with dedicated circuitry and data handling for critical FACT event data. Special for cockpit applications, cabin surveillance and TRAC/FACT systems security and aircraft integrity. Separate but equally secure Flight Cams. With less secure multimedia systems for passenger entertainment. However all systems to be useable by FACT robotics and FAA/FACT homeland security. Possibly hardware Protocols like DES and FACT software.

V/L VOR/Localizer used as detailed for FACT flights and landing.

VLSI Very Large Scale Integration a TRAC FACT constant.

VLV Valve

V/M Voltmeter

Vmo The maximum airspeed at which an aircraft is certified to operate. This can be a fixed number or a function of configuration (gear, flaps, etc.) or altitude, or both. Vmo to be factored in to FACT program and used as a FACT event flag if appropriate.

VNAV Vertical Navigation monitored and Managed by FACT programming as needed.

VNR VHF Navigation Receiver used as needed and data factored into the robotics FACT flight and landing programs.

Voispond A causal function that would automatically identify an aircraft by a voice recording. Voispond is not yet implemented. To be used as detailed in this paper as a FACT identity protocol.

VOR VHF Omni-directional Radio Range. A system that provides bearing information to an aircraft.

VOR/DME A system in which a VOR and DME station are co-located.

VOR/MB VOR/marker beacon.

VORTAC A system in which a VOR and a TACAN station are co located. The 4 terms above are all to be used by FACT programming as needed to best out fit each avionics system per each aircraft. Ideally the best systems will be universally made more available for legacy aircraft.

VOS Velocity Of Sound

VOX Voice Transmission Recorded and reported on the surface and throughout the aircraft.

VPN Vendor Part Number to be recorded and reported in the FACT registry for each aircraft that it is interfaced with.

VR Takeoff Rotation Velocity monitored and recorded.

VRAM Video Random Access Memory all necessary application software and drivers to be redundant in the TRAC/FACT system in isolate RAM.

VS Vertical Speed monitored and Factored by FACT for event robotics implementation.

VSAT Very Small Aperture Terminal.

VSCF Variable Speed Constant Frequency to be determined by application for FACT transmissions.

VSCS Voice Switching and Control System managed by TRAC/FACT event programming and the surface control.

VSI Vertical Speed Indicator data formatted for the Fact program and TRAC process and recorded and reported to surface FACT system.

VSL Advisory Vertical Speed Limit advisory may be preventive or corrective (TCAS). All such conditions and over speed scenarios to have preventative parameters stored in the FACT software and the system to monitor and factor for FACT response.

VSM Vertical Separation Minimum for rotor wing aircraft and for all aircraft safe position parameters for operation to be programmed in to the Fact program for flight assistance as robotics flight becomes most reliable. Presently, for normal FACT flight exaggerated minimums.

VSV Variable Station Vane.

VSWR Voltage-Standing Wave Ratio. The ratio of the amplitude of the voltage (or electric field) at a voltage maximum to that of an adjacent voltage minimum. Vswr is a measurement of the mismatch between the load and the transmission line. To provide trouble alerts to FACT system with software diagnosing problematic cause e.g. tampering or service failure prompting proper response real-time automated augmentation to include substitution if needed and personnel dispatched to further remedy the difficulty.

VTO Volumetric Top-Off.

VTOL Vertical Takeoff and Landing monitored and managed as application specific for helicopters, pogos of old and ospreys if the military implement with DED and DET most likely.

W

WAAS Wide Area Augmentation System (Method of Differential GPS) to be used in the location and tracking of a FACT event access via the communication link established from the airborne TRAC/FACT unit and transponders.

WADGNSS Wide Area Differential Global Navigation Satellite System.

WADGPS Wide Area DGPS o be used in the location and tracking of a FACT event access via the communication link established from the airborne TRAC/FACT unit and transponders.

WADGNSS Wide Area Differential Global Navigation Satellite be used in the location and tracking of a FACT event access via the communication link established from the airborne TRAC/FACT unit and transponders.

WAFS World Area Forecast System interfaced with TRAC/FACT system and data available formatted for immediate application with the TRAC/FACT system command and control and regionally relevant provided to the TRAC/FACT unit performing FACT flight.

WAI Wing Anti-Ice SUC to TRAC/FACT—with FACT having sensor data for wing ice condition and deployed as needed in the TRAC FACT flight.

WARC-92 World Administrative Radio Conference (1992).

WARC-MOB World Administrative Radio Conference for the Mobile.

Service the 2 above to take part in as much as they are active in the determination of standard frequency and RF protocols.

Waypoint A position along a route of flight. Will be used as stated earlier in the robotics FACT flight via these transmissions especially formatted for processing for this purpose both in the aircraft and via the surface matrix.

WCP WXR Control Panels videoed and recorded and reported.

WD Wind Direction always sensed, recorded, reported, and used in the Flight maintenance.

WES Warning Electronic System interfaced into the TRAC/FACT system.

WEU Warning Electronic Unit interfaced into the TRAC/FACT system.

WFA WXR Flat Plate Antenna

WGS World Geodetic System

WGS-72 World Geodetic Survey of 1972

WGS-84 World Geodetic System 1984 The 3 above used as relevant for robotics flights and to determine safe flight paths to the SBs.

Whisper—Shout A sequence of ATCRBS interrogations and suppressions of varying power levels transmitted by TCAS equipment to reduce severity of synchronous interference and multi-path problems. To be used in the current applications but the data formatted for the TRAC/FACT system.

WIP Work In Progress PFN/TRAC/FACT System

WMA WXR Antenna Pedestal & WXR Wave guide Adapter

WMI WXR Indicator Mount

WMS Wide-area Master Station will be employed in the navigation programs and communications for FACT monitoring and management as need be.

WMT WXR Mount

WN Week Number

WORD Grouping of bits. Size of group varies from microprocessor to microprocessor. Will be used as appropriate in the TRAC processor/FACT programs the interface software to all necessary sub system microprocessors or controllers WOW Weight On Wheels as sensed in the aircraft to be transmitted to the TRAC/FACT processor on board and to the TRAC/FACT surface computers to check for abnormalities. A section of the taxiway to be set with a scale mechanism weighing those aircraft not having weight sensor and software algorithm to determine total aircraft weight. These records are stored on board the aircraft and in the FACT Mass data storage and factored by FACT programs for a FACT flag event (criterion to be determined and application to be determined as meaningful or discernable data per aircraft type).

Additionally, fuel and ship, store weights, Baggage plus shipping weights and people carry on weights could be measured and added to TAR weight value of the aircraft each receiving inspection weighed in and entered electronically into the FACT system. This record used to create traveling weight profiles for aircraft type, route weights all sensitive to time of year activities which may be used to project wear and tear on aircraft with flight conditions recorded during all flights for early safety checks on structural components and for transportation management through out the air and surface systems.

WP Working Paper to be a continual process, however this procedure needs to be put in place for the use of TRA/FACT documentation even in the earliest form. This final development of the specific systems in an aircraft to be FACT worthy may need to be handled with certain security measures in place. A FAA/FACT homeland security group on Technology security should determine this. Obviously, all specific code writing (encrypted) software needs the highest security, but even for how existing COTS are used needs some security.

WPT Waypoint used in TRAC/FACT flights to monitor for an event and to manage any SB point. The type of technology used may vary at first but the tracking function must be redundant both in the TRAC/FACT system in the aircraft and on the surface. As time passes the best combination or best technology that can be secured/protected and provide consistent redundant and reliable service may be consolidated and integrated as an ASIC-SOC for a PFN/TRAC/FACT set of markers. Ideally, universal use and interfacing improves efficiency and cost effectiveness. However, any and all operating systems performing way point location functions or aircraft tracking must be configure to interface with FACT or FACT will run a sub routine to use their formatted data. Hopefully all technologies and commercial interest will want to interface with the TRAC/FACT System the way FAA/FACT home land security determines best for safe secure control in the system data management.

WRC World Radio communication Conference— Conferences organization will meet to determine area standards and global standards in frequency and for procedures to be incorporated in to computer and automated protocols for real-time application with some uniform consistency. At least this should be the goal. As much as possible the use of TRAC should be uniform around the world and respectful of individual rights with greater public safety in transportation. Due to national cultural/religious differences the implementation of TRAC/FACT will vary to some degree. It would be possible for automated stored FACT programs to monitor for different maybe unfair FACT Events and to use different ded dedicated frequencies for conducting FACT procedures and protocols in an airspace over a particular area. The inventor hopes through WRC and other industry organizations and national government agencies cooperating that the same frequencies will be used around the world generally and that FACT procedures and protocols to determine an event and any course of action become universal with good respect for human rights as mentioned above.

WRS Wide-area Reference Station all systems used for tracking aircraft will be used as needed in the TRAC/FACT system by first formatting data to be synthesized and factored by running programs and sub routines in the FACT operation.

WRT WXR Receiver/Transmitter all such devices are to be interfaced with the TRAC/FACT system with identifiers.

WWW Internet World Wide Web IP connections and WWW communication link in flight is part of the in flight systems connected to the TRAC/FACT management system on board. This is a recent area of commercial infringement on TRAC proprietary technology that should be interfaced with FACT event control during a WoJack event or any FACT event. It is also another system that must be a sub system to the TRAC process. Additionally all data on aircraft location, performance and impact on the environment should be handled by FACT and presented on public web pages on the WWW. This is another proprietary function of the PFN/TRAC system.

WX Weather

WXI WXR Indicator

WXP Weather Radar Panel

WXR Weather Radar System the 2 above all crucial weather data timed and positioned is to be delivered via useable data streams to the FACT program and the FAA/FACT command control center for monitoring and mid flight course corrections as well as RC landings.

WYPT Waypoint Altitude all way points should be monitored by TRAC/FACT for deviation and FACT event flag (altitude) but used as crucial sensed events in the robotics flight of the aircraft.

X

X-BAND Channel The frequency range between 8000 and 12500 MHzX-A DME channel. There are 126 X-Channels for DME operation. For the first 63 channels, the ground-to-air frequency is 63 MHz below the air-to-ground frequency. For the second 63 X-channels the ground-to-air frequency is 63 MHz above the air-to-ground frequency. These above communications have to be completely controlled from FACT command control central handling a FACT event on board the compromised aircraft. The TRAC processor also can use all the frequencies available in its automated contact to the surface. However, all local communication switching must be locked out from local control. And the aircraft monitored for any unauthorized transmissions.

X.25 Packet Switched Data Network X.25 to be used for TRAC/FACT data and Communication Link for robotics and remote control.

XCVR Transceiver interfaced into the TRAC/FACT system on board and on the surface.

XFR Transfer

XLTR Translator XLTR unit will be part of the TRAC process to scan different communication protocols and transfer emergency messages via any communication link interfaced with a TRAC system.

XM External Master

XMIT Transmit

XMTR Transmitter on board all interfaced, surrounding area monitored by TRAC/FACT RF scan system.

XPD ATC Transponder (also XPDR, XPNDR, TPR) data interfaced into the TRAC/FACT system in helping to monitor flights for FACT events and to fly and land them via FACT robotics programs and RC flight commands.

XPDR Transponder to be protected from in flight tampering and RF incorporated in creating the PFN/TRAC unit in aircraft.

Y

Yagi Antenna An antenna with its maximum radiation parallel to the long axis of its array, consisting of a driven dipole, a parasitic dipole reflector, and one parasitic dipole director or more.

YSAS Yaw Stability Augmentation System sub-system to TRAC/FACT.

YD Yaw Damper automated for TRAC/FACT flight SUC to FACT.

Z

Z Refer to reflectivity factor.

ZFW Zero Fuel Weight. TRAC/FACT on board system will have the capability to dump fuel in the Hi Jack event as part of the first line of TRAC/FACT defense options, and to dump it along a Safe fly crash zone where hazmat surface teams are activated to evacuate, initiate preplanned protective measures and deal appropriately with such an in flight fuel dump if over land (SEA response?). Additionally, a compressed flame retardant possibly CO2 should be released in the evacuated areas of the fuel tanks to suppress remaining fuel ignitions—(possibly some expandable flame retardant gel or O2 absorbent foam as another possible tank filler or a solvent solution that reduces fuel to be flammable) Final Approach to SB controlled crash/landing zone with all flame suppression measures employed on the ground. NOTE: Absolute Emergency Fuel dump requires tanks to be empted in 30 sec while simultaneously filled with anti inflame ant. Triggered by a confirmed collision (robotically determined by PFN/TRAC/FACT matrix or FAA/FACT command surface control center. This is a definite collision response and the fuel dump insures flight termination with the least incendiary contribution to accident fires. Not a good option, hopefully not a necessary one.

Z-Marker A marker beacon, sometimes referred to as a station locator that provides positive identification to the pilot when the aircraft is passing directly over a low frequency navigation aid. Z-Markers will be used on a ded TRAC/FACT frequency. However the protected FACT program must be capable of out thinking the bad guy. This means that all location data is used by TRAC/FACT programming and all forms of communication. Code and sub programs have to be as deeply written, as there are accessory options on any specific aircraft. For example the FACT program must be capable of processing GPS, dead reckoning, all the marker frequencies, Lorands, automated RF triangulation, use any location data from cellular phone protocols and contact TRAC/FACT command and control center via all RF equipment interfaced via wireless gate ways to IP internet/intranet direct connect confirm and coordinate all data available. The objective is to develop a mindful machine in the aircraft that moves at the speed of electricity or light from local computer generated decisions to surface override commands. It is suggested as an ultimate security measure that FACT code and encryption always be subject to the Chief Executive's order, the president of the US for the US must have total override and have the same security procedure as those held for nuclear weapons along with the same backup procedures.

Special Z-Markers will be along the SB routes to SBs with physical security and electronic integrity checks through the system. (Frequency to be determined and encrypted coordinates as well as an integrated local GPS sealed back up to sense any unauthorized movement of the RF unit. Ultimately this should be an application specific PFN/TRAC Z-marker unit. Additionally, system integrity checks between Marker and FACT command control and security/service check schedule.

Summary

The PFN/TRAC technology provides the capacity to organize, record, report, relay and control data and equipment through a large machine messaging matrix, by either sharing or replacing local and standard Human Machine Interfacing HMI with accountable robotics and/or remote control. This patent filing deals with transportation and specifically avionics and air travel.

The following are basic terms and definitions used for this invention: The PFN is a Protected Primary Focal Node (an accountable telematics interface unit and communication router. The PFN contains TRAC a Trusted Remote Activity Controller to perform accountable & reliable robotics and remote control. FACT stands for Federal Access and Control Technology. RC=Remote Control, WoJack=War ops and Jack is taken from hi jacking. TRUSTED for this invention means; reliable, accountable, and Acceptable to all the public (the citizens, government, and commerce).

Of particular value right now, TRAC technology can be embedded into aircraft (at the design stage or after-market) and perform accountable functions for the purpose of gaining control and stopping the unauthorized or unsafe use of an aircraft. Known as the PFN/TRAC SysteMTM, the architecture utilizes existing Commercial Off the Shelf (COTS) aircraft technology to create the automated controls for robotics flight and remote controlled landings absent any human (local) to pilot the aircraft.

However, in a hijacking the lack of flying skill is not the only concern. The aircraft might well be commandeered and deliberately used and guided for it's destructive potential (e.g. a human guided missile into the WTC). In this scenario it is necessary to restrict the local flying controls immediately. For fly by wire controls the conversion to exclude a local pilot on board the aircraft can be achieved far faster than those aircraft still using physical links. Total hydraulic systems and hydraulic assist systems can be converted to exclude local controls easer than physical link systems, but still more difficult than fly by wire systems. Systems and modalities for physical lockouts on human controls and the automation of those controls is taught in prior related filings so that anyone skilled in the art (engineers) can shop up the necessary devices to construct a protect an RC capable or robotics flight aircraft.

The initial goal after eliminating local control is to stabilize the planes flight path. This second objective is accomplished via robotics (for better real-time responsiveness) in flying the plane to a Safe Base This control protocol PFN/TRAC System is secured and secluded onboard with preprogrammed software (5 preprogrammed flight plans available to TRAC processor) The TRAC processor is interfaced with the essential E/E system bus to operate the planes flight control surfaces to guide it to the best location emergency response specific safe base. All available location systems and communication systems are interfaced with the TRAC processor. Additional controls interfaced with PFN/TRAC are to be the cabin and cockpit air pressure controller to restrict any air exhausted from the aircraft by either routing the air through carbon dioxide scrubbers/converters, as well as adding fresh air. The removed and compressed atmosphere is canned. This un-recyclable air or waste air is then presented to a sensor array to detect biohazards and toxins. Once transducers have converted any molecular substance to an electrical signature, the signal is analyzed for recognition by the TRAC system software library, recorded and reported to the surface by any secure on board TRAC unit for the surface Safe Base system to prescribe the appropriate safe base response to the troubled landing craft. Informed decisions to determine whether to terminate it bag it, sterilize it or how to unseal it on the ground). Also, connected to the ventilation system the TRAC processor controls a valve with debilitating gas (sleep gas or chloroform) that can be activated from the ground or robotically for what is termed a WoJack scenario or FACT protocol.

During the final approach to the designated safe base landing zone the robotics flight and glide path control does a hand off to a Remote Control RC pilot in a surfaced based converted flight simulator receiving secure and redundant essential data streams via a protected communication system with the greatest real-time responsiveness of the aircraft heightened by a guardian software algorithm. The result is an intelligent airplane with an accountable autopilot and a Remote Control RC pilot.

Abhorrent RC Accessory Options

TRAC will have the ability to dump any fuel from a remote location or as a robotics function another option that must be reviewed, but can be available. Obviously, the PFN/TRAC system could perform all these undesirable functions as well; including the ultimate destruction of the aircraft. The proper Decision Tree protocol has to be determined ahead a time by all the public for these emergency FACT scenarios. PFN/TRAC was created to improve public safety; the quality of human life and to save lives in transportation, e.g. A detected FACT/WoJack flagged event with no ground or robotics control may well result in a forced destruction of the FACT event aircraft. But at least we are progressing options to save more lives through technical advancement, both through better management of our equipment and through an increase communication with each other and our machines.

What is claimed is:

1. An aircraft management system including at least one 1A PFN/TRAC aircraft controller/router, that interfaces at least one of essential flight controls, existing flight controls and system data streams to detect a troubled aircraft and determine a federal access control technology (FACT) event condition, including a Systems Under Control (SUC) to the at least one 1A PFN/TRAC unit, said aircraft management system optionally providing at least one of Remote Control (RC) and robotics to incrementally decrease public safely risk by at least one of thwarting the unauthorized and reducing the un-safe use and collateral damage of the troubled aircraft, by locking down local human flight controls and initiating a preprogrammed robotics flight plan stored in secured resident flight computer responsive to the at least one 1A PFN/TRAC unit, the at least one 1A PFN/TRAC unit sensing and regulating cabin and flight deck compartment atmosphere, and optionally treating fuel compartments and dumping unnecessary fuel prior to impact or a FACT landing at a safe location and being responsive to commands given by at least one 1A PFN military RC pilot in an assist or escort aircraft and accepting same from local RC commands after a hand off protocol to the safe base remote control pilot for any final glide path RC and landing commands to return to the surface at a designated secure safe base (SB) and stop at a special position, the at least one 1A PFN/TRAC unit including at least one application specific to a FACT event flight determined by continual real-time telemetry transmitted to the surface so an optional local response includes at least one of bagging the aircraft and storing the aircraft in an isolation hanger until at least one of a biological and chemical hazard have been checked and optionally identified and toxins when present at least one of neutralized and further contained and further reported, optionally via a TSA/FACT Department of homeland security matrix of intranets and the Center for Disease Control CDC; the at least one 1A PFN/TRAC unit optionally performing additional functionality responsively with other portions of a PFN/TRAC system and terrestrial PFN units optionally via at least one of the matrix of intranets, dedicated short range communications and geo/time synced portable networks configured in real-time to connect a specific group of responding PFNs from cross applications optionally into a FAA/AOC/TSA FACT security Air intranet and first responder communication loop for close in air to ground responsiveness to clear impending crash or unscheduled landing area via local wireless networking; and the at least one 1A PFN/TRAC unit posting the aircraft terrestrial contact define the condition of the aircraft and or the extent and nature of any debris field via surviving wireless and sensing still intact and responding to determine how best to manage safely the aircraft's responder's effort to assist the FACT event aircraft.

2. An aircraft management system according to claim 1, wherein said at least one 1A PFN/TRAC unit further comprises at least one of a hardware combination, interfacing, connection, augmentation and software development to effect a FACT flight event response, optionally including a protocol for at least one of hijacking of an aircraft and unsafe use, and including application specific functionality for interfacing of at least one of OEM avionics, aircraft bus and E/E systems, and to further include interfacing of at least one of sensors, audio, video, digital, analog, automation, actuators, augmentation, and customization, providing protection to complete a protected locally and remotely automated flight, optionally standardized as at least one of policy, protocol, rule and rules, and made into code or implemented via government mandate with regulations, and law for at least one of commercial air travel transport applications, private aviation and general aviation, and optionally for government and military aviation via the at least one of RC and robotics and networking via the at least one of electronics, avionics, security, operations and management innovations and accountable recording, reporting and recovery innovations.

3. An aircraft management system according to claims 1 or 2, further comprising a protected remote management system at least one of dispersed and centralized singular in function and redundant for reliability and to accountably perform remote control and robotics via at least one protected memory storage, both locally and reported to additional data storage devices, and additionally reported to a AOC/TSA FACT NORAD Air CINC command intranet and to a TSA FACT Department of Homeland Security command center en route associated with the PFN/TRAC system and FACT security program.

4. An aircraft management system according to claims 1 or 2, further comprising at least one protected Primary Focal Node (PFN) and Trusted Remote Activity Controller (TRAC) to perform at least one of accountable robotics and remote management, optionally as a local system and responsive to at least one accountable remote TRAC system and comprising at least one of System On Chip (SOC) technology, and further including at least one cross environmental application, and interfacing with the PFN/TRAC management System and FACT terrestrial machine messaging units and intranets.

5. An aircraft management system according to claim 4, wherein the at least one 1A PFN/TRAC unit interfaces into air fames via a hybrid construction of the at least one 1A PFN/TRAC unit and at least one stand alone self powered PFN configured as a portable unit and designed specifically to receive via a non invasive wireless receiver circuit at least one of ATM and wireless aircraft transmitted avionics flight data reported to FAA/AOC flight operations and to an acceptable isolated wireless unit in real-time to at least one TSA FACT terrestrial monitoring terminal to be located with AOC systems to help coordinate TSA/air marshal with ground security and air operation, and to test more robust and aggressive implementation of accountable remote control technology isolated from real-time flight controls.

6. An aircraft management system according to claims 1 or 2, further comprising at least one DSRC wireless interfacing including bluetooth to be interfaced in either the at least one 1A PFN/TRAC aircraft unit, the progressive air marshal unit, and a tester interface in such a manner access and control all wireless, handheld or carry on devices, cellular phones, navigational aids, personal computer products, Laptops, PDAs and restrict their use during flight and use their CDMA and TDMA or any other wireless longer range or short communications and send FACT EAM messages to the surface TSA/FACT Security intranet via the TSA Air FACT intranet and any such translation processing between wireless protocols.

7. An aircraft management system according to claims 1 or 2, further comprising at least five FACT event Safe Bases (SB) across the United States, to be accompanied by at least five safe air space routes and programmable flight plans to include approach glide paths and landing software using AbS systems and PFN transponder enhancements to effect the robotics flight and landing of aircraft and in time to include all aircraft.

8. An aircraft management system according to claims 1 or 2, further comprising at least one Safe Base to be equipped with emergency medical personnel and appropriate equipment to handle bio-hazards, chemical toxins, nuclear toxins and traditional explosives, and including at least one of the functionality of: skilled squadrons of remote control (RC) pilots with stations that are constructed optionally from hybrid flight simulator technology and interfaced real-time data delivered from the aircraft to provide close in real-time flying skills during approach and landing of a troubled FACT flight responsive to the 1A PFN/TRAC aircraft unit performing robotics serving the RC link; and an escort assist aircraft with a second pilot, an additional RC pilot to include cockpit station for controlling the troubled plane after an automated robotics take over and in flight rendezvous that is accompanied by a second plane and specialists for the FACT emergency, and accessing the aircraft in a preplanned special manner to best protect public safety and preserve national security.

9. An aircraft management system according to claims 1 or 2, further comprising at least one of medical tracking and bio sign telemetry to include robust remote control to deliver automated at least one of treatment and medication via a repeater function of the at least one 1A PFN/TRAC unit and TRACker operated by TSA/FACT security in conjunction with TRAC FACT command and control protocols, while at least one of the aircraft is on the surface and airborne and to include any wireless connected or routed communication via the PFN/TRAC system or via any systems interfaced therewith.

10. An aircraft management system according to claims 1 or 2, further comprising at least one of a robust remote control and preprogrammed robotics weapons or hijack countermeasures that incapacitate, render unconscious, change the behavior or destroy the perpetrator by gas, projectile, electrical shock, chemical substance, or other physical means.

11. An aircraft management system according to claims 1 or 2, further comprising at least one means for providing at least one of a protected incapacitating injection of a debilitating substance, an incapacitating electrical shock mechanism, an automated projectile mechanism embedded in an application specific location in the airframe or in the essential flight control human interfaces or pilot seats and responsive to the at least one of the 1A PFN/TRAC unit and TRACker approved for this interface function and remotely triggered or energized via robotics.

12. An aircraft management system according to claims 1 or 2, further comprising at least one proprietary PFN/TRAC/FACT protocols and teachings for the progressive interfacing of hardware, software and wet ware Human implementations as a response structure including procedures, policies and the development of programs, protocols and law increasing public safety and national security while remaining constitutionally structured to maintain and insure freedom of movement with a free and respectful society.

13. An aircraft management system according to claims 1 or 2, further comprising automatic lock down of all local flight controls when seat defense measures have been deployed, and additionally the at least one 1A PFNTRAC System has initiated a FACT event and the aircraft flight controls would be under robotics safe base programming, with coordinates reported to the surface and escort RC pilot in route to intercept the robotic flight for close in support and further flight management and control.

14. An aircraft management system according to claims 1 or 2, further comprising a Remote Control surface based Pilot to take a controlled handoff off of the FACT flight via at least one 1A PFN/TRAC robotics flight programming and RC recognition capability to interface the air born assist RC chase pilot the surface RC pilot and any real-time error correcting robotics or AI for the final approach, landing and parking of the aircraft.

15. An aircraft management system according to claims 1 or 2, further comprising a surface remote control pilot station to be more rapidly configured from existing appropriate flight simulators that receive direct flight data from the actual troubled FACT flight aircraft and the simulator provide a virtual real-time RC pilot experience due to the short transmission distance generally 4–5 miles or less and basically for the final glide path and landing.

16. An aircraft management system according to claims 1 or 2, further comprising a safe base 7/24 duty ready squadron of RC pilots qualified on various aircraft with application specific interface software for the compromised flight and specific aircraft with the, squadron made up at least one of commercial companies posting employees to this duty and military NORAD the North American CINC Air command supplying and staffing the squadron, with special TSA pilots.

17. An aircraft management system according to claims 1 or 2, further comprising assist jets with RC pilots and troop support air first responders with specialist and squadrons and with their location determined by DOD/NORAD/FAA/TSA and the Department of Homeland security with a 24/7 readiness to be scrambled on any TRAC/FACT flagged flight respective of intercept coordinates via FACT/DES in real time communications and AIR CINC/NORAD command and the pursuit aircraft closest either airborne or surface ready.

18. An aircraft management system according to claims 1 or 2, further receiving data from the TRAC unit flagged with a FACT emergency event like a scenario to down load telemetry data from the troubled aircraft to prescribe specific ground response at the safe bases, and to be in continual flight control via the preprogrammed robotics flight for ground support and surface waning to clear any impact areas to eliminate as much collateral damage as possible.

19. An aircraft management system according to claims 1 or 2, further receiving protected accountable event recordings during a FACT event both in airborne FACT Ball receptacles, and regionally on the surface via downloads established to local surface repositories by geo time synced recognition algorithm running GPS data interfaced in the at least one 1A PFN or TRACker unit and AOC/TSA/FACT Security known locations preprogrammed with connectable links as part of a PFN/TRAC/TSA/FACT protocol to have exact configurations, application and use determined for the structuring and implementation of appropriate rules regulations standards requirements codes or law.

20. A PFN/TRAC system of controller and routers as a series of protected local interface platforms for a multiple of wireless technologies to:
route/translate signals via conversion software programming operating at a higher level application to which the disparate protocols have written code;
route/translate message content via a universal Emergency Action Message content conversion software library that can be transferable between any of the many different wireless protocols to specially process Emergency Action Messaging, FACT EAM messages;
employ a host equipments E/E system to provide a stable primary power source for PFN/TRAC/FACT operations and to maintain supplemental power supplies for reliable service; recover locally generated data from equipment, bodies and accessories interfaced to include, a vehicle/baggage tug 1SV PFN or a car DRC PFN, a piece of equipment a metal detector or conveyor belt via 1E PFN, a person, a guard, a worker via a 1P PFN belt, bracelet, band, or impregnated in a garment or a stand alone digital cam and microphone via 1Ps PFN with a solar array or a injected or implanted chip and automated medicator and sensor via 1PI PFN and the TRACker in passive report and test mode accessory interfaced with a GPS receiver/ and or number or type of sensors;
operate activity controls either via AI robotics use of data recovered and or preprogramming or by remote and automated command and control with or without local human collaboration and with reliability enhanced by emergency/supplemental power available for completed operations to include a multiple event storage with protected limited and authorized access to FACT record storage in the PFN/TRAC configuration whether centrally configured or a dispersed configuration performing the functions of local networking and or responding to a larger matrix or network of intranets to for the TSA FACT Security network for the Department of Homeland security.

21. A PFN/TRAC system according to claim 20, for a 1E equipment PFN/TRAC unit to be attached to stationary equipment and derive primary power, machine messaging data, via the attachment to the equipments E/E system and control machine activities and provide an accessory interface platform for further interfacing either wired or wireless components to translate, route report and record messaging and commands to remote locations.

22. A PFN/TRAC system according to claim 20, for 1SV PFN vehicle platforms automotive, industrial and rail PFN/TRAC unit to be attached to mobile equipment and derive primary power, from at least one of the vehicle E/E system and vehicle bus system and to access and process machine messaging data, and control machine activities as well as, provide an accessory interface platform for further interfacing and processing either wired or wireless to translate, route report and record messaging and commands to remote locations.

23. A PFN/TRAC system according to claim 20, further comprising a progressive DRC PFN automotive vehicle PFN/TRAC unit to interface telematics technologies and vehicle E/E systems or automotive CAN bus technology to connect all private and commercial vehicles to the PFN/TRAC system and develop the FACT security program for automobiles and commercial motor carriers and buses to provide seamless homeland security for everything on or near the earths surface via increasing the Driver Resource Center's interface and management service capability to include carryon cellular phones and other wireless device, and manage them in conjunction with OEM collision avoidance programs and the PFN/TRAC system of movement management to reduce driver distraction and easy driver workload with total vehicle integration in time by providing additional capacity for accessory interfacing for either wired or wireless and processed, translated, routed, reported and recorded as messaging and commands to remote locations, and in a process to become a compete and protected 1SV PFN/TRAC unit.

24. A PFN/TRAC system according to claims 1, 2 or 20, further comprising at least one carryon configuration of COTS products PC software designed to determine application specific final design for PFN/TRAC interfaces, and to serve as a stop gap technology or an implementation filler for the PFN/TRAC System and FACT Security program, wherein the TRACker first enters the system with passive parallel and redundant messaging and then processes more robust activity commands and control to disconnected actuators in a test and record analysis mode for safety sensitive applications to include but not limited to air travel, rail road applications, interactive highway systems to determine the best more permanent design and then placed into service with the proper application specific PFN/TRAC unit.

25. A PFN/TRAC system according to claim 20, further comprising a 1M PFN/TRAC marine platform unit to have all the appropriate wireless telephony DSRC and satellite wireless in a PFN/TRAC unit interface and Bus connectable to the crafts E/E systems to control and manage the craft's operation via at least one of robotics and remote control and be responsive in the PFN/TRAC System and FACT security matrix.

26. A PFN/TRAC system according to claim 20, further including a 1Ps PFN equipment interface PFN/TRAC unit to be a stand alone PFN interface and derive power from self contained batteries and solar regeneration converted to electrical power and perform all the same interfacing and wireless routing and translation functions in the PFN/TRAC System FACT Security matrix of intranets for Homeland security.

27. A PFN/TRAC system according to claim 20, further including a 1P PFN configured on at least one of a belt, a bracelet, and a bracket, in the form of at least one of a PDA and woven into garment either dispersed oft consolidated, self powered, and connect with a human via various external and subcutaneous interface devices and sensors and to support automated remote and robotics or preprogrammed control function to sense body functions and deliver medication and record and report position and telemetry to remote intranets and to other larger PFNs in the area via DSRC, the unit can derive additional power, via connecting with larger units physically to retrieve data and or auxiliary charging and solar cell hats and shoulder scabbards to do mobile charging, with further interface capacity to connect hand held and portable devices Keyboard, displays readers sensors additional wireless devices and GPS and deliver data generated to the PFN/TRAC system network and FACT security matrix to include EAM translations and message and signal repeating.

28. A PFN/TRAC system according to claim 20, further including a 1PI PFN reduced in size to a SOC chip version of the PFN with a low power requirement and DSRC which is injected subcutaneous under the skin or surgically implanted and provides an identifier signal and telemetry array from sensors wired or wirelessly interfaced via other mini inject able 1PI devices that can operate in harmony to perform an automated muscular tetanus via computerized synchronization to perform physical robotics or remote controlled kinetic movement where nerve pathways are non existent or functioning poorly, thus actually interfacing a 1PI PFN/TRAC unit as a cybernetic local Al device to further integrate the technology with human biological systems and perform bionic movement.

29. A PFN/TRAC system according to claim 28, further including a power source using the body as an electrolyte and two contrasting pieces of metal to create potential and applying an exterior encasement of a 1PI PFN implants the body can generate current for the mini PFN unit as a Soma Voltic cell to either energize the proprietary 1PI PFNs or minimal current RFID injectable technology.

30. A system for interfacing a limited range RFID passive and active tag technology with PFN/TRAC units to first interface reader portions of the technology and capture RDID data identifier and stored tag data and process it through the TRAC processor running RFID programming with a higher level converting algorithm to modulate the data into the appropriate wireless data packets for delivery via the PFN/TRAC System TSA/FACT Security intranets to track and retrieve telemetry of materials in transit and to use the tags as a messenger service or archive file program by interfacing the encoder section of the RFID technology with the PFN and delivering important transport data to the tag for later recovery and use during the transport process.

31. A FACT Chip apparatus comprising at least one chip and a RFID chip is impregnated into a circuit board and delivers identification data to the PFN having a reader antenna interfaced as part of the PFN to identify the components and then check a FACT registry for any legal status notices posted in the applicable FACT registry for the part before interfacing it, and wherein data is stored on the RFID tag by a PFN and if not cleared of any special encoding the last encoding from the previous PFN would be recognized and initiate an alert through the system and back to the FACT registry identifying the unit as unauthorized and possible stolen.

32. A circuit that provides distinct signals as a FACT chip modality and comprising a RFID and smart chip technology including flexible interfacing in PFN/TRAC various units providing a plurality of options to be utilized in the PFN/TRAC system and FACT security matrix.

33. A PFN/TRAC system comprising: protective enclosures configured in an application specific manner for rough service and interfacing with at least one of industry standards, governing regulations and code and to protect electronic contents and the memory and to restrict unauthorized access, to include identifiable access electronically and electrical and electronic seals and physical restrictive access panels and locks.

34. A protective PFN/TRAC system comprising: an electronics protective packaging incorporating a spherical shape constructed of at least one hard but light impact, dent, and heat resistant material coated in a fluorescent friction free coating that is capable of withstanding impacts due to high velocity and containing at least one of: a memory storage, recording device, wireless communication device, a power supply, locating technology, a sensor, digital cam, audio pick up, a visible light source, an audible alert an impregnated antenna, an external physical interface connector, an internal physical interface connector, storing any object requiring such protection, a heat resistant insulating material inside the sphere to protect the contents from further heat and impact, a tamper resistant and tamper detective seal and special threaded and heat seal.

35. A PFN/TRAC system according to claims 1, 2 or 20, further comprising at least one automated portable network function to cross manage intranet movement data via a process that links and routes all data streams from responsive wireless tracking technologies into smart cell processing pockets, that are geo and time synced to define at least one given group marriage from time to time forming automated portable networks of mindful machines, smart freight and HMI with people via individual 1P PFN devices.

36. A PFN/TRAC system according to claim 35, further comprising a multiple of different PFNs from different Intranets to receive and process each other's DSRC or wireless messaging into either special coded FACT priority or TRAC movement management digital report packets and format them in available wireless protocols for a transmission confirmation to the appropriate intranets or another responding set of PFNs; and if unsuccessful, the PFN will store the data packet in memory/buffer to remain there until the unit is quarried by a specific Intranet for a lost asset, or message disregard and delete command, as a normal TRAC movement inventory function; and if a FACT application message continues a timed broad cast beacon signal of the data packet TSA FACT hail to connect with any of the TSA/FACT Intranets, also to include GPS, and direct request activated transmissions of any FACT data packet stored as an automated monitoring program, and with a confirmed transfer store the FACT data packet into the units long term memory until TSAFACT Intranet sends a delete command through out the system or the unit memory or buffer is full and request a download sequence with any TSAFACT mass data handling and storage facility.

37. A PFN/TRAC system according to claim 35, further comprising a series of flexible WLAN portable network to be used to monitor movement and provide telemetry via the linked matrix of TSA/FACT intranets and TRAC intranets, where data is shared and assets can become FACT events or passed back to TRAC movement management.

38. A PFN/TRAC movement management system, comprising: intranets with a TSA/FACT Homeland security program running through and forming a security matrix to monitor and mange at least one of machines, vehicles equipment, materials, structures facilities, objects, and any other asset via a responsive FACT and TRAC connectivity and programming and to include various Intranets and sub intranets, and optionally not limited the PFN/TRACFACT intranets for air travel, land rail and interactive highways, and sea inland waterways inner coastal and the high seas and well as ports, airports, stations and terminal and fixed security facilities as part of any TSAFACT matrix of intranets.

39. A universal Emergency Action Messaging (EAM) system comprising: at least one system that translates emergency communications via a multiple of wireless and hardwired communication technologies in a multiple of known human languages to inform a diverse public, first responders and security personnel in at least two definable levels of security via encryption and predetermined identification requirements.

40. A system according to claim 39, wherein the Emergency Action Messages include at least one of SEAM, TEAM and PEAM messages.

41. A system according to 40, wherein the EAM messaging programs to be deliverable by at least one of globally understood universal images, for local display, uniquely diverse but universal audible alerts and audio information to be communicated globally, translated in a multiple of languages and responsive via voice recognition algorithms and or text conversion algorithms for audio, audio read, read write, read or type displays and or keyboard or audio video response per any HMI interface means available.

42. A system according to claim 41, further comprising a non-emergency use of EAM messaging developments, to include any software, translation, components, firmware, hardware configurations for at least one of entertainment, commercial, social, educational use.

43. A FACT registry system, comprising: devices to maintain and monitor equipment and material via an automated software program that queries PFN/TRAC units and extracts a copy or deletes data of a relevant nature and additionally records equipment interfaced for a compare list function of lost or missing assets and supported by a system wide down load to the PFNs via the various Intranets for lost and found and law enforcement operations and to detect FACT events flags.

44. A PFN/TRAC movement management system as a complete inter modal transportation management system, comprising:

a TSA/FACT security network for moving objects and provides federal access and control technology through out a PFN/TRAC/FACT system, a matrix of intranets that performs real-time auto convergence of a security network encompassing government agencies and their FACT modified sovereign intranets with duty specific registries and various mass data and storage facilities;

monitor and management means for monitoring and managing objects, consumption, use, to analyze and discover any misuse, abuse and unauthorized or unsafe for any application to better insure seamless security, public safety, efficient movement, freedom and accountability; an instrument of the newly formed Department of Homeland Security for the real-time constitutional application of a national threat response mechanism that can be set into automated preprogrammed procedures and protocols for the appropriate monitoring, FACT network management and control to directly meet the threat level set by the national color codes; Red Severe, Orange High, Yellow Elevated, Blue Guarded, and Green low; and flag means for flagging automatically in at least one of TRAC and FACT programs running in PFN/TRAC units or the PFN/TRAC system and changing between cost efficient commercial PFN/TRAC standard management /routing of data and remote communications and the higher FACT level direct connections and remote control commands though the PFN units connected in both commercial and governmental intranets.

45. An interface of a single conductor digital transmission technology, comprising:

a TRAC/FACT and EAM machine messaging providing at least one signal propagated and coded via a portable or permanent PFN/TRAC processor and signal generator circuit interfaced or integrated and in contact with, to incorporate, the chassis of a transport vehicle or shipping container's steel walls as a conductor in a circuit to deliver the signal configured for by the PFN to include at least a minimal 1Ps stand alone PFN interface supporting a sensor array inside the truck, container or compartment of an aircraft to monitor the contents and conditions during shipment and when contact of the metal chassis was made with another PFN the transmitted signal would be received via metal deck plates, or storage racks, or bins on board ship, or in a facility, or in a plane, or truck or via the metal hooks of a port Crain, or forks of a industrial tuck at the airport or rail car on the railroads through direct contact such that the signal would be harvested by the new PFN TRAC unit and the appropriate TRAC/FACT intranet would be detected and routing configured by the receiving 1E equipment PFNs, 1M boat PFN, 1P personal PFNs via hand held contact readers connected to a person's 1P PFN belt interface, or a 1SV surface vehicle PFN or DRC PFN prime mover transporting the container and any, and TSA/FACT EAM messages received or generated during transit would be recognized and forwarded by more direct wireless as well as, deliver local warnings from the containers PFN and internal sensors flagging an alert to the receiving PFNs.

46. A PFN/TRAC system for wireless satellite routing to provide voice service and data communications with accompanying accounting function in the system and in the PFN unit, comprising: COTS DSP wireless telephony technology software/hardware developmental integration and interfacing kits and including a turnkey development system that supports the industry-standard DSP's, and the PFN/TRAC unit interfacing with routing COTS products including at least one of a hybrid set of accountable interface communication technologies and the PFN/TRAC technology programming written application specific for wireless telephony.

* * * * *